(12) United States Patent
Roth et al.

(10) Patent No.: US 7,809,574 B2
(45) Date of Patent: Oct. 5, 2010

(54) WORD RECOGNITION USING CHOICE LISTS

(75) Inventors: Daniel L. Roth, Brookline, MA (US); Jordan R. Cohen, Gloucester, MA (US); David F. Johnston, Arlington, MA (US); Edward W. Porter, Exeter, NH (US)

(73) Assignee: Voice Signal Technologies Inc., Woburn, MA (US)

( * ) Notice: Subject to any disclaimer, the term of this patent is extended or adjusted under 35 U.S.C. 154(b) by 0 days.

(21) Appl. No.: 10/950,074

(22) Filed: Sep. 24, 2004

(65) Prior Publication Data
US 2005/0043949 A1 Feb. 24, 2005

Related U.S. Application Data

(63) Continuation-in-part of application No. 10/227,653, filed on Sep. 6, 2002, which is a continuation-in-part of application No. 10/302,053, filed on Sep. 5, 2002, now abandoned.

(60) Provisional application No. 60/317,333, filed on Sep. 5, 2001, provisional application No. 60/317,433, filed on Sep. 5, 2001, provisional application No. 60/317,431, filed on Sep. 5, 2001, provisional application No. 60/317,329, filed on Sep. 5, 2001, provisional application No. 60/317,330, filed on Sep. 5, 2001, provisional application No. 60/317,331, filed on Sep. 5, 2001, provisional application No. 60/317,423, filed on Sep. 5, 2001, provisional application No. 60/317,422, filed on Sep. 5, 2001, provisional application No. 60/317,421, filed on Sep. 5, 2001, provisional application No. 60/317,430, filed on Sep. 5, 2001, provisional application No. 60/317,432, filed on Sep. 5, 2001, provisional application No. 60/317,435, filed on Sep. 5, 2001, provisional application No. 60/317,434, filed on Sep. 5, 2001.

(51) Int. Cl.
G10L 21/00 (2006.01)
G06F 3/16 (2006.01)
G06F 3/14 (2006.01)

(52) U.S. Cl. .................. 704/270; 715/727; 715/784
(58) Field of Classification Search .................. None
See application file for complete search history.

(56) References Cited

U.S. PATENT DOCUMENTS 4,015,139 A 3/1977 Cleary et al.
4,418,412 A 11/1983 Kariya (Continued)

FOREIGN PATENT DOCUMENTS

| DE | 196 35 745 A1 | 3/1998 |
| EP | 02773307 | 7/2007 |
| WO | WO 00/58945 A | 10/2000 |
| WO | WO 2004/023455 A2 | 3/2004 |
| WO | WO 2004/023455 A3 | 3/2004 |

*Primary Examiner*—David R Hudspeth
*Assistant Examiner*—Brian L Albertalli
(74) *Attorney, Agent, or Firm*—Chapin IP Law, LLC

(57) ABSTRACT

One aspect of the invention involves word recognition that uses scrollable choice lists in which choices are listed in character-order. Another aspect relates to a scrollable, visually-displayed word recognition choice list, where the recognition candidates on the choice list are each associated with a choice-selecting symbol the user can use to select a desired recognition candidate by pressing an associated button, and where the same choice-selecting symbol is used for different choices displayed on the display at different times as a result of scrolling. Another aspect of the invention relates to providing a choice list of best scoring characters for a particular character position in the spelling of a filter that is used to filter word recognition. Another aspect of the invention relates to a choice list used in word recognition in which the choice list can be scrolled horizontally.

38 Claims, 96 Drawing Sheets

U.S. PATENT DOCUMENTS

| | | | |
|---|---|---|---|
| 4,481,382 A | 11/1984 | Villa-Real | |
| 4,610,023 A | 9/1986 | Noso et al. | |
| 4,718,092 A | 1/1988 | Klovstad | |
| 4,829,576 A | 5/1989 | Porter | |
| 4,829,578 A | 5/1989 | Roberts | |
| 4,866,778 A | 9/1989 | Baker | |
| 4,942,616 A | 7/1990 | Linstroth et al. | |
| 4,979,216 A | 12/1990 | Malsheen et al. | |
| 5,021,306 A | 6/1991 | Sauer et al. | |
| 5,027,406 A | 6/1991 | Roberts et al. | |
| 5,040,214 A | 8/1991 | Grossberg et al. | |
| 5,131,045 A | 7/1992 | Roth | |
| 5,208,897 A | 5/1993 | Hutchins | |
| 5,392,338 A | 2/1995 | Danish et al. | |
| 5,428,707 A | 6/1995 | Gould et al. | |
| 5,502,774 A | 3/1996 | Bellegarda et al. | |
| 5,596,676 A | 1/1997 | Swaminathan et al. | |
| 5,632,002 A | 5/1997 | Hashimoto et al. | |
| 5,677,990 A | 10/1997 | Junqua | |
| 5,712,957 A | 1/1998 | Waibel et al. | |
| 5,754,972 A | 5/1998 | Baker et al. | |
| 5,794,189 A | 8/1998 | Gould | |
| 5,799,273 A | 8/1998 | Mitchell et al. | |
| 5,819,225 A | 10/1998 | Eastwood et al. | |
| 5,828,991 A | 10/1998 | Skiena et al. | |
| 5,850,627 A * | 12/1998 | Gould et al. | 704/231 |
| 5,850,629 A | 12/1998 | Holm et al. | |
| 5,852,801 A | 12/1998 | Hon et al. | |
| 5,855,000 A | 12/1998 | Waibel et al. | |
| 5,857,099 A | 1/1999 | Mitchell et al. | |
| 5,864,805 A | 1/1999 | Chen et al. | |
| 5,884,258 A | 3/1999 | Rozak et al. | |
| 5,903,630 A | 5/1999 | Collins | |
| 5,903,864 A | 5/1999 | Gadbois et al. | |
| 5,911,485 A | 6/1999 | Rossmann | |
| 5,915,236 A | 6/1999 | Gould et al. | |
| 5,917,889 A | 6/1999 | Brotman et al. | |
| 5,917,890 A | 6/1999 | Brotman et al. | |
| 5,920,836 A | 7/1999 | Gould et al. | |
| 5,920,837 A | 7/1999 | Gould et al. | |
| 5,924,068 A | 7/1999 | Richard et al. | |
| 5,952,942 A | 9/1999 | Balakrishnan et al. | |
| 5,974,413 A | 10/1999 | Beauregard et al. | |
| 5,982,876 A * | 11/1999 | Albesa | 379/354 |
| 5,983,179 A | 11/1999 | Gould | |
| 5,983,190 A | 11/1999 | Trower, II et al. | |
| 5,987,410 A | 11/1999 | Kellner et al. | |
| 5,995,928 A | 11/1999 | Nguyen et al. | |
| 6,012,030 A | 1/2000 | French-St. George et al. | |
| 6,016,471 A | 1/2000 | Kuhn et al. | |
| 6,029,124 A | 2/2000 | Gillick et al. | |
| 6,029,132 A | 2/2000 | Kuhn et al. | |
| 6,032,164 A | 2/2000 | Tsai | |
| 6,035,220 A * | 3/2000 | Claudio et al. | 455/564 |
| 6,057,840 A * | 5/2000 | Durrani et al. | 715/786 |
| 6,064,959 A | 5/2000 | Young et al. | |
| 6,067,521 A * | 5/2000 | Ishii et al. | 704/275 |
| 6,092,043 A | 7/2000 | Squires et al. | |
| 6,108,631 A * | 8/2000 | Ruhl | 704/270 |
| 6,112,613 A | 9/2000 | Baker | |
| 6,119,085 A | 9/2000 | Lewis et al. | |
| 6,138,099 A | 10/2000 | Lewis et al. | |
| 6,163,769 A | 12/2000 | Acero et al. | |
| 6,167,117 A * | 12/2000 | Will | 379/88.03 |
| 6,195,635 B1 | 2/2001 | Wright | |
| 6,212,497 B1 | 4/2001 | Araki et al. | |
| 6,224,383 B1 | 5/2001 | Shannon | |
| 6,230,131 B1 | 5/2001 | Kuhn et al. | |
| 6,233,553 B1 | 5/2001 | Contolini et al. | |
| 6,266,642 B1 | 7/2001 | Franz et al. | |
| 6,285,980 B1 | 9/2001 | Gandhi et al. | |
| 6,304,844 B1 | 10/2001 | Pan et al. | |
| 6,307,549 B1 | 10/2001 | King et al. | |
| 6,321,196 B1 | 11/2001 | Franceschi | |
| 6,324,510 B1 | 11/2001 | Waibel et al. | |
| 6,342,903 B1 | 1/2002 | Fado et al. | |
| 6,343,270 B1 | 1/2002 | Bahl et al. | |
| 6,346,894 B1 | 2/2002 | Connolly et al. | |
| 6,360,201 B1 | 3/2002 | Lewis et al. | |
| 6,366,302 B1 * | 4/2002 | Crosby et al. | 715/786 |
| 6,366,886 B1 | 4/2002 | Dragosh et al. | |
| 6,374,219 B1 | 4/2002 | Jiang | |
| 6,384,845 B1 * | 5/2002 | Takaike | 715/786 |
| 6,385,306 B1 | 5/2002 | Baxter, Jr. | |
| 6,385,586 B1 | 5/2002 | Dietz | |
| 6,393,399 B1 | 5/2002 | Even | |
| 6,434,523 B1 | 8/2002 | Monaco | |
| 6,453,281 B1 | 9/2002 | Walters et al. | |
| 6,462,616 B1 | 10/2002 | Beswick et al. | |
| 6,581,033 B1 * | 6/2003 | Reynar et al. | 704/231 |
| 6,604,077 B2 | 8/2003 | Dragosh et al. | |
| 6,622,121 B1 | 9/2003 | Crepy et al. | |
| 6,654,721 B2 | 11/2003 | Handelman | |
| 6,658,389 B1 | 12/2003 | Alpdemir | |
| 6,675,142 B2 | 1/2004 | Ortega et al. | |
| 6,684,185 B1 | 1/2004 | Junqua et al. | |
| 6,694,296 B1 | 2/2004 | Alleva et al. | |
| 6,725,197 B1 | 4/2004 | Wuppermann et al. | |
| 6,728,348 B2 | 4/2004 | Denenberg et al. | |
| 6,912,498 B2 | 6/2005 | Stevens et al. | |
| 6,922,669 B2 * | 7/2005 | Schalk et al. | 704/255 |
| 6,925,154 B2 | 8/2005 | Gao et al. | |
| 6,961,700 B2 | 11/2005 | Mitchell et al. | |
| 7,010,758 B2 * | 3/2006 | Bate | 715/841 |
| 7,039,629 B1 * | 5/2006 | Theimer et al. | 707/3 |
| 7,120,234 B1 | 10/2006 | Quinn et al. | |
| 7,124,085 B2 | 10/2006 | Junqua et al. | |
| 7,143,043 B1 | 11/2006 | Vandermeijden | |
| 7,225,130 B2 | 5/2007 | Roth et al. | |
| 7,286,989 B1 | 10/2007 | Niedermair et al. | |
| 7,313,526 B2 | 12/2007 | Roth et al. | |
| 2002/0006126 A1 | 1/2002 | Johnson et al. | |
| 2002/0055844 A1 | 5/2002 | L'Esperance et al. | |
| 2002/0077830 A1 | 6/2002 | Suomela et al. | |
| 2002/0094067 A1 | 7/2002 | August | |
| 2002/0184021 A1 | 12/2002 | Horvitz | |
| 2002/0184035 A1 | 12/2002 | Hartley et al. | |
| 2002/0188448 A1 | 12/2002 | Goodman et al. | |
| 2003/0028382 A1 | 2/2003 | Chambers et al. | |
| 2003/0083866 A1 | 5/2003 | Sorbara et al. | |
| 2003/0088410 A1 | 5/2003 | Geidl et al. | |
| 2003/0105623 A1 | 6/2003 | Cyr et al. | |
| 2003/0149565 A1 | 8/2003 | Chang et al. | |
| 2003/0161298 A1 | 8/2003 | Bergman et al. | |
| 2003/0167171 A1 | 9/2003 | Calderone et al. | |
| 2003/0171929 A1 | 9/2003 | Falcon et al. | |
| 2003/0216921 A1 | 11/2003 | Bao et al. | |
| 2004/0002867 A1 | 1/2004 | Nakagawa et al. | |
| 2004/0015365 A1 | 1/2004 | Ohmori et al. | |
| 2004/0049388 A1 | 3/2004 | Roth et al. | |
| 2004/0102971 A1 | 5/2004 | Lipscher et al. | |
| 2004/0267528 A9 | 12/2004 | Roth et al. | |
| 2005/0038653 A1 | 2/2005 | Roth et al. | |
| 2005/0038657 A1 | 2/2005 | Roth et al. | |
| 2005/0043947 A1 | 2/2005 | Roth et al. | |
| 2005/0043954 A1 | 2/2005 | Roth et al. | |
| 2005/0049880 A1 | 3/2005 | Roth et al. | |
| 2005/0159948 A1 | 7/2005 | Roth et al. | |
| 2005/0159950 A1 | 7/2005 | Roth et al. | |
| 2005/0159957 A1 | 7/2005 | Roth et al. | |
| 2006/0167686 A1 | 7/2006 | Kahn | |
| 2006/0190249 A1 | 8/2006 | Kahn et al. | |

\* cited by examiner

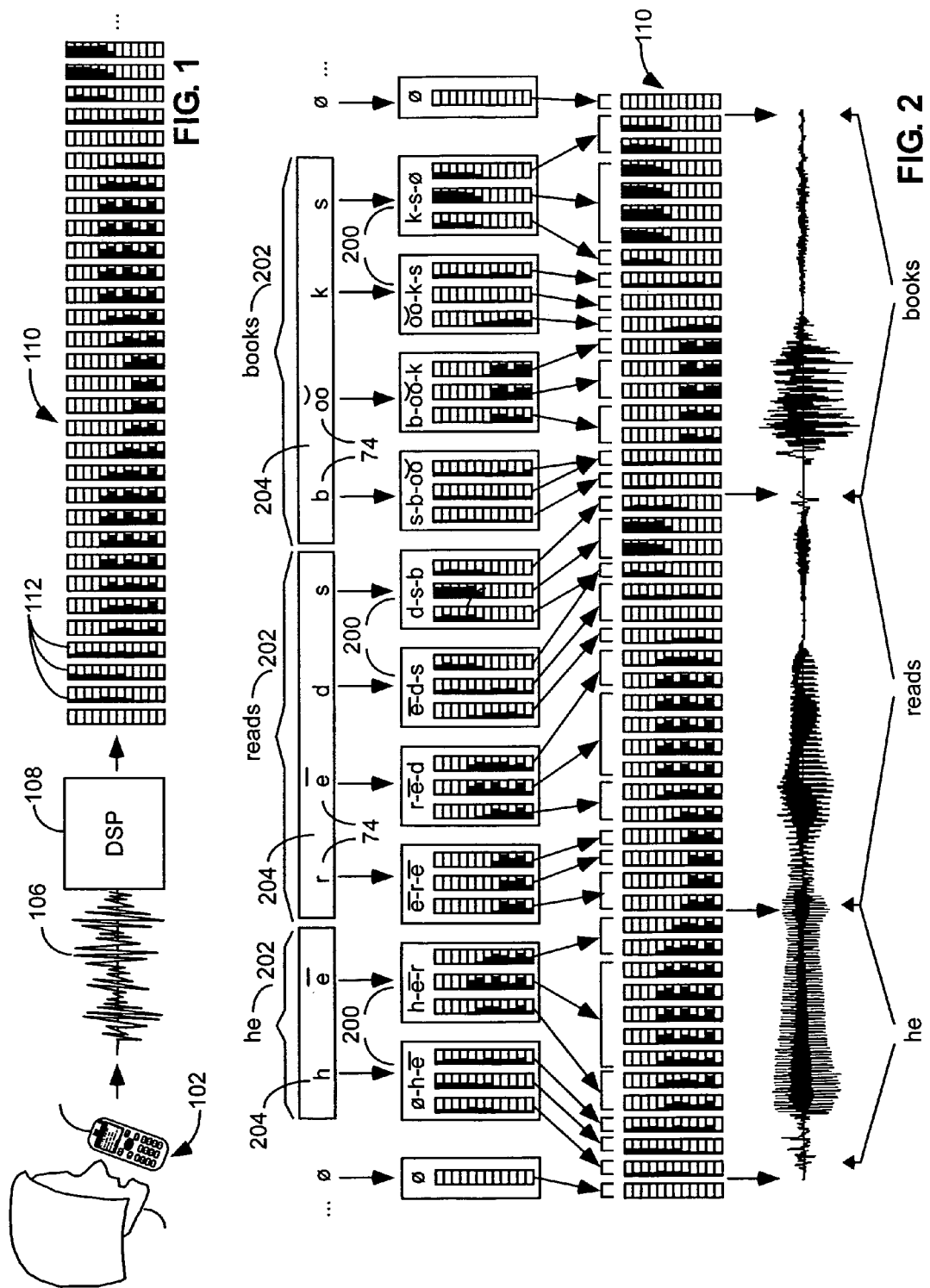

-main loop~1300
- ...
    - If following input is received~1301
        - Talk~1302
            - If there is text in SIP buffer, clear it without sending any deletions to OS text input~1304
            - null priorSipBufferLangContext ~1305
            - if there is a correction window, exit it~1306
            - Start SIP buffer recognition according to current recognition duration mode, with a null priorSipBufferLangContextt~1308
        - Clear~1310
            - if there is a correction window, exit it~1312
            - set priorSipBufferLangContext to reflect the last one or more words of the SIP buffer~1313
            - Clears SIP buffer without sending any deletions to OS text input~1314
        - Cont.~1316
            - if there is a correction window, exit it~1318
            - if cursor has language context in SIP buffer, use that as current language context~1322
            - else if the SIP buffer has no text, use priorSipBufferLangContext as current language context~1326
            - Start SIP buffer recognition according to current recognition duration mode, using current language context ~1330
        - Backspace~1332
            - if in correction mode, enter backspace into filter editor~1334
            - else enter back space into SIP buffer and OS text input, supplying to the OS any additional characters necessary to make an external text receiving such input correspond to the change caused in the SIP buffer~1336
        - New Paragraph~1338
            - if in correction mode, exit it~1340
            - Enter new paragraph character into SIP buffer and OS text inpu, supplying to the OS any additional characters necessary to make an external text receiving such input correspond to the change caused in the SIP buffer~1342
        - Space~1344
            - if in correction mode, enter space into filter editor~1346
            - else enter space into SIP buffer and OS text input, supplying to the OS any additional characters necessary to make an external text receiving such input correspond to the change caused in the SIP buffer~1348
        - Names recognition~1350
            - Set mode's recognition vocabulary to name vocabulary and start recognition according to current recognition duration mode and settings~1356
        - Punctuation recognition~1364
            - Set mode's recognition vocab. to punctuation vocab. and start mode recognition according to current recognition duration mode and settings~1370
        - Number recognition~1378
            - Set mode's recognition vocab. to number vocab. and start mode recognition according to current recognition duration mode and settings~1370

-FIG. 13

-Alphabravo recognition~1402
    -If display_alpha_on_double_click is not set or if double-click~1404
        -Display list of ICA words for duration of key press~1406
    -Set mode's recognition vocab. to alphabravo vocab. and start mode recognition according to current recognition duration mode and settings~1408
-Abc recognition~1410
    -Set mode's recognition vocab. to abc vocab. and start mode recognition according to current recognition duration mode and settings~1412
-Large Vocabulary recognition~1414
    -Set mode's recognition vocab. to large vocab. and start mode recognition according to current recognition duration mode and settings~1416
-Continuous/discrete toggle~1418
    -toggle between a continuous recognition mode using continuous-speech acoustic models and a discrete recognition mode using discrete-recognition acoustic models~1420
    -Start mode recognition according to current recognition duration mode and settings~1422
-Function~1424
    -call function menu~1426
-drag on Function~1428
    -call function menu in drag mode~1430
-Help~1432
    -call help mode~1434
-tap on word in buffer~1436
    -select word~1437
    -call displayChoiceList with word tapped on as selection, and with acoustic data associated with selection as first entry in the utterance list ~1438
-double tap on selection in buffer~1440
    -escape correction window~1442
    -Start SIP buffer recognition according to current recognition duration mode and settings, using current language context ~1444
-tap other than any word in SIP buffer~1446
    -plant cursor at location of tap~1448
    -if double tap~1450
        -Start SIP buffer recognition according to current recognition duration mode and settings, using current language context~1452
-drag across all of one word in buffer~1454
    -call displayChoiceList with dragged word as selection, and with acoustic data associated with selection as first entry in the utterance list~1456

-FIG. 14

-drag across parts of one or more words in buffer~1502
    -call displayChoiceList with all of dragged words as selection, and with acoustic data associated with selection as first entry in the utterance list~1504
-drag across initial part of individual word in buffer~1506
    -call displayChoiceList with partially dragged word as selection, with selection added to notChoiceList, with dragged initial portion of word as filter string, and with acoustic data associated with selection as first entry in the utterance list~1508
-drag across ending of individual word in buffer~1510
    -call displayChoiceList with partially dragged word as selection, with selection added to notChoiceList, with undragged initial portion of word as filter string, and with acoustic data associated with selection as first entry in the utterance list~1512
-...
-indication SIP buffer is full to warning level~1514
    -Display warning that buffer is close to full~1516
-indication that SIP buffer has received text input~1518
    -If cursor is not at end of SIP buffer~1520
        -output to OS a number of backspaces equal to distance from last letter of SIP buffer to cursor~1522
    -enter text input into SIP buffer at cursor~1526
    -output text to OS text input~1527
    -output any text following insertion into SIP buffer to OS Text input~1528
-if any of the above user inputs are received when in -when a correction window is shown, but not in correction mode~1530-confirm recognition of first choice in correction window for text output, language context updating, language model updating, and acoustic model updating purposes~1532
-if text input is received from speech recognition when in OneAtATime mode~1536
    -call displayChoiceList for recognized text~1537
    -turn off correction mode~1538
-...
-if in correction window and following input is received~1542
    -Esc~1544
        -exit correction window without changing selection~1546
    -del~1548
        -exit correction window, delete highlighted text in SIP buffer, and send output causing corresponding deletion to OS~1550
    -new~1552
        -exit correction window, delete highlighted text in SIP buffer, and send output causing corresponding deletion to OS~1553
        -set recognition modes to new utterance default~1554
        -Start SIP buffer recognition, independently of selection, using current recognition duration mode and settings, and current language context~1556

-FIG. 15

-rUt~1602
    -if not in correction mode, enter it~1603
    -set recognition modes to reUtterance default~1604
    -Start receiving one or more re-utterance utterances according to current re-utterance recognition duration mode and settings~1606
    -add utterance (s) received to utterance for selection, along with an indication of the vocabulary and continuous or discrete recognition setting in effect for the re-utterance~1608
    -call displayChoiceList~1610

-filter~1612
    -if not in correction mode, enter it~1613
    -if current filter entry mode is a speech recogntion mode~1614
        -Start filter recognition according to current filter recognition duration mode and settings~1616
    -if current filter entry mode is an entry window mode~1618
        -call appropriate entry window~1620

-s~1622
    -if not in correction mode, enter it~1623
    -call WordFormList for first choice~1624

-Aa~1626
    -if not in correction mode, enter it~1627
    -call CapitalizeCycle for first choice~1628

-play~1630
    -play audio of selection's first utterance, if any~1632

-+W~1634
    -calls dialog box for entering current first choice into either active or backup vocabulary~1636

-check~1638
    -remove correction window~1642
    -output first choice to SIP buffer and feed characters to make corresponding change to OS~1648

-a choice~1650
    -remove correction window~1652
    -output selected choice to SIP buffer and OS text input, supplying to the OS any additional characters necessary to make an external text receiving such input correspond to the change caused in the SIP buffer~1653

-a choice's edit button~1654
    -if not in correction mode, enter it~1656
    -make that button's associated choice the first choice and the current filter string~1656
    -call displayChoiceList for selection with the new filter string~1658

-drag across initial part of choice (including first choice) ~1664
    -if not in correction mode, enter it~1665
    -call displayChoiceList for selection with choice added to notChoiceList, and with dragged initial portion of choice as filter string~1666

-FIG. 16

-drag across ending of choice (including first choice)~1702
    -if not in correction mode, enter it~1702
    -call displayChoiceList for selection with choice added to notChoiceList, and with undragged initial portion of word as filter string~1704
-drag across two choices~1706
    -if not in correction mode, enter it~1705
    -call displayChoiceList for selection with two choices added to notChoiceList, and with two choices as beginning and end of filterRange~1708
-tap between characters on first choice~1710
    -if not in correction mode, enter it~1711
    -move filter cursor to tapped location~1712
-backspace~1714
    -call filterEdit with input as backspace~1718
    -call displayChoiceList for selection with the new filter string~1720
-filtering input~1722
    -if in OneAtATime mode and filter input is produced by speech recognition~1724
        -if a filter character choice window is displayed~1726
            -close filter choice window~1728
            -call FilterEdit for change to filter string with the selected value for the selected filter character as the input~1730
    -call filterEdit with input~1732
    -call displayChoiceList for selection with the new filter string~1734
    -if in OneAtATime mode~1736
        -call filterCharacterChoice for the filter input~1738
-a selection of a filter character choice in a filter character choice window~1740
    -close filter choice window~1742
    -call FilterEdit for change to filter string with the selected value for the selected filter character as the input~1744
    -call displayChoiceList with new filter~1746
-drag up from a character of the filter string~1747
    -call filterCharacterChoice for the character~1748
    -if drag is release over a filter character choice, generate a selection of that filter character choice~1749
    -else if drag is released elsewhere, close filter choice window~1750
-re-utterance(s) ~1752
    -add new utterance to selection's utteranceList~1754
    -call displayChoiceList for selection ~1756

-FIG. 17

-recognition duration logic~1800
    -if recognition duration type is~1802
        -Press Only~1804
            -if speech button pressed~1806
                -recognize during press~1808
       - Press & Click To Utt. End~1810
            -if speech button pressed~1812
                -recognize during press~1814
            -if speech button clicked~1816
                -recognize until next end of utterance~1818
        -Press Contin, Click Discrete To Utt. End~1820
            -if speech button clicked~1822
                -perform discrete recognition until next end of utterance~1824
            -if speech button pressed~1826
                -perform continuous recognize during press~1828
        -Click To Timeout~1830
            -if speech button clicked~1832
                -if recognition is on and press does not cause a change of vocabulary, turn recognition off~1834
                -else turn recognition on until time out~1836
            -if speech button pressed~1838
                -recognize during speech button press and then turn recognition off~1840

-FIG. 18

-Help Mode~1900
    -Display help window with info for help mode~1902
    -If user touches portion of SIP~1904
        -display help window with info for that portion as long as user keeps touching that portion~1906
    -if user d-clicks on portion of display~1908
        -keep help window with info for that portion up until user presses other portion of SIP~1910
    -If user clicks help button again~1912
        -remove help window and return from help mode~1914

-FIG. 19

-displayChoiceList (selection, filterString, FilterRange, wordType, notChoiceList)~2200
    -call getChoices with filterString, FilterRange and selection's utteranceList~2202
    -if there is no filter, no reutterance, and selection is not in notChoiceList~2204
        -make selection first choice~2206
    -remove any strings in notChoiceList from candidate list~2210
    -if a first choice has not been selected, make best scoring candidate first choice~2212
    -if there is a filter~2214
        -indicate letters of first choice corresponding to filter~2218
        -place filter cursor before first character of first choice not corresponding to filter~2220
    -if getChoice returns any non-first-choice candidates~2222
        -create a first choice list, ordered by character, from a set of the best scoring such candidates that fit on one screen~2224
        -if more candidates~2226
            -create a second choice list, ordered by character, of up to multiple screens from a set of the best scoring such candidates~2228
    -display correction window with first choice, showing a filter indication, if any, and the filter cursor, and with a first choice list, if any~2230
    -turn on correction mode~2232

-FIG. 22

-getChoices(utteranceList, filterString, filterRange, wordType)~2300
    -if there has been a prior recognition for selection with current utterance list and filter values~2302
        -return with choices from prior recognition~2304
    -if a filterRange is non-null~2306
        -if filterRange is more specific than current filterString~2308
            -change filter string to common letters of filterRange~2310
        -else, null filterRange~2312
    -if utterance list is not empty~2314
        -if there are any candidates from a prior recognition of the current utterance list~2316
            -for each such candidate call filterMatch with word's recognition score and current filter definitions~2318
            -delete those candidates with return scores below a given threshold level~2320
        -if the number of prior recognition candidates is below a desired number ~2322
            -perform recognition on each entry in the utterance list including: ~2324
                -if there are both continuous and discrete entries in the utterance list~2326
                    -limit the number of possible word candidates in recognition of the continuous entries to a number corresponding to the number of individual utterances detected in one or more of the discrete entries ~2328
                -recognizing each entry with either continuous or discrete recognition, depending upon the respective mode in effect when each such entry was received~2330
                -using filterMatch to aid in scoring and using language model, with polygram scores if there is a prior context for word, to produce list of scored acceptable candidates for each entry ~2332
            -if there was more than one entry in the utterance list~2334
                -pick list of best scoring candidates based on combination of scores from different recognitions~2336
    -if number of candidates is less than a desired amount and if there is a non-null filter definition~2338
        -use filterMatch to select a desired number of additional choices from the appropriate vocabulary~2340
    -if there are no candidates~2342
        -use best scoring character sequences matching filter string as choices, upto desired number~2344

-FIG. 23

-filterMatch(candidate, score, filterString, filterRange, wordType)~2600
    -If wordType is non-null~2602
        -If candidate is not of wordType~2604
            - return with score of zero~2606
    -if a filterRange is non-null~2608
        -if character ordering of word is between start and end of filterRange~2610
            -return with an unchanged score~2612
        -else return with score of zero~2614
    -else if there is a non-null filterString~2616
        -set current candidate character to first character in candidate~2618
        -until end of filter string~2620
            -if next element in filter string is ~2622
                -an unambiguous character~2624
                    -if current candidate character does not match filter character~2626
                        -return with score of zero~2628
                  -else increment position of current candidate character~2630
                -an ambiguous character~2632
                  -if current candidate character does not match one of recognized values of filter character~2634
                      -return with score of zero~2636
                -else~2638
                    -alter word's score as a function of the probability the matching recognized value of the filter character~2640
                    -increment position of current candidate character~2642
            -an ambiguous length set of ambiguous character sequences~2644
                -for each of character sequences of the set~2646
                    -if there is a matching sequence of characters starting at current candidate character~2648
                        -alter word's score as a function of the probability of the matching sequence~2649
                        -increment current position of current candidate character by number of characters in the matching sequence~2649
                        -break out of current for loop~2650
                -if none of the character sequences match against candidate~2651
                    -return with score of zero~2652
        -return with word's score~2653
    -else return with unchanged score~2654

-FIG. 26

-wordFormList(selection)~2700
    -if correction window is already displayed~2702
        -treat current best choice as selection~2704
    -if selection is one word~2706
        -if word has any homonyms, place them at start of a choice list~2708
        -find root form of selection word~2710
        -create list of alternate grammatical forms for word~2712
        -alphabetically order alternate grammatical forms in choice list after homonyms~2714
    -else if selection is multiple words~2716
        -if selection has spaces between words~2718
            -add copy of selection with no spaces to choice list~2720
            -add copy of selection with hypens instead of spaces to choice list~2722
        -if selection has multiple elements subject to same or spelled/non-spelled form transformation~2724
            -add copy of selection, and all prior choices, with that transformation to choice list~2726
        -alphabetically order choice list~2728
-display correction window showing selection as first choice, filter cursor at the start of the first choice, and a scrollable choice list ~2730

-FIG. 27

-filterEdit(choice, filterString, filterCursor, input)~2800
    -set old filter string equal to filter string~2801
    -if there are any characters in choice before filter cursor~2802
        -set new filter string equal to a fixed length unambiguous filter comprised of thecharacters in choice before filter cursor~2805
    -else clear new filter string~2806
    -if input is a backspace~2807
        -if cursor is a non-selection cursor~2808
            -delete the last character from new filter string, if any~2810
        -return with new filter string~2812
    -else if input is unambiguous character(s) ~2814
        -add character(s) to end of new filter string~2816
    -else if input is a sequence of one or more ambiguous characters of fixed length~2818
        -place an element representing each ambiguous character of the sequence at end of new filter~2820
    -else if input is ambiguous length ambiguous input~2822
        -for each of one or more best scoring character sequences associated with ambiguous input~2824
            -if when added to prior unambiguous part of new filter, it matches all or initial part of one or more vocabulary words~2826
                -increase its score as a function of probability of the matched vocabulary words~2828
        -select a set of best scoring characters sequences for association with a new ambiguous filter element~2830
        -add the new ambiguous filter element to end of new filter string~2832
    -for each filter elements in old filter string~2834
        -if old element is an ambiguous fixed-length element that extends beyond new fixed length element(s) ~2836
            -add portion of old element that extends beyond new elements to end of new filter~2838
        -else if old element is an ambiguous fixed length element that extends beyond some sequences in new ambig. length element~2840
            -for each sequence in new ambig. length element, ~2842
                -for each sequence in current old ambiguous fixed length element~2844
                    -if sequence from old element, matches and extends beyond sequence in new element~2846
                        -associate with the new ambiguous length element a new character sequence corresponding to current sequence from new element plus extension from old element~2848
                        -indicate that matched sequence from new element is to be deleted~2850

-FIG. 28

-else if old element is an ambig. length element that extends beyond new fixed length element(s)~2900
    -for each sequence in old ambig. length element~2902
        -if sequence matches and extends beyond any sequence in new element~2904
            -create a new sequence corresponding to extension from old element~2906
    -if any such new sequences have been created~2908
        -add a new ambiguous length element to end of new fixed-length element in filter string corresponding to such new sequences~2910
-else if old element is an ambig. length element that extends beyond some sequences in new ambig length element~2912
    -for each sequence in new ambig. length element, ~2914
        -for each sequence in old ambig. length element~2916
            -if sequence from old element, matches and extends beyond sequence from new element~2918
                -associate with the new ambiguous length element a new character sequence corresponding to current sequence from new element plus extension from old element~2920
        -if all sequences in old ambig. length element match and extend beyond current sequence in new ambig length element, indicate that said current sequence is to be deleted~2922
-return with new filter string~2924

-FIG. 29

-filterCharacterChoice(choice, filterString, selectedFilterChar)~3000

-if selected filter character corresponds to an ambiguous character or an unambiguous character in filter string having multiple best choice characters associated with it ~3002
    -set a filter character choice list equal to all characters associated with character ~3004
-else if selected filter character corresponds to a character of ambiguous length filter string element~3006
    -if selected filter character is first character of ambiguous element~3008
        -set filter character choice list equal to all first characters in any of the ambiguous element's associated character sequences~3010
    -else~3012
        -set filter character choice list equal to all characters in any character sequence of the ambiguous element's that are preceded by the same characters that precede the selected filter character in the current choice ~3014
-display filter character choice window with these choices~3016

-FIG. 30

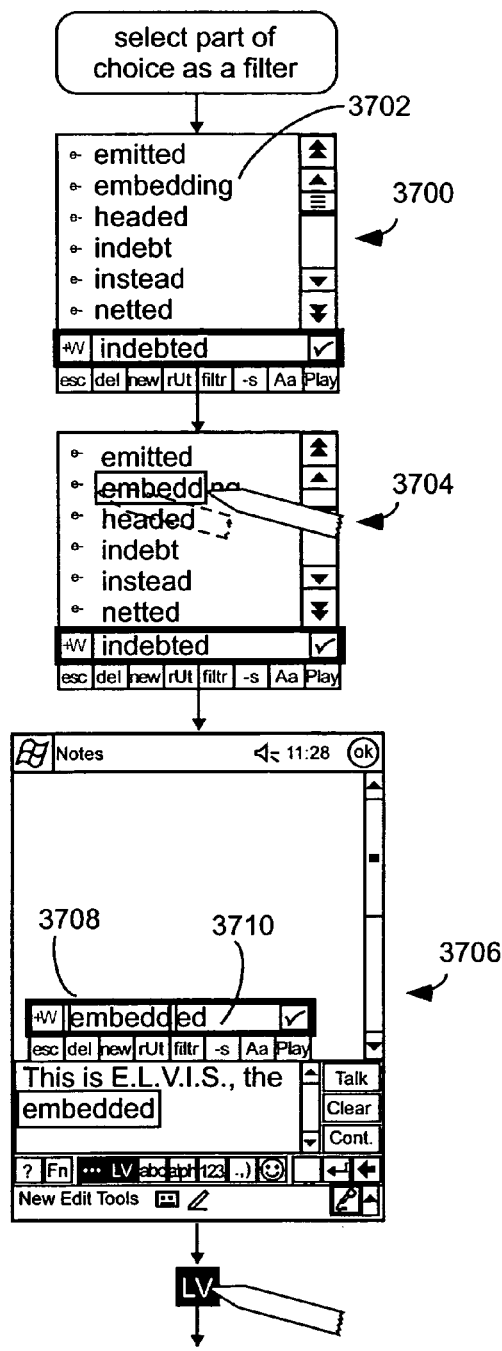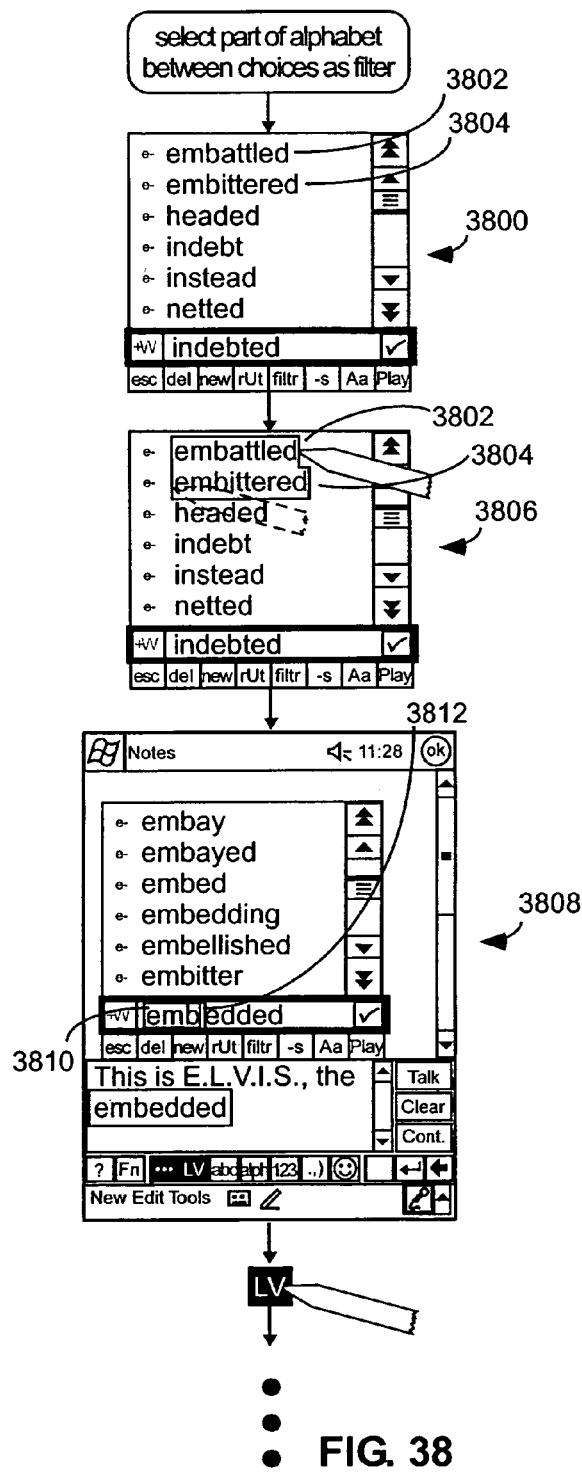
FIG. 37
FIG. 38

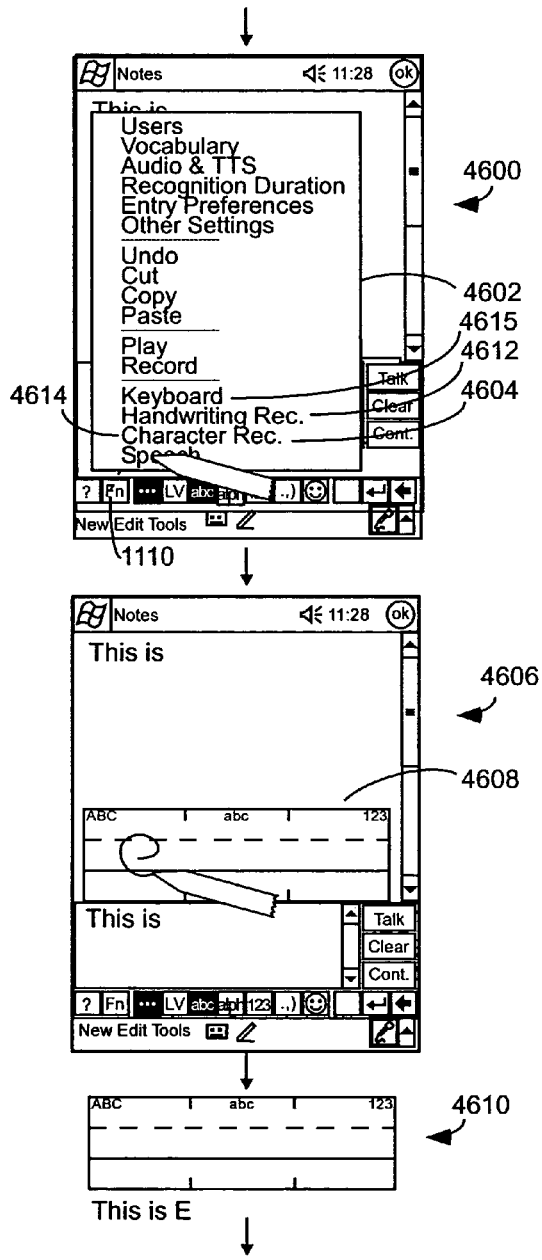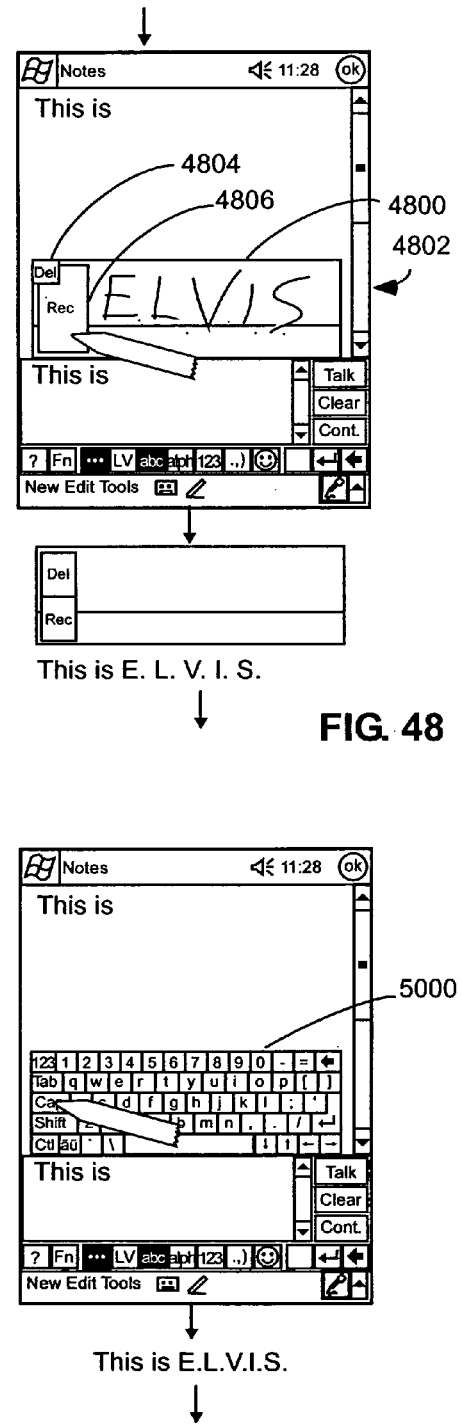
FIG. 46
FIG. 48
FIG. 50

-character rec mode~4700
    -display character recognition window~4702
    -loop until exit window~4704
        -if user touches window, record ink during touch (unless touch is in del. Button) ~4906
        -if user releases touch in window~4708
            -perform character recognition on ink in window~4710
            -clear window~4712
            -supply corresponding recognized output to SIP buffer and OS~4714

-FIG. 47

-handwriting recognition mode~4900
    -display handwriting recognition window~4902
    -loop until exit window~4903
        -if user touches window, record ink during touch (unless touch is in del. Button) ~4904
        -if user touches down in Rec. button~4905
            -perform handwriting recognition on ink previously in entry window~4906
            -supply recognized output to SIP buffer and OS~4908
            -clear window~4910
        -if user presses del. button~4912
            -clear window~4914

-FIG. 49

-displayChoiceList (selection, filterString, FilterRange, wordType, notChoiceList) [alt embodiment] ~2200A
    -call getChoices with filterString, FilterRange and selection's utteranceList~2202
    -if there is no filter, no reutterance, and selection is not in notChoiceList~2204
        -make selection first choice~2206
    -remove any strings in notChoiceList from candidate list~2210
    -if a first choice has not been selected, make best scoring candidate first choice~2212
    -indicate letters of first choice corresponding to filter~2218
    -place filter cursor before first character of first choice not corresponding to filter~2220
    -if getChoice returns any non-first-choice candidates~2222
        <u>-create a score ordered choice list from a set of the best scoring such candidates extending up to multiple screens in length if enough choices</u>~2224A
    -display correction window with first choice, showing a filter indication, if any, and the filter cursor, and with <u>scrollable</u> choice list, if any~2230A

-FIG. 58

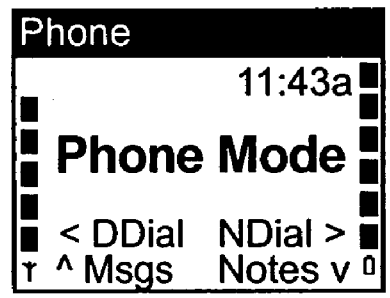
(1)
(7)
(8)
(1)
(9)
(7)
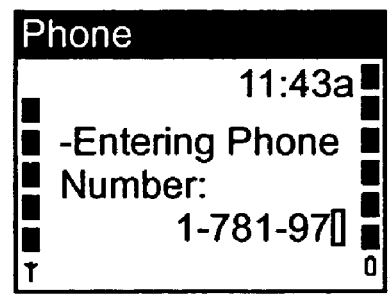
FIG. 62

-top level phone mode~6300
    -<
        -call digit dial~6302
    ->
        -call name dial~6304
    -^
        -call messages~6306
    -v
        -open editor for new item at end of note outline~6308
-menu
    -call displayMenu for main menu~6312
-menu-menu
    -call displayMenu for main menu~6316
    -set recognition vocabulary to displayed main menu's command vocabulary ~6318
    -treat last menu press as speech key for recognition duration purposes~6320
-menu-press
    -call help for main menu~6324
-talk
    -if phone is ringing~6328
        -answer it~6330
    -if there is a presently enter phone number~6332
        -dial it~6334
-end
    -if not at top level phone mode~6338
        -go there~6340
-basic phone pad key
    -If not already in phone number entry mode~6344
        -Enter number entry mode~6346
    -add key to current phone number~6348

-FIG. 63

-Main Menu~6500
    -display screen of menu items starting at item 1, with item one highlighted~6502
    -if user enters~6504
        -<> or page left/right
            -scroll menu choices up/down one screen, highlighting first item in new screen~6508
        -^v or item up/down
            -scroll highlight up/down by one item, scrolling display if necessary to show newly highlighted item on screen~6512
        -OK
            -selects current highlighted choice in menu, if any~6516
        -menu
            -if press is not part of double click~6520
                -return from all currently called menus~6522
        -menu-menu
            -set recognition vocabulary to displayed menu's command vocabulary~6526
            -treat last menu press as speech key for recognition duration purposes~6528
        -menu-press
            -call help for displayed menu~6532
        -talk
            -set recognition vocabulary to displayed menu's command vocabulary~6536
            -treat press as speech key for recognition duration purposes~6538
        -end
            -save current state for a possible future resume~6542
            -go to phone mode~6544

-1-Name Dial
        -call name dial~6548
    -2-Digit Dial
        -call digit dial~6552
    -3-Speed Dial
        -call speed dial~6556

-FIG. 65

-4-Voice Messages
 -call voice messages~6604
-44-Email
 -call email~6608
-5-Editor
 -call editor with a blank file~6612
-55-Note Outline
 -call editor for new item at end of note outline~6616
-6-Contacts
 -call contacts~6620
-66-Schedule
 -call schedule~6624
-7-Web Browser
 -call web browser~6628
-8-Call History
 -call call history~6632
-9-Files
 -call file manage~6636
-*Escape
 -return from call to current menu~6640
-** or "Task List
 -go to Task List? ~6644
-0-Main Options Menu
 -call displayMenu for Main Options Menu~6648

-FIG. 66

```
Cmds: Editor      <P^l
1-Entry Mode Menu
2-Choice List
22-Filter Choices
3-Nav. Mode Menu
4-Descret Recog.
5-Selection Strt/Stp
55-Select All
6-Play/Rec. Start/Stop
66-Record Start/Stop
7-Capitalize Menu
77-Capitlize Cycle
8-Word Form List
88-Word Type Menu
9-Basic Keys Menu
99-New Para
*-Escape
**-Task List
0-Edit Opt. Menu
00-Undo
#-Backspace
```
FIG. 67

```
MENU: Entry Mode
1-Large Vocab. Rec
2-ABC Rec
22-Ambig. ABC Rec
3-AlphaBravo Rec
33-KeyAlpha Rec
4-123 Rec
44-Key Numbers
5-Punctuation Rec
6-Name Rec
7-Key Characters
77-Ambiguous Key
8-Contin/Discrete
88-One@ATime Rec
9-Entry Preferences
*-Escape
**-Task List
```
FIG. 68

```
Cmds: Corr.Wnd<P^l
1-Entry Mode Menu
2-Choice Nav
22-Filter Nav
3-Corr. Nav. Modes
4-Choose 4
5-Choose 5
6-Choose 6
7-Choose 7
*-Escape
**-Task List
0-Edit. Opt. Menu
00-Undo
#-Backspace
```
FIG. 69

```
MENU: Edit Nav.
1-Utterance Start
2-Word/Char
3-Word/Line
4-Doc/Page
5-Outline Lev./Item
6- Audio Item/5sec.
66-AudioItem/30Sec
7-Undo List/Item
8-File Lev/Item
9-Utterance End
*-Escape
**-Task List
```
FIG. 70

```
MENU: Corr. Nav
2-Page/Item Nav.
22-Word/Char Nav.
3-Word/Char Nav.
4-Pre-Choice Filter
5-Choice Filter
6-PostChoice Filter
7-Capitalize
8-Word Form List
*-Escape
**-Task List
```
FIG. 71

```
Cmds:KeyAlpha<P^l
1-Entry Mode Menu
2-abc
3-def
4-ghi
5-jkl
6-mno
7-pqrs
8-tuv
9-wzxy
*-Escape
**-Task List
0-KeyPunctuation
00-Space
#-Backspace
```
FIG. 72

```
MENU: Basic Keys
1-Punctuation menu
2-Question Mark
3-Colon
4-Semicolon
5-Comma
6-Period
7-Hyphen
8-Space
88-Tab
9-New Paragraph
*-Escape
**-Task List
#-Backspace
```
FIG. 73

```
MENU: Edit Options
1-Files Menu
2-Edit Menu
3-Entry Peferences
4-TTS Menu
44-TTS On/Off
5-Outline Menu
55-Expand Item
6-Audio Menu
7-User Menu
8-Find
88-Find Again
9-Vocab. Menu
*-Escape
**-Task List
0-Undo
00-Undo
#-Redo
```
FIG. 74

- Editor mode~7600
    - if user selects~7602
        - <,>,^,v~7603
            - if in word/line nav~7604
                - if user selects Word Left/Right~7606
                    - if extended selection is on~7608
                        - move cursor one word to left/right and extend previous selection to that word~7610
                    - else~7612
                        - if prior input was a Word Left/Right command of different direction making a word the selection or if move would put cursor before/after end of text~7614
                            - place cursor to left/right of prior selection and remove prior selection~7615
                        - else~7616
                            - move cursor one word to left/right of current position and make that word the current selection~7617
                - if user selects Line Up/Down~7618
                    - move cursor to the nearest word on line up/down from current cursor position~7620
                    - if extended selection is on~7622
                        - extend selection through that current word~7624
            - if in ... nav~7626
                - ...~7627
- OK
    - if editor has been called to enter text into another program~7630
        - enter content of editor to that other program and return~7632
    - else save editors content and return~7634
- Menu
    - call displayMenu for editor commands~7638
- MenuMenu
    - call displayMenu for editor commands~7642
    - set recognition vocabulary to displayed editor's command vocabulary~7644
    - treat last menu press as speech key for recognition duration purposes~7646
- MenuPress
    - call help for editor ~7650
- Talk
    - turn on recognition according to current recognition settings, treating press as speech key for recognition duration purposes~7654
- End
    - go to phone mode~7658

-FIG. 76

-1 or "Entry Mode Menu"
    -call displayMenu for Entry Mode Menu~7702
-2 or "Choice List"
    -set correction window nav mode to Page/Item~7706
    -call Correction Window for current selection~7708
-22 or "Filter Choices"
    -set correction window nav mode to Word/Char~7712
    -call correctionWindow for current selection~7714
    -treat second press of double-click as speech key press for recognition duration purposes~7716
-3 or "Nav. Mode Menu"
    -call displayMenu for Nav Mode menu~7720
-4 or "Discrete Recog."
    -turn on discrete recognition according to current vocabulary using Press & Click To Utterance End as the recognition duration setting~7724
-5 or "Selection Start/Stop"
    -toggle extended selection between on and off~7728
    -if extended selection has just been turned off~7730
        -de-select any prior selection other than current cursor~7732
-55 or "Select All"
    -select all of current document~7736
-6 or "Play/Record Start/Stop"
    -if not recording audio~7740
        -toggle play between on and off~7742
        -if on phone call and Play Only to Me is Off~7744
            -send audio from play over phone line as well as to phone's speaker or headphone out~7746
    -else if recording audio~7748
        -turn recording off~7750
-66 or "Record"
    -turn audio recording on~7754
    -if on phone call and Record Only Me is Off~7756
        -record audio from other side of phone line as well as phone,s microphone~7758
-7 or "Capitalize Menu"
    -call displayMenu for Capitalize Menu~7762
-77 or "Capitalize Cycle"
    -call CapitalizeCycle~7766
-8 or "Word Form List"
    -call word form list~7770
-88 or "Word Type Menu"
    -call displayMenu for Word Type Menu~7774

-FIG. 77

-9 or "Basic Keys Menu"
    -call displayMenu for Basic Keys Menu~7802
-99 or "New Para"
    -enter a new paragraph character into text~7806
-* or "Escape"
    -if editor has been called to input or edit text in another program~7810
        -returns from call from editor with edited text for insertion into that program~7812
    -else~7818
        -prompt user with choice of exiting editor, saving its contents, or canceling escape~7820
        -if user selects to escape~7822
            -escape to phone mode~7824
-** or "Task List"
    -go to Task List~7828
-0 or Edit Options Menu
    -call displayMenu for Edit Options Menu~7832
-00 or Undo
    -undo last command~7836
-# or Backspace
    -if there is a selection~7840
        -delete it~7842
    -else~7844
        -if current smallest navigational unit is a character, word, or outline item~7846
            -delete backward by that unit~7848

-FIG. 78

-Entry Mode Menu~7900
    -if user selects~7902
        -...
        -1 or "Large Vocab. Rec"
            -set recognition vocabulary to Large vocabulary~7906
            -treat press selecting mode as speech key press for recognition duration purposes~7907
            -if in Correction Window~7908
                -set recognition mode to discrete~7910
                -add utterance (s) recognized in this mode to utterance list as a new utterance for selection, along with an indication of the vocabulary and continuous or discrete recognition setting in effect for the re-utterance~7912
                -call displayChoiceList~7914
        -2 or "ABC Rec"
            -set recognition to letter name vocabulary and indicate that recognition results are to be treated unambiguously~7920
            -treat press selecting mode as speech key press for recognition duration purposes~7922
        -22 or "Ambiguous ABC"~7924
            -if in a correction window~7925
                -set recognition vocabulary to letter vocabulary and indicate that an output is to be treated as an ambiguous filter~7926
                -treat press selecting mode as speech key press for recognition duration purposes~7928
        -3 or "AlphaBravo Rec"
            -set recognition vocabulary to ICA vocabulary~7932
            -treat press selecting mode as speech key press for recognition duration purposes~7934
       -33 or "KeyAlpha Rec"
            -call KeyAlpha mode~7938
        -4 or "123 Rec"
            -set recognition vocabulary to digit vocabulary~7942
            -treat press selecting mode as speech key press for recognition duration purposes~7944
       -44 or "Key Numbers"
            -respond to pressing of any numbered phone keys as the entry of corresponding number, with "*" escaping mode, and "#" backspacing~7948
        -5 or "Punctuation Rec"
            -set recognition vocabulary to punctuation vocabulary~7952
            -treat press selecting mode as speech key press for recognition duration purposes~7954

-FIG. 79

-6 or "Name Rec"
    -set recognition vocabulary to contact name vocabulary~8002
    -treat press selecting mode as speech key press for recognition duration purposes~8004
-7 or "Key Characters"
    -respond to pressing of phone keys as traditional non-ambiguous phone key spelling,
    with "1" calling Entry Mode Menu, "*" escaping mode, and "#" backspacing~8008
-77 or "Ambiguous Key"
    -respond to each press of phone key labeled with set of letters as corresponding to one
    of those letters, with "1" calling Entry Mode Menu, "*" escaping mode, and "#"
    backspacing~8012
-8 or "Continuous/Discrete Rec"
    -if in continuous mode~8016
        -switch to discrete mode~8018
        -sound de-de-de tone~8020
    -if in discrete mode~8022
        -switch to continuous mode~8024
        -sound deeeeeee tone~8026
-88 or One@Atime
    -enter One@Atime Mode~8030
-9 or "Entry Preferences"
    -call displayMenu for Entry Preferences~8034
    -return to Editor
-* or "Escape"
    -return to Editor~8040
-** or "Task List"
    -go to Task List~8044

-FIG. 80

-correctionWindow (selection)~8100
    -set recognition mode during call to that of filter default~8102
    -call displayChoiceList for selection~8104
    -loop~8106
        -if user inputs
            -in Page/Item nav~8108
                -<> or "Page Left/Right"~8112
                    -scroll choice lists by a page up/down, moving highlight by one page~8114
                -^v or "Item Up/Down"~8116
                    -scroll highlighted choice up/down by one choice, scrolling screen if necessary to display highlighted choice~8118
            -in Word/Char nav~8120
                -<> or "Word Left/Right"~8122
                    -if there is a first/last character of word within 7 characters to left/right of filter cursor in best choice~8124
                        -move filter cursor to that first/last character~8126
                    -else if there is a character 5 characters to left/right of filter cursor in best choice~8128
                        -move filter cursor to that character~8130
                    -else if filter cursor is on or after last character in best choice~8132
                        -if scroll would not extend beyond rightmost character in all of the choices~8134
                            -scroll choice window left/right by 5 character's width~8135
                        -else scroll rightward by numbers of characters, if any, that would expose rightmost character in choice list~8136
                -^v or "Character Up/Down"~8142
                    -if filter cursor is after last character in best choice~8144
                        -if scroll would not extend beyond rightmost character in all of the choices~8146
                            -scroll choice window left/right by one character's width~8147
                    -else if filter cursor is not before/after start/end of best choice~8148
                        -move filter character cursor left/right by one character~8150
            -if the filter cursor has been moved to a new character~8151
                -if the character moved to is ambiguous, call filterCharacterChoice for that character~8152
            -if a filter character choice list has been displayed and subsegent input is received ~8153
                -if the input is choice in the filter character choice window~8154
                    -close filter choice window~8156
                    -call FilterEdit for change to filter string with the selected value for the selected filter character as the input~8158
                    -call displayChoiceList with new filter~8160
                -else remove filter character choice list~8162

-FIG. 81

-MENU
    -call displayMenu for Correction Window~8202
-MENU-MENU
    -call displayMenu for correctionWindow's commands~8206
    -set recognition vocabulary to displayed Correction Window's command vocabulary~8208
    -treat last menu press as speech key for recognition duration purposes~8210
-MenuPress
    -call help for correctionWindow ~8250
-TALK
    -turn on recognition according to current recognition settings, treating press as speech key for recognition duration purposes~8214
-END
    -save current state for a possible future resume~8218
    -go to phone mode~8220
-OK
    -if a choice is highlighted~8224
        -select it~8226
    -else~8228
        -select first choice~8230
    -return to editor and insert selected choice at current selection or cursor~8232
-1 or "Entry Mode Menu"
    -call displayMenu for Entry Mode Menu~8236
-2 or "Choice Nav"
    -remove display of any filter character choice lists~8240
    -set correction window nav mode to Page/Item nav~8242
    -play audio of selection's first utterance, if any~8244
-22 or "Filter Nav"
    -set correction window nav mode to Word/Char nav~8248
    -treat second press of double-click as speech key press for recognition duration purposes~8250
-3 or "Corr. Nav Modes"
    -call displayMenu for Correction Nav Modes~8254

-FIG. 82

- a choice number
    - if in Choice Filter Mode~8302
        - call displayChoiceList with selected choice as filter string and enter word/char nav if not in it~8304
    - else if in Pre-Choice Filter Mode~8306
        - and enter word/char nav if not in it~8308
        - call displayChoiceList with selected choice as end of filterRange, and prior choice (or point before beginning of character ordering) as end of filterRange~8310
    - else if in Post-Choice Filter Mode~8312
        - and enter word/char nav. In not in it~8314
        - call displayChoiceList with selected choice as start of filterRange, and following choice (or point after end of character ordering) as end of filterRange~8316
    - else~8318
        - return to editor and insert selected choice at current selection or cursor~8320
- double-click on a choice number
    - call displayChoiceList with selected choice as filter string and enter word/char nav. if not in it~8324
- * or "Escape"
    - return to editor from correction window without any changes to editors selection or cursor, and with any selection existing before call to correction window still selected~8328
- ** or "Task List"
    - go to Task List~8332
- 0 or "Edit Options Menu"
    - call displayMenu for Edit Options Menu~8336
- 00 or "Undo"
    - undo last command in correction window~8340
- # or "Backspace"
    - call filterEdit with any portion of the first choice before the filter cursor as the filter string, with the filter cursor, with backspace as input~8350
    - call displayChoiceList for selection with the new filter string~8352
- filtering characters
    - call filterEdit for input~8356
- re-utterance(s)
    - add new utterance to selection's utteranceList~8360
    - call displayChoiceList for selection~8362

-FIG. 83

-Edit Nav Menu~8400
    -if user enters~8402
        -...
        -1 or "Utterance Start"~8404
            -if a current last utterance~8406
                -select as cursor the text corresponding to first word in utterance and return~8408
        -2 or "Word/Char"~8410
            -change nav mode to Word/Char and return~8412
        -3 or "Word/Line"~8414
            -change nav mode to Word/Line and return~8416
        -4 or "Doc/Screen"~8418
            -change nav mode to Doc/Sreen and return~8420
        -5 or "Outline Lev./Item"~8422
            -change nav mode to Outline Lev/Item and return~8424
        -6 or "Audio Item/5sec"~8426
            -set sound display to high resolution~8428
            -change nav mode to Audio Item/5sec and return~8430
        -66 or "Autio Item/30sec"~8432
            -set sound display to low resolution~8434
            -change nav mode to Audio Item/30sec and return~8436
        -7 or "Undo List/Item"~8438
            -change nave mode to Undo List/Item and return~8440
        -8 or "File Lev/Item"~8442
            -change nav mode to File Lev/Item and return~8444
        -9 or "Utterance End"~8446
            -if a current last utterance~8448
                -select as cursor the text corresponding to last word in utterance and return~8450
        -* or "Escape"~8452
            -return to editor~8454
        -** or "Task List"~8456
            -go to Task List~8458

-FIG. 84

-Corr. Nav Menu~8500
    -if user enters~8502
        -...
            -2 or "Page/Item"~8504
                -change nav mode to Page/Item and return~8506
            -22 or "Word/Char"~8508
                -change nav mode to Word/Char and return~8510
            -3 or "Word/Char"~8512
                -change nav mode to Word/Char and return~8514
            -4 or "Pre-Choice Filter"~8516
                -set Correction Window to Pre-Choice Filter Mode~8518
                -change nav mode to Page/Item and return~8520
            -5 or "Choice Filter"~8522
                -set Correction Window to Choice Filter Mode~8524
                -change nav mode to Page/Item and return~8526
            -6 or "Post-Choice Filter"~8528
                -set Correction Window to Post-Choice Filter Mode~8530
                -change nav mode to Page/Item and return~8532
            -7 or "Capitalize"~8534
                -cycle capitization of best choice and return~8536
            -8 or "Word Form List"~8538
                -cause word form list to be displayed for best scoring word and return~8540
            -* or "Escape"~8542
                -return~8544
            -** or "Task List"~8546
                -go to Task List~8548

-FIG. 85

-KeyAlpha Mode~8600
    -set nav mode to Word/Char~8602
    -overlay following responses to following keys~8604
        -TALK
            -turn on recognition for alphabravo recognition according to current recognition settings, treating press as speech key for recognition duration purposes, outputting letters corresponding to recognized ICA word~8608
        -1 or "Entry Mode Menu"
            -call displayMenu for Entry Mode Menu~8612
        -2 through 9
            -during press of key~8616
                -prompt with alphabetical list of ICA words corresponding to key's letters~8618
                -substantially limit vocabulary to displayed ICA words~8620
                -turn on recognition~8622
                -output letter corresponding to recognized ICA word~8624
        -0
            -enter KeyPunctuation Mode~8628
        -00-Space
            -output space~8632
        -#-Backspace
            -if there is a selection~8636
                -delete it~8638
            -else~8640
                -if current smallest navigational unit is a character, word, or outline item~8642
                    -delete backward by that unit~8644

-FIG. 86

-KeyAlpha Mode(1st Alt Embodiment) ~8700
   -set nav mode to Word/Char~8602
   -overlay following responses to following keys~8604
      -TALK
         -turn on recognition for large vocabulary recognition according to current recognition settings, treating press as speech key for recognition duration purposes, outputting initial letter of each recognized word~8608A
      -1 or "Entry Mode Menu"
         -call displayMenu for Entry Mode Menu~8612
      -2 through 9
         -during press of key~8616
            -prompt use to say a word starting with desired one of key's letters~8618A
            -substantially limit vocabulary to words starting with one of the key's associated letters~8620A
            -turn on recognition~8622
         -output initial letter corresponding to recognized word~8624A
      -0
         -enter KeyPunctuation Mode~8628
      -00-Space
         -output space~8632
      -#-Backspace
         -if there is a selection~8636
            -delete it~8638
         -else~8640
            -if current smallest navigational unit is a character, word, or outline item~8642
               -delete backward by that unit~8644

-FIG. 87

-KeyAlpha Mode(2nd Alt Embodiment) ~8800
    -set nav mode to Word/Char~8602
    -overlay following responses to following keys~8604
        -TALK
            -turn on recognition for <u>vocabulary of 5 or fewer words starting with each letter of the alphabet</u> according to current recognition settings, treating press as speech key for recognition duration purposes, outputting <u>initial letter of each recognized word</u>~8608A
        -1 or "Entry Mode Menu"
            -call displayMenu for Entry Mode Menu~8612
        -2 through 9
            -during press of key~8616
                -prompt <u>use to say one of the words starting with desired one of key's letters</u>~8618A
                -substantially limit vocabulary to <u>the limited vocabulary of words starting with one of the key's associated letters</u>~8620A
                -turn on recognition~8622
                -output <u>initial</u> letter corresponding to <u>recognized word</u>~8624A
        -0
            -enter KeyPunctuation Mode~8628
        -00-Space
            -output space~8632
        -#-Backspace
            -if there is a selection~8636
                -delete it~8638
            -else~8640
                -if current smallest navigational unit is a character, word, or outline item~8642
                    -delete backward by that unit~8644

-FIG. 88

-Edit Options Menu~8900
  -...
  -1 or "Files Menu"~8902
  -2 or "Edit Menu"~8904
  -3 or "Entry Preferences"~8906
  -4 or "TTS Menu"~8908
    -...
    -1-TTS Keys On/Off~8909
    -4 TTS On/Off~8910
      -toggle TTS on/off, using command TTS to inform user~8912
      -if toggling on~8914
        -if there is a selection~8916
          -use text TTS to say "Selection:" and then the selection itself~8918
        -else~8920
          -use text TTS to play starting at current cursor until the end of the document or user input other than cursor movement within the document~8922
    -5 TTS Selection~8924
      -use text TTS to say "Selection:" and then the selection itself~8926
    -6 TTS Cont. Play on/off~8928
      -toggle TTS Continuous Play on/off, using command TTS to inform user~8930
    -...
  -44 or "TTS On/Off"~8932
  -5 or "Outline mode"~8934
  -55 or "Expand/Collapse Item"~8936
  -6 or "Audio Menu"~8938
    -1-Audio Navigation~8940
      -1-5sec/1sec~8942
      -2-10sec/2sec~8944
      -3-30sec/5sec~8946
      -4-Item/5sec~8948
      -...
    -2-Playback Settings~8950
      -1-volume~8952
      -2-speed~8954
      -3-all audio~8956
      -4-non-recognition audio~8958
      -5-recognition audio~8960

-FIG. 89

-3-Recognize audio options dialog~9000
    -give user options to select~9002
        -to recognize the audio in current selection~9004
        -to recognize the audio in current document~9006
        -if previously recognized audio is to be re-recognized~9008
        -to set quality of recognition~9010
    -provide estimate of recognition time with current quality setting~9012
    -provide status of current job, if any~9014
    -...
-4-delete from selection~9016
    -1-non-recognition audio~9018
    -2-recognition audio~9020
    -3-all audio~9022
    -4-text~9024
-5-show recognition audio>on/off~9026
-6-record recognition audio on/off~9028
-7-transcription mode dialog~9030
-7 or "User Menu"~9032
-8 or "Find"~9034
    -call search dialog box, with current selection, if any as the search string~9036
-88 or "Find Again"~9038
-9 or "Vocab. Menu"~9040
-* or "Escape"~9042
-** or "Task List"~9044
-0 or "Undo"~9046
-00 or "Undo"~9048
-# or "Redo"~9050

-FIG. 90

-Word Type Menu~9100
    -if current selection is not a single word~9102
        -prompt that Word Type only works on single word selections and return~9104
    -change active vocabulary during call to word type vocabulary~9106
    -if user selects~9108
        -...
        -1 or "Ends"~9110
            -call displayMenu with a menu offering option to change to a corresponding word with following ending type (where appropriate for selection)~9112
                -1-ed/not-ed~9114
                -2-s/not-s~9116
                -3-'s/s~9118
                -4-'s/not-'s~9120
                -5-ing/not-ing~9122
                -6-ly/not-ly~9124
                -7-ingly/not-ingly~9126
                -8-er/not-er~9128
        -...
        -2 or "Starts"~9130
            -call displayMenu with a menu offering option to change to a corresponding word with following prefix (where appropriate for selection)~9132
                -1-un-~9134
                -2-re-~9136
        -...
        -3 or Tense~9138
            -call displayMenu with a menu offering option to change to a corresponding word with following tense (where appropriate for selection)~9140
                -1-present~9142
                -2-past~9144
                -3-past perfect~9146
            -...

-FIG. 91

-4 or "Part Of Speech"~9200
    -call displayMenu with a menu offering option to call a displayChoiceList for selected word with wordType limited to a word with the following part of speech (where appropriate for selection)~9202
        -1-noun~9204
        -2-pronoun~9206
        -3-article~9208
        -4-adjective~9210
        -5-adverb~9212
        -6-verb~9214
        -7-conjunction~9216
        -8-preposition~9218
        -9-interjection~9220
-5 or "Possessive/Non-Possessive"~9222
    -replace selection with corresponding possessive/non-possessive form~9224
-6 or "Singular/Plural"~9226
    -replace selection with corresponding singular/plural noun form~9228
-7 or "Singular/Plural subject"~9230
    -replace selection with corresponding singular/plural verb form~9232
-8 or "Spelled/Non-Spelled"~9234
    -replace selection with corresponding spelled/non-spelled form~9236
-9 or "Homonym"~9238
    -if there is only one homonym~9240
        -replace selection with that homonym~9242
    -else if there are multiple homonyms~9244
        -display correction window with current word as first choice and any homonyms and alternate forms of selected word as alternate choices~9246

-FIG. 92

-Entry Preferences Menu~9300
  -...
    -1 or "Dictation Defaults"~9302
      -1-Continuous~9304
      -2-Descrete~9306
      -3-One@ATime~9308
      -4 or "Press Only"~9330
      -5 or "Press & Click To Utt. End"~9332
      -6 or "Press Contin, Click Discrete To Utt. End~9334
      -7 or "Click To Timeout"~9336
      -8 or "Set Timeout"~9338
    -2 or "Filter Defaults"~9310
      -1-Continous~9312
      -2-Descrete~9314
      -3-One@Atime~9316
      -4-Abc~9318
      -5-Ambig. Abc~9320
      -6-Keyalpha~9322
      -7 or "Press Only"~9330
      -8 or "Press & Click To Utt. End"~9332
      -9 or "Press Contin, Click Discrete To Utt. End~9334
    -3 or "Reutterance Defaults"~9324
      -1-Continuous~9326
      -2-Descrete~9328
      -3 or "Press Only"~9330
      -4 or "Press & Click To Utt. End"~9332
      -5 or "Press Contin, Click Discrete To Utt. End~9334
    -4 or "Press Only"~9330
    -5 or "Press & Click To Utt. End"~9332
    -6 or "Press Contin, Click Discrete To Utt. End~9334
    -7 or "Click To Timeout"~9336
    -8 or "Set Timeout"~9338
  -...

-FIG. 93

-TTS play rules~9400
 -when TTS is on~9402
  -if TTS keys in on~9404
   -if key has been pushed down~9406
    -if same key has not been pressed within TTSKeyTime~9408
     -until key is let up~9410
      -TTS number of key and its command and if has an associated double-click command, that commands name~9412
    -else respond to key as normally (including double-clicks)~9414
  -if recognize or otherwise receive command~9416
   -use command TTS to say name of recognized command~9418
  -if recognize a text utterance~9420
   -wait until end of utterance~9422
   -use text TTS to say words recognized for utterance~9424
  -if recognize string of letters(such as for filtering)~9426
   -waits until end of utterance~9428
   -use text TTS to say letters recognized for utterance~9430
  -if user moves cursor to select new word or character~9432
   -use text TTS to say new word or character~9434
   -if there is an extended selection~9436
    -after brief pause use text TTS to say "selection" and then the words in the selection itself~9438
  -if user moves cursor to position between or before or after character or word~9440
   -use text TTS to say "cursor" between <word before> and <word after>~9442
  -if a new correction window is displayed~9444
   -use text TTS to say first choice, to spell the filter, if any, and then each candidate in the first choice list and its associated selection number~9446
  -if user scrolls an item in correction window~9448
   -use text TTS to say currently highlighted choice and its selection numbers~9450
  -if user scrolls a page in correction window~9452
   -use text TTS to say newly displayed choices and associated selection numbers~9454
  -if enter a menu~9456
   -use menu TTS to say all of choices in menu and their selection numbers, indicating current selection~9458
  -if user scrolls up/down in menu~9460
   -use menu TTS to say highlighted choices, and then after a brief pause any following selections on page with selection numbers~9462

-FIG. 94

-TTS speech generation~9500
 -...
   -If word is in speech recognition's vocabulary of phonetically spelled words~9502
     -If word has different phonetic spellings for different parts of speech and if word has current linguistic context~9504
       -Use speech recognition's part of speech indicating code to select phonetic spelling of probable part of speech for word~9506
     -Else~9508
       -select the single or most common phonetic spelling for the word~9510
     -Use the phonetic spelling selected for word as phonetic spelling for TTS speech generation~9512
   -Else~9514
     -User pronunciation-guesser used by speech recognition to assign phonetic spelling to names and newly entered word for TTS speech generation~9516
 ..

-FIG. 95

-transcription mode~9600
   -change navigation to audio 5sec/1sec~9602
   -during transcription mode map following functions over play key~9604
     -if user clicks play key~9606
       -if play is off, turn it on~9607
       -else if play is on, turn it off~9608
       -if toggling play on~9610
         -if there has been no sound navigation since last play~9612
           -start play a short length before end of last play~9614
     -if user presses play key~9616
       -if play is on, turn it off~9618
       -turn on large vocabulary recognition during press in continuous or discrete mode according to current setting~9620
       -place recognized text into audio at location at which end of play~9622
     -if user double-clicks the play key~9624
       -prompt user that there is no record in transcription mode which can be turned off in Edit Options /Audio Menu~9626

-FIG. 96

- Dialog Box Editor (dialog box)~9700
    -display editor window for start of dialog box~9702
    -respond to commands as editor mode except~9704
        -if the user selects OK, execute dialog box with current setting~9706
        -if the user supplies a navigational input, ~9707
            -the cursor moves in a manner similar to that and in the editor except that can normally only move to a control that can be typed in~9708
        -if cursor is in field and user selects a text input command~9710
            -display a separate editor window for field, showing its current contents if any~9712
            -if there are any limitations on vocabulary in field~9714
                -limit recognition vocabulary accordingly~9716
            -execute selected command for that new editor window~9718
        -if cursor is in choice list, and user selects a text input command~9720
            -display correction window for choice list showing current values in list box as best choice and which scrollable choice list for other selections~9722
        -if cursor is in check box or radio button and user selects a text input command~9724
            -change state of check box or radio button~9726

-FIG. 97

-help(state)~9800
    -display scrollable help menu for state, including description of state along with selectable list of help options and all of state's commands~9802
    -if user selects)~9804
        -any key except OK, Menu,<,>,^,v, and End)~9806
            -move to selection in menu and place selection highlight on it)~9808
            -call help with key's associated command as the state)~9810
        -Page Left/Right)~9812
            -scroll page up/down, moving selection highlight with scroll)~9814
        -Line Up/Down)~9816
            -scroll line up/down, moving selection highlight with scroll)~9818
        -OK)~9820
            -If current selection is Help Options)~9822
                -Display menu of help options)~9824
            -If current selection is a command of current help state)~9826
                -call help with key's associated command as the state)~9828
            -Select help or function for current selection, if any)~9830
        -if user selects Escape)~9832
            -return from current help call)~9834

-FIG. 98

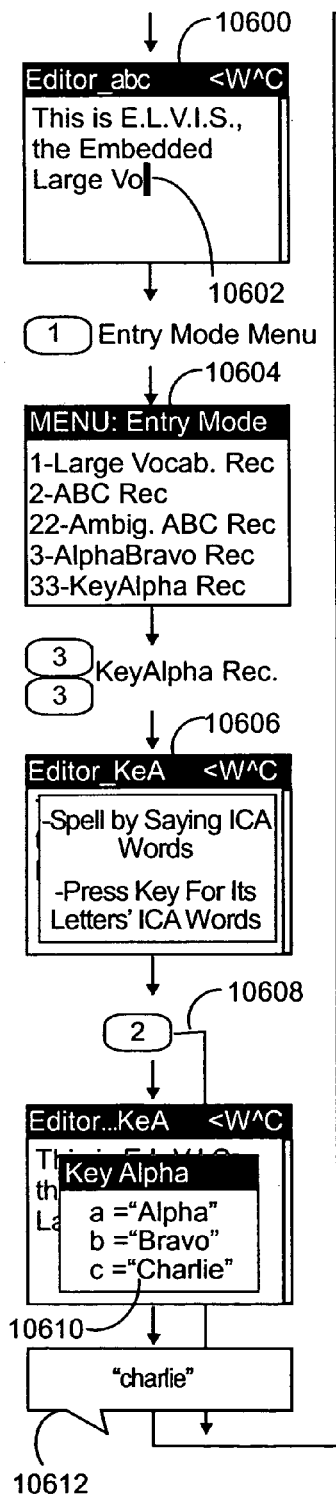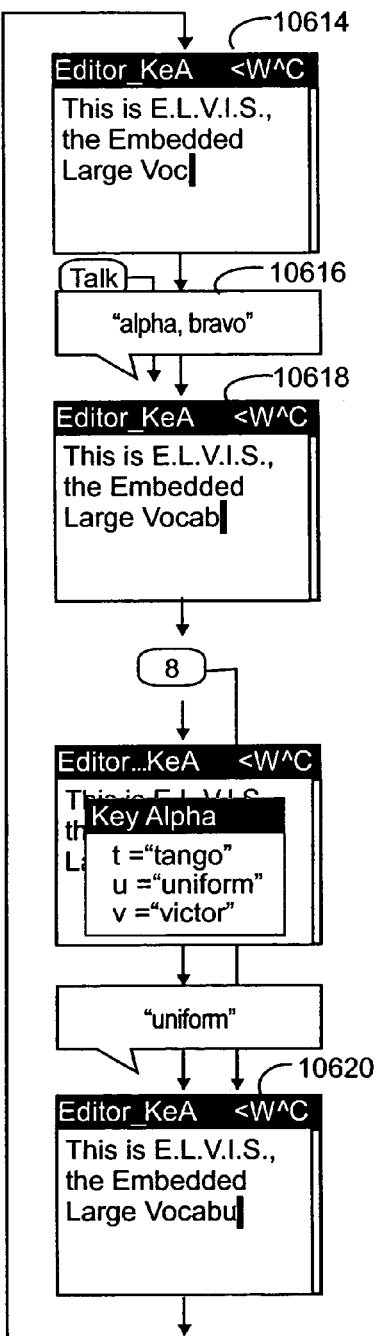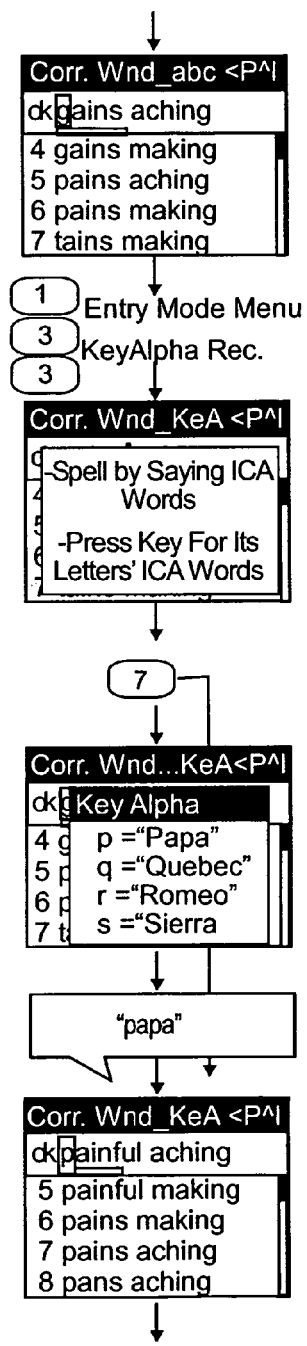
FIG. 106
FIG. 107

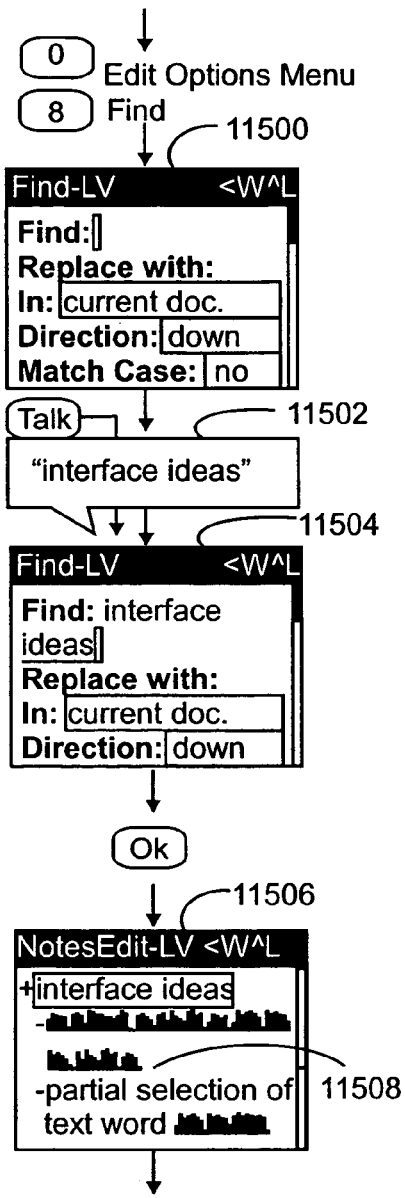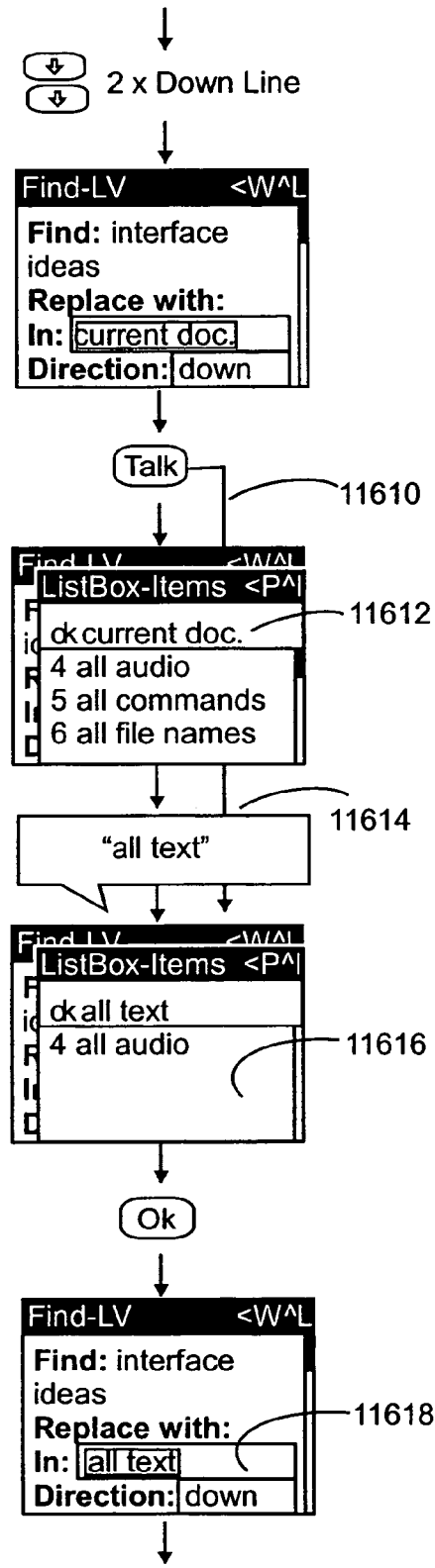
FIG. 115
FIG. 116

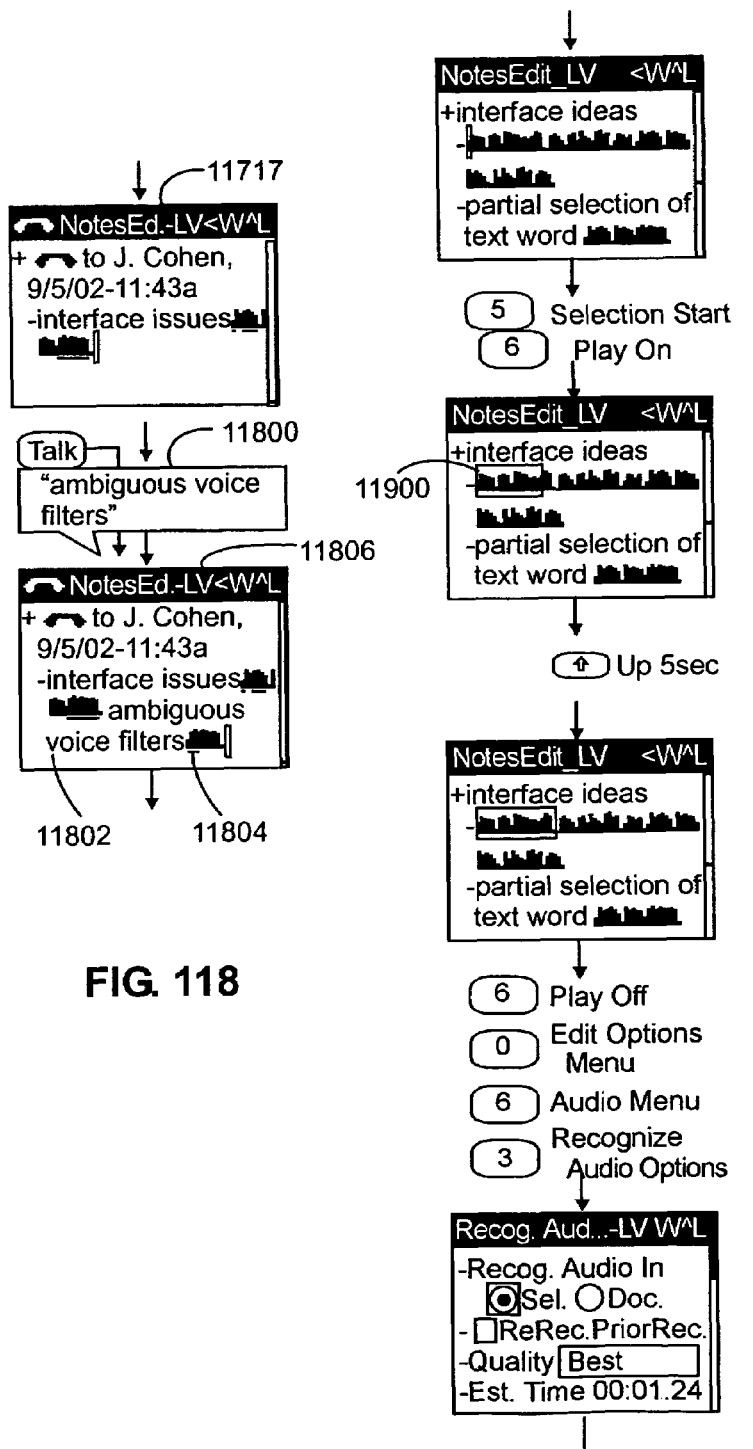
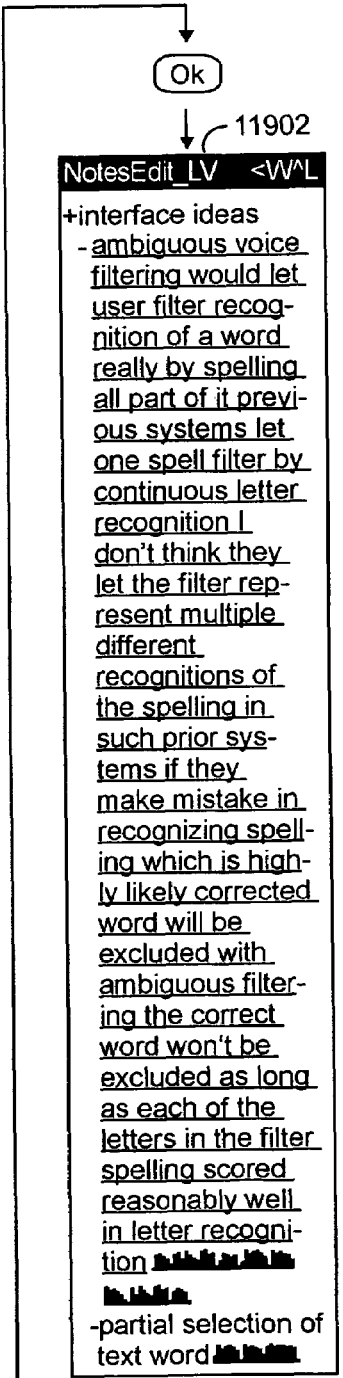
FIG. 118
FIG. 119

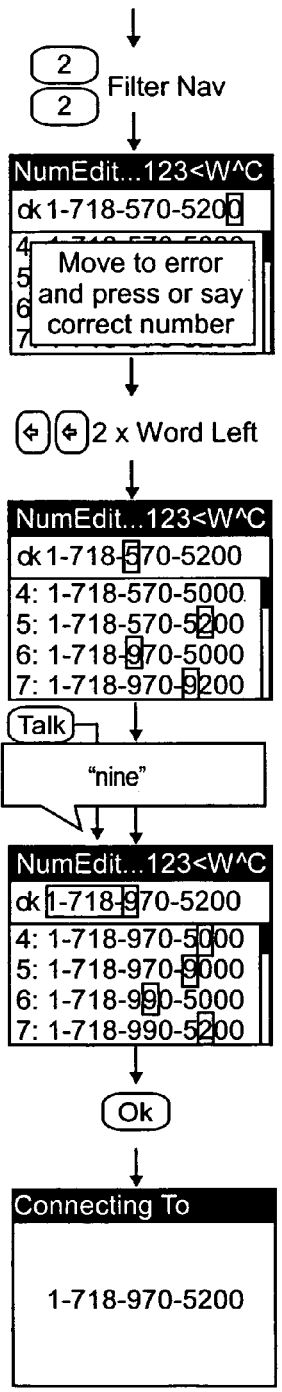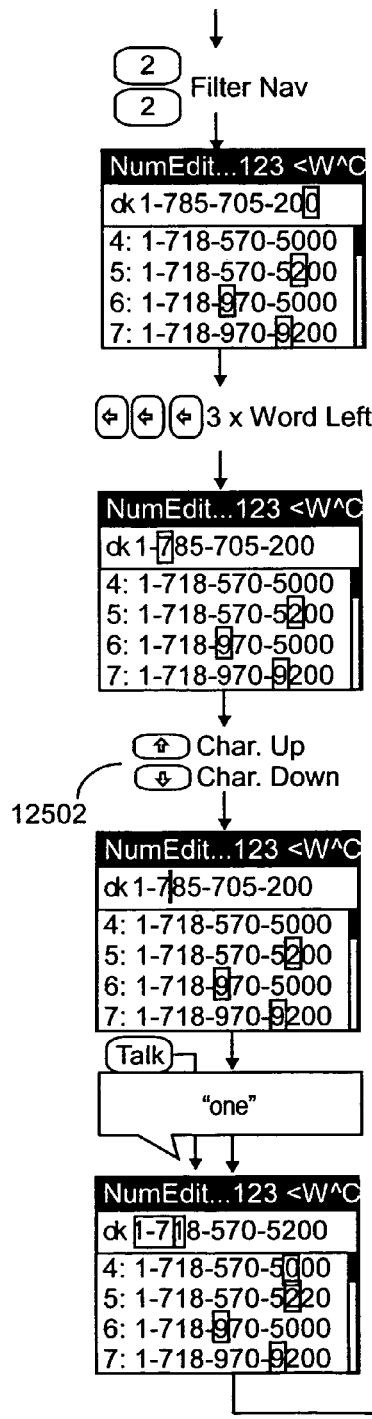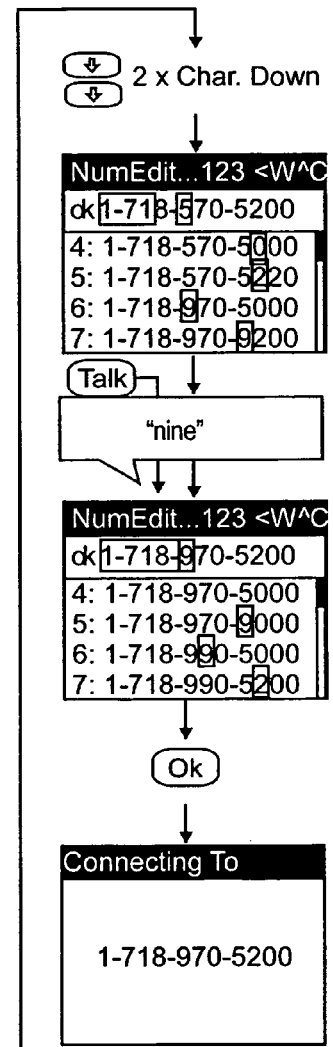
FIG. 124
FIG. 125

-Name Dial~12900
    -Prompt user to say or spell name from contact list, clear filter string, and enter name recognition mode~12904
    -loop~12906
        -if utterance is recognized in name recognition mode~12908
            -remove prompt~12909
            -call getChoices with utterance to perform recognition on utterance with vocabulary favoring recognition of names from system's contact list~12910
            -set nav. mode to Page/Item and enter choice mode~12912
            -create first alphabetically ordered choice list (one screen) and a second alphabetically ordered choice list (up to multiple screens) from recognition results~12914
            -display best choice plus first ordered choice list with filter cursor on first letter of first choice~12916
        -if user selects filter mode, set nav mode to Word/Char and enter filter mode~12917
        -if an alphabetic filtering character is received while in filter mode~12918
            -remove prompt~12919
            -call filterEdit with input and current first choice, filter string, and filter cursor~12920
            -call getChoices for filter string and any prior name utterance~12922
            -if there is no prior name utterance~12926
                -create one alphabetically ordered choice list of contact names which have initial letters corresponding to filter~12928
            -display choice list with first word in list as best choice and with filter cursor before the first letter of first choice not corresponding to the filter~12930
        -if choice list is displayed~12932
            -if user selects displayed choice candidate~12934
                -dial chosen name's phone number~12936
            -if user selects choice mode, set nav mode to Page/Item and enter choice mode~12938
            -if in Page/Item nav~12940
                -if user selects page left/right~12942
                    -scroll choice lists by a page up/down, moving highlight by one page~12944
                -if user selects item up/down~12946
                    -scroll highlighted choice up/down by one choice, scrolling screen if necessary to display highlighted choice~12948
            -if in Word/Char nav~12950
                -if user selects word left/right~12952
                    -move filter cursor's current character selection to first/last character of last/next word in displayed best choice~12954
                -if user selects character up/down~12956
                    -if move would not place filter cursor before/after start/end of best choice~12958
                        -move filter cursor left/right by one character~12960

-FIG. 129

-Digit dial~13000
    -Prompt user to say digits of phone number~13002
    -perform continuous digit recognition on utterance~13004
    -if confirmation is not required and confidence is above a required level~13006
        -dial recognized number~13008
    -if best choice has a score above a required level~13010
        -set nav. mode to Page/Item~13012
        -create first numerically ordered choice list (one screen) and a second numerically ordered choice list (up to multiple screens) from recognition results~13014
        -display best choice plus first ordered choice list with current selection of last digit in best choice~13016
    -loop~13018
        -if user selects displayed choice candidate~13020
            -dial candidate number~13022
        -if user selects filter mode, set nav mode to Word/Char~13024
        -if user selects choice mode, set nav mode to Page/Item~13026
        -if in Page/Item nav~13028
            -if user selects page left/right~13030
                -scroll choice lists by a page up/down, moving highlight by one page~13032
            -if user selects item up/down~13034
                -scroll highlighted choice up/down by one choice, scrolling screen if necessary to display highlighted choice~13036
        -if in Word/Char nav~13038
            -if user selects word left/right~13040
                -move current character selection to first/last digit of displayed best choice~13042
            -if user selects character up/down~13044
                -if prior input was a character up/down command of different direction or if move would put character selection before/after end of best choice~13046
                      -change current character selection to an insertion cursor immediately before/after prior current character selection~13048
                -else~13050
                      -move current character selection left/right by one digit~13052
        -if user inputs one or more digits at a current cursor~13054
            -if current character selection is a digit,~13056
                -replace selection with new digit(s)~13058
            -if current character selection is an insertion cursor~13060
                -insert digit(s) at cursor~13062
            -filter number choices with all digits up to and including changed or inserted digit(s) as the filter string~13066
            -create a new first ordered choice list (one screen) and a new second ordered choice list from filtered recognition results~13068
            -redisplay new best choice and first choice list~13070

WORD RECOGNITION USING CHOICE LISTS

RELATED APPLICATIONS

This application is a continuation-in-part of, and claims the priority of, a parent application, i.e., U.S. patent application Ser. No. 10/227,653, entitled "Methods, Systems, and Programming For Performing Speech Recognition", filed on Sep. 6, 2002 by Daniel L. Roth et al. This parent application is a continuation-in-part of, and claims the priority of, a grandparent application, U.S. patent application Ser. No. 10/302,053, which has the same title as the parent application (i.e., "Methods, Systems, and Programming For Performing Speech Recognition") and was filed one day before the parent application (i.e., on Sep. 5, 2002), now abandoned by Daniel L. Roth et al. The grandparent application claims the priority of the following United States provisional applications, all of which were filed on Sep. 5, 2001, and all of which were referenced in priority claims contained in the parent and grandparent applications as well as this current application:

- U.S. Provisional Patent App. 60/317,333, entitled "Systems, Methods, and Programming for Speech Recognition Using Selectable Recognition Modes" by Daniel L. Roth et al.
- U.S. Provisional Patent App. 60/317,433, entitled "Systems, Methods, and Programming for Speech Recognition Using Automatic Recognition Turn Off" by Daniel L. Roth et al.
- U.S. Provisional Patent App. 60/317,431, entitled "Systems, Methods, and Programming for Speech Recognition Using Ambiguous Or Phone Key Spelling And/Or Filtering" by Daniel L. Roth et al.
- U.S. Provisional Patent App. 60/317,329, entitled "Systems, Methods, and Programming For Phone Key Control Of Speech Recognition" by Daniel L. Roth et al.
- U.S. Provisional Patent App. 60/317,330, entitled "Systems, Methods, and Programming for Word Recognition Using Choice Lists" by Daniel L. Roth et al.
- U.S. Provisional Patent App. 60/317,331, entitled "Systems, Methods, and Programming For Word Recognition Using Word Transformation Commands" by Daniel L. Roth et al.
- U.S. Provisional Patent App. 60/317,423, entitled "Systems, Methods, and Programming For Word Recognition Using Filtering Commands" by Daniel L. Roth et al.
- U.S. Provisional Patent App. 60/317,422, entitled "Systems, Methods, and Programming For Speech Recognition Using Phonetic Models" by Daniel L. Roth et al.
- U.S. Provisional Patent App. 60/317,421, entitled "Systems, Methods, and Programming For Large Vocabulary Speech Recognition In Handheld Computing Devices" by Daniel L. Roth et al.
- U.S. Provisional Patent App. 60/317,430, entitled "Systems, Methods, and Programming For Combined Speech And Handwriting Recognition" by Daniel L. Roth et al.
- U.S. Provisional Patent App. 60/317,432, entitled "Systems, Methods, and Programming For Performing Re-Utterance Recognition" by Daniel L. Roth et al.
- U.S. Provisional Patent App. 60/317,435, entitled "Systems, Methods, and Programming For Combined Speech Recognition And Text-To-Speech Generation" by Daniel L. Roth et al.
- U.S. Provisional Patent App. 60/317,434 entitled "Systems, Methods, and Programming For Sound Recording" by Daniel L. Roth et al.

FIELD OF THE INVENTION

The present invention relates to methods, systems, and programming for performing speech recognition.

BACKGROUND OF THE INVENTION

Discrete large-vocabulary speech recognition systems have been available for use on desktop personal computers for approximately twelve years by the time of the writing of this patent application. Discrete speech recognition can only recognize a single set of one or more recognition candidates, each consisting of one vocabulary word, per utterance, where a vocabulary word, for example, can correspond to a single word, a letter name, or even a multiword phrase the system treats as one word. Continuous speech recognition, on the other hand, can produce a sequence of sets of one or more recognition candidates, each consisting of one or more vocabulary words in response to a single utterance. Continuous large-vocabulary speech recognition systems have been available for use on such computers for approximately seven years by this time. Such speech recognition systems have proven to be of considerable worth. In fact, much of the text of the present patent application has been prepared by the use of a large-vocabulary continuous speech recognition system.

As used in this specification and the claims that follow, when we refer to a large-vocabulary speech recognition system, we mean one that has the ability to recognize a given utterance as being any one of at least two thousand different vocabulary words at one time, with the recognition depending upon which of those words has corresponding phonetic or acoustic models that most closely match the given spoken word.

As indicated by FIG. 1, large-vocabulary speech recognition typically functions by having a user 100 speak into a microphone 102, which in the example of FIG. 1 is a microphone of a cellular telephone 104. The microphone transduces the variation in air pressure over time caused by the utterance of one or more words into a corresponding waveform represented by an electronic signal 106. In many speech recognition systems this waveform signal is converted, by digital signal processing performed either by a computer processor or by a special digital signal processor 108, into a time domain representation. Often the time domain representation comprises a plurality of parameter frames 112, each of which represents properties of the sound represented by the waveform 106 at each of a plurality of successive time periods, such as every one-hundredth of a second.

As indicated in FIG. 2, the time domain, or frame, representation of an utterance to be recognized is then matched against a plurality of possible sequences of phonetic models 200 corresponding to different words in a large vocabulary. In most large-vocabulary speech recognition systems, individual words 202 are each represented by a corresponding phonetic spelling 204, similar to the phonetic spellings found in most dictionaries. Each phoneme in a phonetic spelling has one or more phonetic models 200 associated with it. In many systems the models 200 are phoneme-in-context models, which model the sound of their associated phoneme when it occurs in the context of the preceding and following phoneme in a given word's phonetic spelling. The phonetic models are commonly composed of the sequence of one or more probability models, each of which represents the probability of different parameter values for each of the parameters used in the frames of the time domain representation 110 of an utterance to be recognized.

One of the major trends in personal computing in recent years has been the increased use of smaller and often more portable computing devices.

Originally most personal computing was performed upon desktop computers of the general type represented by FIG. 3. Then there was an increase in usage of even smaller personal computers in the form of laptop computers, which are not shown in the drawings because laptop computers have roughly the same type of computational capabilities and user interface as desktop computers. Most current large-vocabulary speech recognition systems have been designed for use on such systems.

Recently there has been an increase in the use of new types of computers such as the tablet computer shown in FIG. 4, the personal digital assistant computer shown in FIG. 5, cell phones which have increased computing power, shown in FIG. 6, wrist phone computers represented in FIG. 7, and a wearable computer which provides a user interface with a screen and eye tracking and/or audio output provided from a head wearable device as indicated in FIG. 8.

Because of recent increases in computing power, such new types of devices can have computational power equal to that of the first desktops on which discrete large-vocabulary recognition systems were provided and, in some cases, as much computational power as was provided on desktop computers that first ran large vocabulary continuous speech recognition. The computational capacities of such smaller and/or more portable personal computers will only grow as time goes by.

One of the more important challenges involved in providing effective large-vocabulary speech recognition on ever more portable computers is that of providing a user interface that makes it easier and faster to create, edit, and use speech recognition on such devices.

SUMMARY OF THE INVENTION

The present invention relates to using choice lists in word recognition. One aspect of the invention involves word recognition with character-ordered, scrollable choice lists. The combination of character-ordered, such as alphabetically and/or numerically ordered, choice lists, and scrollable choice lists has the benefit of allowing a user to quickly search for a desired choice from among a large number of recognition candidates, even if the choice list's display can only show a relatively small number of choices at one time. This is because the user knows where the desired recognition candidate is in the character ordering and can quickly scroll until reaching the part of the ordering where the desired candidate would be before carefully reading the recognition candidates. Another aspect of the invention relates to a scrollable, visually-displayed word recognition choice list, where the recognition candidates on the choice list are each associated with a choice-selecting symbol the user can use to select a desired recognition candidate by pressing an associated button, and where the same choice-selecting symbol is used for different choices displayed on the display at different times as a result of scrolling. This reuse of choice-selecting symbols on different parts of the same choice list enables a smaller set of choice-selecting symbols and associated buttons to be used for selecting among a larger set of recognition candidates. Another aspect of the invention relates to providing a choice list of best scoring characters for a particular character position in the spelling of a filter that is used to filter word recognition. For example, this enables a user to use character recognition, such as speech or handwriting character recognition, to input a filter sequence of one or more letters used to indicate that an associated word recognition is to be limited to words starting with such a filter sequence, and to use such a choice list to correct errors in the recognition of individual characters of the filter sequence. Another aspect of the invention relates to a choice list used in word recognition in which the choice list can be scrolled horizontally. Such a horizontal scroll is particularly useful when using small choice list displays in which long choice words might not fit within the width of the display and/or when the recognition choices contain multiple words.

BRIEF DESCRIPTION OF THE DRAWINGS

These and other aspects of the present invention will become more evident upon reading the following description of the preferred embodiment in conjunction with the accompanying drawings:

FIG. 1 is a schematic illustration of how spoken sound can be converted into acoustic parameter frames for use by speech recognition software.

FIG. 2 a schematic illustration of how speech recognition, using phonetic spellings, can be used to recognize words represented by a sequence of parameter frames such as those shown in FIG. 1, and how the time alignment between phonetic models of the word can be used to time align those words against the original acoustic signal from which the parameter frames have been derived.

FIGS. 13 through 17 provide a highly simplified pseudocode description of the responses that the speech recognition SIP makes to various inputs, particularly inputs received from its graphical user interface.

FIG. 18 is a highly simplified pseudocode description of the recognition duration logic used to determine the length of time for which speech recognition is turned on in response to the pressing of one or more user interface buttons, either in the speech recognition SIP shown in FIG. 9 or in the cellphone embodiment shown starting at FIG. 59.

FIG. 19 is a highly simplified pseudocode description of a help mode that enables a user to see a description of the functions associated with each element of the speech recognition SIP of FIG. 9 merely by touching it.

FIG. 22 is a highly simplified pseudocode description of a displayChoiceList routine used in various forms by both the speech recognition SIP of FIG. 9 and the cellphone embodiment of FIG. 59 to display correction windows.

FIG. 23 is a highly simplified pseudocode description of the getChoices routine used in various forms by both the speech recognition SIP and the cellphone embodiment to generate one or more choice list for use by the displayChoiceList routine of FIG. 22.

FIG. 26 is a highly simplified pseudocode description of a filter Match routine used by the getChoices routine to limit correction window choices to match filtering input, if any, entered by a user.

FIG. 27 is a highly simplified pseudocode description of a word Form List routine used in various forms by both the speech recognition SIP and the cellphone embodiment to generate a word form correction list that displays alternate forms of a given word or selection.

FIGS. 28 and 29 provided a highly simplified pseudocode description of a filterEdit routine used in various forms by both the speech recognition SIP and cellphone embodiment to edit a filter string used by the filter Match routine of FIG. 26 in response to alphabetic filtering information input from a user.

FIG. 30 provides a highly simplified pseudocode description of a filtercharacterchoice routine used in various forms by both the speech recognition SIP and cellphone embodiment to display choice lists for individual characters of a filter string.

FIG. 37 shows how a user of the SIP can correct such a mis-recognition by selecting part of an alternate choice in the correction window and using it as a filter for selecting the desired speech recognition output.

FIG. 38 shows how a user of the SIP can select two successive alphabetically ordered alternate choices in the correction window to cause the speech recognizer's output to be limited to output starting with a sequence of characters alphabetically located between the two selected choices.

FIG. 46 illustrates how the speech recognition SIP also enables a user to input characters by handwritten character recognition.

FIG. 47 is a highly simplified pseudocode description of a character recognition mode used by the SIP when performing handwritten character recognition of the type shown in FIG. 46.

FIG. 48 illustrates how the speech recognition SIP lets a user input text using another type of handwriting recognition.

FIG. 49 is a highly simplified pseudocode description of the handwriting recognition mode used by the SIP when performing handwriting recognition of the type shown in FIG. 48.

FIG. 50 illustrates how the speech recognition system enables a user to input text with a software keyboard.

FIG. 58 is a highly simplified description of an alternate embodiment of the displayChoiceList routine of FIG. 22 in which the choice list produced orders choices only by recognition score, rather than by alphabetical ordering as in FIG. 22.

FIG. 62 illustrates that the cellphone of FIG. 59 allows traditional phone dialing by the pressing of numbered phone keys.

FIG. 63 is a highly simplified pseudocode description of the command structure of the cellphone of FIG. 59 when in its top level phone mode, as illustrated by the screen shown in the top of FIG. 62.

FIGS. 65 and 66 provide a highly simplified pseudocode description of the operation of the main menu illustrated in FIG. 64.

FIGS. 67 through 74 illustrate command mappings of the cellphone's numbered keys in each of various important modes and menus associated with a speech recognition text editor that operates on the cellphone of FIG. 59.

FIGS. 76 through 78 provide a highly simplified pseudocode description of the responses of the cellphone's speech recognition program when in its text window editor mode.

FIGS. 79 and 80 provide a highly simplified pseudocode description of an entry mode menu, which can be accessed from various speech recognition modes to select among various ways to enter text.

FIGS. 81 through 83 provide a highly simplified pseudocode description of the correction Window routine used by the cellphone to display a correction window and to respond to user input when such correction window is shown.

FIG. 84 is a highly simplified pseudocode description of an edit navigation menu that allows a user to select various ways of navigating with the cellphone's navigation keys when the edit mode's text window is displayed.

FIG. 85 is a highly simplified pseudocode description of a correction window navigation menu that allows the user to select various ways of navigating with the cellphone's navigation keys when in a correction window, and also to select from among different ways the correction window can respond to the selection of an alternate choice in a correction window.

FIGS. 86 through 88 provide highly simplified pseudocode descriptions of three slightly different embodiments of the key Alpha mode, which enables a user to enter a letter by saying a word starting with that letter and which responds to the pressing of a phone key by substantially limiting such recognition to words starting with one of the three or four letters associated with the pressed key.

FIGS. 89 and 90 provide a highly simplified pseudocode description of some of the options available under the edits options menu that is accessible from many of the modes of the cellphone's speech recognition programming.

FIGS. 91 and 92 provide a highly simplified description of a word type menu that can be used to limit recognition choices to a particular type of word, such as a particular grammatical type of word.

FIG. 93 provides a highly simplified pseudocode description of an entry preference menu that can be used to set default recognition settings for various speech recognition functions, or to set recognition duration settings.

FIG. 94 provides a highly simplified pseudocode description of text-to-speech playback operation available on the cellphone.

FIG. 95 provides a highly simplified pseudocode description of how the cellphone's text to speech generation uses programming and data structures also used by the cellphone's speech recognition.

FIG. 96 is a highly simplified pseudocode description of the cellphone's transcription mode that makes it easier for a user to transcribe audio recorded on the cellphone using the device's speech recognition capabilities.

FIG. 97 is a highly simplified pseudocode description of programming that enables the cellphone's speech recognition editor to be used to enter and edit text in dialogue boxes presented on the cellphone, as well as to change the state of controls such as list boxes, check boxes, and radio buttons in such dialog boxes.

FIG. 98 is a highly simplified pseudocode description of a help routine available on the cellphone to enable a user to rapidly find descriptions of various locations in the cellphone's command structure.

FIG. 106 illustrates how the KeyAlpha recognition mode can be used to enter alphabetic input into the cellphone's text editor window.

FIG. 107 illustrates operation of the key Alpha mode shown in FIG. 86.

FIG. 115 illustrates the cellphone's find dialog box, how a user can enter a search string into that dialog box by speech recognition, how the find function then performs a search for the entered string, and how the found text can be used to label audio recorded on the cellphone.

FIG. 116 illustrates how the dialog box editor programming shown in FIG. 97 enable speech recognition to be used to select from among possible values associated with a list boxes.

FIG. 118 illustrates how speech recognition can be turned on and off when the cellphone is recording audio to insert text labels or text comments into recorded audio.

FIG. 119 illustrates how the cellphone enables a user to have speech recognition performed on portions of previously recorded audio.

FIGS. 122 through 125 illustrate how the cellphone speech recognition software allows the user to enter telephone numbers by speech recognition and to correct the recognition of such numbers when wrong.

FIG. 129 provides a highly simplified pseudocode description of the name dialing programming of the cellphone embodiment, which is partially illustrated in FIG. 117.

FIG. 130 provides a highly simplified pseudocode description of the cellphone's digit dial programming illustrated in FIGS. 122 through 125.

DETAILED DESCRIPTION OF SOME PREFERRED EMBODIMENTS

Figure 3:
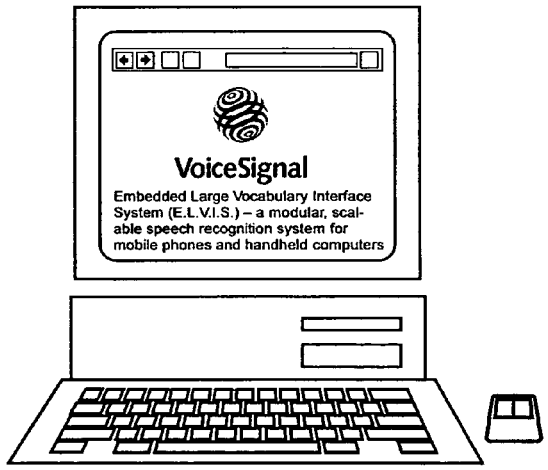
FIGS. 3 through 8 show a progression of different types of computing platforms upon which many aspects of the present invention can be used, illustrating the trend toward smaller and/or more portable computing devices.
Figure 6:
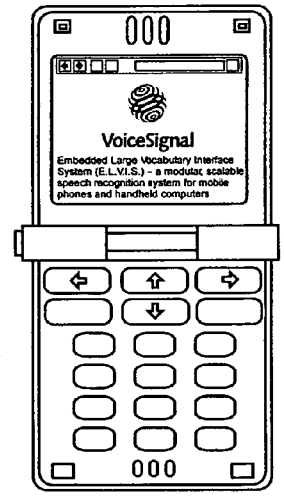
Figure 4:
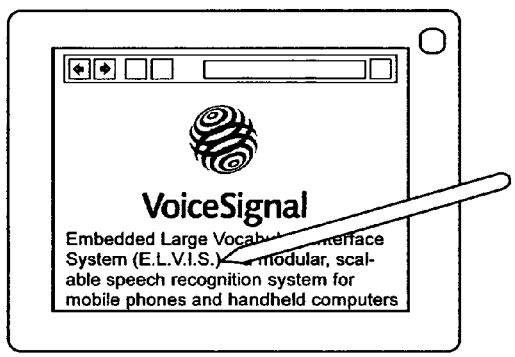
Figure 7:
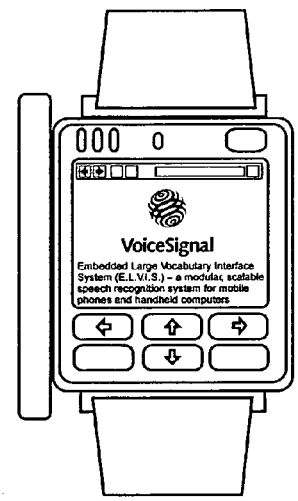
Figure 5:
Figure 8:
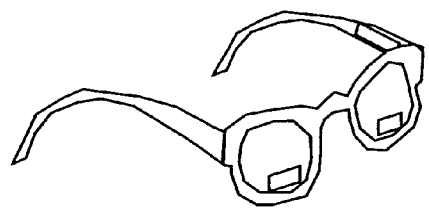
Figure 9:
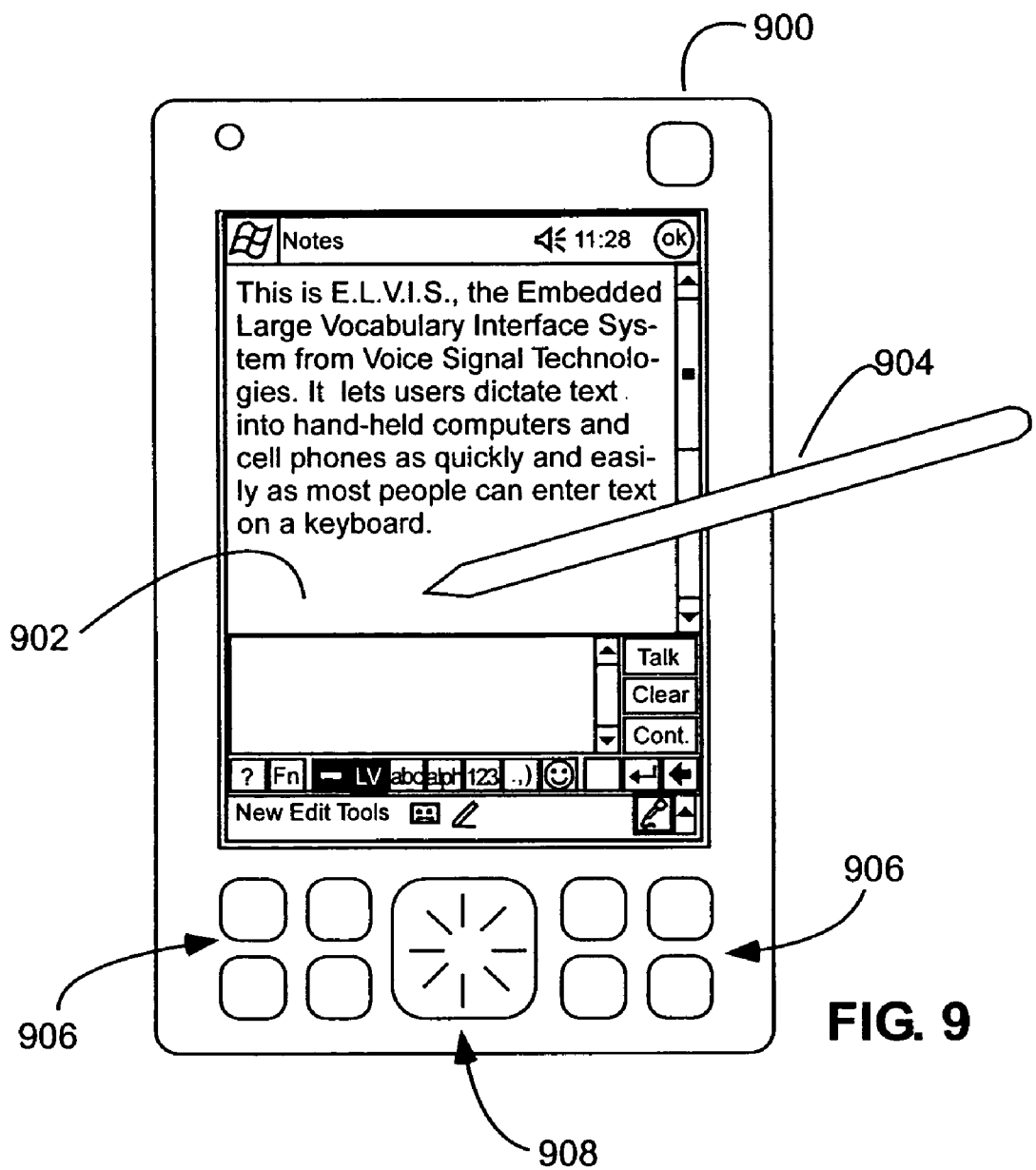
FIG. 9 illustrates a personal digital assistant, or PDA, device having a touch screen displaying a software input panel, or SIP, embodying many aspects of the present invention, that allows entry by speech recognition of text into application programs running on such a device.

FIG. 9 illustrates the personal digital assistant, or PDA, 900 on which many aspects of the present invention can be used. The PDA shown is similar to the Compaq iPAQ H3650 Pocket PC, the Casio Cassiopeia, and the Hewlett-Packard Jornado 525.

The PDA 900 includes a relatively high resolution touch screen 902, which enables the user to select software buttons as well as portions of text by means of touching the touch screen, such as with a stylus 904 or a finger. The PDA also includes a set of input buttons 906 and a two-dimensional navigational control 908.

In this specification and the claims that follow, a navigational input device that allows a user to select discrete units of motion on one or more dimensions will normally be considered to be included in the definition of a "button". This is particularly true with regard to telephone interfaces, in which the Up, Down, Left, and Right inputs of a navigational device will be considered "phone keys" or "phone buttons".

Figure 10:
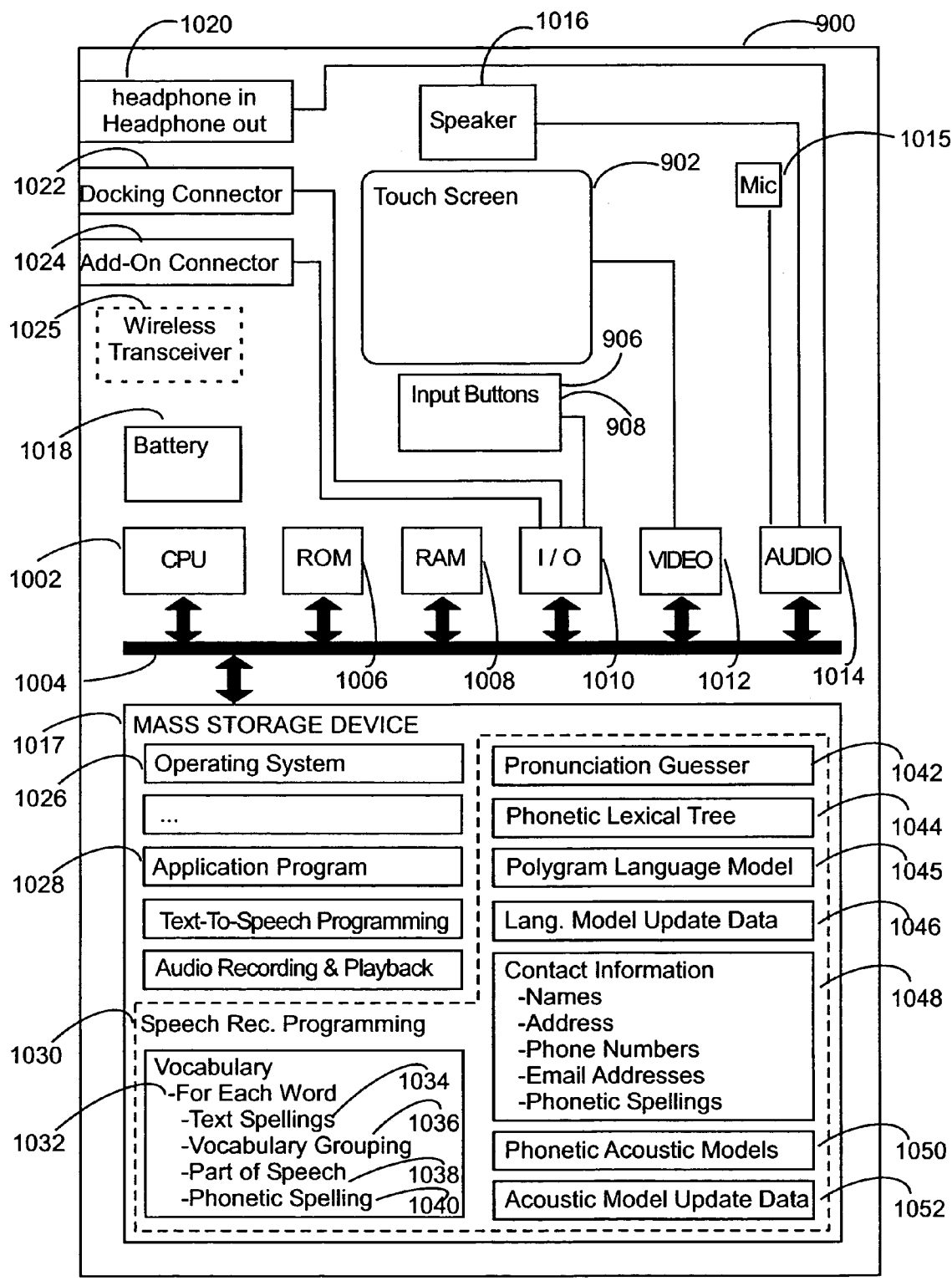
FIG. 10 is a highly schematic illustration of many of the hardware and software components that can be found in a PDA of the type shown in FIG. 9.

FIG. 10 provides a schematic system diagram of a PDA 900. It shows the touch screen 902 and input buttons 906 (which include the navigational input 908). It also shows that the device has a central processing unit such as a microprocessor 1002. The CPU 1002 is connected over one or more electronic communication buses 1004 with read-only memory 1006 (often flash ROM); random access memory 1008; one or more I/O devices 1010; a video controller 1012 for controlling displays on the touch screen 902; and an audio device 1014 for receiving input from a microphone 1015 and supplying audio output to a speaker 1016.

The PDA also includes a battery 1018 for providing it with portable power; a headphone-in and headphone-out jack 1020, which is connected to the audio circuitry 1014; a docking connector 1022 for providing a connection between the PDA and another computer, such as a desktop; and an add-on connector 1024 for enabling a user to add circuitry to the PDA such as additional flash ROM, a modem, a wireless transceiver 1025, or a mass storage device.

FIG. 10 shows a mass storage device 1017. In actuality, this mass storage device could be any type of mass storage device, including all or part of the flash ROM 1006 or a miniature hard disk. In such a mass storage device the PDA would normally store an operating system 1026 for providing much of the basic functionality of the device. Commonly it would include one or more application programs, such as a word processor, a spreadsheet, a Web browser, or a personal information management system, in addition to the operating system and in addition to the speech recognition related functionality explained next.

When the PDA 900 is used with the present invention, it will normally include speech recognition programming 1030. It includes programming for performing word matching of the general type described above with regard to FIGS. 1 and 2. The speech recognition programming will also normally include one or more vocabularies or vocabulary groupings 1032 including a large vocabulary that includes at least two thousand words. Many large vocabulary systems have a vocabulary of fifty thousand to several hundred thousand words. For each vocabulary word, the vocabulary will normally have a text spelling 1034 and one or more vocabulary groupings 1036 to which the word belongs (for example, the text output "." might actually be in both a large-vocabulary recognition vocabulary, a spelling vocabulary, and a punctuation vocabulary grouping in some systems). Each vocabulary word will also normally have an indication of the one or more parts of speech 1038 in which the word can be classified, and the phonetic spelling 1040 for the word for each of those parts of speech.

The speech recognition programming commonly includes a pronunciation guesser 1042 for guessing the pronunciation of new words that are added to the system and, thus, which do not have a predefined phonetic spelling. The speech recognition programming commonly includes one or more phonetic lexical trees 1044. A phonetic lexical tree is a tree-shaped data structure that groups together in a common path from the tree's root all phonetic spellings that start with the same sequence of phonemes. Using such lexical trees improves recognition performance because it enables all portions of different words that share the same initial phonetic spelling to be scored together.

Preferably the speech recognition programming will also include a polygram language model 1045 that indicates the probability of the occurrence of different words in text, including the probability of words occurring in text given one or more preceding and/or following words.

Commonly the speech recognition programming will store language model update data 1046, which includes information that can be used to update the polygram language model 1045 just described. Commonly this language model update data will either include or contain statistical information derived from text that the user has created or that the user has indicated is similar to the text that he or she wishes to generate. In FIG. 10 the speech recognition programming is shown storing contact information 1048, which includes names, addresses, phone numbers, e-mail addresses, and phonetic spellings for some or all of such information. This data is used to help the speech recognition programming recognize the speaking of such contact information. In many embodiments such contact information will be included in an external program, such as one of the application programs 1028 or accessories to the operating system 1026, but, even in such cases, the speech recognition programming would normally need access to such names, addresses, phone numbers, e-mail addresses, and phonetic representations for them.

The speech recognition programming will also normally include phonetic acoustic models 1050 which can be similar to the phonetic models 200 shown in FIG. 2. Commonly the speech recognition programming also stores acoustic model update data 1052, which includes information from acoustic signals that have been previously recognized by the system. Commonly such acoustic model update data will be in the form of parameter frames, such as the parameter frames 110 shown in FIGS. 1 and 2, or in the form of statistical data that has been abstracted from such frames.

Figure 11:
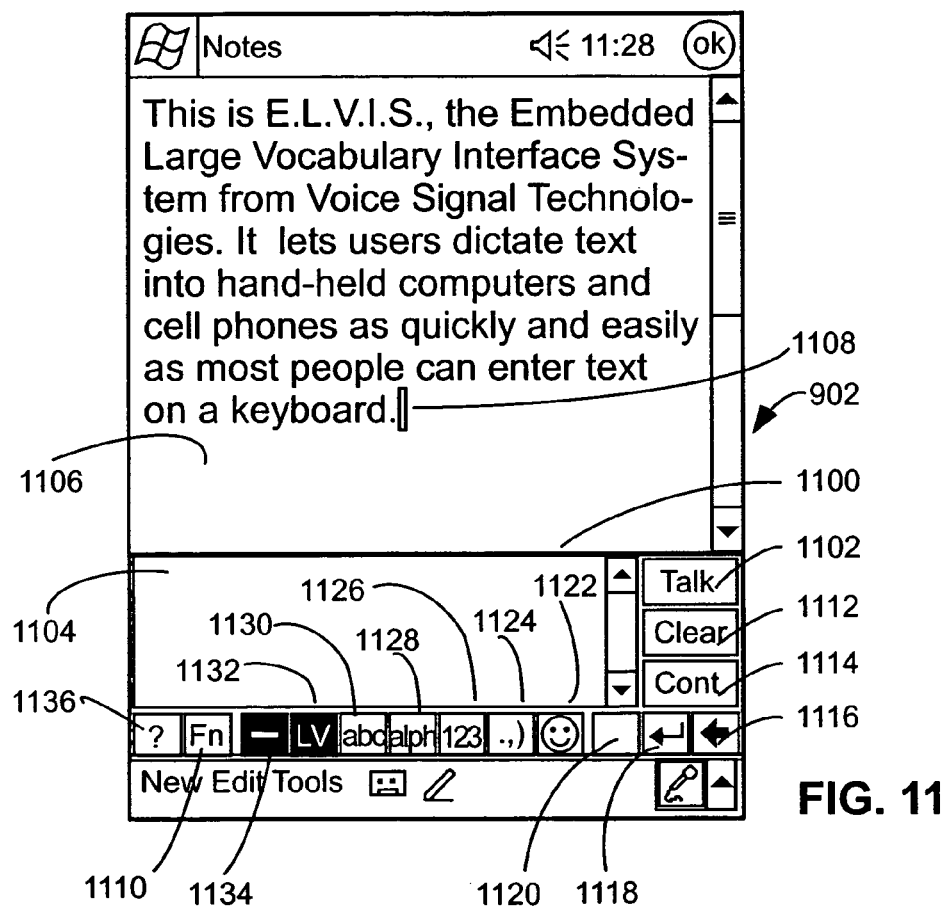
FIG. 11 is a blowup of the screen image shown in FIG. 9, used to point out many of the specific elements of the speech recognition SIP shown in FIG. 9.

FIG. 11 provides a close-up view of the user interface provided by the touch screen 902 shown in FIG. 9, with the PDA using a software input panel (or SIP) 1100 embodying many aspects of the present invention.

Figure 12:
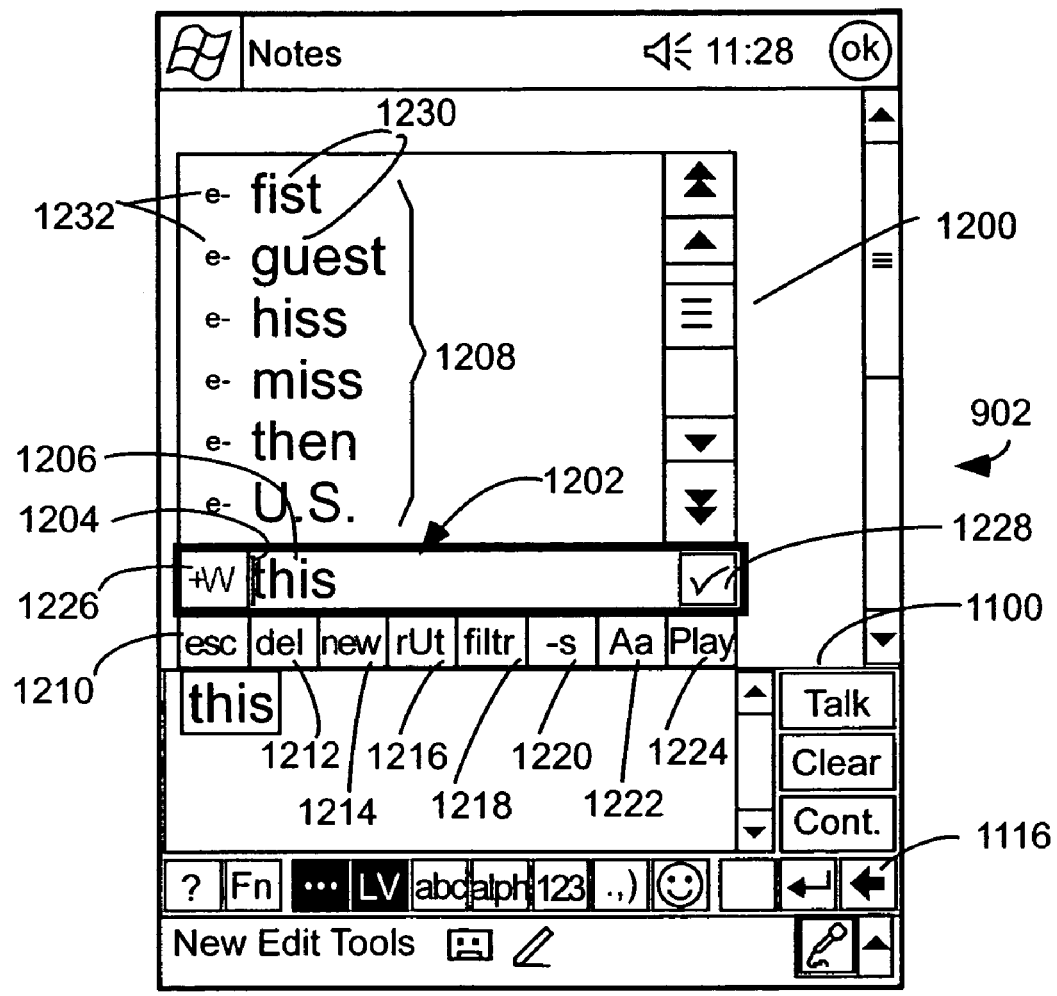
FIG. 12 is similar to FIG. 11 except that it also illustrates a correction window produced by the speech recognition SIP and many of its graphical user interface elements.

FIG. 12 is similar to FIG. 11 except it shows the touch screen 902 when the speech recognition SIP is displaying a correction window 1200.

FIGS. 13 through 17 are successive pages of a pseudocode description of how the speech recognition SIP responds to various inputs on its graphical user interface. For purposes of simplicity this pseudocode is represented as one main event loop 1300 in the SIP program which responds to user input.

In FIGS. 13 through 17 this event loop is described as having two major switch statements: a switch statement 1301 in FIG. 13 that responds to inputs on the user interface that can be generated whether or not the correction window 1200 is displayed, and a switch statement 1542 in FIG. 15 that responds to user inputs that can only be generated when the correction window 1200 is displayed.

If the user presses the Talk button 1102 shown in FIG. 11, function 1302 of FIG. 13 causes functions 1304 through 1308 to be performed. Function 1304 tests to see if there is any text in the SIP buffer shown by the window 1104 in FIG. 11. In the SIP embodiment shown in the figures, the SIP buffer is designed to hold a relatively small number of lines of text, for which the SIP's software will keep track of the acoustic input and best choices associated with the recognition of each word, and the linguistic context created by such text. Such a text buffer is used because the speech recognition SIP often will not have knowledge about the text in the remote application shown in the window 1106 in FIG. 11 into which the SIP outputs text at the location of the remote application's current cursor 1108. In other embodiments of the invention a much larger SIP buffer could be used. In other embodiments many of the aspects of the present invention will be used as part of an independent speech recognition text creation application that will not require the use of a SIP for the inputting of text. The major advantage of using a speech recognizer that functions as a SIP is that it can be used to provide input for almost any application designed to run on a PDA.

Returning to FIG. 13, function 1304 clears any text from the SIP buffer 1104 because the Talk button 1102 is provided as a way for a user to indicate to the SIP that he or she is dictating text in a new context. Thus, if the user of the SIP has moved the cursor 1108 in the application window 1106 of FIG. 11, he should start the next dictation by pressing the Talk button 1102.

When function 1304 clears text from the SIP buffer no deletion are sent to the OS text inputs. This is because such clearing of the SIP buffer does not indicate a desire to delete any text in the SIP buffer that may have been sent to the OS text input by the SIP, but rather only a desire to start new dictation.

Function 1305 sets a variable or a structure named prior SipBufferLangContext to null. This structure indicates the prior language context, if any, which is to be used for recognition at the start of the SIP buffer. By pressing the Talk button, the user has selected that no prior language context be used at the start of the SIP buffer.

Function 1306 in FIG. 13 responds to the pressing of the Talk button removing any correction window, such as the correction window 1200 shown in FIG. 12, that may be currently displayed. If the SIP was in the correction mode at the time the removed correction window was displayed, correction mode is also exited.

The SIP shown in the figures has two modes in which it can display a correction window. In the first, used in a one-at-a-time mode before a user has explicitly selected to use the correction window, the SIP is not in correction mode when a correction window is displayed, and the correction window is not selected to receive inputs from most buttons of the main SIP interface. In the second mode, used other than in the circumstances just described, the SIP is in correction mode when the correction window is displayed and it is selected to receive inputs from many of the SIP buttons.

This distinction is desirable because the particular SIP shown can be selected to operate in the above mentioned one-at-a-time mode in which words are spoken and recognized discreetly, and in which a correction window is displayed for each word as it is recognized to enable a user to more quickly see the choice list or provide correction input. In one-at-a-time mode most forms of user input not specifically related to making corrections are used to affect or effect the input of subsequent text, as well as to perform the additional function of confirming the first choice displayed in the current choice list as the desired word. In one at a time mode the user can explicitly select to use the correction window, in which case correction mode is entered. When the system is not in one-at-a-time mode, the correction window is usually displayed only when the user has provided input indicating a desire to correct previous input. In such cases the correction window is opened with the SIP in correction mode, because it is assumed that, since the user has chosen to make a correction, most forms of input should be directed to the correction window.

It should be appreciated that in systems that only use one-at-a-time recognition, or those that do not use it at all, there would be no need to have the added complication of being able to display correction windows either with or without being in correction mode.

Returning to function 1306, it removes any current correction window because the pressing of the Talk button 1302 indicates a desire to start new dictation, rather than an interest in correcting old dictation.

Function 1308 of FIG. 13 responds to the pressing of the Talk button by causing SIP buffer recognition to start according to a previously selected current recognition duration mode. Because function 1305 has nulled the prior SipBufferLangContex this recognition takes place without any prior language context for the first word in the SIP buffer. Preferably language model context will be derived from words recognized in response to one pressing of the Talk button and used to provide a language context for the recognition of the second and subsequent words in such recognition.

FIG. 18 is a schematic representation of the recognition duration programming 1800 that enables a user to select different modes of activating speech recognition in response to the pressing or clicking of any button in the SIP interface that can be used to start speech recognition. In the shown embodiment there are a plurality of buttons, including the Talk button, each of which can be used to start speech recognition. This enables a user to both select a given mode of recognition and to start recognition in that mode with a single pressing of a button.

Function 1802 helps determine which functions of FIG. 18 are performed, depending on the current recognition duration mode. The mode can have been set in multiple different ways, including by default and by selection under the Entry Preference option in the function menu shown in FIG. 46.

If the PressOnly recognition duration type has been selected, function 1804 will cause functions 1806 and 1808 to recognize speech sounds that are uttered during the pressing of a speech button. This recognition duration type is both simple and flexible because it enables a user to control the length of recognition by one simple rule: recognition occurs during and only during the pressing of a speech button. Preferably utterance and/or end of utterance detection is used during any recognition mode, to decrease the likelihood that background noises will be recognized as utterances.

If the current recognition duration type is the Press-And-ClickToUtteranceEnd type, function 1810 will cause functions 1812 and 1814 to respond to the pressing of a speech button by recognizing speech during that press. In this case the "pressing" of a speech button is defined as the pushing of such a button for longer than a given duration, such as, for example, longer than one-quarter or one-third of a second. If the user pushes on a speech button for a shorter period of time, that push will be treated as a "click" rather than as a "press," and functions 1816 and 1818 will initiate recognition starting from the time of that click until the next end of utterance detection.

The PressAndClickToUtteranceEnd recognition duration type has the benefit of enabling the use of one button to rapidly and easily select between a mode that allows a user to select a variable length extended recognition, and a mode that recognizes only a single utterance.

If the current recognition duration type is the Press-Continuous, ClickDiscreteToUtterances End type, function 1820 causes functions 1822 through 1828 to be performed. If the speech button is clicked, as just defined, functions 1822 and 1824 perform discrete recognition until the next end of utterance. If, on the other hand, the speech button is pressed, as previously defined, functions 1826 and 1828 perform continuous recognition as long as the speech button remains pressed.

This recognition duration type has the benefit of making it easy for users to quickly switch between continuous and discrete recognition merely by using different types of presses on a given speech button. In the SIP embodiment shown, the other recognition duration types do not switch between continuous and discrete recognition.

If the current recognition duration type is the Click-ToTimeout type, function 1830 causes functions 1832 to 1840 to be performed. If the speech button is clicked, functions 1833 through 1836 normally toggle recognition between off and on. Function 1834 responds to a click by testing to see whether or not speech recognition is currently on. If so, and if the speech button being clicked is other than one that changes vocabulary, it responds to the click by turning off speech recognition. If the two conditions of function 1834 are not met, function 1836 turns recognition on, or if it already is on (in the case of a vocabulary change) leaves it on, until a timeout duration has elapsed. The length of this timeout duration can be set by the user under the Entry Preferences option in the function menu 4602 shown in FIG. 46. If the speech button is pressed for longer than a given duration, as described above, functions 1838 and 1840 will cause recognition to be on during the press but to be turned off at its end.

This recognition duration type provides a quick and easy way for users to select with one button between toggling speech recognition on and off, and causing speech recognition to be turned on only during an extended press of a speech button.

Returning to function 1308 of FIG. 13, it can be seen that the selection of different recognition duration types can allow the user to select how the Talk button and other speech buttons initiate recognition.

If the user selects the Clear button 1112 shown in FIG. 11, functions 1310 through 1314 are performed.

Function 1312 removes any correction window which might be displayed.

Function 1313 sets the prior SipBufferLangContext to reflect the last one or more words of the SIP buffer. This is done so that if a user presses the Continue or any other buttons for starting speech recognition without first pressing the Talk button, the language context from the end of the SIP buffer being cleared can be used to improve the recognition accuracy of the next next word or words dictated.

Function 1314 clears the contents of the SIP buffer without sending any deletions to the operating system's text input. As stated above, in the speech SIP shown, the SIP text window 1104, shown in FIG. 11, is designed to hold a relatively small body of text. As text is entered or edited in the SIP buffer, characters are supplied to the operating system of the PDA, causing corresponding changes to be made to text in the application window 1106 shown in FIG. 11. The Clear button enables a user to clear text from the SIP buffer, to prevent it from being overloaded, without causing corresponding deletions to be made to text in the application window.

The Continue button 1114 shown in FIG. 11 is intended to be used when the user wants to dictate a continuation of the last dictated text, or text which is to be inserted at the current location in the SIP buffer window 1104, shown in FIG. 11. When this button is pressed, function 1316, of FIG. 13, causes functions 1318 through 1330 to be performed. Function 1318 removes any correction window, because the pressing of the Continue button indicates that the user has no interest in using the correction window. Next, function 1132 tests if the current cursor in the SIP buffer window has a prior language context that can be used to help in predicting the probability of the first word or words of any utterance recognized as a result of the pressing of the Continue button. If so, it causes that language context to be used. If not, function 1326 uses the prior SipBufferLangContext as the language context at the start of recognition initiated by the Continue button. Next, function 1330 starts SIP buffer recognition, that is, recognition of text to be output to the cursor in the SIP buffer, using the current recognition duration mode.

The Continue button allows the user to select recognition in which the first word of the recognition is recognized with whatever prior language context is available. Unless the user has pressed the Talk button since a prior SIP buffer was cleared by use of the Clear button, this can include a language context carried over, through use of prior SipBufferLangContext, from such a previously cleared SIP buffer.

It should be appreciated that in some embodiments of the invention a button could be provided that combined the functions of the Clear and Continue buttons. One press of such a button would both clear the SIP buffer and start new recognition using the language context from the end of the SIP buffer before it was cleared.

If language contexts is useful for recognition in their respective vocabularies, the other buttons which start recognition in the SIP buffer—such as the Names, Punctuation, Number, Alphabravo, Abc, Large Vocabulary, and Continuous/discrete buttons described with regard to functions 1350 through 1418 in FIGS. 13 and 14—function similarly to the Continue button with regard to their use of language context. That is, they cause dictation to start using either the language context defined by words before the cursor in the SIP buffer, or if there are no words before them in the SIP buffer, the language context, if any, defined by the prior SipBufferLangContext.

If complex language models are used functions related to prior SipBufferLangContext would have to be changed accordingly. For example, if trigram language models are used the prior SipBufferLangContext would store the last two words in a prior SIP buffer, and would effect not only the recognition of the first but the second word in a new SIP buffer.

If the user selects the Backspace button 1116 shown in FIG. 11, functions 1332 through 1336 will be performed. Function 1334 tests if the SIP is currently in the correction mode. If so, it enters the backspace into the filter editor of the correction window. The correction window 1200 shown in FIG. 12 includes a first choice window 1202. As will be described below in greater detail, the correction window interface allows the user to select and edit one or more characters in the first choice window as being part of a filter string which identifies a sequence of initial characters belonging to the desired recognition word or words. If the SIP is in the correction mode, pressing backspace will delete from the filter string any characters currently selected in the first choice window, and if no characters are so selected, will delete the character to the left of the filter cursor 1204.

If the SIP is not currently in the correction mode, function 1336 will respond to the pressing of the Backspace button by entering a backspace character into the SIP buffer and outputting that same character to the operating system so the same change can be made to the corresponding text in the application window 1106 shown in FIG. 11.

When the backspace is supplied to the operating system, the OS is also supplied with any additional characters necessary to make an external text, such as the text in the application window 1106 of FIG. 11, that receives such input correspond to the changes in the SIP buffer. As is explained below with regard to Functions 1520 through 1528, such additional characters are necessary when an edit is made other than at the end of the SIP buffer. This is because an edit other than at the end of the SIP buffer changes text that has already been sent to the OS for use in an external text. In such a case, backspaces have to be sent to the OS to delete back to the location in the external text corresponding to the position of the edit in the SIP buffer. After the changed text is inserted or deleted, any portion of SIP buffer text following the change has to then be sent to the OS for re-insertion into the external text.

If the user changes his cursor location in the external program and then wants to create new text in the SIP buffer, he or she should use the TALK button, which will cause the SIP buffer to start in a cleared state. Once subsequent dictation occurs, any words located in the SIP buffer will correspond to text that has been sent to the OS for insertion at the new location. This will cause any subsequent SIP buffer changes made other than at the end of that buffer to delete and change only text located immediately before the current cursor in the external program that corresponds to the text currently in the SIP buffer.

If the user selects the New Paragraph button 1118 shown in FIG. 11, functions 1338 through 1342 of FIG. 13 will exit correction mode, if the SIP is currently in it, and they will enter a New Paragraph character into the SIP buffer and provide corresponding output to the operating System.

As indicated by functions 1344 through 1348, the SIP responds to user selection of a Space button 1120 in substantially the same manner that it responds to a backspace, that is, by entering it into the filter editor if the SIP is in correction mode, and otherwise outputting it to the SIP buffer and the operating system.

If the user selects one of the Vocabulary Selection buttons 1122 through 1132 shown in FIG. 11, functions 1350 through 1370 of FIG. 13, and functions 1402 through 1416 FIG. 14, will set the appropriate recognition mode's vocabulary to the vocabulary corresponding to the selected button and start speech recognition in that mode according to the current recognition duration mode and other settings for the recognition mode.

If the user selects the Name Recognition button 1122, functions 1350 and 1356 set the current mode's recognition vocabulary to the name recognition vocabulary and start recognition according to the current recognition duration settings and other appropriate speech settings. With all of the vocabulary buttons besides the Name and Large Vocabulary buttons, these functions will treat the current recognition mode as either filter or SIP buffer recognition, depending on whether the SIP is in correction mode. This is because these other vocabulary buttons are associated with vocabularies used for inputting sequences of characters that are appropriate either for defining a filter string or for direct entry into the SIP buffer. The large vocabulary and the name vocabulary, however, are often inappropriate for filter string editing and, thus, in the disclosed embodiment when either large vocabulary or name vocabulary are selected the current recognition mode will be either re-utterance or SIP buffer recognition, depending on whether the SIP is in correction mode. In other embodiments, name and large vocabulary recognition could be used for editing a multiword filter.

Figure 40:
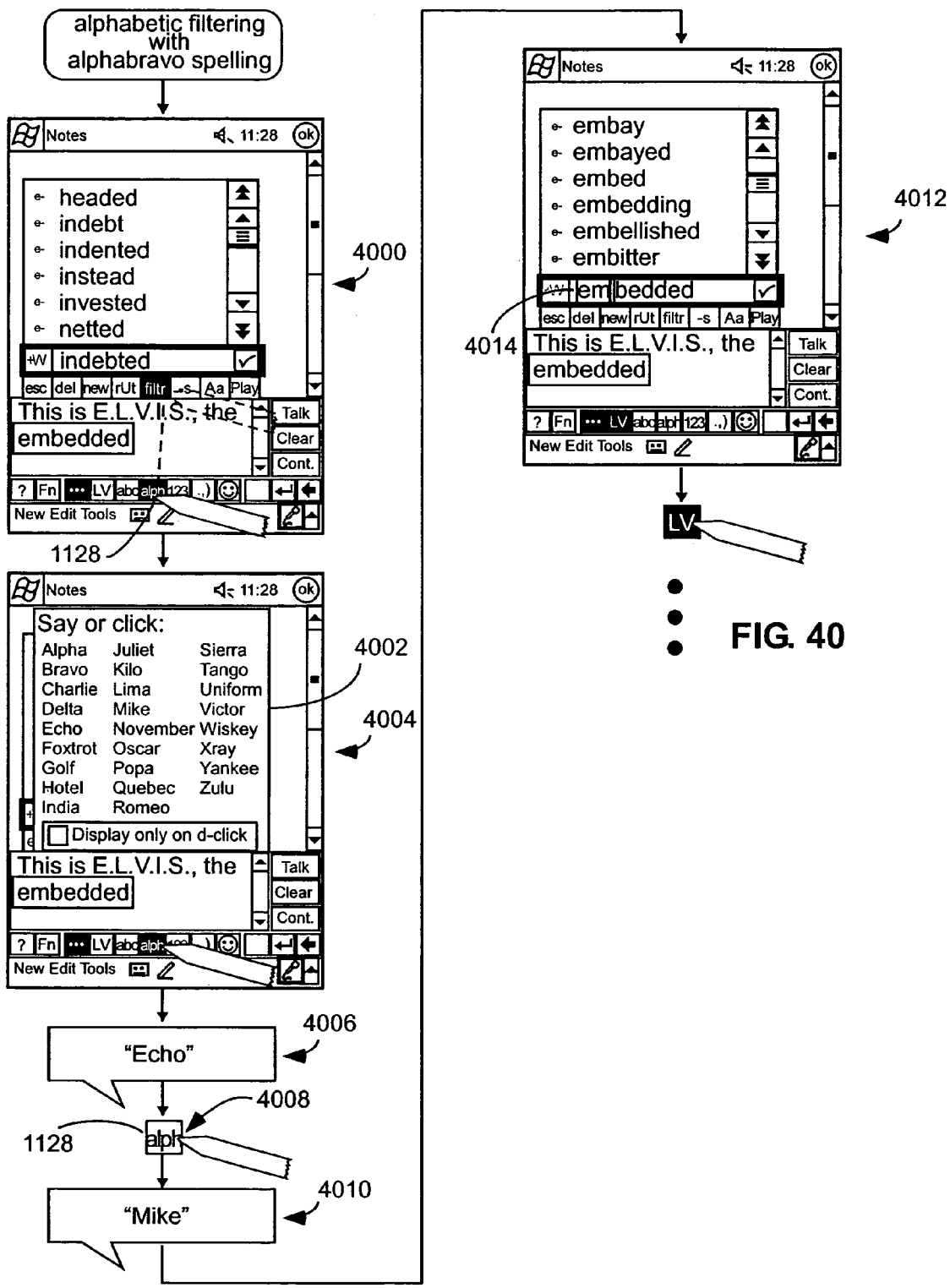
FIG. 40 illustrates how a user of the SIP recognizer can enter one or more characters of a filter string using the international communication alphabets and how the SIP interface can show the user the words out of that alphabet.

In addition to the standard response associated with the pressing of a vocabulary button, if the AlphaBravo Vocabulary button is pressed or double-clicked, functions 1404 through 1406 cause a list of all the words used by the International Communication Alphabet (or ICA) to be displayed, as is illustrated in window 4002 in FIG. 40. Normally a single press or click of the AlphaBravo Vocabulary button will cause this list to be displayed. But if users desire to see this list only when specifically desired, they can set a Display_Alpha_On_Double_Click flag, which will cause the list to be displayed only when the user double-clicks the AlphaBravo Vocabulary button.

If a user wants to take more than a short fraction of a second to read the list of ICA alphabet words, functions 1404 and 1406 will require that she or he push on the Alphabravo button long enough (either as the single push of a single press or click or the second push of a double click) that it will be considered a continuous "press" by duration logic of FIG. 18.

Often this is not a problem, since press recognition is often appropriate for alphabravo spelling, and even when it is not, in many cases, the user can end the press without dictating anything, and then click for alphabravo dictation with the duration logic using a click-related duration.

The need to wait for a double click if Display_Alpha_On_Double_Click flag is set will not slow down the user interface significantly, as long as the activity started by the initial click of a double click is compatible with the activity selected by the recognition duration logic of FIG. 18 in response whether the second click of the double click is a click or a continuous press. This will be the case for Alphabravo recognition if (1) its discrete and continuous recognition are the same, except that discrete recognition only considers single vocabulary word recognition candidates; and (2) it ignores function 1834 of FIG. 18. This is true because the time duration between the first and second presses of a double click is shorter than the length of time required for an end of utterance detection, and, thus, the decision about which of FIG. 18's durations should apply can be delayed until after that double-click time.

In other embodiments, other methods could be used to determine when and how the ICA alphabet words are displayed, such as, for example, by use of the help button.

If the user selects the Continuous/Discrete Recognition button 1134 shown in FIG. 11, functions 1418 through 1422 of FIG. 14 are performed. Function 1420 toggles between continuous recognition mode, which uses continuous speech acoustic models and allows multiple vocabulary word recognition candidates to match a given single utterance, and a discrete recognition mode, which uses discrete recognition acoustic models and only allows single vocabulary word recognition candidates to be recognized for a single utterance.

Function 1422 then starts speech recognition using either discrete or continuous recognition, as has just been selected by the toggling of function 1420.

If the user selects the function key 1110 by pressing it, functions 1424 and 1426 call the function menu 4602 shown in FIG. 46. This function menu allows the user to select from other options besides those available directly from the buttons shown in FIGS. 11 and 12.

If the user selects the Help button 1136 shown in FIG. 11, functions 1432 and 1434 of FIG. 14 call help mode.

Figure 20:
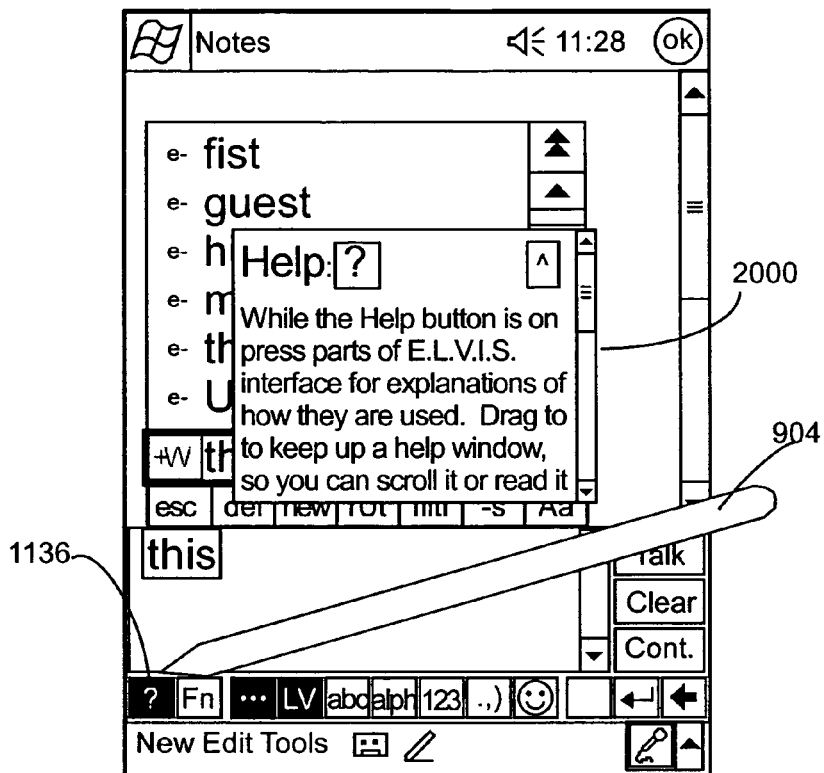
FIGS. 20 and 21 are screen images produced by the help mode described in FIG. 19.
Figure 21:
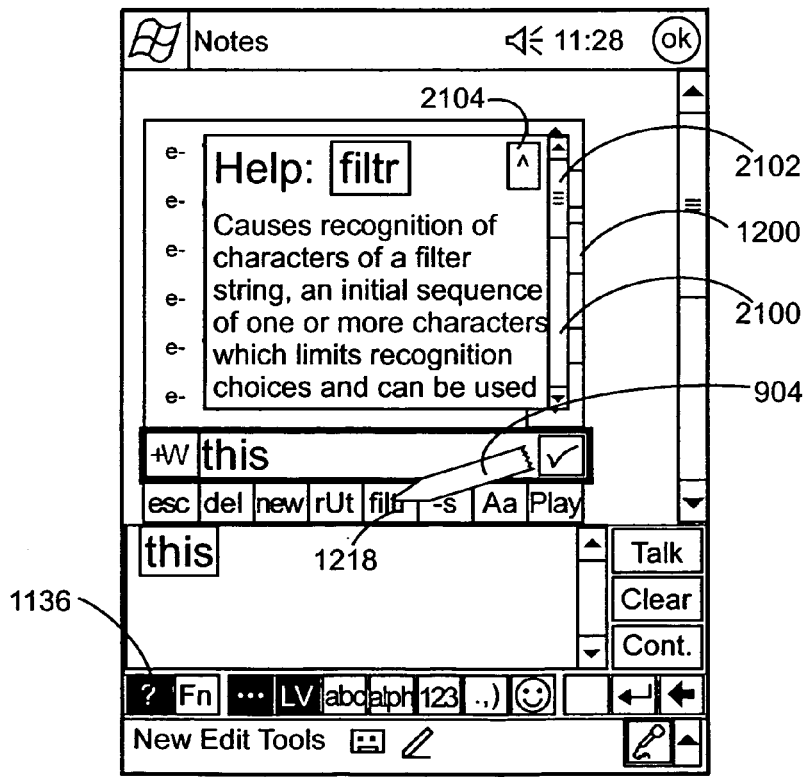

As shown in FIG. 19, when the help mode is entered in response to an initial pressing of the Help button, a function 1902 displays a help window 2000 providing information about using the help mode, as illustrated in FIG. 20. During subsequent operation of the help mode, if the user touches a portion of the SIP interface, functions 1904 and 1906 display a help window with information about the touched portion of the interface that continues to be displayed as long as the user continues that touch. This is illustrated in FIG. 21, in which the user has used the stylus 904 to press the Filter button 1218 of the correction window. In response, a help window 2100 is shown that explains the function of the Filter button. If during the help mode a user double-clicks on a portion of the display, functions 1908 and 1910 display a help window that stays up until the user presses another portion of the interface. This enables the user to use the scroll bar 2102 shown in the help window of FIG. 21 to scroll through and read help information too large to fit on the help window 2102 at one time.

Although not shown in FIG. 19, help windows can also have a Keep Up button 2104 to which a user can drag from an initial down press on a portion of the SIP user interface of interest to also select to keep the help window up until the touching of a another portion of the SIP user interface.

When, after the initial entry of the help mode, the user again touches the Help button 1136 shown in FIGS. 11, 20, and 21, functions 1912 and 1914 remove any help windows and exit the help mode, turning off the highlighting of the Help button.

If a user taps on a word in the SIP Buffer, functions 1436 through 1438 of FIG. 14 make the selected word the current selection and call the displayChoiceList routine shown in FIG. 22 with the tapped word as the current selection and with acoustic data associated with the recognition of the tapped word, if any, the first entry in an utterance list, which holds acoustic data associated with the current selection.

As shown in FIG. 22, the displayChoiceList routine is called with the following parameters: a selection parameter; a filter string parameter; a filter range parameter; a word type parameter; and a notChoiceList pointer. The selection parameter indicates the selected text in the SIP buffer for which the routine has been called. The filter string indicates a sequence of one or more characters indicating elements that define the set of one or more possible spellings with which the desired recognition output begins. The filter range parameter defines two character sequences, which bound a section of the alphabet in which the desired recognition output falls. The word type parameter indicates that the desired recognition output is of a certain type, such as a desired grammatical type. The NotChoiceList pointer, if non-null, points to a list of one or more words that the user's actions indicate are not a desired word.

Function 2202 of the displayChoiceList routine calls a getChoices routine, shown in FIG. 23, with the filter string and filter range parameters with which the displayChoiceList routine has been called and with an utterance list associated with the selection parameter.

Figure 24:
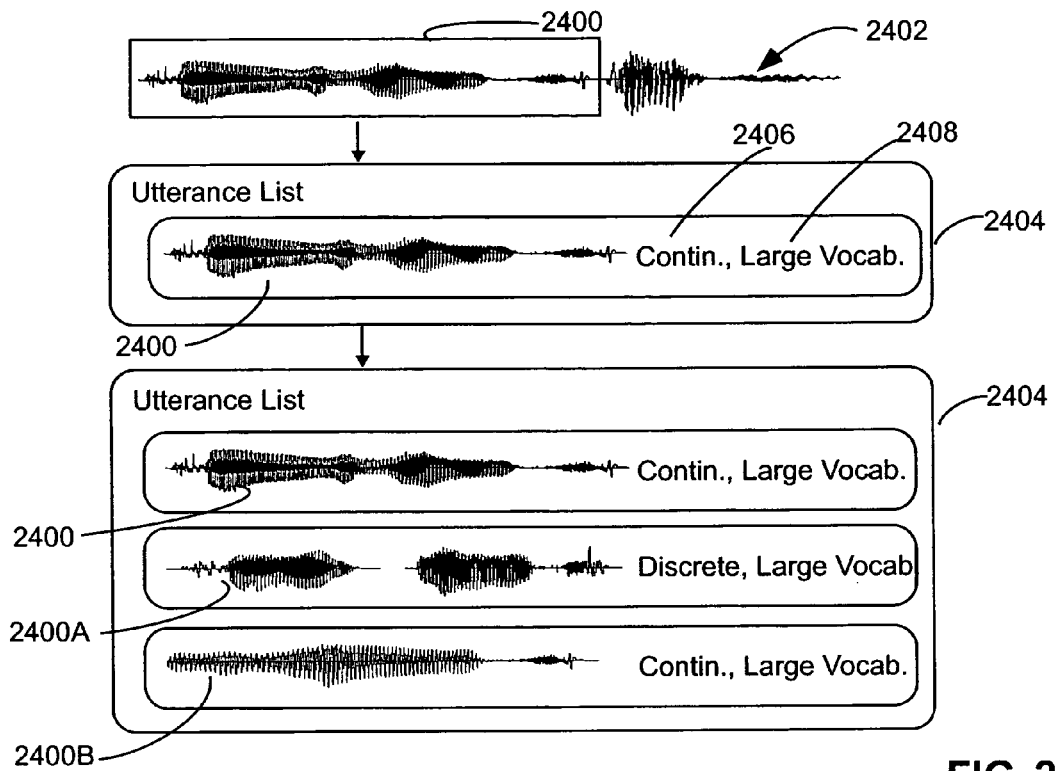
FIGS. 24 and 25 illustrate the utterance list data structure used by the getChoices routine of FIG. 23.
Figure 25:
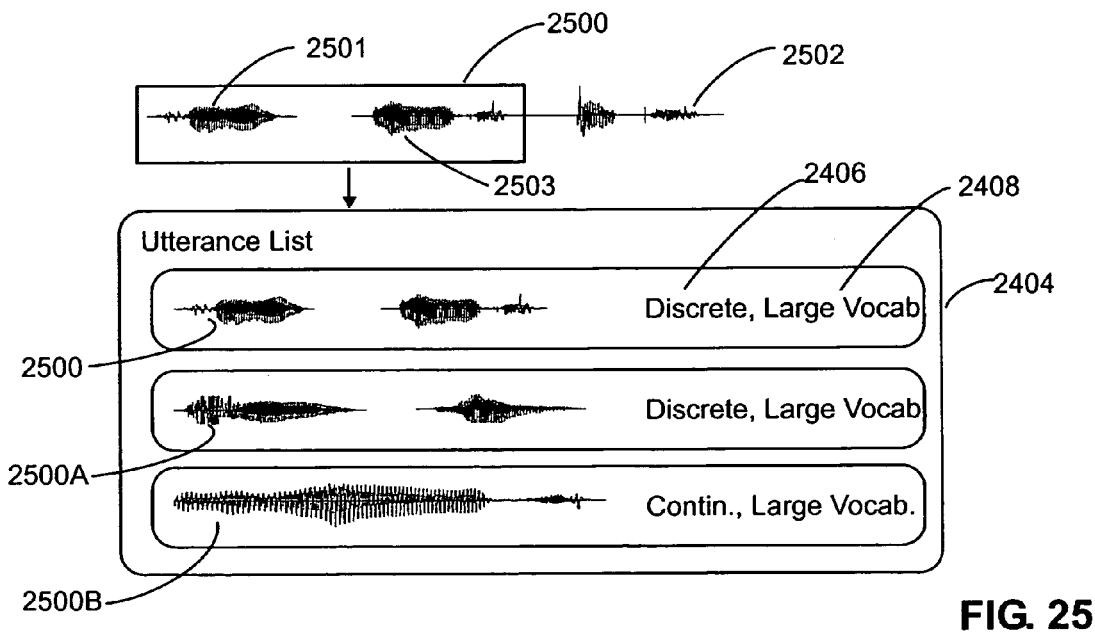

As shown in FIGS. 24 and 25, the utterance list 2404 stores sound representations of one or more utterances that have been spoken as part of the desired sequence of one or more words associated with the current selection. As previously stated, when function 2202 of FIG. 22 calls the getChoices routine, it does so with a representation, such as 2400 shown in FIG. 24, of that portion of the sound 2402 from which the word or words of the current selection have been recognized. As was indicated in FIG. 2, the process of speech recognition time-aligns acoustic models against representations of an audio signal. The recognition system preferably stores these time alignments so that when corrections or playback of selected text are desired it can find the corresponding audio representations from such time alignments.

In FIG. 24 the first entry 2400 in the utterance list is part of a continuous utterance 2402. The present invention enables a user to add additional utterances of a desired sequence of one or more words to a selection's utterance list, and recognition can be performed on all these utterance together to increase the chance of correctly recognizing a desired output. As shown in FIG. 24, such additional utterances can include both discrete utterances, such as entry 2400A, as well as continuous utterances, such as entry 2400B. Each additional utterance contains information as indicated by the numerals 2406 and 2408 that indicates whether it is a continuous or discrete utterance and the vocabulary mode in which it was dictated.

In FIGS. 24 and 25, the acoustic representations of utterances in the utterance list are shown as waveforms. It should be appreciated that in many embodiments, other forms of acoustic representation will be used, including parameter frame representations such as the representation 110 shown in FIGS. 1 and 2.

FIG. 25 is similar to FIG. 24, except that in it, the original utterance list entry is a sequence of discrete utterances. It shows that additional utterance entries used to help correct the recognition of an initial sequence of one or more discrete utterances can also include either discrete or continuous utterances, 2500A and 2500B, respectively.

As shown in FIG. 23, the getChoices routine 2300 includes a function 2302 which tests to see if there has been a prior recognition for the selection for which this routine has been called that has been performed with the current utterance list and filter values (that is, filter string and filter range values). If so, it causes function 2304 to return with the choices from that prior recognition, since there have been no changes in the recognition parameters since the time the prior recognition was made.

If the test of function 2302 is not met, function 2306 tests to see if the filter range parameter is null. If it is not null, function 2308 tests to see if the filter range is more specific than the current filter string, and, if so, it changes the filter string to the common letters of the filter range. If not, function 2312 nulls the filter range, since the filter string contains more detailed information that it does.

As will be explained below, a filter range is selected when a user selects two choices on a choice list as an indication that the desired recognition output falls between them in the alphabet. When the user selects two choices that share initial letters, function 2310 causes the filter string to correspond to those shared letters. This is done so that when the choice list is displayed, the shared letters will be indicated to the user as one which has been confirmed as corresponding to the initial characters of the desired output.

If the utterance list is not empty and there are any candidates from a prior recognition of the current utterance list, function 2316 causes function 2318 and 2320 to be performed. Function 2318 calls a filterMatch routine shown in FIG. 26 for each such prior recognition candidate with the candidate's prior recognition score and the current filter definitions, and function 2320 deletes those candidates returned as a result of such calls that have scores below a certain threshold.

As indicated in FIG. 26, the filterMatch routine 2600 performs filtering upon word candidates. In the embodiment of the invention shown, this filtering process is extremely flexible, since it allows filters to be defined by filter strings, filter range, or word type. It is also flexible because it allows a combination of word type and either filter string or filter range specifications, and because it allows ambiguous filtering, including ambiguous filters where elements in a filter string are not only ambiguous as to the value of their associated characters but also ambiguous as to the number of characters in their associated character sequences.

When we say a filter string or a portion of a filter string is ambiguous, we mean that a plurality of possible character sequences can be considered to match it. Ambiguous filtering is valuable when used with a filter string input, which, although reliably recognized, does not uniquely defined a single character, such as is the case with ambiguous phone key filtering of the type described below with regard to a cellphone embodiment of many aspects of the present invention.

Ambiguous filtering is also valuable with filter string input that cannot be recognized with a high degree of certainty, such as recognition of letter names, particularly if the recognition is performed continuously. In such cases, not only is there a high degree of likelihood that the best choice for the recognition of the sequence of characters will include one or more errors, but also there is a reasonable probability that the number of characters recognized in a best-scoring recognition candidate might differ from the number spoken. But spelling all or the initial characters of a desired output is a very rapid and intuitive way of inputting filtering information, even though the best choice from such recognition will often be incorrect, particularly when dictating under adverse conditions.

The filterMatch routine is called for each individual word candidate. It is called with that word candidate's prior recognition score, if any, or else with a score of 1. It returns a recognition score equal to the score with which it has been called multiplied by the probability that the candidate matches the current filter values.

Functions 2602 through 2606 of the filterMatch routine test to see if the word type parameter has been defined, and, if so and if the word candidate is not of the defined word type, it returns from the filterMatch function with a score of 0, indicating that the word candidate is clearly not compatible with current filter values.

Functions 2608 through 2614 test to see if a current value is defined for the filter range. If so, and if the current word candidate is alphabetically between the starting and ending words of that filter range, they return with an unchanged score value. Otherwise they return with a score value of 0. Note that functions 2306 through 2313 of the getChoices routine of FIG. 23 cause the filterMatch routine to only be called with a non-null filter range if the filter range is more specific than the filter string. Thus, if filterMatch is called with a non-null filter range, it can ignore the filter string and return with either function 2612 or 2614.

Function 2616 determines if there is a defined filter string. If so, it causes functions 2618 through 2653 to be performed. Function 2618 sets the current candidate character, a variable that will be used in the following loop, to the first character in the word candidate for which filterMatch has been called.

Next, a loop 2620 is performed until the end of the filter string is reached by its iterations. This loop includes functions 2622 through 2652.

The first function in each iteration of this loop is the test by step 2622 to determine the nature of the next element in the filter string. In the embodiment shown, three types of filter string elements are allowed: an unambiguous character, an ambiguous character, and an ambiguous element representing a set of ambiguous character sequences, which can be of different lengths.

An unambiguous character unambiguously identifies a letter of the alphabet or other character, such as a space. It can be produced by unambiguous recognition of any form of alphabetic input, but it is most commonly associated with letter or ICA word recognition, keyboard input, or non-ambiguous phone key input in phone implementations. Any recognition of alphabetic input can be treated as unambiguous merely by accepting a single best scoring spelling output by the recognition as an unambiguous character sequence.

An ambiguous character is one which can have multiple letter values, but which has a definite length of one character. As stated above, this can be produced by the ambiguous pressing upon keys in a telephone embodiment, or by speech or character recognition of letters. It can also be produced by continuous recognition of letter names in which all the best scoring character sequences have the same character length.

An ambiguous length element is commonly associated with the output of continuous letter name recognition or handwriting recognition. It represents multiple best-scoring letter sequences against handwriting or spoken input, some of which sequences can have different lengths.

If the next element in the filter string is an unambiguous character, function 2624 causes functions 2626 through 2630 to be performed. Function 2626 tests to see if the current candidate character matches the current unambiguous character. If not, the call to filterMatch returns with a score of 0 for the current word candidate. If so, function 2630 increments the position of the current candidate character.

If the next element in the filter string is an ambiguous character, function 2632 causes functions 2634 through 2642 to be performed. Function 2634 tests to see if the current character fails to match one of the recognized values of the ambiguous character. If so, function 2636 returns from the call to filterMatch with a score of 0. Otherwise, functions 2638 through 2642 alter the current word candidate's score as a function of the probability of the ambiguous character matching the current candidate character's value, and then increment the current candidate character's position.

If the next element in the filter string is an ambiguous length element, function 2644 causes a loop 2646 to be performed for each character sequence represented by the ambiguous length element. This loop comprises functions 2648 through 2650. Function 2648 tests to see if there is a matching sequence of characters starting at the current candidate's character position that matches the current character sequence of the loop 2646. If so, function 2649 alters the word candidate's score as a function of the probability of the recognized matching sequence represented by the ambiguous length element, function 2650 increments the current position of the current candidate character by the number of the characters in the matching ambiguous length sequence, and then function 2650 breaks out of the for loop 2646 and cause program flow to advance to the next iternation of the until loop 2620, either by starting another iteration of that loop, or if the current candidate character points to the end of the current filter string, by advancing to function 2653.

If the for 2646 is completed without any sequence of characters starting at the current word candidate's character position that match any of the sequences of characters associated with the ambiguous length element, functions 2651 and 2652 return from the call to filterMatch with a score of 0.

If the until loop 2620 is completed, the current word candidate will have matched against the entire filter string. In this case, function 2653 returns from filterMatch with the current word's score produced by the loop 2620.

If the test of step 2616 finds that there is no filter string defined, step 2654 merely returns from filterMatch with the current word candidate's score unchanged.

Returning now to function 2318 of FIG. 23, it can be seen that the call to filterMatch for each word candidate will return a score for the candidate. These are the scores that are used to determine which word candidates to delete in function 2320.

Once these deletions have taken place, function 2322 tests to see if the number of prior recognition candidates left after the deletions, if any, of function 2320 is below a desired number of candidates. Normally this desired number would represent a desired number of choices for use in a choice list. If the number of prior recognition candidates is below such a desired number, functions 2324 through 2336 are performed. Function 2324 performs speech recognition upon every one of the one or more entries in the utterance list 2404, shown in FIGS. 24 and 25. As indicated by functions 2326 and 2328, this recognition process includes a test to determine if there are both continuous and discrete entries in the utterance list, and, if so, it limits the number of possible word candidates in recognition of the continuous entries to a number corresponding to the number of individual utterances detected in one or more of the discrete entries. The recognition of function 2324 also includes recognizing each entry in the utterance list with either continuous or discrete recognition, depending upon the respective mode that was in effect when each was received, as indicated by the continuous or discrete recognition indication 2406 shown in FIGS. 24 and 25. As indicated by 2332, the recognition of each utterance list entry also includes using the filterMatch routine previously described and using a language model in selecting a list of best-scoring acceptable candidates for the recognition of each such utterance. In the filterMatch routine, the vocabulary indicator 2408 shown in FIGS. 24 and 25 for the most recent utterance in the utterance list is used as a word type filter to reflect any indication by the user that the desired word sequence is limited to one or more words from a particular vocabulary. The language model used is a PolyGram language model, such as a bigram or trigram language model, which uses any prior language contexts that are available in helping to select the best-scoring candidates.

After the recognition of one or more entries in the utterance list has been performed, if there is more than one entry in the utterance list, functions 2334 and 2336 pick a list of best scoring recognition candidates for the utterance list based on a combination of scores from different recognitions. It should be appreciated that in some embodiments of this aspect of the invention, combination of scoring could be used from the recognition of the different utterances so as to improve the effectiveness of the recognition using more than one utterance.

If the number of recognition candidates produced by functions 2314 through 2336 is less than the desired number, and if there is a non-null filter string or filter range definition, functions 2338 and 2340 use filterMatch to select a desired number of additional choices from the vocabulary associated with the most recent entry in the utterance list, or the current recognition vocabulary if there are no entries in the utterance list.

If there are no candidates from either recognition or the current vocabulary by the time the getChoices routine of FIG. 23 reaches function 2342, function 2344 uses the best-scoring character sequences that match the current filter string as choices, up to the desired number of choices. When the filter string contains nothing but unambiguous characters, only the single character sequence that matches those unambiguous characters will be selected as a possible choice. However, where there are ambiguous characters and ambiguous length elements in the filter string, there will be a plurality of such character sequence choices. And where ambiguous characters with ambiguous length elements have different probabilities associated with different possible corresponding sequences of one or more characters, the choices produced by function 2344 will be scored correspondingly by a scoring mechanism corresponding to that shown in functions 2616 through 2606 the three of FIG. 26.

When the call to getChoices returns, a list of choices produced by recognition, by selection from a vocabulary according to filter, or by selection from a list of possible filters will normally be returned.

Returning now to FIG. 22, when the call to getChoices in function 2202 returns to the displayChoiceList routine, function 2204 tests to see if the following three conditions currently exits: no filter has been defined for the current selection, there has not been any re-utterance added to the current selection's utterance list, and the selection for which displayChoiceList has been called is not in the notChoiceList, which includes a list of one or more words the user's inputs have indicated are not desired as recognition candidates. If these three negative conditions are met, function 2206 makes the current selection the first choice for display in the correction window, which the routine is to create.

Next, function 2210 removes any other candidates from the list of candidates produced by the call to the getChoices routine that are contained in the notChoiceList.

Next, if the first choice has not already been selected by function 2206, function 2212 makes the best-scoring candidate returned by the call to getChoices the first choice for the subsequent correction window display. If there is no single best-scoring recognition candidate, alphabetical order can be used to select the candidate which is to be the first choice.

Next, if there is a filter, function 2214 causes functions 2218 and 2220 to be performed. Function 2218 selects those characters of the first choice which correspond to the filter string, if any, for special display. As will be described below, in the preferred embodiments, characters in the first choice which correspond to an unambiguous filter are indicated in one way, and characters in the first choice which correspond to an ambiguous filter are indicated in a different way so that the user can appreciate which portions of the filter string correspond to which type of filter elements.

Next, function 2220 places a filter cursor before the first character of the first choice that does not correspond to the filter string. When there is no filter string defined, this cursor will be placed before the first character of the first choice.

Next, function 2222 causes steps 2224 through 2228 to be performed if the getChoices routine returned any candidates other than the current first choice. In this case, function 2224 creates a first character-ordered (e.g., alphabetically and/or numerically ordered) choice list from a set of the best-scoring such candidates that will all fit in the correction window at one time. If there are any more recognition candidates, functions 2226 and 2228 create a second character-ordered choice list of up to a preset number of screens for all such choices from the remaining best-scoring candidates.

When all this has been done, function 2230 displays a correction window showing the current first choice, an indication of which of its characters, if any, are in the filter, an indication of the current filter cursor location, and with the first choice list, as shown in FIG. 12. Then function 2232 turns on correction mode.

In FIG. 12 the first choice, "this", 1206 is shown in the first choice window 1202, the filter cursor 1204 is shown before the first character of the first choice (since no filter has yet been defined), and the first choice list 1208 is shown in the correction window 1200.

It should be appreciated that the displayChoiceList routine can be called with a null value for the current selection as well as with a text selection which has no associated utterances. In either case, it will respond to alphabetic filtering input by performing word completion based on the operation of functions 2338 and 2344 of FIG. 23.

The combination of the display_choice_list and the getChoices routines allow great flexibility. It allows (a) selection of choices for the recognition of an utterance without the use of filtering or re-utterances, (b) use of filtering and/or re-utterances to help correct a prior recognition, (c) performing word completion upon alphabetic filtering input (and, if desired, to help such alphabetic completion process by entering a subsequent utterance), (d) spelling a word which is not in the current vocabulary with alphabetic input, and (e) mixing and matching different forms of alphabetic input including forms which are unambiguous, ambiguous with regard to characters and ambiguous with regard to both characters and length.

Returning now to FIG. 14, we've explained how functions 1436 and 1438 respond to a tap on a word in the SIP buffer by calling the display Choice List routine, which in turn, causes a correction window such as the correction window 1200 shown in FIG. 12 to be displayed. The ability to display a correction window with its associated choice list merely by tapping on a word provides a fast and convenient way for enabling a user to correct single word errors.

If the user double taps on a selection in the SIP buffer, functions 1440 through 1444 escape from any current correction window that might be displayed, and start SIP buffer recognition according to current recognition duration modes and settings using the current language context of the current selection. The recognition duration logic responds to the duration of the key press type associated with the second tap of such a double-click in determining whether to respond as if there has been either a press or a click for the purposes described above with regard to FIG. 18. The output of any such recognition will replace the current selection. Although not shown in the figures, if the user double taps on a word in the SIP buffer that was not previously selected or part of a selection, it is treated as the current selection for the purpose of function 1444

If the user taps in any portion of the SIP buffer which does not include text, such as between words or before or after the text in the buffer, function 1446 causes functions 1448 to 1452 to be performed. Function 1448 plants a cursor at the location of the tap. If the tap is located at any point in the SIP buffer window which is after the end of the text in the SIP buffer, the cursor will be placed after the last word in that buffer. If the tap is a double tap, functions 1450 1452 start SIP buffer recognition at the new cursor location according to the current recognition duration modes and other settings, using the duration of the second touch of the double tap for determining whether it is to be responded to as a press or a click.

FIG. 15 is a continuation of the pseudocode described above with regard to FIGS. 13 and 14.

If the user drags across part of one or more words in the SIP buffer, functions 1502 and 1504 call the display Choice List routine described above with regard to FIG. 22 with all of the words that are all or partially dragged across as the current selection and with the acoustic data associated with the recognition of those words, if any, as the first entry in the utterance list. If the selection involves more than a certain number of words, it may be preferred to merely mark the selected text as selected and forego the display of a correction window, because it is unlikely a user would want to use a correction window to correct text of more than a given length.

If the user drags across an initial part of an individual word in the SIP buffer, functions 1506 and 1508 call the displayChoiceList function with that word as the selection, with that word added to the notChoiceList, with the dragged initial portion of the word as the filter string, and with the acoustic data associated with that word as the first entry in the utterance list. This programming interprets the fact that a user has dragged across only the initial part of a word as an indication that the entire word is not the desired choice, as indicated by the fact that the word is added to the notChoiceList.

If a user drags across the ending of an individual word in the SIP buffer, functions 1510 and 1512 call the displayChoiceList routine with the word as a selection, with the selection added to the notChoiceList, with the undragged initial portion of the word as the filter string, and with the acoustic data associated with a selected word as the first entry in the utterance list.

If an indication is received that the SIP buffer has more than a certain amount of text, functions 1514 and 1516 display a warning to the user that the buffer is close to full. In the disclosed embodiment this warning informs the user that the buffer will be automatically cleared if more than an additional number of characters are added to the buffer, and requests that the user verify that the text currently in the buffer is correct and then press talk or continue, which will clear the buffer.

If an indication is received that the SIP buffer has received text input, such as in response to any speech recognition, function 1518 causes functions 1520 through 1528 to be performed. Function 1520 tests to see if the cursor is currently at the end of the SIP buffer. If not, function 1522 outputs to the operating system a number of backspaces equal to the distance from the last letter of the SIP buffer to the current cursor position within that buffer. Next, function 1526 causes the text input, which can be composed of one or more characters, to be output into the SIP buffer at its current cursor location. Steps 1527 and 1528 output the same text sequence and any following text in the SIP buffer to the text input of the operating system.

The fact that function 1522 feeds backspace to the operating system before the recognized text is sent to the OS as well as the fact that function 1528 feed any text following the received text to the operating system causes any change made to the text of the SIP buffer that corresponds to text previously supplied to the application window to also be made to that text in the application window.

If any of the user inputs described above in FIGS. 13 through 15 is received when the system is in one-at-a-time mode when a correction window is displayed but the system is not in correction mode, functions 1530 and 1532 confirms the recognition of the first choice in the correction window.

This causes the display of the correction window to be removed, and the first choice in the correction window to remain as the output for the prior recognition, both in the SIP buffer and the text output to the OS. It also causes the correction window's first choice to be treated as the correct recognition for purposes of updating the current language context for the recognition of one or more subsequent words; for the purpose of providing data for use in updating the language model; and for the purpose of providing data for updating acoustic models.

The operation of functions 1530 and 1532 enables a user to confirm the prior recognition of the word in one-at-a-time mode by any one of a large number of inputs which can be used to also advance the recognition process.

If any text input is received from speech recognition when the SIP program is in one-at-a-time mode, functions 1536 through 1538 call the displayChoiceList routine for the recognized text, and turn off correction mode.

When displayChoiceList is called, its function 2232, shown in FIG. 22, switches the system to correction mode, but function 1538 undoes the effect of function 2232 when displayChoiceList is called by function 1537 in one-at-a-time mode.

As has been described above, correction mode is turned off because in one-at-a-time mode, a correction window is displayed automatically each time speech recognition is performed upon an utterance of a word, and thus there is a relatively high likelihood that a user intends input supplied to the non-correction window aspects of the SIP interface to be used for purposes other than input into the correction window. On the other hand, when the correction window is being displayed as a result of specific user input indicating a desire to correct one or more words, correction mode is entered so that certain non-correction window inputs will be directed to the correction window.

One-At-A-Time mode allows a user to enter a series of utterances; see the choice list produced by the recognition of each; and confirm the current first choice, when it is correct, by merely entering the utterance of the next word or by entering another non-correction window input. Thus, once functions 1530 and 1532 use a non-correction window input to confirm a first choice in One-At-A-Time mode, the non-correction window input is then used to cause the one or more functions associated it in the portion of FIGS. 13 through 15 above functions 1530 and 1532 to be performed. Thus, although functions 1530 and 1532 are shown below functions 1302 through 1528 in FIGS. 13 through 15, in most actual programming, their actual code would be performed before such other functions.

It should be appreciated that if the user is in one-at-a-time mode and generates inputs indicating a desire to correct the word shown in a choice list, the SIP will be set to the correction mode, and subsequent input during the continuation of that mode will not cause operation of function 1532.

Function 1542 in FIG. 15 indicates the start of the portion of the main response loop of the SIP program that relates to inputs received when a correction window is displayed. This portion extends through the remainder of FIG. 15 and all of FIGS. 16 and 17.

If the Escape button 1210 of a correction window shown in FIG. 12 is pressed, functions 1544 and 1546 cause the SIP program to exit the correction window and correction mode without changing the current selection.

If the Delete button 1212 of the correction window shown in FIG. 12 is pressed, functions 1548 and 1550 exit the correction window, delete the current selection in the SIP buffer, and send an output to the operating system, which causes a corresponding change to be made to any text in the application window corresponding to that in the SIP buffer.

If the New button 1214 shown in FIG. 12 is pressed, function 1552 causes functions 1553 to 1556 to be performed. Function 1553 exits the correction window, deletes the current selection in the SIP buffer corresponding to the correction window, and sends output to the operating system so as to cause a corresponding change to text in the application window. Function 1554 sets the recognition mode to the new utterance default, which will normally be the large vocabulary recognition mode, and can be set by the user to be either continuous or discrete recognition mode. Function 1556 starts SIP buffer recognition using the current recognition duration mode and other recognition settings. SIP buffer recognition is recognition that provides an input to the SIP buffer, according to the operation of functions 1518 to 1528, described above.

FIG. 16 continues the illustration of the response of the main loop of the SIP program to input received during the display of a correction window.

If the re-utterance button 1216 of FIG. 12 is pressed, function 1602 causes functions 1603 through 1610 to be performed. Function 1603 sets the SIP program to the correction mode if it is not currently in it. This will happen if the correction window has been displayed as a result of a discrete word recognition in one-at-a-time mode and the user responds by pressing a button in the correction window, in this case the Re-utterance button, indicating an intention to use the correction window for correction purposes. Next, function 1604 sets the recognition mode to the current recognition mode associated with re-utterance recognition. Then function 1606 receives one or more utterances according to the current re-utterance recognition duration mode and other recognition settings, including vocabulary. Next function 1608 adds the one or more utterances received by function 1606 to the utterance list for the correction window selection, along with an indication of the vocabulary mode at the time of those utterances, and whether continuous or discrete recognition is in effect. This causes the utterance list 2004 shown in FIGS. 24 and 25 to have an additional utterance.

Then function 1610 calls the displayChoiceList routine of FIG. 22, described above. This in turn will call the getChoices function described above regarding FIG. 23 and will cause functions 2306 through 2336 of that figure to perform re-utterance recognition using the new utterance list entry.

If the Filter button 1218 shown in FIG. 12 is pressed, function 1612 of FIG. 16 causes functions 1613 to 1620 to be performed. Function 1613 enters the correction mode, if the SIP program is not currently in it, as described above with regard to Function 1603. Function 1614 tests to see whether the current entry mode is a speech recognition mode and, if so, causes function 1616 to start filter recognition according to the current filter recognition duration mode and settings. This causes any input generated by such recognition to be directed to the cursor of the current filter string. If on the other hand the current filter entry mode is a non-speech recognition entry window mode, functions 1618 and 1620 call the appropriate entry window. As described below, in the embodiment of the invention shown, these non-speech entry window modes correspond to a character recognition entry mode, a handwriting recognition entry mode, and a keyboard entry mode.

If the user presses the Word Form button 1220 shown in FIG. 12, functions 1622 through 1624 cause the correction mode to be entered if the SIP program is not currently in it, and cause the word form list routine of FIG. 27 to be called for the current first choice word. Until a user provides input to the correction window that causes a redisplay of the correction window, the current first choice will normally be the selection for which the correction window has been called. This means that by selecting one or more words in the SIP buffer and by pressing the Word Form button in the correction window, a user can rapidly select a list of alternate forms for any such a selection.

FIG. 27 illustrates the function of the wordFormList routine. If a correction window is already displayed when it is called, functions 2702 and 2704 treat the current best choice as the selection for which the word form list will be displayed. If the current selection is one word, function 2706 causes functions 2708 through 2714 to be performed. If the current selection has any homonyms, function 2708 places them at the start of the word form choice list. Next, step 2710 finds the root form of the selected word, and function 2712 creates a list of alternate grammatical forms for the word. Then function 2714 alphabetically orders all these grammatical forms in the choice list after any homonyms, which may have been added to the list by function 2708.

If, on the other hand, the selection is composed of multiple words, function 2716 causes functions 2718 through functions 2728 to be performed. Function 2718 tests to see if the selection has any spaces between its words. If so, function 2720 adds a copy of the selection to the choice list, which has no such spaces between its words, and function 2222 adds a copy of the selection with the spaces replaced by hyphens. Although not shown in FIG. 27, additional functions can be performed to replace hyphens with spaces or with the absence of spaces. If the selection has multiple elements subject to the same spelled/non-spelled transformation function, 2726 adds a copy of the selection and all prior choices transformations to the choice list. For example, this will transform a series of number names into a numerical equivalent, or reoccurrences of the word "period" into corresponding punctuation marks. Next, function 2728 alphabetically orders the choice list.

Once the choice list has been created either for a single word or a multiword selection, function 2730 displays a correction window showing the selection as the first choice, the filter cursor at the start of the first choice, and a scrollable choice list and a scrollable list. In some embodiments where the selection is a single word, the filter of which has a single sequence of characters that occurs in all its grammatical forms, the filter cursor could be placed after that common sequence with the common sequence indicated as an unambiguous filter string.

In some embodiments of the invention, the word form list provides one single alphabetically ordered list of optional word forms. In other embodiments, options can be ordered in terms of frequency of use, or there could be a first and a second alphabetically ordered choice list, with the first choice list containing a set of the most commonly selected optional forms which will fit in the correction window at one time, and the second list containing less commonly used word forms.

As will be demonstrated below, the word form list provides a very rapid way of correcting a very common type of speech recognition error, that is, an error in which the first choice is a homonym of the desired word or is an alternate grammatical form of it.

If the user presses the Capitalization button 1222 shown in FIG. 12, functions 1626 through 1628 will enter the correction mode if the system is currently not in it and will call the capitalized cycle function for the correction window's current first choice. The capitalized correction cycle will cause a sequence of one or more words which do not all have initial capitalization to have initial capitalization of each word, will cause a sequence of one or more words which all have initial capitalization to be changed to an all capitalized form, and will cause a sequence of one or more words which have an all capitalized form to be changed to an all lower case form. By repeatedly pressing the Capitalization button, a user can rapidly select between these forms.

If the user selects the Play button 1224 shown in FIG. 12, functions 1630 and 1632 cause an audio playback of the first entry in the utterance list associated with the correction window's associated selection, if any such entry exists. This enables a user to hear exactly what was spoken with regard to a mis-recognized sequence of one or more words. Although not shown, the preferred embodiments enable a user to select a setting which automatically causes such audio to be played automatically when a correction window is first displayed.

If the Add Word button 1226 shown in FIG. 12 is pressed when it is not displayed in a grayed state, function 1634 and 1636 call a dialog box that allows a user to enter the current first choice word into either the active or backup vocabulary. In this particular embodiment of the SIP recognizer, the system uses a subset of its total vocabulary as the active vocabulary that is available for recognition during the normal recognition using the large vocabulary mode. Function 1636 allows a user to make a word that is normally in the backup vocabulary part of the active vocabulary. It also allows the user to add a word that is in neither vocabulary but which has been spelled in the first choice window by use of alphabetic input, to be added to either the active or backup vocabulary. It should be appreciated that in other embodiments of the invention having greater hardware resources, there would be no need for distinction between an active and a backup vocabulary.

The Add Word button 1226 will only be in a non-grayed state when the first choice word is not currently in the active vocabulary. This provides an indication to the user that he or she may want to add the first choice to either the active or backup vocabulary.

If the user selects the Check button 1228 shown in FIG. 12, functions 1638 through 1648 remove the current correction window and output its first choice to the SIP buffer and feed to the operating system a sequence of keystrokes necessary to make a corresponding change to text in the application window.

If the user taps one of the choices 1230 shown in the correction window of FIG. 12, functions 1650 through 1653 remove the current correction window, and output the selected choice to the SIP buffer and feed the operating system a sequence of keystrokes necessary to make the corresponding change in the application window.

If the user taps on one of the ChoiceEdit buttons 1232 shown in FIG. 12, function 1654 causes functions 1656 through 1658 to be performed. Function 1656 changes to correction mode if the system is not already currently in it. Function 1656 makes the choice associated with the tapped ChoiceEdit button the first choice and the current filter string, and then function 1658 calls the display-ChoiceList with the new filter string. As will be described below, this enables a user to select a choice word or sequence of words as the current filter string and then to edit that filter string, normally by deleting any characters from its end which disagree with the desired word.

If the user drags across one or more initial characters of any choice, including the first choice, functions 1664 through 1666 change the system to correction mode if it is not in it, and call the displayChoiceList with the dragged choice added to the notChoiceList and with the dragged initial portion of the choice as the filter string. These functions allow a user to indicate that a current choice is not the desired first choice but that the dragged initial portion of it should be used as a filter to help find the desired choice.

FIG. 17 provides the final continuation of the list of functions which the SIP recognizer makes in response to correction window input.

If the user drags across the ending of a choice, including the first choice, functions 1702 and 1704 enter the correction mode if the system is currently not already in it, and call displayChoiceList with the partially dragged choice added to the notChoiceList and with the undragged initial portion of the choice as the filter string.

If the user drags across two choices in the choice list, functions 1706 through 1708 enter the correction mode if the system is not currently in it, and call display-ChoiceList with the two choices added to the notChoiceList and with the two choices as the beginning and ending words in the definition of the current filter range.

If the user taps between characters on the first choice, functions 1710 through 1712 enter the correction mode if the SIP is not already in it, and move the filter cursor to the tapped location. No call is made to display-ChoiceList at this time because the user has not yet made any change to the filter.

If the user enters a backspace by pressing the Backspace button 1116 shown in FIG. 12 when in correction mode, as described above with regard to function 1334 of FIG. 13, function 1714 causes functions 1718 through 1720 to be performed. Function 1718 calls the filterEdit routine of FIGS. 28 and 29 with a backspace is input.

As will be illustrated with regard to FIG. 28, the filterEdit routine 2800 is designed to give the user flexibility in the editing of a filter with a combination of unambiguous, ambiguous, and/or ambiguous length filter elements.

This routine includes a function 2801 which copies all the elements of the prior filter string at the time of the call to filterEdit into a data structure named old filter string. As is explained below with regard to functions 2834 through 2922 in FIGS. 28 and 29, old filter string is used to remember any elements of the prior filter which might extend past a new element that is being added to the filter by the call the filterEdit.

Then function 2802 tests to see if there are any characters in the choice with which it has been called before the current location of the filter cursor. If so, function 2806 makes the characters in the choice with which the routine has been called before the location of the filter cursor, the new filter string, with all the characters in that string unambiguously defined. This enables a user to define any part of a first choice before the location of an edit to be automatically confirmed as an unambiguously correct filter character sequence.

If the test of function 2802 does not find any characters before the current filter cursor position, function 2806 clears the new filter string.

Next, the function 2807 tests to see if the input with which filterEdit has been called is a backspace. If so, it causes functions 2808 through 2812 to be performed.

Functions 2808 and 2810 delete the last character of the new filter string (if there is one) if the filter cursor is a non-selection cursor. If the filter cursor corresponds to a selection of one or more characters in the current first choice, these characters were already removed from inclusion in the new filter by the operation of function 2805 just described.

Then function 2812 returns from the call to filterEdit with the new filter, which will be an unambiguous filter string comprised of the characters, if any, that occurred before the backspaced character in the first choice of the correction window.

If the input with which the filterEdit routine is called is one or more unambiguous characters, functions 2814 and 2816 add the one or more unambiguous characters to the end of the new filter string.

If the input to the filterEdit routine is a sequence of one or more ambiguous characters of fixed length, functions 2818 and 2820 place an element representing each ambiguous character in the sequence at the end of the new filter.

If the input to the filterEdit routine is an ambiguous length element, function 2822 causes functions 2824 through 2832 to be performed.

Function 2824 causes a for loop comprised of functions 2826 and 2828 to be performed for each of one or more best scoring character sequences associated with the ambiguous input. Function 2826 tests if the current character sequence from the ambiguous input, when added to the prior unambiguous part of the new filter string (if any) matches all or an initial part of one or more vocabulary words. If so, function 2828 increases the score associated with the character sequence as a function of the probability of the one or more vocabulary words it matches. This is done to favor character sequences which could be part of vocabulary word spellings, because, as a general rule, such character sequences are more likely to have been intended.

Next function 2830 selects a set of the best scoring character sequences for association with anew ambiguous filter element which is added to the end of the new filter by function 2832. The selection of function 2830 allows character sequences which cannot be part of the spelling of a vocabulary word to be included in the new ambiguous filter element, provided that have a high enough relative score based on character recognition alone.

Next, a loop 2834 is performed for each filter element in the old filter string. This loop contains the functions 2836 through 2850 shown in the remainder of FIG. 28 and the functions 2900 through 2920 shown in FIG. 29.

If the current old filter string element of the loop 2834 is an ambiguous, fixed length element that extends beyond a new fixed length element which has been added to the new filter string by functions 2814 through 2820, functions 2836 and 2838 add the portion of the old element, if any, that extends beyond the new element to the end of the new filter string. This is done because editing of a filter string other than by use of the Backspace button is not intended to delete previously entered ambiguous filter information that corresponds to part of the prior filter to the right of the new edit.

If the current old element of the loop 2834 is an ambiguous, fixed length element that extends beyond some sequences in a new ambiguous length element that has been added to the end of the new filter string by operation of functions 2822 through 2832, function 2840 causes functions 2842 through 2850 to be performed. Function 2842 performs a loop for each character sequence represented by the new ambiguous length element that has been added to the filter string. The loop performed for each such character sequence of the new ambiguous length element includes a loop 2844 performed for each character sequence in the current old ambiguous fixed length element of the loop 2834. This inner loop 2844 includes a function 2846, which tests to see if the old element matches and extends beyond the current sequence in the new element. If so, function 2848 adds to the list of character sequences represented by the new ambiguous length element a new sequence of characters corresponding to the current sequence from the new element plus the portion of the sequence from the old element that extends beyond that current sequence from the new element. As indicated at function 2850, once the new character sequence is formed by the concatenation of the current sequence from the new element and the extension from the old element, the current sequence from the new element is marked for deletion, since it is being replaced by the concatenated sequence of which it is a part.

If the current old element is an ambiguous length element that contains any character sequences that extend beyond a new fixed length element that has been added to the new filter, function 2900 of FIG. 29 causes functions 2902 through 2910 to be performed.

Function 2902 is a loop which is performed for each sequence represented by the old ambiguous length element. It is composed of a test 2904 that checks to see if the current sequence from the old element matches and extends beyond any sequence in the new fixed length element. If so, function 2906 creates a new character sequence corresponding to that part of the sequence from the old element that extends beyond the new. After this loop has been completed, a function 2908 tests to see if any new sequences have been created by the function 2906, and if so, they cause function 2910 to add that new ambiguous length element to the end of the new filter, after the new element. This new ambiguous length element represents the possibility of each of the sequences created by function 2906. Preferably a probability score is associated with each such new sequence based on the relative probability scores of each of the character sequences which were found by the loop 2902 to match the current new fixed length element.

If the current old element is an ambiguous length element that has some character sequences that extend beyond some character sequences in a new ambiguous length element, function 2912 causes functions 2914 through 2920 to be performed.

Function 2914 is a loop that is performed for each character sequence in the new ambiguous length element. It is composed of an inner loop 2916 which is performed for each character sequence in the old ambiguous length element and a function 2922.

The inner loop is composed of functions 2918 and 2920, which test to see if the character sequence from the old element matches and extends beyond the current character sequence from the new element. If so, they associate with the new ambiguous length element, a new character sequence corresponding to the current sequence from the new element plus the extension from the current old element character sequence.

The function 2922 is performed at the end of the iteration performed by loop 2914 for a current sequence in the new ambiguous length element. If all sequences in old ambiguous length element match and extend beyond the current sequence in new ambiguous length element, function 2922 indicate that the current sequence from the new element is to be replaced, since it has been totally replaced by new elements created by function 2920.

Once all the functions in the loop 2834 are completed, function 2924 returns from the call to filterEdit with the new filter string which has been created by that call.

It should be appreciated that in many embodiments of various aspects of the invention a different and often more simple filter-editing scheme can be used. But it should be appreciated that one of the major advantages of the filterEdit scheme shown in FIGS. 28 and 29 is that it enables one to enter an ambiguous filter quickly, such as by continuous letter recognition, and then to subsequently edit it by more reliable alphabetic entry modes, or even by subsequent continuous letter recognition. For example, this scheme would allow a filter entered by the continuous letter recognition to be all or partially replaced by input from discrete letter recognition, ICA word recognition, or even handwriting recognition.

Under this scheme, when a user edits an earlier part of the filter string, the information contained in the latter part of the filter string is not destroyed unless the user indicates such an intent, which in the embodiment shown is by use of the backspace character.

Returning now to FIG. 17, when the call to filterEdit in function 1718 returns, function 1720 calls displayChoiceList for the selection with the new filter string that has been returned by the call to filterEdit.

Whenever filtering input is received, either by the results of recognition performed in response to the pressing of the filter key described above with regard to function 1612 of FIG. 16, or by any other means, functions 1722 through 1738 are performed.

Figure 39:
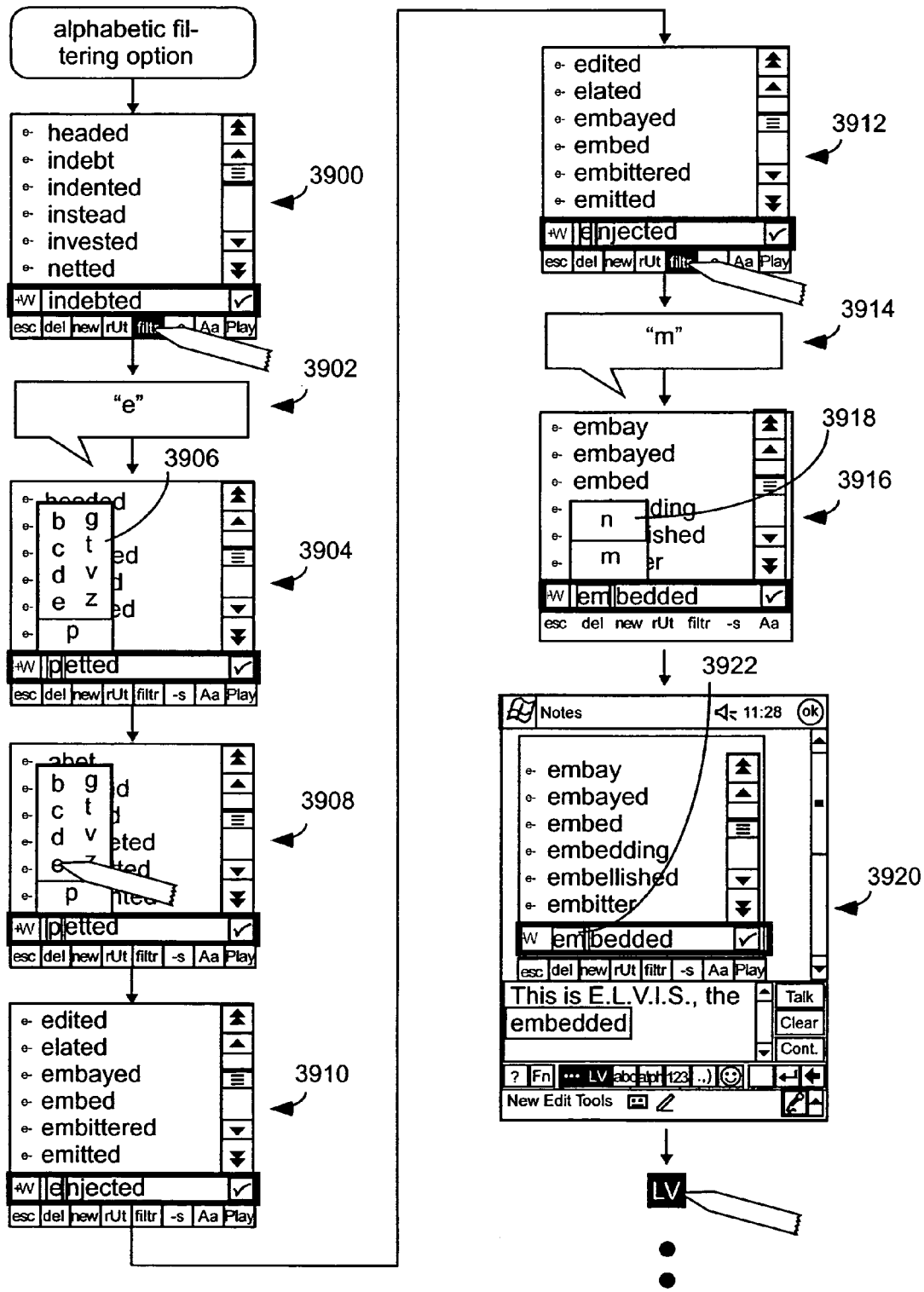
FIG. 39 illustrates how a user of the SIP can use the speech recognition of letter names (i.e., of "a", "b", c etc.) to input filtering characters and how a filter character choice list can be used to correct errors in the recognition of such filtering characters.

Function 1724 tests to see if the system is in one-at-a-time recognition mode and if the filter input has been produced by speech recognition. If so, it causes functions 1726 to 1730 to be performed. Function 1726 tests to see if a filtercharacter-choicefiltercharacter window, such as window 3906 shown in FIG. 39, is currently displayed. If so, function 1728 closes that filter choice window and function 1730 calls filterEdit with the first choice filter character as input. This causes all previous characters in the filter string to be treated as an unambiguously defined filter sequence. Regardless of the outcome of the test of function 1726, a function 1732 calls filterEdit for the new filter input which is causing operation of function 1722 and the functions listed below it. Then, function 1734 calls displayChoiceList for the current selection and the new filter string. Then, if the system is in one-at-a-time mode, functions 1736 and 1738 call the filtercharacter-choice routine with the filter string returned by filterEdit and with the newly recognized filter input character as the selected filter character.

FIG. 30 illustrates the operation of the filtercharacter-choice subroutine 3000.

It includes a function 3002 which tests to see if the selected filter character with which the routine has been called corresponds to an either an ambiguous character or an unambiguous character in the current filter string having multiple best choice characters associated with it. If this is the case, function 3004 sets a filtercharacterchoice list equal to all characters associated with that character. If the number of characters is more than will fit on the filtercharacterchoice list at one time, the choice list can have scrolling buttons to enable the user to see such additional characters. Preferably the choices are displayed in alphabetical order to make it easier for the user to more rapidly scan for a desired character.

The filtercharacterchoice routine of FIG. 30 also includes a function 3006 which tests to see if the selected filter character corresponds to a character of an ambiguous length filter string element in the current filter string. If so, it causes functions 3008 through 3014 to be performed.

Function 3008 tests to see if the selected filter character is the first character of the ambiguous length element. If so, function 3010 sets the filtercharacterchoice list equal to all the first characters in any of the ambiguous element's associated character sequences. If the selected filter character does not correspond to the first character of the ambiguous length element, functions 3012 and 3014 set the filtercharacter-choice list equal to all characters in any character sequences represented by the ambiguous element that are preceded by the same characters that precede the selected filter character in the current first choice. Once either functions 3002 and 3004 or functions 3006 though 3014 have created a filtercharacterchoice list, function 3016 displays that choice list in a window, such as the window 3906 shown in FIG. 39

If the SIP program receives a selection by a user of a filtercharacterchoice in a filtercharacterchoice window, function 1740 causes functions 1742 through 1746 to be performed. Function 1742 closes the filter choice window in which such a selection has been made. Function 1744 calls the filterEdit function for the current filter string with the character that has been selected in the filter choice window as the new input. Then function 1746 calls the displayChoiceList routine with the new filter string returned by filterEdit.

Figure 45:
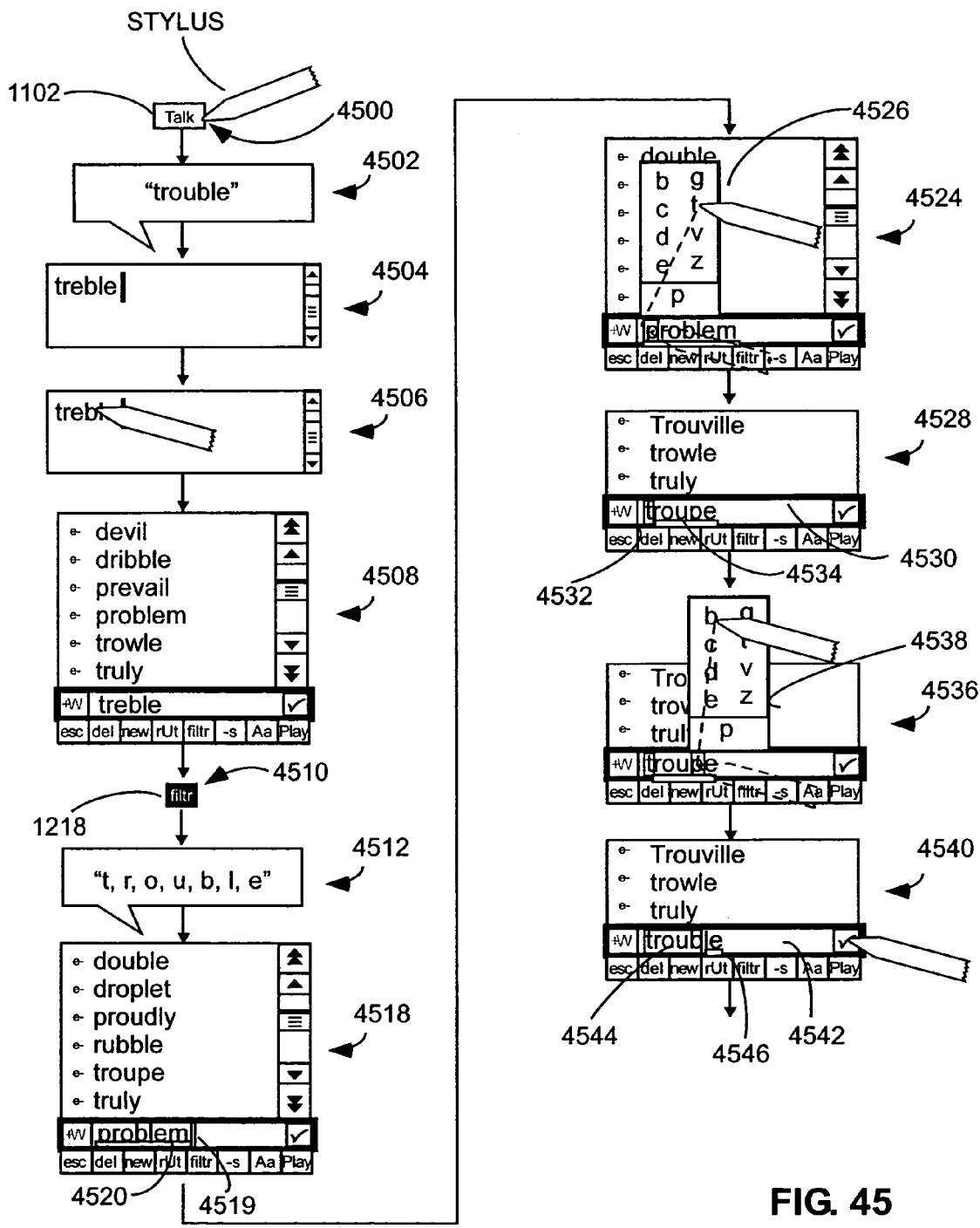
FIG. 45 illustrates how the user can correct a mis-recognition by spelling all or part of the desired output using continuous letter name recognition as an ambiguous (or multi-valued) filter, and how the user can use filter character choice lists to rapidly correct errors produced in such continuous letter name recognition.

If a drag upward from a character in a filter string, of the type shown in the correction windows 4526 and 4538 of FIG. 45, function 1747 causes functions 1748 through 1750 to be performed. Function 1748 calls the filtercharacterchoice routine for the character which has been dragged upon, which causes a filtercharacterchoice window to be generated for it if there are any other character choices associated with that character. If the drag is released over a filter choice character in this window, function 1749 generates a selection of the filtercharacterchoice over which the release takes place. Thus it causes the operation of the functions 1740 through 1746 which have just been described. If the drag is released other than on a choice in the filtercharacterchoice window, function 1750 closes the filter choice window.

If a re-utterance is received other than by pressing of the Re-utterance button, as described above with regard to functions 1602 and 1610, such as by pressing the Large Vocabulary button or the Name Vocabulary button during correction mode, as described above with regard to functions 1350, 1356 and 1414 and 1416 of FIGS. 13 and 14, respectively, function 1752 of FIG. 17 causes functions 1754 and 1756 to be performed. Function 1754 adds any such new utterance to the correction window's selection's utterance list, and function 1756 calls the displayChoiceList routine for the selection so as to perform re-recognition using the new utterance.

Turning now to FIGS. 31 through 41, we will provide an illustration of how the user interface which has just been described can be used to dictate a sequence of text. In this particular sequence, the interface is illustrated as being in the one-at-a-time mode, which is a discrete recognition mode that causes a correction window with a choice list to be displayed every time a discrete utterance is recognized.

In this, and other examples, showing user inputs and the resulting visual outputs, it should be understood that a given user input in a given state causes the performance of the one or more functions shown in the pseudocode figures in association with that given input and that given state.

Figure 31:
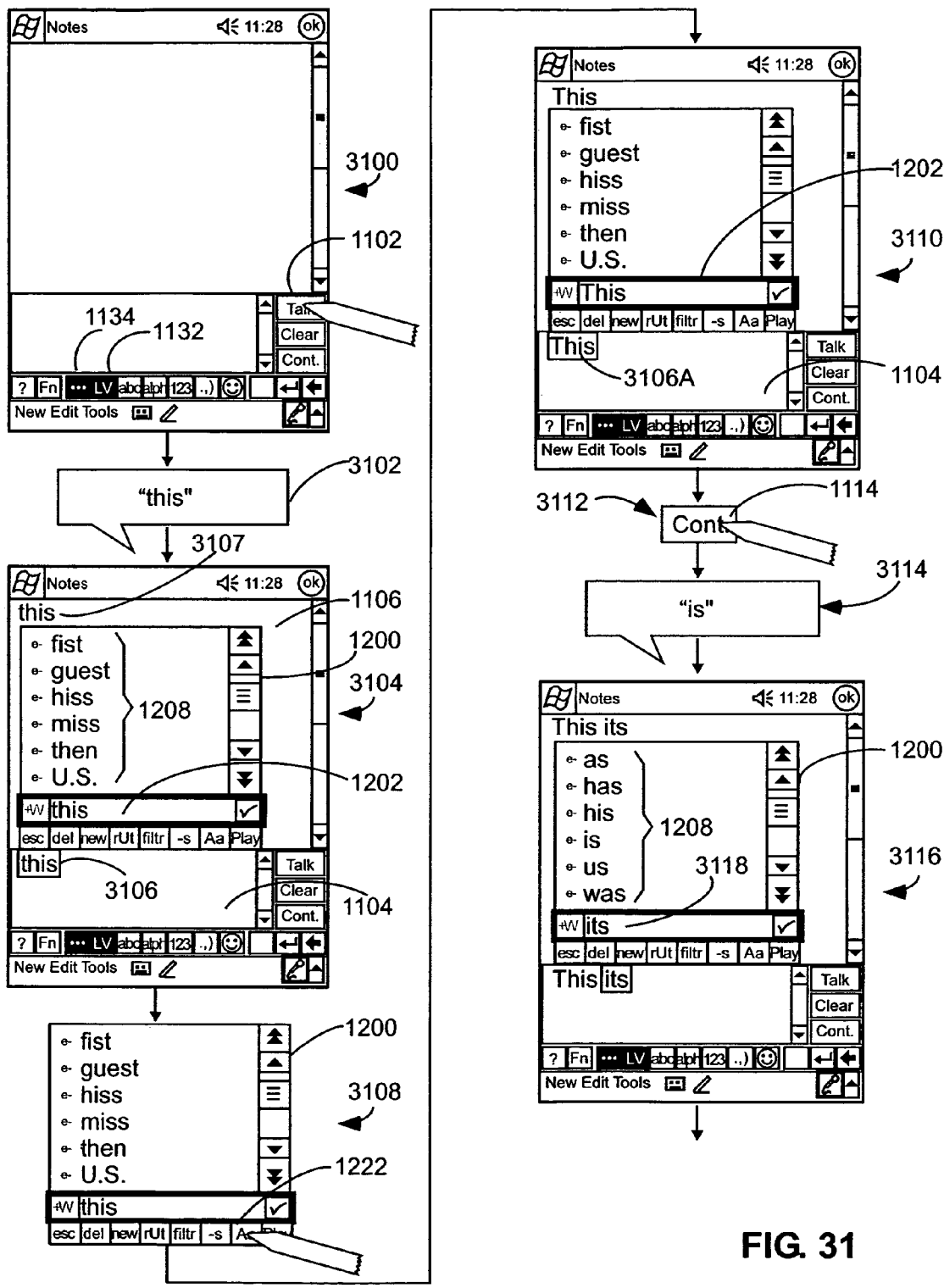
FIGS. 31 through 35 illustrate a sequence of interactions between a user and the speech recognition SIP, in which the user enters and corrects the recognition of words using a one-at-a-time discrete speech recognition method.

In FIG. 31, numeral 3100 points to the screenshot of the PDA screen showing the user tapping the Talk button 1102 to commence dictation starting in a new linguistic context. As indicated by the highlighting of the Large Vocabulary button 1132, the SIP recognizer is in the large vocabulary mode. The sequence of separated dots on the Continuous/Discrete button 1134 indicates that the recognizer is in a discrete recognition mode. It is assumed the SIP is in the Press And Click To End Of Utterance Recognition duration mode described with regard to numerals 1810 to 1818 of FIG. 18. As a result, the click of the Talk button causes recognition to take place until the end of the next utterance. Numeral 3102 represents an utterance by the user of the word "this". Numeral 3104 points to an image of the screen of the PDA after a response to this utterance by placing the recognized text 3106 in the SIP text window 1104, outputting this text to the application window 1106, and by displaying a correction window 1200 which includes the recognized word in the first choice window 1202 and a first choice list 1208.

In the example of FIG. 31, the user taps the Capitalization button 1222 as shown in the correction windo 3108. This causes the PDA screen to have the appearance pointed to by numeral 3110 in which the current first choice and the text output in the SIP buffer and the application window is changed to having initial capitalization.

In the example the user clicks the Continue button 1104 as pointed to by numeral 3112 and then utters the word "is" as pointed to by numeral 3114. In the example, it is assumed this utterance is mis-recognized as the word "its" causing the PDA screen to have the appearance pointed to by numeral 3116, in which a new correction window 1200 is displayed having the mis-recognized word as its first choice 3118 and a new choice list 1208 for that recognition 1208.

Figure 32:
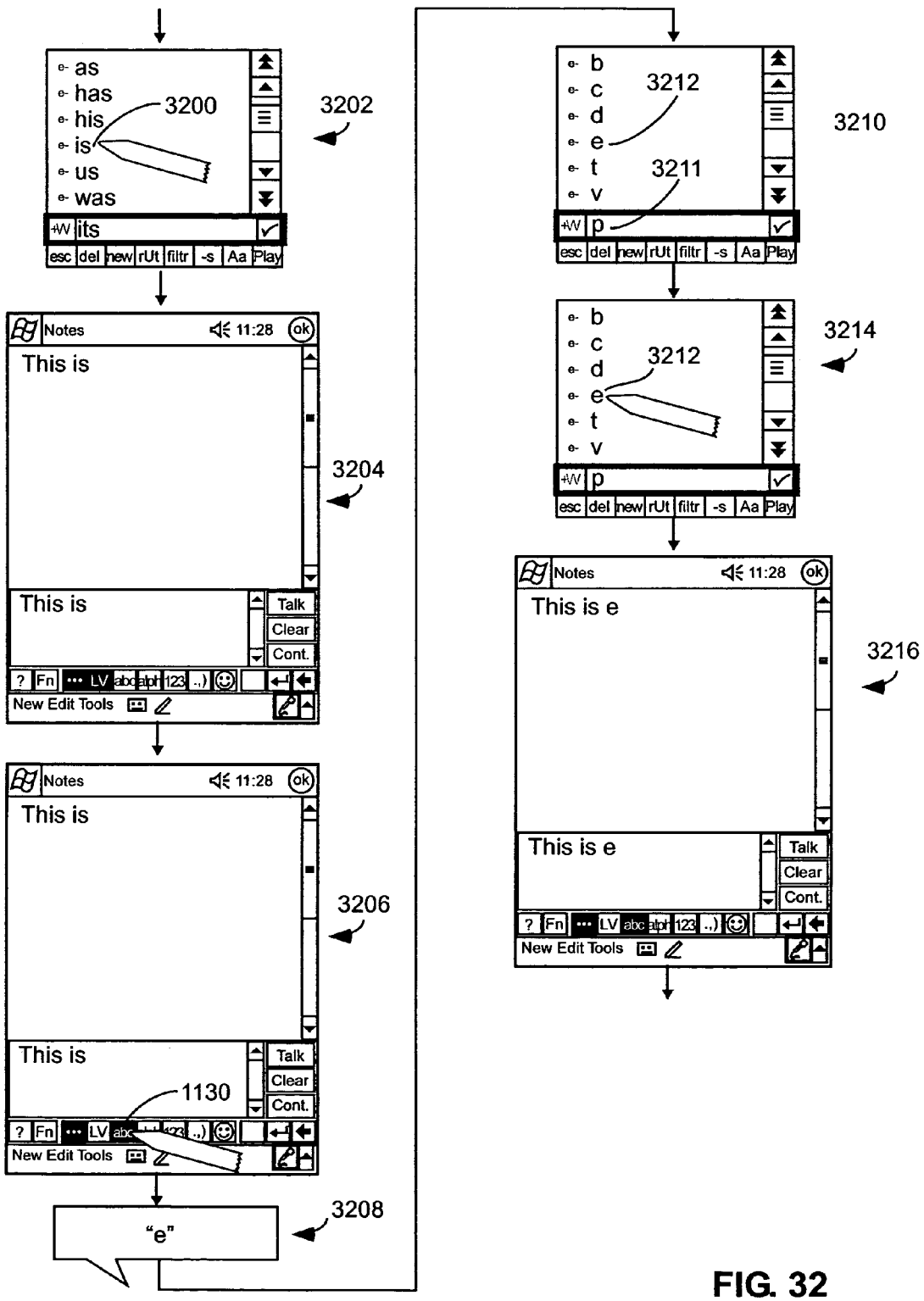

FIG. 32 represents a continuation of this example, in which the user clicks the choice word "is" 3200 in the image pointed to by numeral 3202. This causes the PDA screen to have the appearance indicated by the numeral 3204 in which the correction window has been removed, and corrected text appears in both the SIP buffer window and the application window.

In the screenshot pointed to by numeral 3206 the user is shown tapping the letter name vocabulary button 1130, which changes the current recognition mode to the letter name vocabulary as is indicated by the highlighting of the button 1130. As is indicated above with regard to functions 1410 and 1412, the tapping of this button commences speech recognition according to the current recognition duration mode. This causes the system to recognize the subsequent utterance of the letter name "e" pointed to by numeral 3208

In order to emphasize the ability of the present interface to quickly correct recognition mistakes, the example assumes that the system mis-recognizes this letter as the letter "p" 3211, as indicated by the correction window that is displayed in one-at-a-time mode in response to the utterance 3208. As can be seen in the correction window pointed to by 3210, the correct letter "e" is, however, one of the choices shown in the correction window. In the view of the correction window pointed to by numeral 3214, the user taps on the choice 3212, which causes the PDA screen to have the appearance pointed to by numeral 3216 in which the correct letter is entered both in the SIP buffer and the application window.

Figure 33:
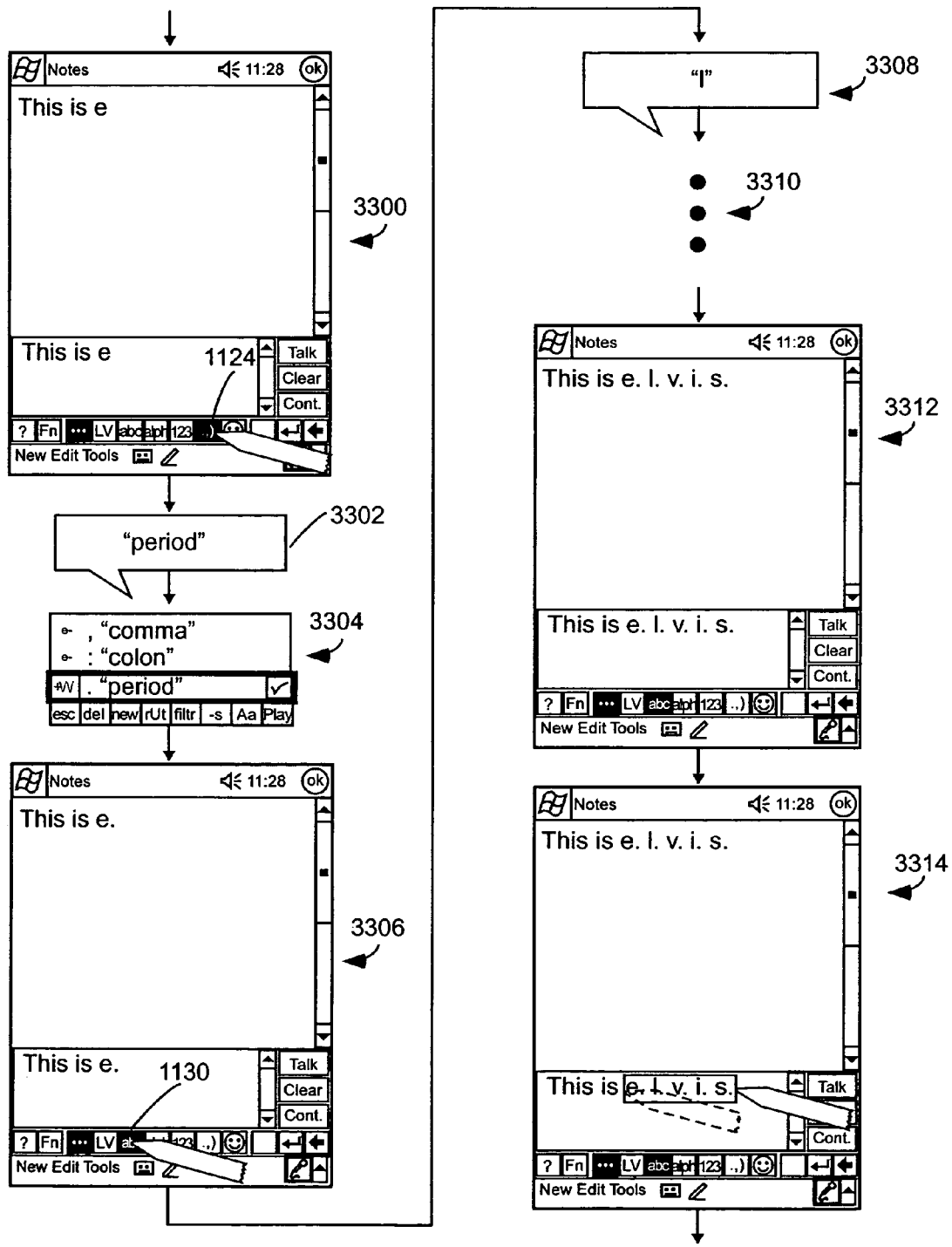
Figure 34:
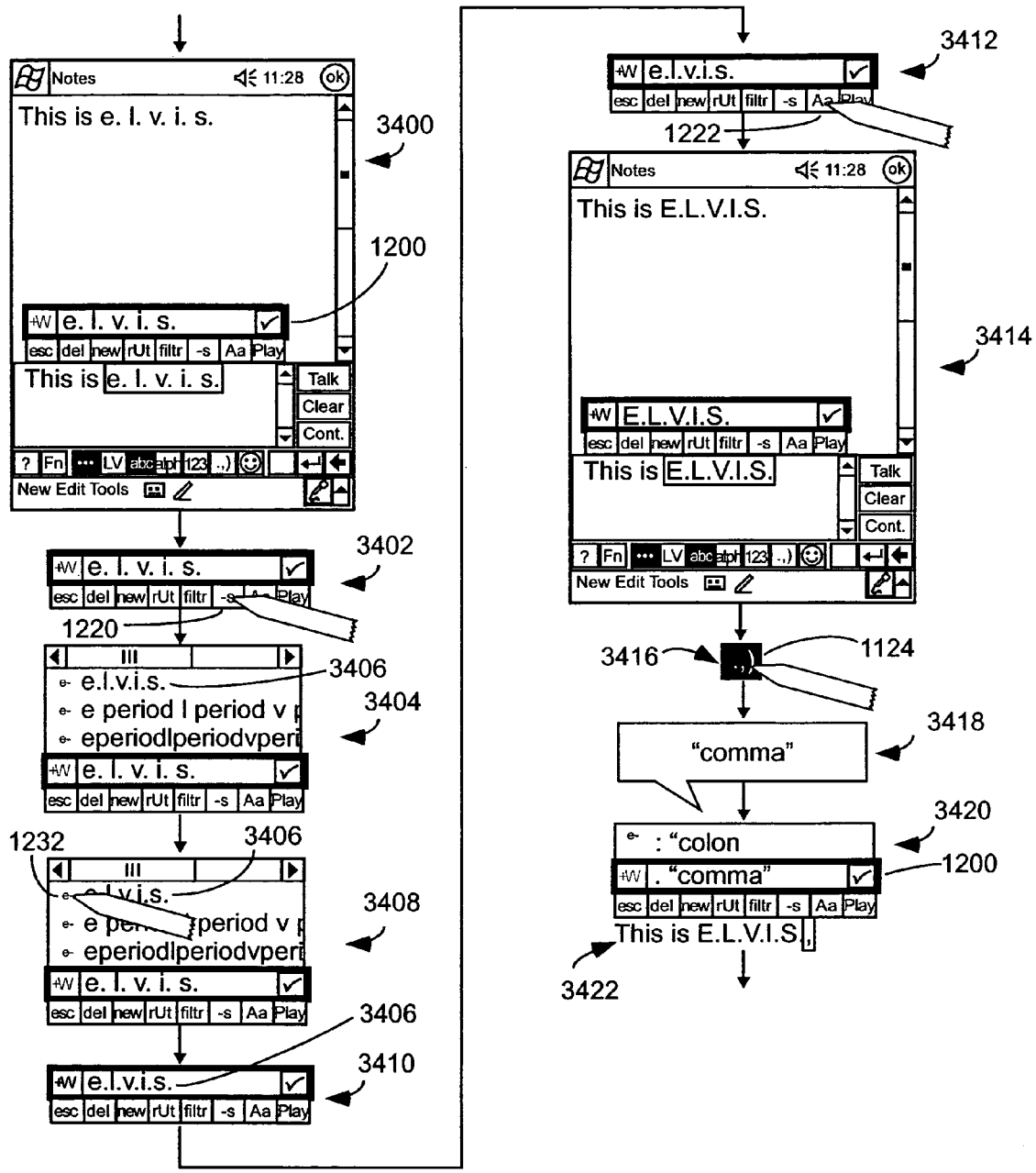

FIG. 33 illustrates a continuation of this example, in which the user taps on the Punctuation Vocabulary button 1124 as indicated in the screenshot 3300. This changes the recognition vocabulary to the punctuation vocabulary and starts utterance recognition, causing the subsequent utterance of the word "period" pointed to by the numeral 3300, to give rise to the correction window 3304, in which the punctuation mark "." is shown in the first choice window followed by that punctuation mark's name to make it easier for the user to recognize.

Since, in the example, this is the correct recognition, the user confirms it and starts recognition of a new utterance by pressing the letter name vocabulary button 1130, as shown in the screenshot 3306, and saying the utterance 3308 of the letter "l." This process of entering letters followed by periods is repeated until the PDA screen has the appearance shown by numeral 3312. At this point it is assumed the user drags across the text "e. l. v. i. s.", as shown in the screenshot 3314, which causes that text to be selected and which causes the correction window 1200 in the screenshot 3400 in the upper left-hand corner of FIG. 34 to be displayed. Since it is assumed that the selected text string is not in the current vocabulary, there are no alternate choices displayed in this choice list. In the view of the correction window pointed to by 3402, the user taps the Word Form button 1220, which calls the word form list routine described above with regard to FIG. 27. Since the selected text string includes spaces, it is treated as a multiple-word selection causing the portion of the routine shown in FIG. 27 illustrated by functions 2716 through 2728 to be performed. This includes a choice list such as that pointed to by 3404 including a choice 3406 in which the spaces have been removed from the correction window's selection. In the example, the user taps the Edit button 1232 next to the choice 3406. As indicated in the view of the correction window pointed to by numeral 3410, this causes the choice 3406 to be selected as the first choice, as indicated in the view of the correction window pointed to by 3412. The user taps on the Capitalization button 1222 until the first choice becomes all capitalized at which point the correction window has the appearance indicated in the screenshot 3414. At this point the user clicks on the Punctuation Vocabulary button 1124 as pointed to by numeral 3416 and says the utterance "comma" 3418. In the example it is assumed that this utterance is correctly recognized causing a correction window 1200 pointed to by the numeral 3420 to be displayed and the former first choice "E.L.V.I.S." to be outputted as text.

Figure 35:
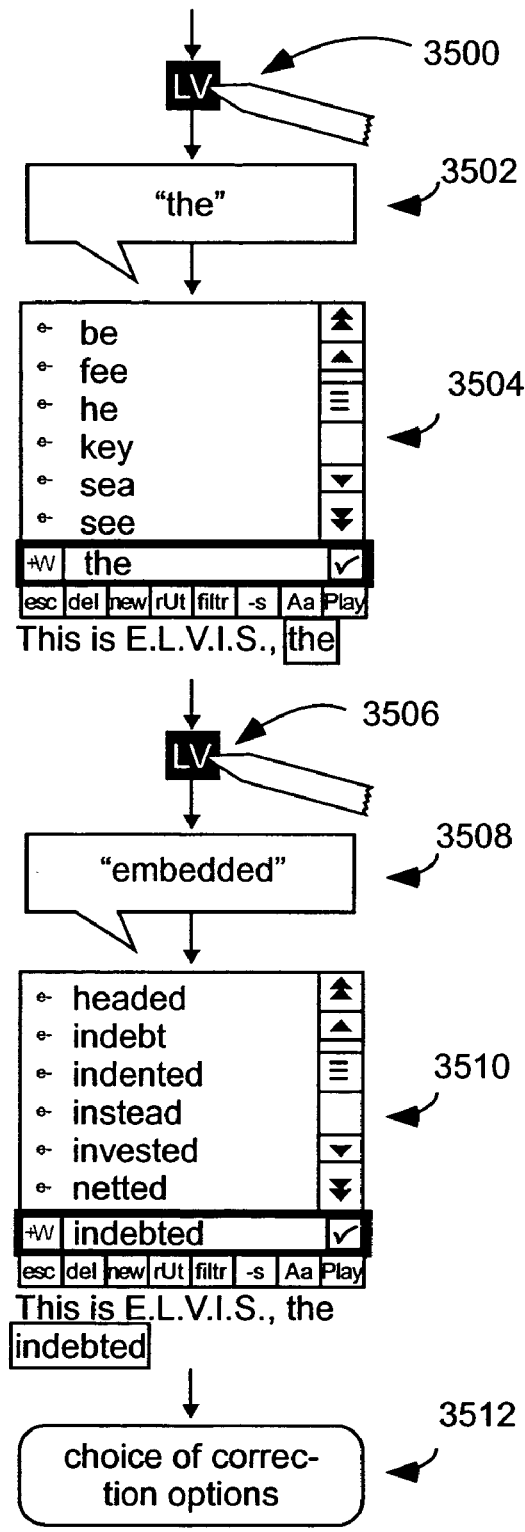

FIG. 35 is a continuation of this example. In it, it is assumed that the user clicks the Large Vocabulary button as indicated by numeral 3500, and then says the utterance "the" 3502. This causes the correction window 3504 to be displayed. The user responds by confirming this recognition by again pressing the large vocabulary button as indicated by 3506 and saying the utterance "embedded" pointed to by 3508. In the example, this causes the correction window 3510 to be displayed in which the utterance has been mis-recognized as the word "indebted" and in which the desired word is not shown on the first choice list. Starting at this point, as is indicated by the comment 3512, a plurality of different correction options will be illustrated.

Figure 36:
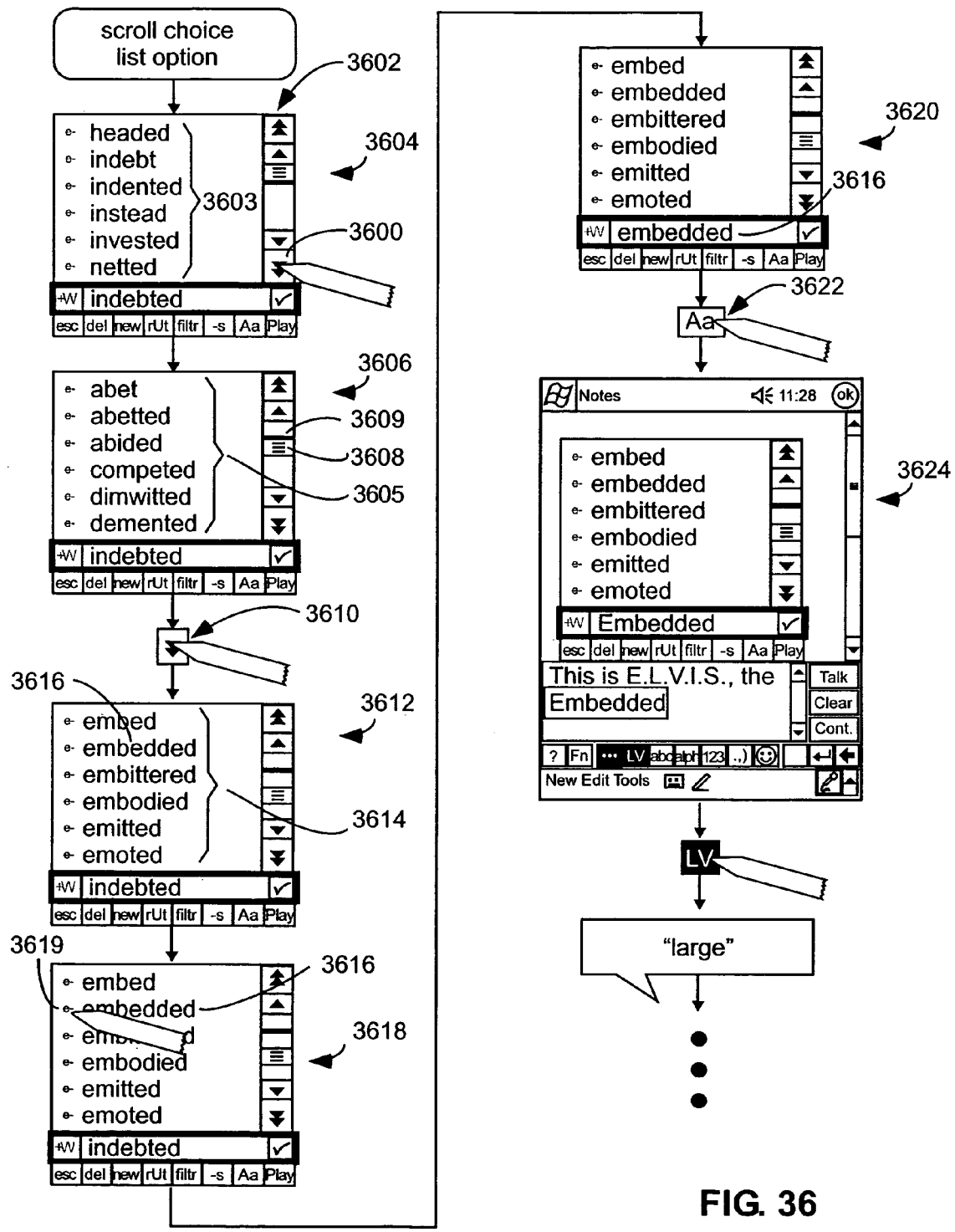
FIG. 36 shows how a user of the SIP can correct a mis-recognition shown at the end of FIG. 35 by a scrolling through the choice list provided in the correction window until finding a desired word and then using a capitalized button to capitalize it before entering it into text.

FIG. 36 illustrates the correction option of scrolling through the first and second choice list associated with the mis-recognition. In the view of the correction window pointed to by 3604, the user taps the page down scroll button 3600 in the scroll bar 3602 of the correction window, causing the first choice list 3603 to be replaced by the first screenful of the second choice list 3605 shown in the correction window 3606. As can be seen in this view, the slide bar 3608 of the correction window has moved down below a horizontal bar 3609, which defines the position in the scroll bar associated with the end of the first choice list. In the example, the desired word is not in the portion of the alphabetically ordered second choice list shown in view 3606, and thus the user presses the Page Down button of the scroll bar as indicated by 3610. This causes the correction window to have the appearance shown in view 3612 in which a new screenful of alphabetically listed choices is shown. In the example, the desired word "embedded" is shown on this choice list as is indicated by the 3616. In the example, the user clicks on the choice button 3619 associated with this desired choice as shown in the view 3618. This causes the correction window to have the appearance shown at 3620 in which this choice is displayed in the first choice window. In the example, the user taps the Capitalized button as pointed to by numeral 3622, which causes this first choice to have initial capitalization as shown in the screenshot 3624.

Thus it can be seen that the SIP user interface provides a rapid way to allow a user to select from among a relatively large number of recognition choices. In the embodiment shown, the first choice list is composed of up to six choices, and the second choice list can include up to three additional screens of up to 18 additional choices. Since the choices are arranged alphabetically and since all four screens can be viewed in less than a second, this enables the user to select from among up to 24 choices very quickly.

FIG. 37 illustrates the method of filtering choices by dragging across an initial part of a choice, as has been described above with regard to functions 1664 through 1666 of FIG. 16. In the example of this figure, it is assumed that the first choice list includes a choice 3702 shown in the view 3700, which includes the first six characters of the desired word "embedded". As is illustrated in the correction window 3704, the user drags across these initial six letters and the system responds by displaying a new correction window limited to recognition candidates that start with an unambiguous filter corresponding to the six characters, as is displayed in the screenshot 3706.

In this screenshot the desired word is the first choice and the first six unambiguously confirmed letters of the first choice are shown highlighted as indicated by the box 3708, and the filter cursor 3710 is also illustrated. Note that in the correction window of screen shot 3706 the word that had been partially dragged across in correction window 3704, "embedding", is not shown as a choice even though it starts with the newly selected filters string. This is because, as is shown at function 1508 of FIG. 15, the partially selected word "embedding" is added to the not-ChoiceList, which cause it to be excluded from the list of recognition choices.

FIG. 38 illustrates the method of filtering choices by dragging across two choices in the choice list that has been described above with regard to functions 1706 through 1708 of FIG. 17. In the example shown in correction window 3800, the desired choice, "embedded", occurs alphabetically between the two displayed choices 3802 and 3804. As shown in the view 3806, the user indicates that the desired word falls in this range of the alphabet by dragging across these two choices. This causes a new correction window to be displayed in which the possible choices are limited to words which occur in the selected range of the alphabet, as indicated by the screenshot 3808. In this example, it is assumed that the desired word is selected as a first choice, in part, as a result of the filtering caused by the selection shown in 3806. In screenshot 3808 the portion of the first choice which forms an initial portion of the two choices selected in the view 3806 is indicated as unambiguously confirmed portion of the filter string 3810 and the filter cursor 3812 is placed after that confirmed filter portion.

FIG. 39 illustrates a method in which alphabetic filtering is used in one-at-a-time mode to help select the desired word choice. In this example, the user presses the Filter button as indicated in view 3900. It is assumed that the default filter vocabulary is the letter name vocabulary. Pressing the Filter button starts speech recognition for the next utterance and the user says the letter "e" as indicated by 3902. This causes the correction window 3904 to be shown in which it is assumed that the filter character has been mis-recognized as in "p." In the embodiment shown, in one-at-a-time mode, alphabetic input also has a choice list displayed for its recognition. In this case, it is a filtercharacterchoice list window 3906 of the type described above with regard to the filtercharacterchoice subroutine of FIG. 30. In the example, the user selects the desired filtering character, the letter "e," as shown in view 3908, which causes a new correction window 3900 to be displayed. In the example, the user decides to enter an additional filtering letter by again pressing the Filter button as shown in the view 3912, and then says the utterance "m" 3914. This causes the correction window 3916 to be displayed, which displays the filtercharacterchoice window 3918. In this correction window, the filtering character has been correctly recognized and the user could either confirm it by speaking an additional filtering character or by selecting the correct letter, "m", shown in the filter-character-choice window 3918. Either confirmation of the desired filtering character causes a new correction window to be displayed with the filter string 3922, "em", treated as an unambiguously confirmed filter's string. In the example shown in screenshot 3920, this causes the desired word to be recognized.

FIG. 40 illustrates a method of alphabetic filtering with AlphaBravo, or ICA word, alphabetic spelling. In the screenshot 4000, the user taps on the AlphaBravo button 1128. This changes the alphabet to the ICA word alphabet, as described above by functions 1402 through 1408 of FIG. 14. In this example, it is assumed that the Display_Alpha_On_Double_Click variable has not been set. Thus the function 1406 of FIG. 14 will display the list of ICA words 4002 shown in the screenshot 4004 during the press of the AlphaBravo button 1128. In the example, the user enters the ICA word "echo," which represents the letter "e" followed by a second pressing of the AlphaBravo key as shown at 4008 and the utterance of a second ICA word "Mike" which represents the letter "m". In the example, the inputting of these two alphabetic filtering characters successfully creates an unambiguous filter string composed of the desired letters "em" and produces recognition of the desired word, "embedded".

Figure 41:
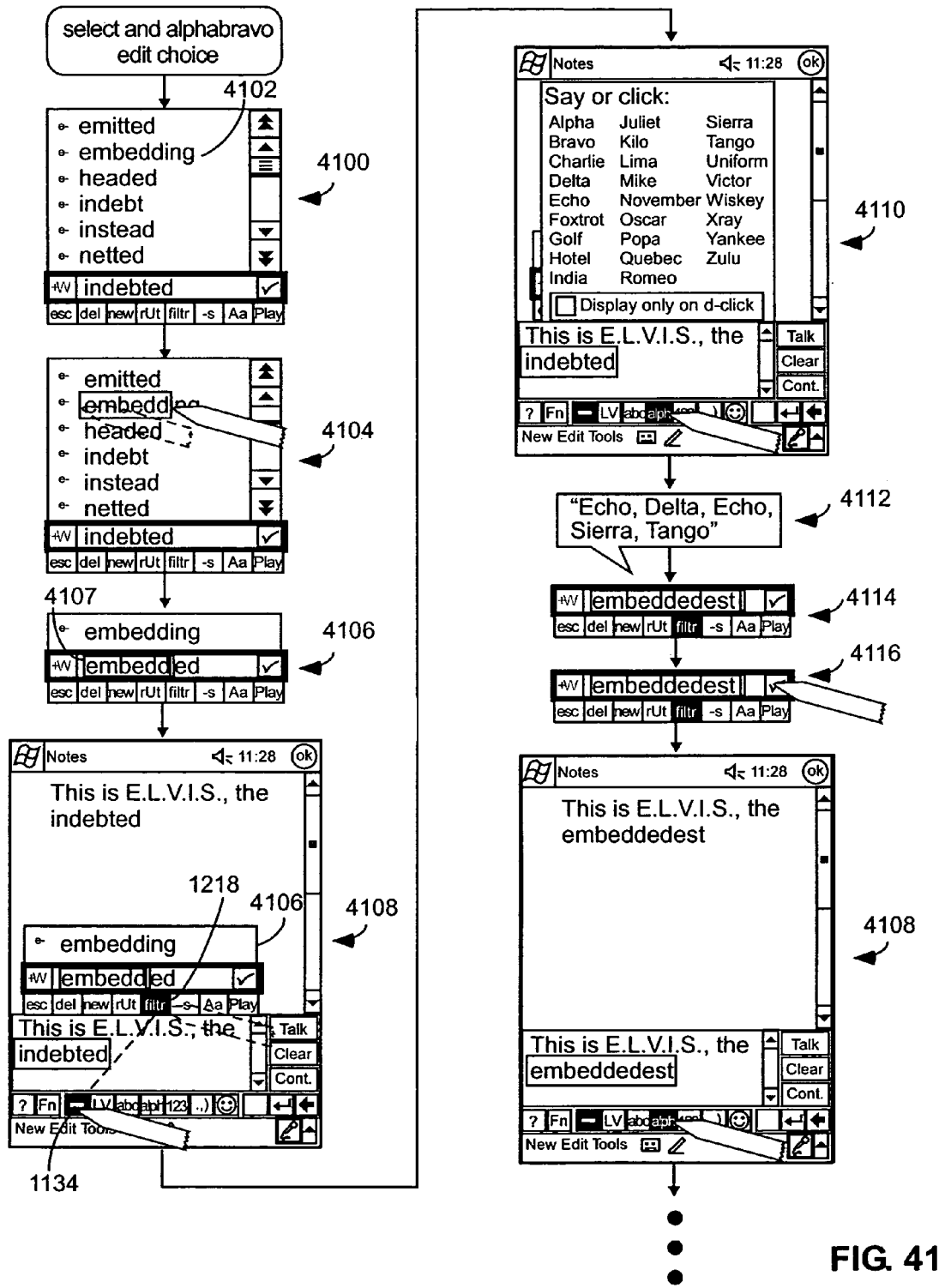
FIG. 41 shows how a user can select an initial sequence of characters from an alternate choice in the correction window and then use international communication alphabets to add characters to that sequence so as to complete the spelling of a desired output.

FIG. 41 illustrates a method in which the user selects part of a choice as a filter and then uses AlphaBravo spelling to complete the selection of a word which is not in the system's vocabulary, in this case the made-up word "embeddedest".

In this example, the user is presented with the correction window 4100 which includes one choice 4102, which includes the first six letters of the desired word. As shown in the correction window 4104, the user drags across these first six letters causing those letters to be unambiguously confirmed characters of the current filter string 4107, as shown in correction window 4106. The screenshot 4108 shows the display of this correction window in which the user drags from the filter button 1218 and releases on the Discrete/Continuous button 1134, changing it from the discrete-filter dictation mode to the continuous-filter dictation mode, as is indicated by the continuous line on that button shown in the screenshot 4108. In screenshot 4110, the user presses the alpha button again and says an utterance containing the following ICA words "Echo, Delta, Echo, Sierra, Tango". This causes the current filter string to correspond to the spelling of the desired word. Since there are no words in the vocabulary matching this filter string, the filter string itself becomes the first choice as is shown in the correction window 4114. In the view of this window shown at 4116, the user taps on the check button to indicate selection of the first choice, causing the PDA screen to have the appearance shown at 4108.

Figure 42:
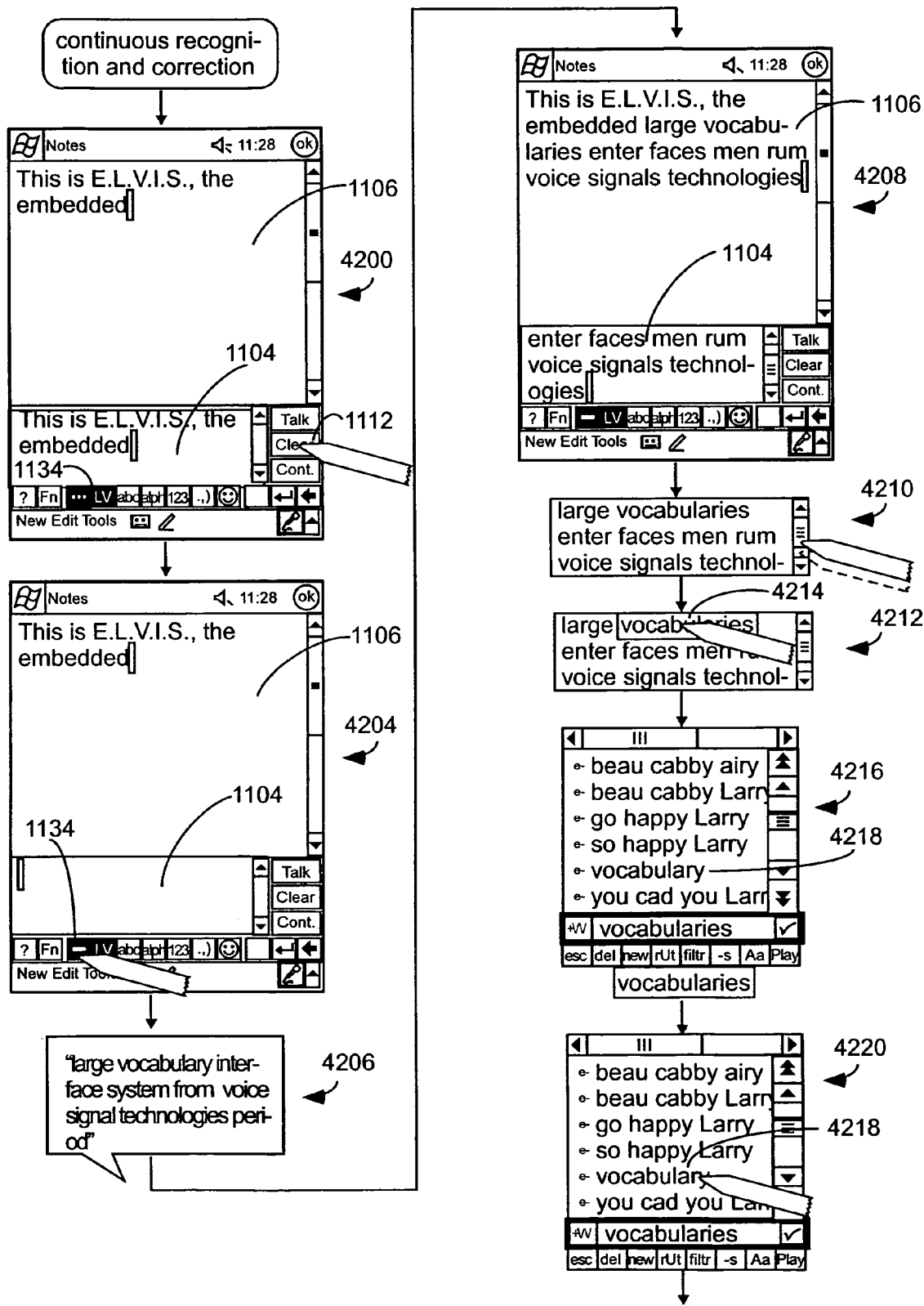
FIGS. 42 through 44 illustrate a sequence of user interactions in which the user enters and edits text into the SIP using continuous speech recognition.
Figure 43:
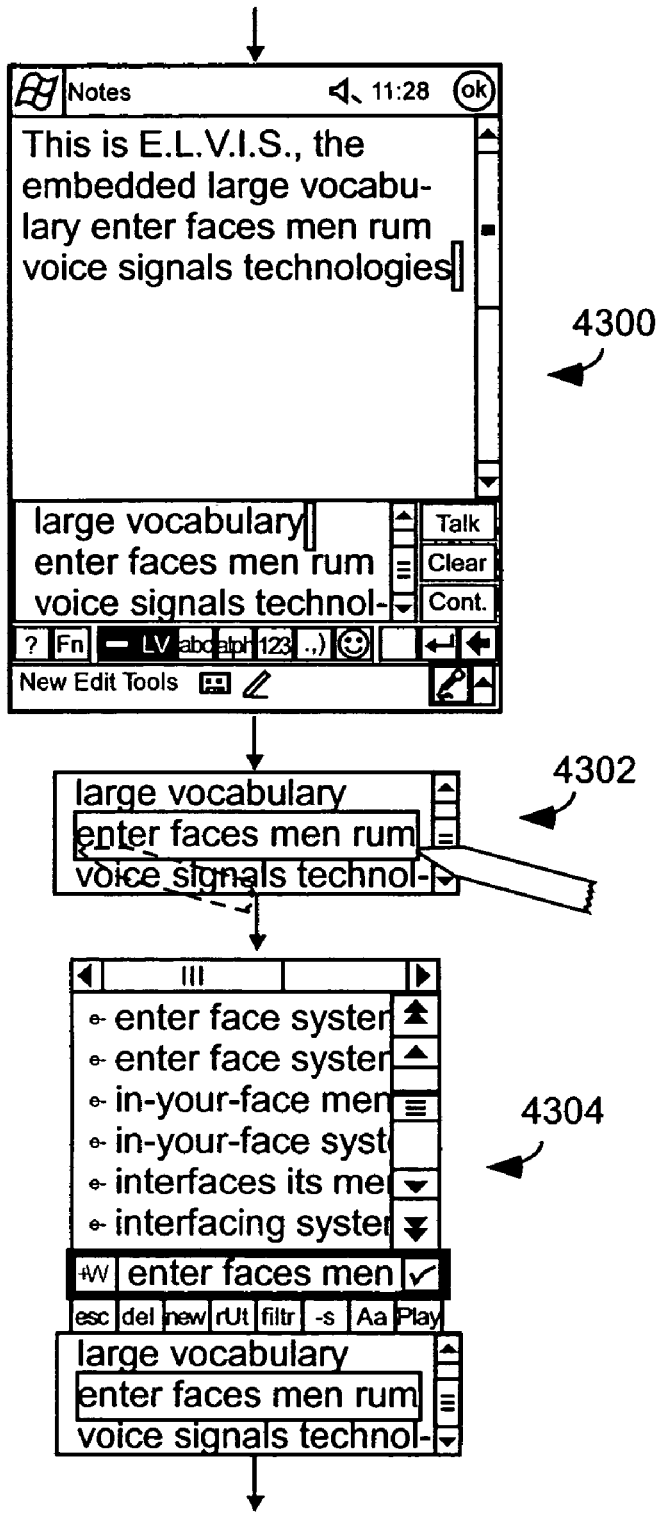
Figure 44:
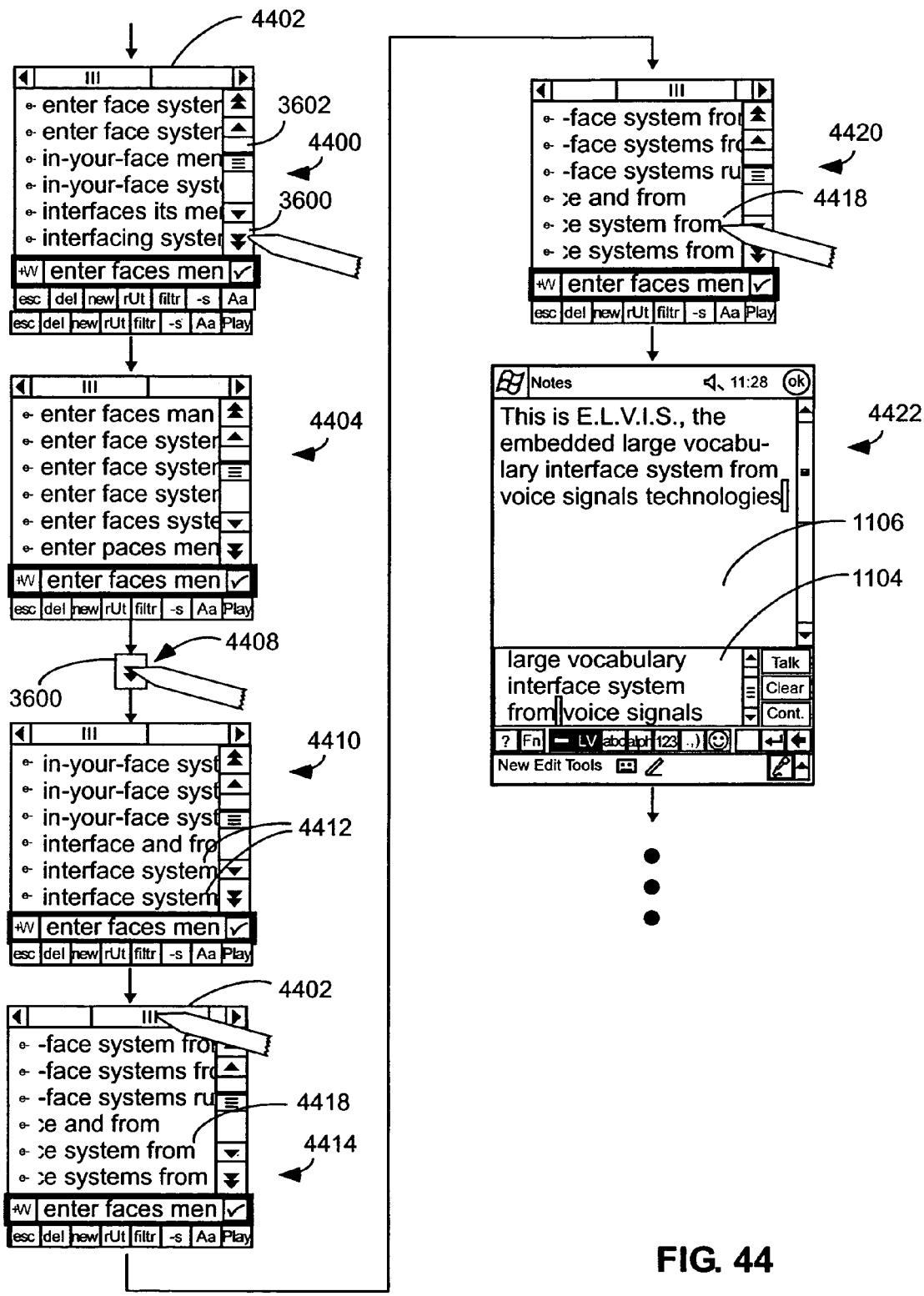

FIGS. 42 through 44 demonstrate the dictation, recognition, and correction of continuous speech. In the screenshot 4200 the user clicks the Clear button 1112 described above with regard to functions 1310 through 1314 of FIG. 13. This causes the text in the SIP buffer 1104 to be cleared without causing any associated change with the corresponding text in the application window 1106, as is indicated by the screenshot 4204. In the screenshot 4204 the user clicks the Continuous/Discrete button 1134, which causes it to change from discrete recognition indicated on the button by a sequence of dots in the screenshot 4200 to a continuous line shown in screenshot 4204. This starts speech recognition according to the current recognition duration mode, and the user says a continuous utterance of the following words "large vocabulary interface system from voice signal technologies period", as indicated by numeral 4206. The system responds by recognizing this utterance and placing a recognized text in the SIP buffer 1104 and through the operating system to the application window 1106, as shown in the screenshot 4208. Because the recognized text is slightly more than fits within the SIP window at one time, the user scrolls in the SIP window as shown at numeral 4210 and then taps on the word "vocabularies" 4214, to cause functions 1436 through 1438 of FIG. 14 to select that word and generate a correction window for it. In response the correction window 4216 is displayed. In the example the desired word "vocabulary" 4218 is on the choice list of this correction window and in the view of the correction window 4220 the user taps on this word to cause it to be selected, which will replace the word "vocabularies" in both the SIP buffer in the application window with that selected word.

Continuing now in FIG. 43, this correction is shown by the screenshot 4300. In the example, the user selects the four mistaken words "enter faces men rum" by dragging across them as indicated in view 4302. This causes functions 1502 and 1504 to display a choice window with the dragged words as the selection, as is indicated by the view 4304.

FIG. 44 illustrates how the correction window shown at the bottom of FIG. 43 can be corrected by a combination of horizontal and vertical scrolling of the correction window and choices that are displayed in it. Numeral 4400 points to a view of the same correction window shown at 4304 in FIG. 43. In it not only is a vertical scroll bar 3602 displayed, but also a horizontal scroll bar 4402. The user is shown tapping the page down button 3600 in the vertical scroll bar, which causes the portion of the choice list displayed to move from the display of the one-page alphabetically ordered first choice list shown in the view 4400 to the first page of the second alphabetically ordered choice list shown in the view 4404. In the example none of the recognition candidates in this portion of the second choice list start with a character sequence matching the desired recognition output, which is "interface system from." Thus the user again taps the page down scroll button 3600 as is indicated by numeral 4408. This causes the correction window to have the appearance shown at 4410 in which two of the displayed choices 4412 start with a character sequence matching the desired recognition output. In order to see if the endings of these recognition candidates matched the desired output, the user scrolls the horizontal scroll bar 4402 as shown in view 4414. This allows the user to see that the choice 4418 matches the desired output. As is shown at is 4420, the user taps on this choice and causes it to be inserted into the dictated text both in the SIP window 1104 and in the application window 1106 as is shown in the screenshot 4422.

FIG. 45 illustrates how the use of an ambiguous filter created by the recognition of continuously spoken letter names and edited by filtercharacterchoice windows can be used to rapidly correct an erroneous dictation. In this example, the user presses the talk button 1102 as shown at 4500 and then utters the word "trouble" as indicated at 4502. In the example it is assumed that this utterance is missrecognized as the word "treble" as indicated at 4504. In the example, the user taps on the word "treble" as indicated 4506, which causes the correction window shown at 4508 to be shown. Since the desired word is not shown as any of the choices, the user taps the filter button 1218 as shown at 4510 and makes a continuous utterance 4512 containing the names of each of the letters in the desired word "trouble." In this example it is assumed that the filter recognition mode is set to include continuous letter name recognition.

In the example the system responds to recognition of the utterance 4512 by displaying the correction window 4518. In this example it is assumed that the result of the recognition of this utterance is to cause a filter string to be created that is comprised of one ambiguous length element. As has been described above with regard to functions 2644 through 2652 of FIG. 26, an ambiguous length filter element allows any recognition candidate that contains in the corresponding portion of its character sequence one of the character sequences represented by that ambiguous length element. In the correction window 4518 the portion of the first choice word 4519 that corresponds to an ambiguous filter element is indicated by the ambiguous filter indicator 4520. Since the filter uses an ambiguous element, the choice list displayed contains best scoring recognition candidates that start with different initial character sequences including ones with length less than the portion of the first choice that corresponds to a matching character sequence represented by the ambiguous element.

In the example, the user drags upward from the first character of the first choice, which causes operation of functions 1747 through 1750 described above with regard to FIG. 17. This causes a filter choice window 4526 to be display. As shown in the correction window 4524, the user drags up to the initial desired character the letter "t," and releases the drag at that location which causes functions 1749 and 1740 through 1746 to be performed. These close the filter choice window, call the filterEdit routine of FIG. 28 with the selected character as an unambiguous correction to the prior ambiguous filter element and causes a new correction window to be displayed with the new filter as is indicated at 4528. As is shown in this correction window the first choice 4530 is shown with an unambiguous filter indicator 4532 for its first letter "t" and an ambiguous filter indicator 4534 for its remaining characters. Next, as is shown in the view of the same correction window shown at 4536 the user drags upward from the fifth letter "p" of the new first choice which causes a new correction window 4538 to be displayed. When the user releases this drag on the character "b", it causes that character and all the characters that preceded the character it replaces in the first choice to be defined unambiguously in the current filter string, as indicated in the new correction window 4540, in which the first choice 4542 is the desired word, and the unambiguous portion of the filter is indicated by the unambiguous filter indicator 4544 and the remaining portion of the ambiguous filter element, which stays in the filter string by operations of functions 2900 through 2910 shown in FIG. 29.

FIG. 46 illustrates that the SIP recognizer allows the user to also input text and filtering information by use of a character recognizer similar to the character recognizer that comes standard with that Windows CE operating system.

As shown in the screenshot 4600 of this figure, if the user drags up from the function key functions 1428 and 1430 of FIG. 14 will display a menu 4602 and if the user releases on the menu's character recognition entry 4604 the character recognition mode described in FIG. 47 will be turned on.

As shown in FIG. 47, this causes function 4702 to display a single-stroke character recognition window 4608, shown in screen 4606 FIG. 46, and then to enter an input loop 4704 which is repeated until the user selects to exit the window by selecting another input option on the function menu 4602. When in this loop, if the user touches the character recognition window, function 4906 records "ink" during the continuation of such a touch which records the motion if any of the touch across the surface of the portion of the display touch screen corresponding to the character recognition window. If the user releases a touch in this window, functions 4708 through 4714 are performed. Function 4710 performance character recognition on the "ink" currently in the window.

Function 4712 clears the character recognition window, as indicated by view 4610 in FIG. 46. And function 4708 supplies the corresponding recognized character to the SIP buffer and the operating system.

FIG. 48 illustrates that if the user selects the handwriting recognition option 4612 in the function menu shown in the screenshot 4600, a handwriting recognition entry window 4800 will be displayed in association with the SIP as is shown in screenshot 4802.

The operation of the handwriting mode is provided in FIG. 49. When this mode is entered function 4902 displays the handwriting recognition window shown in FIG. 48, and then a loop 4903 is entered until the user selects to use another input option. In this loop, if the user touches the handwriting recognition window in any place other then the delete button 4804 shown in FIG. 48, the motion if any during the touch is recorded as "ink" by function 4904. If the user touches down in the "REC" button area 4806 shown in FIG. 48 function 4905 causes functions 4906 through 4910 to be performed. Function 4906 performs handwriting recognition on any "ink" previously entered in the handwriting recognition window. Function 4908 supplies the recognized output to the SIP buffer and the operating system, and function 4910 clears the recognition window. If the user presses the Delete button 4804 shown in FIG. 48 functions 4912 and 4914 clear the recognition window of any "ink."

It should be appreciated that the use of the recognition button 4806 allows the user to both instruct the system to recognize the "ink" that was previously in the handwriting recognition entry window and, at the same time, start the writing of a new word to be recognized.

FIG. 50 shows the keypad 5000, which can be selected from the function menu 4602 by picking the option 4615 shown in FIG. 46.

Having character recognition, handwriting recognition, and keyboard input methods rapidly available as part of the speech recognition SIP is often extremely advantageous because it lets the user switch back and forth between these different modes in a fraction of a second depending upon which is most convenient at the current time. And it allows the outputs of all of these modes to be used in editing text in the SIP buffer.

Figure 51:
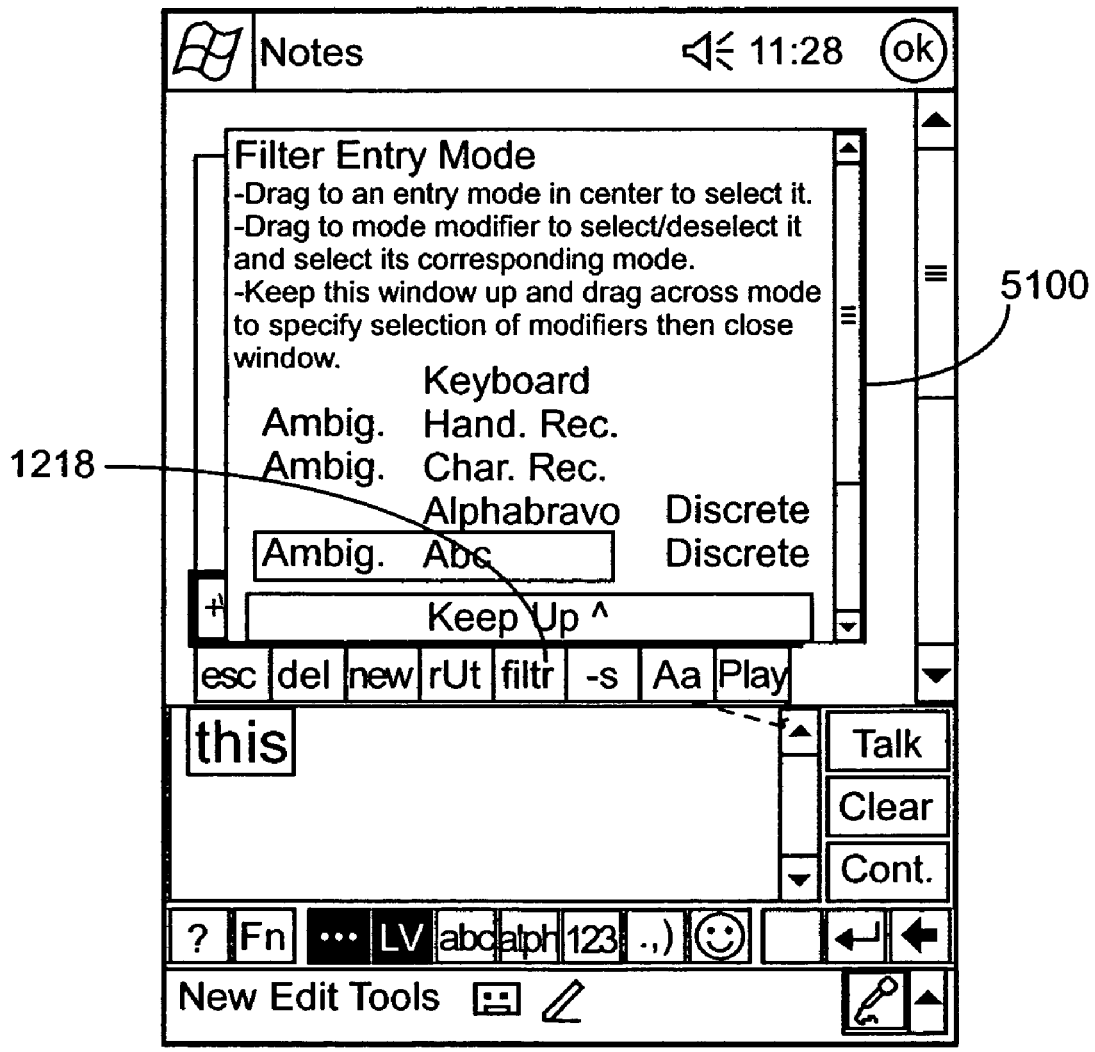
FIG. 51 illustrates a filter entry mode menu that can be selected to choose from different methods of entering filtering information, including speech recognition, character recognition, handwriting recognition, and software keyboard input.

As shown in FIG. 51, in one embodiment of the SIP buffer, if the user drags up from the filter button 1218 a window 5100 is display that provides the user with optional filter entry mode options. These include options of using a letter-name speech recognition, AlphaBravo speech recognition, character recognition, handwriting recognition, and the keyboard window, as alternative methods of entering filtering spellings. It also enables a user to select whether any of the speech recognition modes are discrete or continuous and whether the letter name recognition character recognition and handwriting recognition entries are to be treated as ambiguous in the filter string. This user interface enables the user to quickly select the filter entry mode which is appropriate for the current time and place. For example, in a quiet location where one does not have to worry about offending people by speaking, continuous letter name recognition is often very useful. However, in a location where there's a lot of noise, but a user feels that speech would not be offensive to neighbors, AlphaBravo recognition might be more appropriate. In a location such as a library where speaking might be offensive to others silent filter entry methods such as character recognition, handwriting recognition or keyboard input might be more appropriate.

Figure 52:
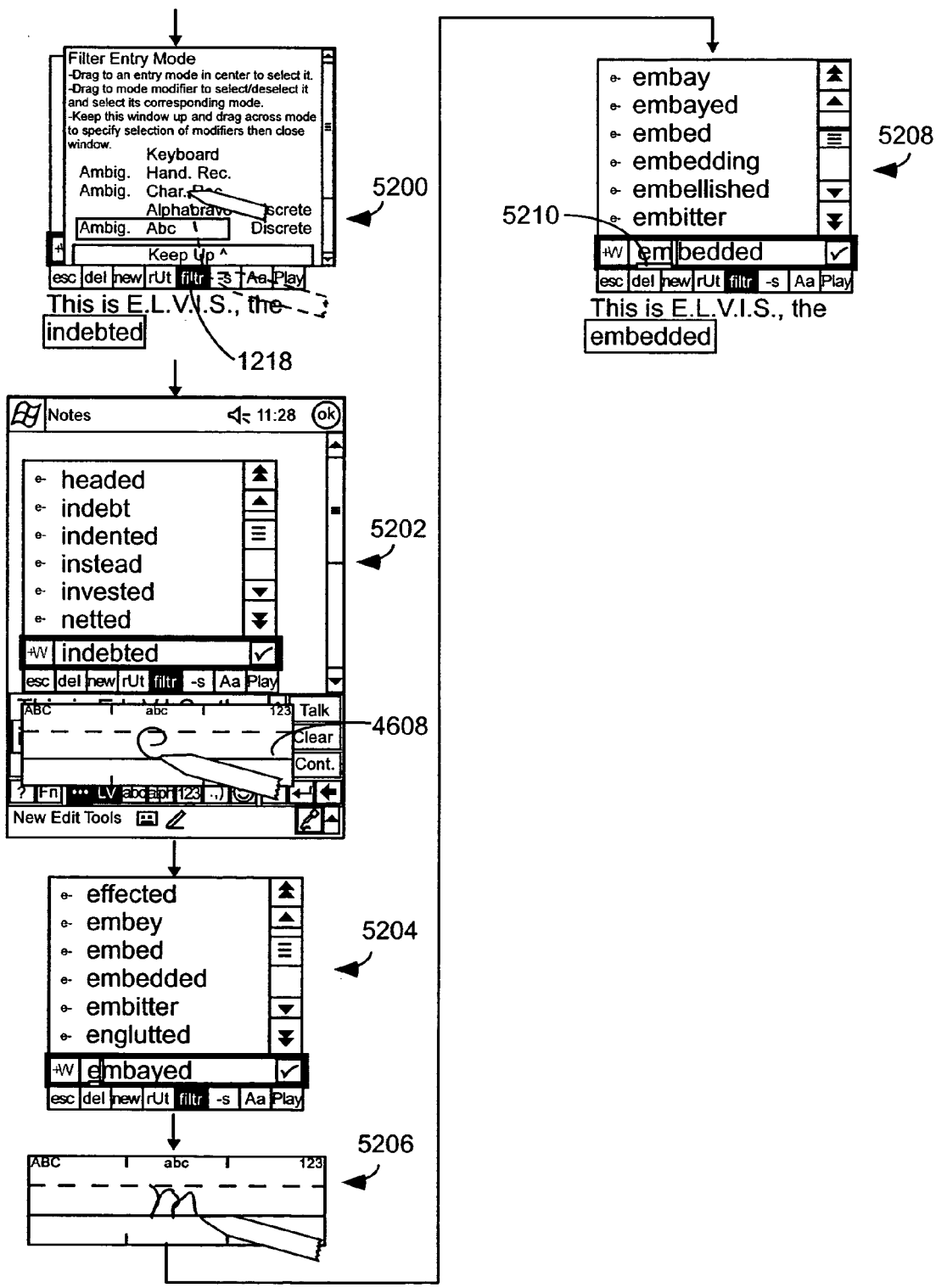
FIGS. 52 through 54 illustrates how either character recognition, handwriting recognition, or software keyboard input can be used to filter speech recognition choices produced by in the SIP's correction window.

FIG. 52 provides an example of how character recognition can be quickly selected to filter a recognition. View 5200 shows a portion of a correction window in which the user has pressed the filter button and dragged up, causing the filter entry mode menu 5100 shown in FIG. 51 to be displayed, and then selected the character recognition option. As is shown in screenshot 5202 this causes the character recognition entry window 4608 to be displayed in a location that allows the user to see the entire correction window. In the screenshot 5202 the user has drawn the character "e" and when he releases his stylus from the drawing of that character the letter "e" will be entered into the filter string causing a correction window 5204 to be displayed in the example. The user then enters an additional character "m" into the character recognition window as indicated at 5206, and when he releases his stylus from the drawing of this letter the recognition of the character "em" causes the filter string to include "e" as shown by the ambiguous filter string indicator 5210 in view 5208.

Figure 53:
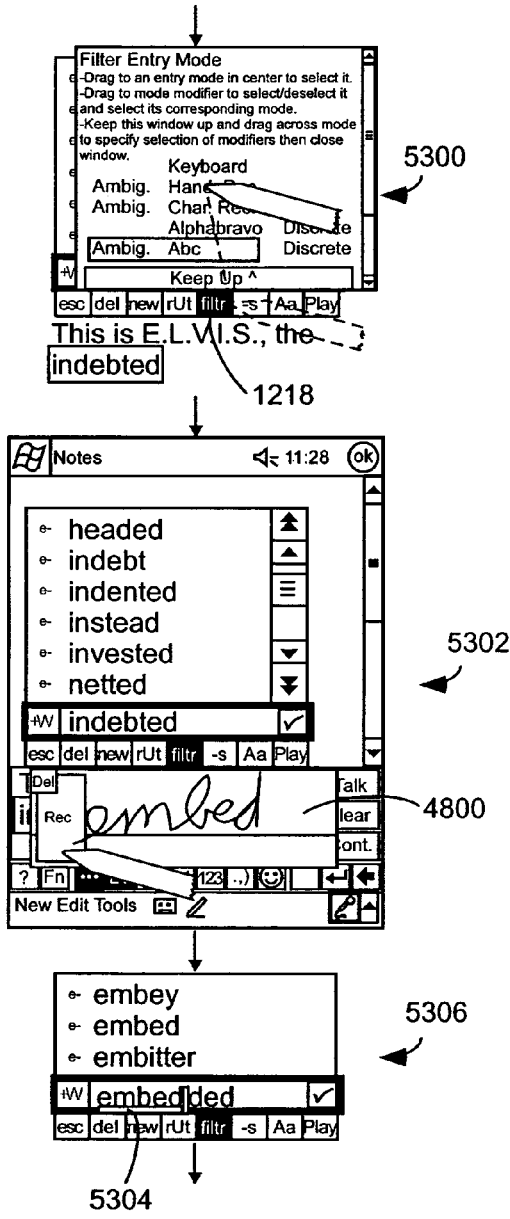
Figure 54:
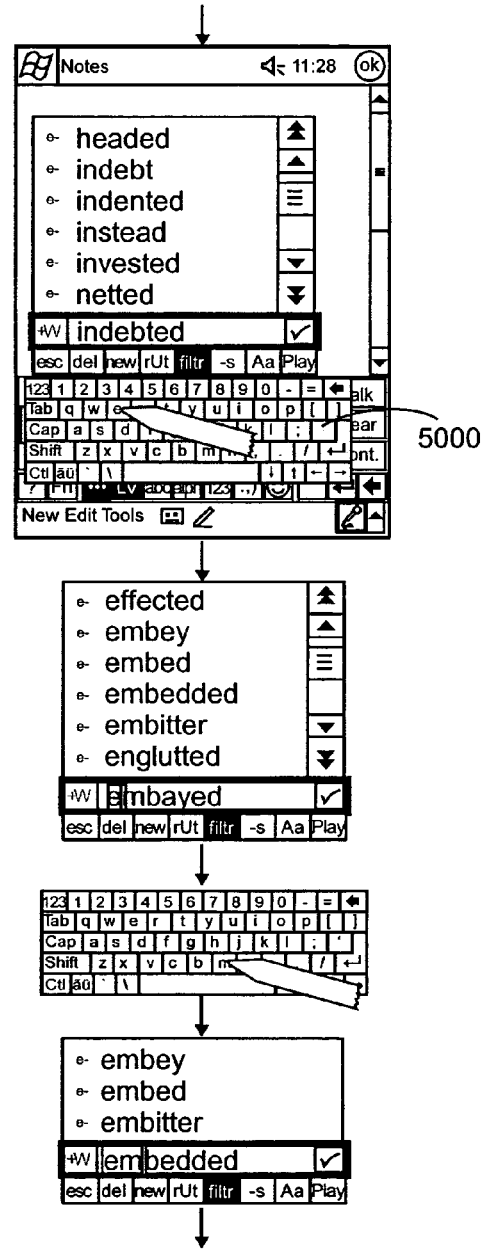

FIG. 53 starts with a partial screenshot 5300 where the user has tapped and dragged up from the filter key 1218 to cause the display of the filter entry mode menu, and has selected the handwriting option. This displays a screen such as 5302 with a handwriting entry window 4800 displayed at a location that does not block a view of the correction window. In the screenshot 5302 the user has handwritten in a continuous cursive script the letters "embed" and then presses the "REC" button to cause recognition of those characters. Once he has tapped that button an ambiguous filter string indicated by the ambiguous filter indicator 5304 is displayed in the first choice window corresponding to the recognized characters as shown by the correction window 5306. FIG. 54 shows how the user can use a keypad window 5000 to enter alphabetic filtering information.

Figure 55:
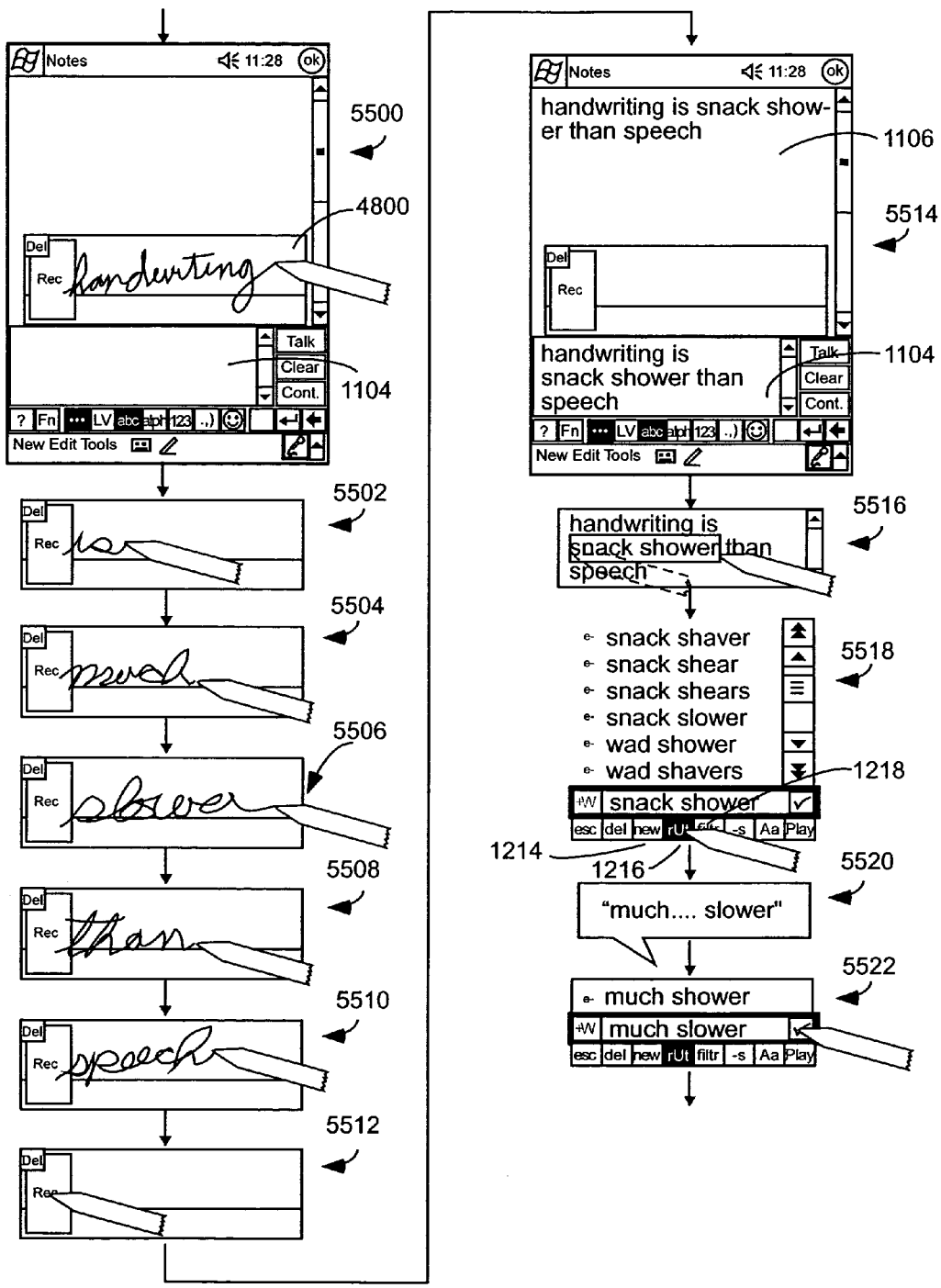
FIGS. 55 and 56 illustrate how the SIP allows speech recognition of words or filtering characters to be used to correct handwriting recognition input.

FIG. 55 illustrates how speech recognition can be used to collect handwriting recognition. Screenshot 5500 shows a handwriting entry window 4800 displayed in a position for entering text into the SIP buffer window 1104. In this screenshot the user has just finished writing a word. Numerals 5502 through 5510 indicate the handwriting of five additional words. The word in each of these views is started by a touchdown in the "REC" button so as to cause recognition of the prior written word. Numeral 5512 points to a handwriting recognition window where the user makes a final tap on the "REC" button to cause recognition of the last handwritten word "speech". In the example of FIG. 55, after this sequence of handwriting input has been recognized, the SIP buffer window 1104 in the application window 1106 had the appearance shown in the screenshot 5514 as indicated by 5516. The user drags across the miss-recognized words "snack shower." This causes the correction window 5518 to be shown. In the example, the user taps the re-utterance button 1216 and discretely re-utters the desired words "much . . . slower." By operation of a slightly modified version of the "get" choices function described above with regard to FIG. 23 this will cause the recognition scores from recognizing the utterances 5520 to be combined with the recognition results from the handwritten inputs pointed to by numerals 5504 and 5506 to select a best scoring recognition candidate, which in the case of the example is the desired words, as shown at numerals 5522.

It should also be appreciated that the user could have pressed the "new" button 1214 in the correction window 5518 instead of the ReUtt button 1218, in which case the output of speech recognition of the utterances 5520 would replace the handwriting outputs that had been selected as shown at 5516.

Figure 56:
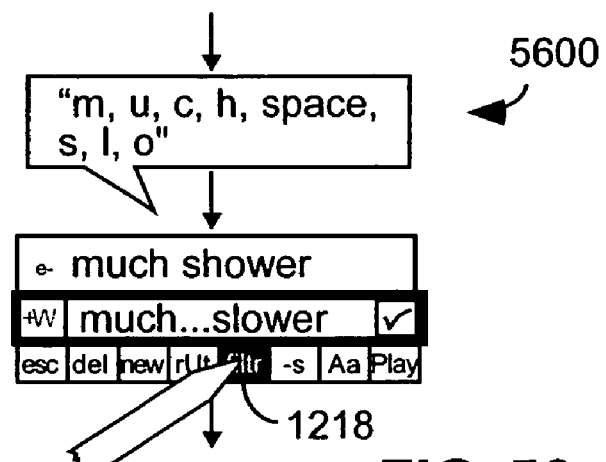

As indicated in FIG. 56, if the user had pressed the filter button 1218 instead of the re-utterance button in the correction window 5518, the user could have used the speech recognition of letter names, such as in the utterance 5600 shown in FIG. 56, to alphabetically filter the handwriting recognition of the two words selected at 5516 in FIG. 55.

Figure 57:
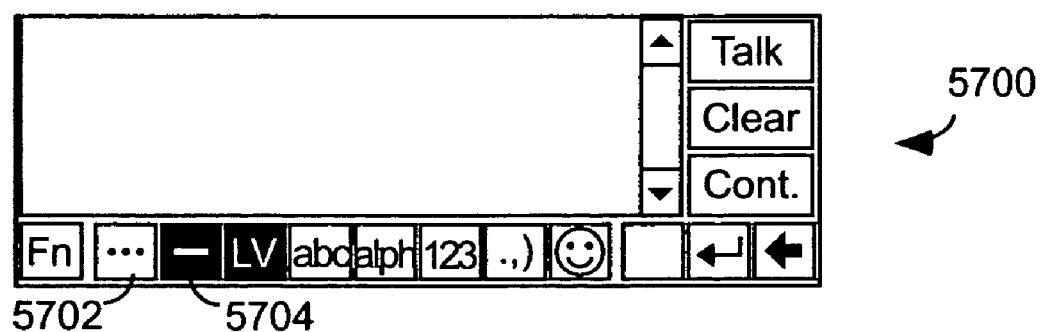
FIG. 57 illustrates an alternate embodiment of the SIP in which there are two separate top-level buttons to select between discrete and continuous speech recognition.

FIG. 57 illustrates an alternate embodiment 5700 of the SIP speech recognition interface in which there are two separate top-level buttons 5702 and 5704 to select between discrete and continuous speech recognition, respectively. It will be appreciated that it is a matter of design choice which buttons are provided at the top level of a speech recognizes user interface. However, the ability to rapidly switch between the more rapid and more natural continuous speech recognition versus the more reliable although more halting and slow discrete speech recognition is something that can be very desirable, and in some embodiments justifies the allocation of a separate top-level key for the selection of discrete and for the selection of continuous recognition.

FIG. 58 displays an alternate embodiment of the displayChoiceList routine shown in FIG. 22. It is similar to the routine of FIG. 22 except that it creates a single scrollable score ordered choice list rather than the two alphabetically ordered choice lists created by the routine in FIG. 22. The only portions of its language that differs from the language contained in FIG. 22 are underlined, with the exception that functions 2226 and 2228 have also been deleted in the version of the routine shown in FIG. 58.

Figure 59:
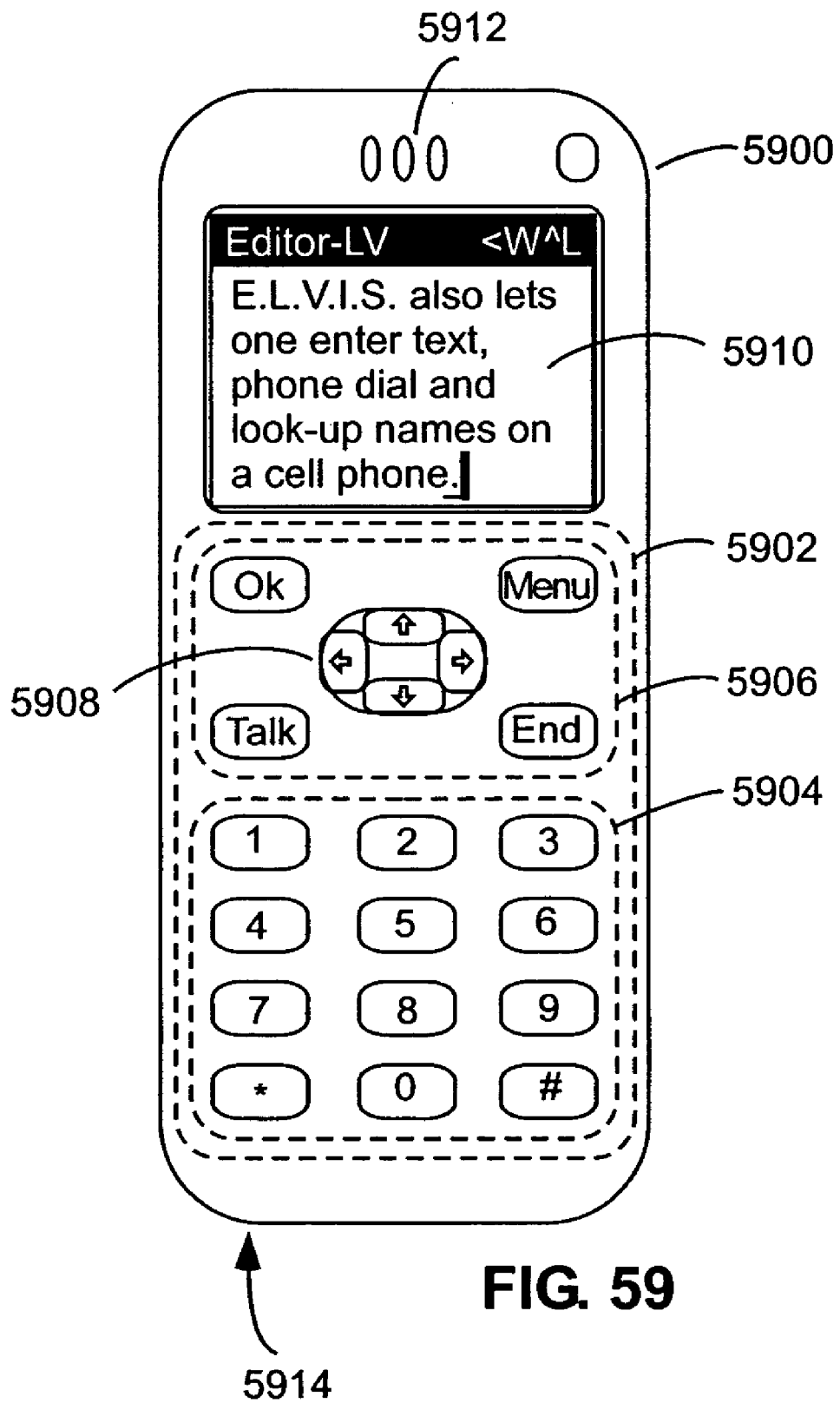
FIG. 59 illustrates a cellphone that embodies many aspects of the present invention.

FIG. 59 illustrates one possible embodiment of a cellphone which contains a large vocabulary speech recognition capability according to certain aspects of the present invention. It includes a set of phone keys 5902, which includes a basic numbered phone keypad 5904 and a set of additional keys 5906 which are common in many of today's cellphones. These extra keys include the navigational keys 5908 which can actually be formed of one unit which can be tilted either up or down or left or right to enable a user to provide a discrete Up, Down, Left, or Right input. The cellphone also includes a display screen 5910, a speaker 5912, and a microphone 5914, which is located the bottom of the phone in a position that is not shown in FIG. 59.

Figure 60:
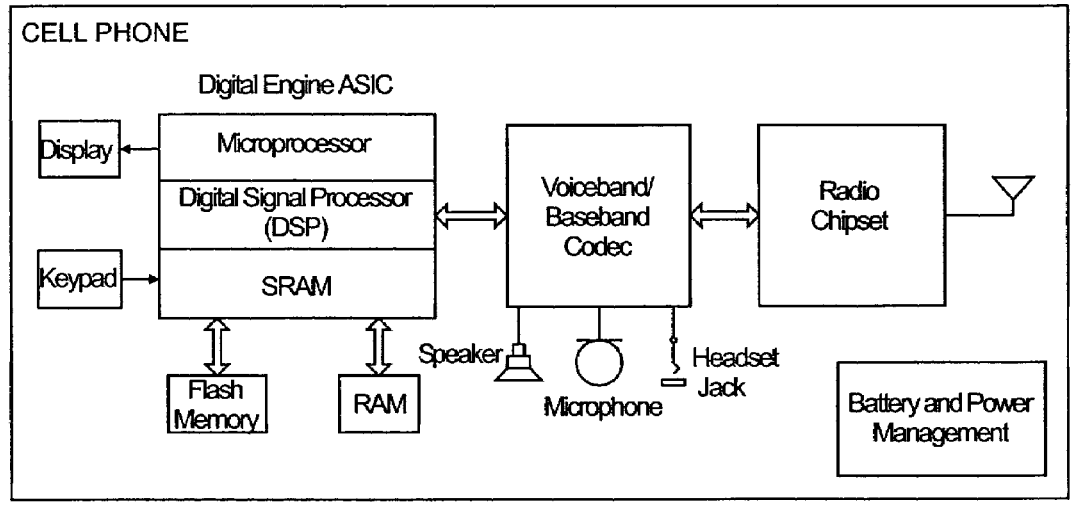
FIG. 60 provides a highly simplified block diagram of the major components of a typical cellphone such as that shown in FIG. 59.

FIG. 60 provides a description of the basic components found in many cellphones.

Figure 61:
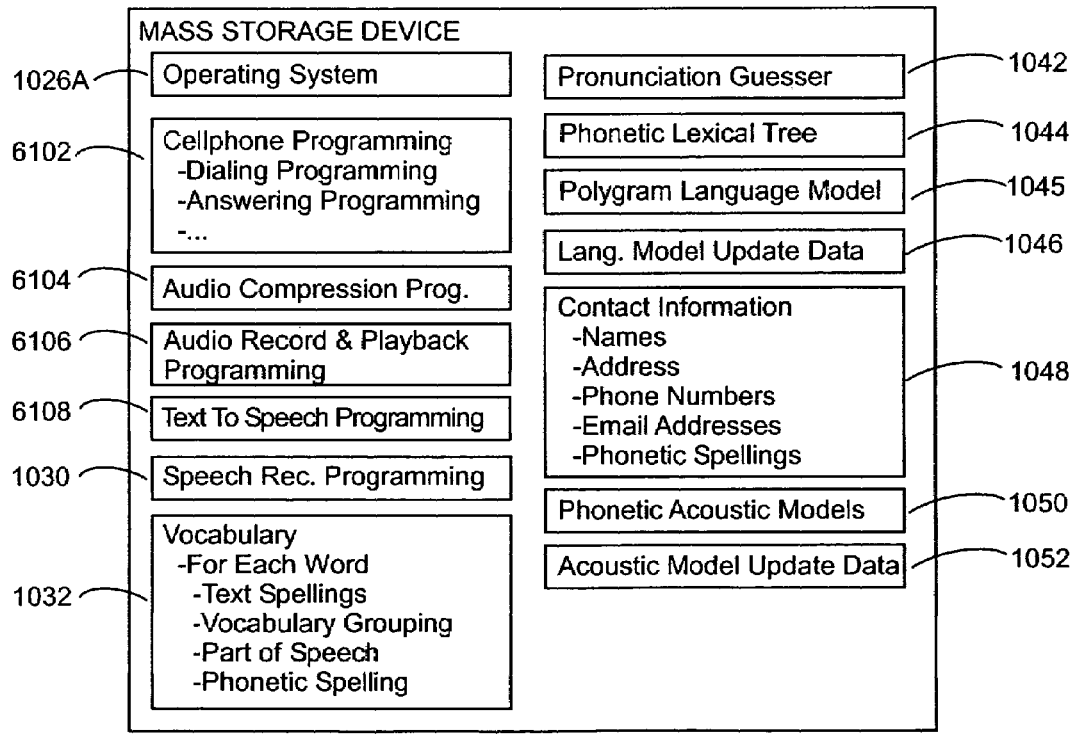
FIG. 61 is a highly simplified block diagram of various programming and data structures contained in one or more mass storage devices on the cellphone of FIG. 59.

FIG. 61 includes a description of some of the programming and data structures contained on the mass storage device of the cellphone. Like the mass storage device described above with regard to FIG. 10, this mass storage device can be flash ROM, but could in some embodiments include other mass storage devices such as magnetic memories. The programs and data structures stored on the cellphone's mass storage device are somewhat similar to those stored in the PDA's mass storage shown in FIG. 10, and the similar elements are indicated by similar numbering. The mass storage device shown in FIG. 61 also includes cellphone programming 6102, which includes programming for dialing and answering calls and performing other phone functions. It is also shown having audio compression programming 6104, which is used by the cellphone programming to compress audio signals so they can be efficiently communicated by wireless cellphone transmission. In some embodiments of the invention some portions of this audio compression programming are also used to compress audio used by audio record-and-playback programming 6106. In many embodiments of the present invention the cellphone's mass storage also stores text-to-speech programming 6108 for tasks such as providing acknowledgement of the recognition of commands and feedback on speech recognition.

FIG. 62 illustrates that the cellphone of FIG. 59 allows traditional phone dialing by the pressing of numbered phone keys.

FIG. 63 provides a quick description of the cellphone's top-level mode, "phone mode".

As shown in this figure, if the user presses the Left navigation button on the rocker 5908 in FIG. 59, function 6302 calls a digit dial program, which allows the user to dial phone number by continuous digit recognition.

If the user presses the Right navigation button on the same rocker, function 6304 calls the name dial program, which allows the user to dial a phone number by saying the name of a person in his contact list associated with that number.

If the user presses the navigational up button on the rocker, function 6306 calls a message program that allows the user to see his phone and e-mail messages.

If the user presses the down navigational button on the rocker switch, function 6308 opens up a speech recognition editor for a new item at the end of a textual outline of notes, enabling the user to quickly dictate into text ideas on any subject, which can then later be moved to other locations in the outline or into other text files.

This use of navigational keys provides the user with rapid access to the important speech recognition functions of digit dial, named dial, and note taking from the telephone's top-level mode.

If the user presses the "Menu" button shown in FIG. 59, function 6312 calls a displayMenu routine for the main menu of the phone. This routine displays the menu for which it is called, in this case, the main menu. If the user double-click's on the menu button, functions 6316 through the 6320 are performed. These functions call the displayMenu function for the main menu, set the recognition vocabulary to the main menu's command vocabulary, and treat the last press of the menu key as a speech key for recognition duration purposes of the type described above with regard to FIG. 18.

If the user makes a single press of the Menu key for longer than a certain duration, function 6324 calls the help routine for the main menu. The help routine displays a text which describes the mode or menu for which it is called including all the commands which are available in that mode.

These multiple uses of the Menu Key—i.e., the ability of different presses of the Menu key to either display the menu, display the menu and turn on command recognition of the menu's commands, or to evoke help for the current mode or menu—are available across virtually all modes of the particular embodiment of the cellphone that is described in detail in this application.

FIG. 63 shows that when the cellphone is in phone mode its response to a pressing of the "Talk" and "End" buttons and keys on the standard phone pad are similar to that found in many prior cellphones.

Figure 64:
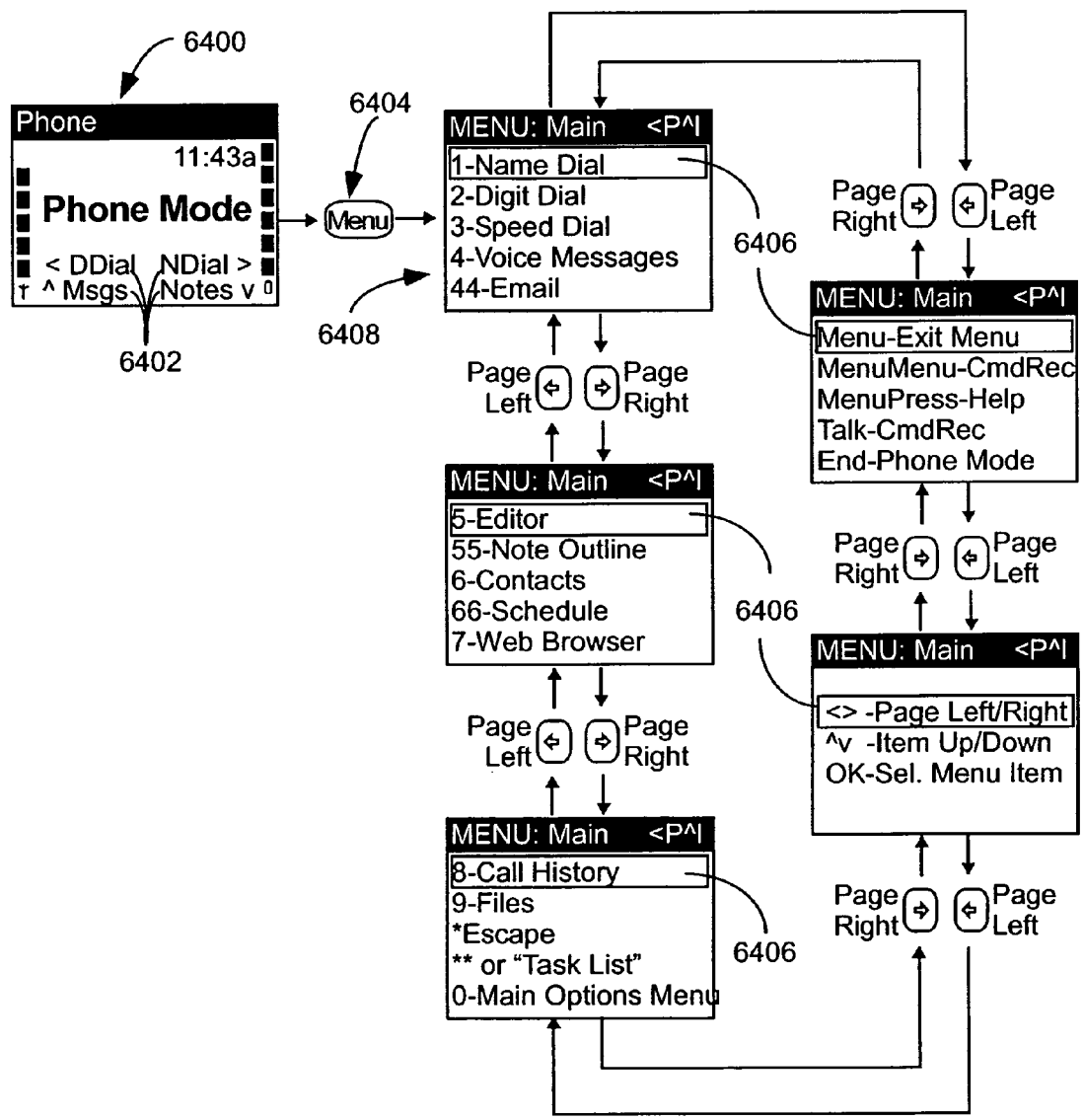
FIG. 64 illustrates how a user of the cellphone of FIG. 59 can access and quickly view the commands of a main menu by pressing the menu key on the cellphone.

FIG. 64 illustrates at 6400 the appearance of the cellphone's display screen when at the top-level phone mode, such as before dialing has commenced. The notation indicated by numeral 6402 at the bottom of this display indicates to the user the functions associated with the navigational keys by the functions 6302 through 6308 of FIG. 63, discussed above. If the user either presses or double-clicks the Menu button, as shown at 6404, the main menu will be displayed, as described above with regard to functions 6312 and 6316. Once in this menu, the user can display an entire page at a time by pressing either the Left or Right navigational buttons, as is indicated in FIG. 64. If the user presses the Up or Down navigational buttons the current selection 6406 will be scrolled up or down one item at a time. The notation "<P^I" in the title bar of the menu display indicates that the navigational mode moves a page with presses of the Left/Right navigational buttons, and an item at a time with presses of the Up and Down buttons.

FIGS. 65 and 66 provide a more detailed description of the functionality that results when a call is made to displayMenu for the main menu, such as by the function 6318 of the top-level phone mode described in FIG. 63.

When the displayMenu routine is called for a given menu, it displays the first screen of the given menu and then responds to commands associated with that menu. When displayMenu is called for the main menu, function 6502 displays the first screen of the main menu starting with the menu item numbered "1" in the cellphone screen shot 6408 shown in FIG. 64.

If the user presses the Left or Right navigational key or says "Page Left" or "Page Right," function 6508 scrolls the menu choice list up or down one screen, highlighting the first item in each new screen as indicated in FIG. 64.

If the user presses the Up or Down navigational button or says "Item Up" or "Item Down," function 6512 scrolls the highlight 6406 shown in FIG. 64 up or down by one item, scrolling the display, if necessary, to show newly highlighted items on the screen.

If the user presses the OK key or says "OK," function 6516 selects the currently highlighted choice in the menu, if any, and performs a function associated with that choice.

If the user presses the Menu key while already in the menu mode and the press is not part of a double-click, functions 6520 and 6522 return from all currently called menus. Since menus can be hierarchical this has the effect of returning to the last non-menu mode from which a sequence of one or more displayMenu calls originated. As is described below, pressing the "*" or escape key causes a returns from a current menu call that will return to any menu from which a current, lower-level menu has been called.

If the user double-click's the Menu key when the main menu is displayed, function 6526 and 6528 set the recognition vocabulary to the commands in the displayed menu, i.e., the main menu in FIG. 65, and treats the last Menu key press of the double-click as a speech key press for recognition duration logic purposes. This allows the user to be able to always turn on command recognition by double-clicking the menu key.

If the user makes a sustained press of the Menu button, function 6532 calls the help routine for the currently displayed menu.

If the user presses the Talk button, the response is the same as double-clicking on the menu button.

If the user presses the End button, function 6542 saves the current state the cellphone is in for a possible return to that state in the future, and function 6544 goes to the phone mode.

All of the above items just described with regard to FIG. 65 are shown in bold text in that figure to indicate that they are user interface features which are available in all menus of the particular cellphone interface that is described in detail.

In the main menu and all the menus and command structures described below, if a number or key name precedes the name of an option, the user is able to select such an option by (a) pressing the numbered or named key; (b) if command recognition is on, by saying the name of the option; or (c) if in a menu or command list by selecting the option by moving the menu or command list highlight to a displayed command and then selecting it, either by pressing the OK key or, if command recognition is on, by saying "OK".

If any of these methods are used to select "Name Dial" when in the main menu, function 6548 calls the Name Dial program described above briefly.

If the user selects "Digit Dial", function 6552 calls the Digit Dial program.

If the user selects "Speed Dial", function 6556 calls the Speed Dial function.

As shown in FIG. 66, if the user selects "Voice Messages", function 6604 calls a program that allows a user to see a listing of, listen to, annotate, and/or copy selected portions of such voice messages into other documents on the cellphone system.

If the user selects "Email", function 6608 calls an Email function, which allows a user to originate, send, and receive e-mails, including the use of voice recognition to address e-mails and/or to create text in new e-mails or as comments on replies to e-mails sent by others.

In FIG. 66 the Email option is preceded by "44". A double-digit such as this indicates a double-click. The menu structure of the cellphone embodiment shown uses double-clicks liberally to increase the number of functions available to a user at one time through the relatively small number of keys found on most cellphones.

If the user selects "Editor", function 6612 calls editor mode with a new file. As will be described below in greater detail editor mode is the major speech recognition and phone key text entry mode of the disclosed cellphone embodiment.

If the user selects "Note Outline", function 6616 calls editor mode for new item at the bottom of a note outline. This is the same function which is called pressing a Down key when in the top-level phone mode. The note outlined is a hierarchical document structure which enables a sequence of notes to be viewed as if they were part of one document when desired. It allows various levels of the outline to be expanded and collapsed so as to enable more rapid navigation and reading of the outline's major headings. It is good for enabling a user to keep a chronological list of notes. It also is good for grouping certain types of information together such as to-do list information, and information concerning people of interest or subjects of interest.

If the user selects "Contacts", function 6620 calls a contact program which contains name, address, phone number, e-mail, and other information about each of a plurality of people.

If the user selects "Schedule", function 6624 calls the schedule program that allows the user to view, enter, and edit by voice recognition information relating to scheduling.

If the user selects "Web browser", function 6628 calls a Web browser program in which the user can enter values into text fields by speech recognition.

If the user selects "Call History", function 6632 calls a call history program that allows a user to see time, length, and phone number or name information about past calls it been made on the cellphone.

If the user selects "Files", function 6636 calls a file manager program that enables a user to navigate, open, delete, and create text and other types of stored files on the cellphone.

If the user selects "Escape", the call to displayMenu that is displaying the current menu will return. This "escape" option is shown in bold because it is available in all menus. If the currently displayed menu is being displayed in response to a call to displayMenu made by the selection of a command in a higher level menu, selecting "escape" will return to that higher level menu.

As mentioned above, the current interface provides two options for returning from a menu. The first is pressing "Menu", which returns to the top-level phone mode from all currently called menus, and "Escape", which returns just from the currently displayed menus. This allows the user greater flexibility when using and navigating the cellphone's hierarchical menu structure.

If the user selects "Task List", function 6644 causes the execution to go to a Task List Manager which enables a user to select between all of the currently available tasks, in much the way that a task manager does on many current personal computers. This is an extremely desirable feature on a cellphone in which a user is given the capability to perform significant tasks through speech recognition. This is because having such multitasking on a cellphone allows one to answer a phone while in the middle of the relatively complex task such as composing a multi-line e-mail, without losing work on that task.

Note that the Escape and Task List options are shown in bold because they are available in all of the cellphones menus.

If the user selects "Main Options Menu", function 6648 will call displayMenu for the Main Option Menu, which contains phone options that are less commonly used than those that selectable from the Main Menu itself.

FIG. 67 through 74 displayed various mapping of a basic phone number keypad to functions used in various modes or menus of the disclosed cellphone speech recognition editor.

The phone key mapping in the editor mode is shown in FIG. 67.

FIG. 68 shows the phone key portion of the entry mode menu which is selected if the user presses the one key when in the editor mode. The entry mode menu is used to select among various text and alphabetic entry modes available on the system.

FIG. 69 displays the functions that are available on the numerical phone key pad when the user has a correction window displayed, which can be caused from the editor mode by pressing the "2" key.

FIG. 70 displays the numerical phone key commands available from an edit menu selected by pressing the "3" key when in the edit mode illustrated in FIG. 67. This menu is used to change the navigational functions performed by pressing the navigation keys of the phone keypad.

FIG. 71 illustrates a somewhat similar correction navigation menu that displays navigational options available in the correction window by pressing the "3" key when the correction window is displayed. In addition to changing navigational modes while in a correction window, the menu of FIG. 71 also allows the user to vary the function that is performed when a choice is selected.

FIG. 72 illustrates the numerical phone key mapping during a key Alpha mode, in which the pressing of a phone key having letters associated with it will cause a prompt to be shown on the cellphone display asking the user to say the ICA word associated with the desired one of the sets of letters associated with the pressed key. This mode is selected by double-clicking the "3" phone key when in the entry mode menu shown in FIG. 68.

FIG. 73 shows a basic keys menu, which allows the user to rapidly select from among a set of the most common punctuation and function keys used in text editing, or by pressing the "1" key to see a menu that allows a selection of less commonly used punctuation marks. The basic keys menu is selected by pressing a "9" in the editor mode illustrated in FIG. 67.

FIG. 74 illustrates the edit option menu that is selected by pressing "0" in the editor mode, the menu of which is shown in FIG. 67. This contains a menu which allows a user to perform basic tasks associated with use of the editor that are not available in the other modes or menus.

At the top of each of the numerical phone key mappings shown in FIGS. 67 through 74 is a title bar that is shown at the top of the cellphone display when that menu or command list is shown. As can be seen from these figures the title bars illustrated in FIGS. 67, 69 and 72 start with the letters "Cmds" to indicate that the displayed options are part of a-command list, whereas FIGS. 68, 70, 71, 73 and 74 have title bars which start with "MENU." This is used to indicate a distinction between the command lists shown in FIGS. 67, 69 and 72 and the menus shown in the others of these figures.

A command list displays commands that are available in a corresponding mode even when that command list is not displayed. The commands associated with a menu, on the other hand, are normally only available when the menu is being displayed. For Example, when in the editor mode associated with the command list of FIG. 67 or the key Alpha mode associated with FIG. 72, normally the text editor window will be displayed even though the phone keys have the functional mappings shown in those figures. Normally when in the correction window mode associated with the command list shown in FIG. 69, a correction window is shown on the cellphones display.

Figure 75:
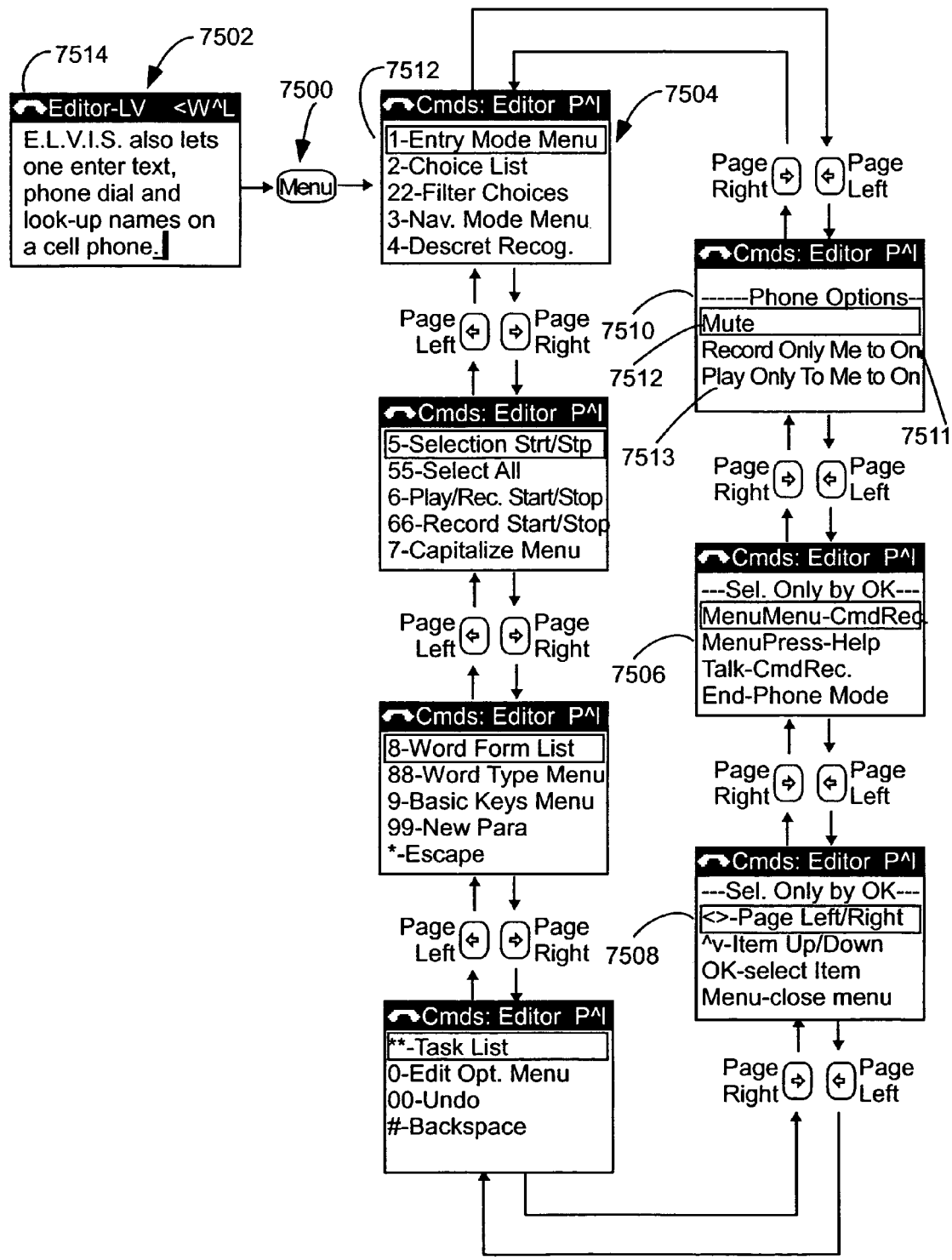
FIG. 75 illustrates how user of the cellphone's text editing software can rapidly see the function associated with one or more keys in a non-menu mode by pressing the menu button and scrolling through a command list that can be used substantially in the same manner as a menu of the type shown in FIG. 64.

In all these modes, the user can access the command list to see the current phone key mapping, as illustrated in FIG. 75, by merely pressing the menu key, as indicated by the numerals 7500 in that figure. In the example of FIG. 75, a display screen 7502 shows a window of the editor mode before the pressing of the Menu button. When the user presses the Menu button, the first page of the editor command list is shone, as indicated by 7504, the user then has the option of scrolling up or down in the command list to see not only the commands that are mapped to the numerical phone keys but also the commands mapped to the "Menu", "Talk" and "End" key, as shown in screen 7506, as well as the navigational key buttons, "OK", and "Menu" buttons, as shown in screen 7508 As shown in screen 7510, if there are additional options associated with the current mode at the time the command list is entered, they can also be selected from the command list by means of scrolling the highlight 7512 and using the "OK" key. In the example shown in FIG. 75 a phone call indicator 7514 having the general shape of a telephone handset is indicated at the left of each title bar to indicate to the user that the cellphone is currently in a telephone call. In this case extra functions are available in the editor that allow the user to quickly select to mute the microphone of the cell found, to record only audio from the user side of the phone conversation and to play the playback only to the user side of the phone conversation.

FIGS. 76 through 78 provide a more detailed pseudocode description of the functions of the editor mode than is shown by the command listings shown in FIGS. 67 and 75. This pseudocode is represented as one input loop 7602 in which the editor responds to various user inputs.

If the user inputs one of the navigational commands indicated by numeral 7603, by either pressing one of the navigational keys or speaking a corresponding navigational command, the functions 7604 through 7627 shown indented under that command in FIG. 76 are performed.

Function 7604 tests to see if the editor is currently in word/line navigational mode. This is the most common mode of navigation in the editor, and it can be quickly selected by pressing the "3" key twice from the editor. The first press selects the navigational mode menu shown in FIG. 70 and the second press selects the word/line navigational mode from that menu. If the editor is in word-line mode function 7606 through 7624 are performed.

If the navigational input is a Word-Left or Word-Right command, function 7606 causes function 7608 through 7617 to be performed. Functions 7608 and 7610 test to see if extended selection is on, and if so, they move the cursor one word to the left or right, respectively, and extend the previous selection to that word. If extended selection is not on, function 7612 causes functions 7614 to 7617 to be performed. Functions 7614 and 7615 test to see if either the prior input was a Word Left/Right command of a different direction than the current command or if the current command would put the cursor before or after the end of text. If either of these conditions is true, the cursor is placed to the left or right out of the previously selected word, and that previously selected word is unselected. If the conditions in the test of function 7614 are not met then function 7617 will move the cursor one word to the left or the right out of its current position and make the word that has been moved to the current selection.

The operation of function 7612 through 7617 enable Word Left and Word Right navigation to allow a user to not only move the cursor by a word but also to select the current word at each move if so desired. It also enables the user to rapidly switch between a cursor that corresponds to a selected word and a cursor that represents an insertion point before or after a previously selected word.

If the user input has been a line up or a line down command, function 7620 moves the cursor to the nearest word on the line up or down from the current cursor position, and if extended selection is on, function 7624 extends the current selection through that new current word.

As indicated by the line 7626, the editor also includes programming for responding to navigational inputs when the editor is in other navigation modes that can be selected from the edit navigation menu shown in FIG. 70.

If the user selects "OK" either by pressing the button or using voice command, function 7630 tests to see if the editor has been called to enter text into another program, such as to enter text into a field of a Web document or a dialog box, and if so function 7632 enters the current context of the editor into that other program at the current text entry location in that program and returns. If the test 7630 is not met, function 7634 exits the editor saving its current content and state for possible later use.

If the user presses the Menu key when in the editor, function 7638 calls the displayMenu routine for the editor commands which causes a command list to be displayed for the editor as has been described above with regard to FIG. 75. As has been described above, this allows the user to scroll through all the current command mappings for the editor mode within a second or two. If the user double-clicks on the Menu key when in the editor, functions 7642 through 7646 call displayMenu to show the command list for the editor, set the recognition vocabulary to the editor's command vocabulary, and perform command speech recognition using the last press of the double-click to determine the duration of that recognition.

If the user makes a sustained press of the menu key, function 7650 enters help mode for the editor. This will provide a quick explanation of the function of the editor mode and allow the user to explore the editor's hierarchical command structure by pressing its keys and having a brief explanation produced for the portion of that hierarchical command structure reached as a result of each such key pressed.

If the user presses the Talk button when in the editor, function 7654 turns on recognition according to current recognition settings, including vocabulary and recognition duration mode. The talk button will often be used as the major button used for initiating speech recognition in the cellphone embodiment.

If the user selects the End button, function 7658 goes to the phone mode, so as to enable the user to quickly make or answer a phone call. It saves the current state of the editor so that the user can return to it when such a phone call is over.

A shown in FIG. 77, if the user selects the entry mode menu, illustrated in FIG. 68, while in edit mode, function 7702 causes that menu to be displayed. As will be described below in greater detail, this menu allows the user to quickly select between dictation modes somewhat as buttons 1122 through 1134 shown in FIG. 11 did in the PDA embodiment. In the embodiment shown, the entry mode menu has been associated with the "1" key because of the "1" key's proximity to the talk key. This allows the user to quickly switch dictation modes and then continue dictation using the talk button.

If the user selects "choice list," functions 7706 and 7708 set the correction window navigational mode to be page/item navigational mode, which is best for scrolling through and selecting recognition candidate choices. They then can call the correction window routine for the current selection, which causes a correction window somewhat similar to the correction window 1200 shown in FIG. 12 to be displayed on the screen of the cellphone. If there currently is no selection, the correction window will be called with an empty selection. A correction window starting with an initially empty selection can be used to select one or more words using alphabetic input, word completion, and/or the addition of one or more utterances. Once such one or more words are selected in such a correction window, they will be inserted into text at the location of the originally empty cursor.

The correction window routine will be described in greater detail below.

If the user selects "filter choices" such as by double-clicking on the "2" key, function 7712 through 7716 set the correction window navigational mode to the word/character mode used for navigating in a first choice or filter string. They than call the correction window routine for the current selection and treat the second press of the double-click, if one has been entered, as the speech key for recognition duration purposes.

In most cellphones, the "2" key is usually located directly below the navigational key. This enables the user to navigate in the editor to a desired word or words that need correction and then single press the nearby "2" key to see a correction window with alternate choices for the selection, or to double-click on the "2" key and immediately start entering filtering information to help the recognizer selects a correct choice.

If the user selects the navigational mode menu shown in FIG. 70, function 7720 causes it to be displayed. As will be described in more detail below, this function enables the user to change the navigation that is accomplished by pressing the Left and Right and the Up and-Down navigational buttons. In order to make such changes more easy to make, the navigational button has been placed in the top row of the numbered phone keys, close to the navigation buttons.

If the user selects the discrete recognition input by pressing the "4" botton, function 7724 turns on discrete recognition according to the current vocabulary using the press-And-Click-To-Utterance-End duration mode as the current recognition duration setting. This button is provided to enable the user to quickly shift to discrete utterance recognition whenever desired by the pressing of the "4" button. As has been stated before, discrete recognition tends to be substantially more accurate than continuous recognition, although it is more halting. The location of this commands key has been selected to be close to the talk button and the "1" key, which serves in the editor as the entry mode menu button. Because of the availability of the discrete recognition key, the recognition modes normally mapped to the Talk button will be continuous. Such a setting allows the user to switch between continuous and discrete recognition by altering between pressing the Talk button and the "4" key.

If the user selects selections start or selections stop as by toggling the "5" key, function 7728 toggles extended selection on and off, depending on whether that mode was currently on or off. Then function 7730 tests to see whether extended selection has just been turned off and if so, function 7732 de-selects any prior selection other than one, if any, at the current cursor. In the embodiment described, the "5" key is selected for the extended selection command because of its proximity to the navigational controls and the "2" key which is used for bringing up correction windows.

If the user chooses the select all command, such as by double-clicking on the "5" key, function 7736 selects all the text in the current document.

If the user selects the "6" key or any of the associated commands which are currently active (which can include play start, play stop, or records stop), function 7740 tests to see if the system is currently not recording audio. If so, function 7742 toggles between an audio play mode and a mode in which audio play is off. If the cellphone is currently on a phone call and the play only to me option 7513 shown in FIG. 75 has been set to the off mode, function 7746 sends audio from the play over the phone line to the other side of the phone conversation as well as to the speaker or headphone of the cellphone itself.

If, on the other hand the system is recording audio when the "6" button is pressed, function 7750 turns recording off.

If the user double-click on the "6" key or enters a record command, function 7754 turns audio recording on. Then function 7756 tests to see if the system is currently on a phone call and if the Record-Only-Me setting 7511 shown in FIG. 75 is in the off state. If so, function 7758 records audio from the other side of the phone line as well as from the phone's microphone or microphone input jack.

If the user presses the "7" key or otherwise selects the capitalized menu command, function 7762 displays a capitalized menu that offers the user the choice to select between modes that cause all subsequently entered text to be either in all lowercase, all initial caps, or all capitalized. It also allows the user to select to change one or more words currently selected, if any, to all lowercase, all initial caps, or all capitalized form.

If the user double-clicks on the "7" key or otherwise selects the capitalized cycle key, the capitalized cycle routine which can be called one or more times to change the current selection, if any, to all initial caps, all capitalized, or all lowercase form.

It the user presses the "8" key or otherwise selects the word form list, function 7770 calls the word form list routine described above with regard to FIG. 27.

If the user double-click on the "8" key or selects the word type command, function 7774 displays the word type menu. The Word Type menu allows the user to select a word type limitations as described above with regard to the filter match routine of FIG. 26 upon a selected word. In the embodiment shown, this menu is a hierarchical menu having the general form shown in FIGS. 91 and 92, which allows the user to specify word ending types, word start types, word tense types, word part of speech types and other word types such as possessive or non-possessive form, singular or plural nominative forms, singular or plural verb forms, spelled or not spelled forms and homonyms, if any exist.

As shown in FIG. 78, if the user presses the "9" key or selects the "Basic Key's Menu" command, function 7802 displays the basic key's menu shown in FIG. 73, which allows the user to select the entry of one of the punctuation marks or input character that can be selected from that menu as text input.

If the user double-clicks on the "9" key or selects the "New Paragraph" Command, function 7806 enters a New Paragraph Character into the editor's text.

If the user selects the "*" key or the "Escape" command, functions 7810 to 7824 are performed. Function 7810 tests to see if the editor has been called to input or edit text in another program, in which case function 7812 returns from the call to the editor with the edited text for insertion to that program. If the editor has not been called for such purpose, function 7820 prompts the user with the choice of exiting the editor, saving its contents and/or canceling escape. If the user selects to escape, functions 7822 and 7824 escape to the top level of the phone mode described above with regard to FIG. 63. If the user double-clicks on the "*" key or selects the—"Task List" function, function 7828 goes to the task list, as such a double-click does in most of the cellphone's operating modes and menus.

It the user presses the "0" key or selects the "Edit Options Menu" command, function 7832 calls the edited options menu described above briefly with regard to FIG. 74. If the user double-clicks on the "0" key or selects the "Undo" command, function 7836 undoes the last command in the editor, if any.

It the user presses the "#" key or selects the "Backspace" command, function 7840 tests to see if there's a current selection. If so, function 7842 deletes it. If there is no current selection and if the current smallest navigational unit is a character, word, or outline item, functions 7846 and 7848 delete backward by that smallest current navigational unit.

FIGS. 79 and 80 illustrate the options provided by the Entry Mode menu discussed above with regard to FIG. 68.

When in this menu, if the user presses the "1" key or otherwise selects "Large Vocabulary Recognition", functions 7906 through 7914 are performed. These set the recognition vocabulary to the large vocabulary. They treat the press of the "1" key as a speech key for recognition duration purposes. They also test to see if a correction window is displayed. If so, they set the recognition mode to discrete recognition, based on the assumption that in a correction window, the user desires the more accurate discrete recognition. They add any new utterance or utterances received in this mode to the utterance list of the type described above, and they call the displayChoiceList routine of FIG. 22 to display a new correction window for any re-utterance received.

In the cellphone embodiment shown, the "1" key has been selected for large vocabulary in the entry mode menu because it is the most common recognition vocabulary and thus the user can easily select it by clicking the "1" key twice from the editor. The first click selects the entry mode menu and the second click selects the large vocabulary recognition.

If the user presses the "2" key when in entry mode, the system will be set to unambiguous letter-name recognition of the type described above. If the user double-clicks on that key when the entry mode menu is displayed at a time when the user is in a correction window, function 7926 sets the recognition vocabulary to the letter-name vocabulary and indicates that the output of that recognition is to be treated as an ambiguous filter. In the preferred embodiment, the user has the ability to indicate under the entry preference option associated with the "9" key of the menu, shown in FIG. 80, whether or not such filters are to be treated as ambiguous length filters or not. The default setting is to let such recognition be treated as an ambiguous length filter in continuous letter-name recognition, and a fixed length ambiguous filter in response to the discrete letter-name recognition.

If the user presses the "3" key, recognition is set to the AlphaBravo mode. If the user double-clicks on the "3" key, recognition is set to the "keyAlpha" mode as described above with regard to FIG. 72. This mode is similar to AlphaBravo mode except that pressing one of the number keys "2" through "9" will cause the user to be prompted to one of the ICA words associated with the letters on the pressed key and recognition will favor recognition of one word from that limited set of ICA words, so as to provide very reliable alphabetic entry even under relatively extreme noise conditions.

It the user presses the "4" key, the vocabulary is changed to the digit vocabulary.

If the user double-clicks on the "4" key, the system will respond to the subsequent pressing of numbered phone keys by entering the corresponding numbers into the editors text.

If the user presses the "5" key, the recognition vocabulary is limited to a punctuation vocabulary.

If the user presses the "6"-key, the recognition vocabulary is limited to the contact name vocabulary described above.

If the user presses the 7 key, the system enters a non-ambiguous phone key spelling mode in which it enables a user to input a sequence of one or more alphabetic characters by pressing a given phone key one or more times for each desired character, with the number of times each key is pressed in quick succession being used to select which of the characters associated with that key is desired.

If the user double-clicks on the "7" key, the system enters ambiguous key recognition in which each press of a phone key having a set of letters associated with it causes entry of an ambiguous character, of the type described above in the filterMatch and filterEdit routines of FIGS. 26 and 28, respectively, which represents any one of the pressed phone key's associated letters.

If the user selects the "8" key, the system toggles between continuous and discrete recognition. Preferably, as indicated by functions 8020 and 8026, there is an audio indication at each such change between these recognition modes to indicate to the user which of the modes has been selected, so, if the wrong mode has been selected, the user can correct it merely by pressing the key again.

If the user double-clicks on the "8" key, the system enters a One-At-A-Time mode similar to that described above with regard to the PDA embodiment.

If the user presses the "9" key, the system displays the Entry Preferences menu shown in FIG. 93. As is indicated in that figure, this menu allows the user to select default recognition settings for normal large vocabulary dictation, for the entry of filter strings, and re-utterances. It also allows the user to select the recognition duration mode defaults for dictation, filtering, and reutterances, as well as to select, at the top level of this menu, the temporary duration mode for the current dictation mode.

FIGS. 81 through 83 illustrate the operation of the correction window routine in the disclosed cellphone embodiment.

In this routine, function 8102 sets the recognition mode to that of the current default for filter recognition, since in the correction window the most likely voice input would be that of a filtering string. However, the current vocabulary would normally also include the capability to recognize commands to choose any of the choices currently shown on the choice list by a "choose N" voice command, where N is the number associated with a desired choice, or a "first choice" voice command to select the current first choice.

Next, function 8104 calls the displayChoiceList routine, described above with regard to FIG. 22, for the current selection with which the correction window routine has been called. This causes a correction window to be displayed on the cellphone screen.

Once functions 8102 and 8104 have been performed, an input loop 8106 is performed. In this loop, if the current navigational mode is the page/item mode, the functions 8108 to 1818 respond to navigational input. If the input is a Page Left or Page Right command, function 8114 scrolls the choice list up or down a page, respectively, moving the display list's highlighted choice by one page. If the input is an item up/down command, function 8118 scrolls the highlighted choice up or down, respectively, by one choice, scrolling the screen if necessary to display the highlighted choice after such a move.

If the correction window is in the word/character navigation mode, functions 8120 through 8162 respond to navigational input. If the input is a Word Left or Word Right input, functions 8124 through 8136 are performed.

If there is a first/last character of a word within seven characters to the left or right, respectively, of the filter cursor in the best choice, functions 8124 and 8126 move the filter cursor to that first or last character, and select it. If there is no such word start or word end within such a desired distance, function 8128 tests to see if there is a character 5 characters to the left or right., respectively, of the filter cursor in the best choice. If so, the filter cursor moves to and selects that character.

If the filter cursor is on or after the last character in the best choice and if a scroll would not extend beyond the right-most character of all choices, functions 8132 through 8135 scroll the choice list window horizontally left or right by 5 characters' width. This allows a user to see rightward portions of choices that are longer than the first choice. If a 5 character scroll would extend past the rightmost character in the choice list, function 8136 scroll rightward by the numbers of characters, if any, that would expose rightmost character in choice list.

If the navigational input received when the correction window is in the word/character navigation mode is a Character Up or Character Down input, functions 1844 through 8150 are performed. Function 8144 tests to see if the filter cursor is after the last character in the best choice. If a scroll would not extend beyond the right-most character in all choices, then function 8147 scrolls the choice list window horizontally left or right by one character's width. If the filter cursor is not currently before or after the start of the best choice at the time the navigational input is received, function 8150 moves the filter cursor left or right by one character.

FIG. 81 only describes movement to characters in the current first choice or spaces after it, in which the character moved to is selected by the current cursor after the move. Techniques could easily be designed to allow a user to position a cursor before the first choice or between characters in the first choice if desired. For example, functions 7606 through 7617 of FIG. 76 show how a user can select between cursor movements that selects a word to the left or right, and cursor movements that makes the cursor into a non-selection cursor. In these functions, a non-selection cursor is chosen by a left or right movement immediately followed by the opposite right or left movement, respectively. A similar technique could be used in the correction window if desired.

If a new filter string character has been moved to as a result of functions 8126, 8130, 8147 or 8150, function 8151 causes functions 8152 through 8162 to be performed. Function 8152 calls the filterCharacterChoice routine of FIG. 30 for that character, so as to display a filter choice window for the character's position in the filter string, if that position in the filter string is ambiguous. In the cellphone embodiment, this displays an alphabetized choice list of filter characters corresponding to the selected character in the filter string.

If the choice list has been displayed and any subsequent input is received from the user, function 8153 causes functions 8154 through 8162 to be performed. Function 8154 tests to see if the input is a choice in the filtercharacterchoice window. If so, function 8156 closes the filter choice window, function 8158 calls the filterEdit routine for the change in the filter string caused by the selection of the filter character, which will unambiguously confirm not only the selected filter character but all characters before it in the current first choice word, then function 8160 calls the displayChoiceList routine to display a new correction window with choices limited to the newly edited filter string.

As shown in FIG. 82, if the user presses the "Menu" key, function 8202 calls the displayMenu routine for the correction window's commands. This will cause a display of a command list similar to that shown in FIG. 69. In a manner similar to that shown for the editor mode command list in FIG. 75, this allows the user to quickly see the phone key command mapping available when the correction window is displayed.

As shown in FIG. 82, double-clicking the "Menu" key and pressing it for a sustained period of time has corresponding results as the same inputs do in the editor mode and other menu modes.

Pressing the "Talk" key initiates speech recognition in the correction window according to the current recognition mode, which will normally be the filter entry mode described above with regard to function 8102.

As indicated by functions 8224 through 8232, pressing the "OK" key in the correction window will select the first choice unless another choice is highlighted in that window. As shown by functions 8236 through 8254 near the bottom of FIG. 82, the top row of numbered phone keys performed the same or similar functions in the correction window as they do in the editor mode. In both modes the "1" key displays the entry mode menu. In both modes a single click of the "2" key causes a correction window to be in the page/item navigational mode and a double-click of the "2" key the causes a correction window to be in the word-character navigation mode. And in both modes the "3" key is used for selecting navigational modes.

The operation of the "2" key is somewhat different when in the correction window, since a correction window is already displayed at that time. Pressing the two key once in that mode not only sets the navigational mode for the correction window but also removes the display of any filtercharacterchoice window and also plays the audio of the correction window's selection's first utterance, if there is one.

Pressing the "3" key in the correction window displays the correction navigation mode menu illustrated below with regard to FIG. 85. This menu also allows the user to switch between the two navigation modes most appropriate for the correction window by use of the 2 and 3 keys. But it also allows the user to define how the correction window will respond to the selection of a given recognition choice displayed in the correction window by means of keys 4 through 6. It also allows the user to change the capitalization of, or to cause a Word Form list to be displayed for, the current best choice.

As shown in FIG. 83, if the user inputs a choice number, either by voice command or pressing one of the numbered phone keys corresponding to a choice number, functions 8302 through 8320 are performed.

The Choice Filter Mode is selected by pressing the "5" key in the correction navigation menu shown in FIG. 85. If the correction window is currently in this mode when a choice number is received, functions 8302 and 8304 call the displayChoiceList routine with the choice corresponding to the choice number as the filter string, and sets the correction window's navigation mode to word/character mode if the correction window is not currently in that navigation mode.

The Pre-Choice Filter Mode can be selected by pressing the "4" key in the correction navigation menu of FIG. 85. If, when a choice number is input, the correction window is in the Pre-Choice Filter Mode, function 8308 causes the correction window to enter the word/character navigation mode, if it is not currently in it, and function 8310 calls the displayChoiceList routine with the selected choice as the end of the current filter range and the prior choice as the beginning of the filter range. If the selected choice is the first choice in an alphabetical list of choices, the first entry in the filter range is the start of the alphabet.

If the correction window is in the Post-Choice Filter Mode, which is selected by pressing the "6" key in the correction navigation menu of FIG. 85, functions 8312 through 8316 ensure that the correction window is in the word/character navigation mode appropriate for filter editing, and then call the displayChoiceList routine with the selected choice as the start of the filter range and the next choice or the end of the alphabet as the end of the filter range.

Although not shown in functions 8302 through 8316, the Choice Filter, Pre-Choice Filter, and Post-Choice Filter modes are all exited by the selection of a choice in such a mode or by any input other than the selection of a displayed choice.

If none of the three choice filter modes described in functions 8302 through 8316 are in effect, function 8320 responds to user input of a choice number by returning to the editor and inserting the selected choice at the current selection or cursor.

If the user double-clicks on a choice number, function 8324 causes it to have the same effect as if the user had selected that choice in the choice filter mode described above with regard to function 8302 and 8304. This allows an alternate choice word to be selected as a first choice and then have all or a subset of its letters used as a filter to help rapidly selected a desired word.

If the user single-clicks the "Star" key, function 8328 will escape from the correction window without making any changes to the current selection.

The responses to "*" or the "Task List" command, "0" or the "Edit Options Menu" command, and "00" or the "Undo" command are the same in the correction window as in the editor window.

If the user presses "#" or utters the "Backspace" command function 8350 calls the filterEdit routine of FIG. 28 with any portion of the first choice before the filter cursor as the filter string, with the filter cursor, and with "backspace" as an input. Then Function 8352 calls the displayChoiceList routine of FIG. 22 with the resulting new filter string.

If the user enters one or more filtering characters, either by voice recognition or by having previously temporarily entered one of the entry modes that allow the entry of characters by phone keys, function 8356 calls filterEdit with the current choice, filter string, and filter cursor position, and with the newly entered one or more characters as the new filter choice.

If the user enters a re-utterance, function 8360 adds the new utterance to the current selection's utterance list, and function 8362 calls the displayChoiceList routine of FIG. 22, which, through its call to the getChoices routine of FIG. 23, causes recognition to be performed using both a prior utterance, if any, and the re-utterance for the current selection, and then displays a new correction window with the resulting best choice if any.

FIG., 84 shows the Edit Navigation Menu 8400, which can be entered by pressing the "3" key or saying "Nav. Mode Menu" as indicated in FIG. 77.

When in the Edit Nav. Menu, if the user presses the "1" key or the enters the command "Utterance Start" and if there is a current last utterance, functions 8404-8408 cause the text, if any, corresponding first word in that utterance to be selected as the cursor.

If a user in the Edit Nav Menu presses the "2" key or enters the command "Word/Char", functions 8410 and 8412 change the navigation mode to the Word/Char navigation mode, which responds to Left or Right navigation buttons by moving a Word Left or Right, respectively, and to Up or Down navigational buttons by moving a character left or right, respectively.

If the user presses the "3" key or enters the command "Word/Line", functions 8414 and 8416 change the navigation mode to the Word/Line navigation mode, which responds to Left or Right navigation buttons by moving a word left or right, respectively, and to Up or Down navigational buttons by moving a line up or down, respectively.

If the user presses the "4" key or enters the command "Doc/Screen", functions 8418 and 8420 change the navigation mode to the Doc/Screen navigation mode, which responds to Left or Right navigation buttons by moving to the last or next start or end of a document, respectively, and to Up or Down navigational buttons by moving up-or down a screen, respectively.

If the user presses the "5" key or enters the command "Outline Level/Item", functions 8422 and 8424 change the navigation mode to the Outline Level/Item navigation mode, which responds to Left or Right navigation buttons by moving to the last parent item or next child item, respectively, in an outline, and to up or down navigational buttons by moving up or down an item at the current level.

If a User in the Edit Nav Menu presses the "6" key or enters the command "Audio Item/5 sec", functions 8426 through 8430 set the display of sound waveforms to high resolution and change the navigation mode to the Audio Item/5 second navigation mode, which responds to Left or Right navigational buttons by moving to the last or next start or end of a recorded audio item, respectively, and to up or down navigation buttons by skipping forward or backward 5 seconds in recorded audio, respectively.

If the user double presses the "6" key or enters the command "Audio Item/30 sec", functions 8432 through 8436 set the display of sound waveforms to low resolution and change the navigation mode to the Audio Item/30 second navigation mode, which responds to Left or Right navigational buttons by moving to the last or next start or end of a recorded audio item, respectively, and to Up or Down navigation buttons by skipping forward or backward 30 seconds in recorded audio, respectively.

If the user presses the "7" key or enters the command "Undo List/Item", functions 8438 and 8440 change the navigation mode to the Undo List/Item navigation mode, which responds to Left or Right navigation buttons by moving to the start or end of the undo list, respectively, and to Up or Down buttons by moving to the last or next item in the undo list, respectively. This form of navigation is used to allow a more flexibility in selecting of which commands to undo.

If the user presses the "8" key or enters the command "File Lev/Item", functions 8442 and 8444 change the navigation mode to the File Lev/Item navigation mode, which responds to Left or Right navigation buttons by moving to the last parent level or next child level, if any, in the directory structure, respectively, and to up or down navigational buttons by moving up or down an item at the current level (i.e., in the current file directory). This form of navigation is used to allow a user to navigate a file structure on the cellphone.

If a user in the Edit Nav Menu presses the "9 key or enters the command "Utterance End", if there is a current last utterance, functions 8448 and 8450 select as the cursor the text corresponding to the last word in that utterance, and then return.

If the user presses the "*" key or enters the command "Escape", functions 8452 and 8454 return to the editor window.

If the user double presses the "*" key or enters the command "Task List", functions 8456 and 8458 go to the Task List routine.

FIG. 85 illustrates the Correction Navigation Menu that is accessed by pressing the "3" key when in the correction window, as discussed above with regard to function 8254 of FIG. 82.

If a user in the Correction Navigation Menu presses the "2" key or enters the command "Page/Item", functions 8504 and 8506 change the navigation mode to the Page/Item navigation mode, which responds to Left or Right navigation buttons by moving up or down a page in the current choice list, respectively, and to Up or Down navigational buttons by moving up or down an individual choice in the current choice list, respectively.

If the user double presses the "2" key, presses the "3" key, or enters the command "Word/Char", functions 8508 and 8510 change the navigation mode to the Word/Char navigation mode, which responds to Left or Right navigation buttons by moving a word left or right, respectively, and to Up or Down navigational buttons by moving a character left or right, respectively.

If the user presses the "4" key or enters the command "Pre-Choice Filter", functions 8516 through 8520 set the Correction Window to Pre-Choice Filter Mode and change the navigation mode to the Page/Item mode, described above with regard to functions 8504 and 8506. As was stated above with regard to functions 8306 through 8310 of FIG. 83, the Pre-Choice Filter mode allows a user to select an alphabetic filter range between two adjacent words on a choice list.

If the user presses the "5" key or enters the command "Choice Filter", functions 8522 through 8526 set the Correction Window to Choice Filter Mode and change the navigation mode to the Page/Item mode. As was stated above with regard to functions 8302 and 8304, the Choice Filter mode allows a user to select an alternate choice to be the first choice and the current filter string. Once such a choice is made the user can edit the filter string if only certain characters in the selected word are in the desired word.

If the user presses the "6" key or enters the command "Post-Choice Filter", functions 8528 through 8532 set the Correction Window to Post-Choice Filter Mode and change the navigation mode to the Page/Item mode. As was stated above with regard to functions 8312 through 8316 of FIG. 83, the Post-Choice. Filter mode, like the Pre-Choice Filter Mode, allows a user to select an alphabetic filter range between two adjacent words on a choice list.

Each time a user in the Correction Navigation Menu presses the "7" key or enters the command "Capitalize", functions 8534 and 8536 cause the current choice to progress one stage through the capitalization cycle, which changes to initial caps, all caps, and then no caps.

If a user in the Correction Navigation Menu presses the "8" key or enters the command "Word Form List", functions 8538 and 8540 cause the word form list to be displayed for the current choice.

The "Escape" and "Task List" commands function substantially the same in the Correction Navigation Menu as in most other menus.

FIG. 86 illustrates the keyAlpha mode which has been described above to some extent with regard to FIG. 72. As indicated in FIG. 86, when this mode is entered the navigation mode is set to the word/character navigation mode normally associated with alphabetic entry. Then function 8604 overlays the keys listed below it with the functions indicated with each such key. In this mode, pressing the Talk key turns on recognition with the AlphaBravo vocabulary according to current recognition settings and responding to the key press according to the current recognition duration setting.

The "1" key continues to operate as the entry edit mode key so the user can press it to exit the keyAlpha mode.

A pressing of the numbered phone keys "2" through "9" causes functions 8618 through 8624 to be performed during such a press. Function 8618 displays a prompt of the ICA words corresponding to the phone key's letters. Function 8620 substantially limits the recognition vocabulary to one of the three or four displayed ICA words. Function 8622 turns on recognition for the duration of the press. And Function 8624 outputs the letter corresponding to the recognized ICA word either into the text of the editor, if in editor mode, or into the filter string, if in filterEdit mode.

If the user presses the "0" button, function 8628 enters a key punctuation mode that responds to the pressing of any phone key having letters associated with it by displaying a scrollable list of all punctuation marks that start with one of the set of letters associated with that key, and which favors the recognition of one of those punctuation words.

If a user in the KeyAlpha mode double presses "0" button or enters the "Space" command, function 8632 will output a space.

If the user press the "#" key or enters the "Backspace" command, function 8636 tests to see if there is a current selection. If so, function 8638 deletes that selection. If not, Functions 8640 and 8642 test to see if the current smallest navigational unit associated with a navigational key is a character, word, or outline item, and if so, it deletes the last such unit before the current cursor position.

FIG. 87 represents an alternate embodiment of the keyAlpha mode, which is identical to that of FIG. 86 except for portions of the pseudocode which are underlined in FIG. 87. In this mode, if the user presses the Talk button, large vocabulary recognition will be turned on but only the initial letter of each recognized word will be output, as indicated in function 8608A. As functions 8618A and 8620A indicate, when the user presses a phone key having a set of three or four letters associated with it, the user is prompted to say a word starting with the desired letter and the recognition vocabulary is substantially limited to words that start with one of the key's associated letters, and function 8624A outputs the initial letter corresponding to the recognized word.

FIG. 88 represents a second alternate embodiment of the keyAlpha mode, which is identical to that of FIG. 86 except for portions of the pseudocode that are underlined in FIG. 88. As is indicated in FIG. 88, in this second alternative a limited set of words is associated with each letter of the alphabet and during the pressing of the key, recognition is substantially limited to recognition of the set of words associated with the key's associated letters. In some such embodiments, a set of five or fewer words would be associated with each such letter.

FIGS. 89 and 90 represent some of the options available in the Edit Options Menu, which is accessed by pressing the 0 button in the editor and correction window modes.

In this menu, if the user presses the "1" key, he gets a menu of file options as indicated at function 8902. If the user presses the "2" key, he gets a menu of edit options, such as those that are common in most editing programs, as indicated by function 8904. If the user presses the "3" button, function 8906 displays the same entry preference menu that is accessed by pressing a "9" in the entry mode menu described above with regard to FIGS. 68 and 80.

If the user presses the "4" key when in the edit options menu, a text-to-speech or TTS menu will be displayed. In this menu, the "4" key toggles TTS play on or off.

The TTS submenu also includes a choice, selected by pressing the "5" key, that allows the user to play the current selection whenever he or she desires to do so, as indicated by functions 8924 and 8926.

The Submenu also includes functions 8928 and 8930, which are selected by pressing the "6" key, that allow the user to toggle continuous TTS play on or off. This causes TTS speech synthesis to start at the start of the current cursor and continue until the end of the current document, independently of the state of TTS playback that has resulted from functions 8910 through 8912.

As indicated by the top-level choices in the edit options menu at 8932, a double-click of the "4" key toggles text-to-speech on or off, just as if the user had pressed the "4" key, then waited for the text-to-speech menu to be displayed and then again pressed the "4" key.

The "5" key in the Edit Options Menu selects the outline menu that includes a plurality of functions that let a user navigate in, and expand and contract, headings in an outline mode. If the user double-clicks on the "5" key, the system toggles between totally expanding and totally contracting the outline element in which the editor's cursor is currently located.

If the user selects the "6" key an audio menu is displayed as a submenu, some of the options of which are displayed indented under the audio menu item 8938 in the combination of FIGS. 89 and 90.

If a user selects the Audio Navigation option 8940 of the audio menu by pressing the "1" key, an Audio Navigation sub-menu will be displayed which includes options 8942 through 8948 which allow the user more ways navigate with the navigation keys in audio recordings than are provided by the options 8426 and 8432 shown FIG. 84.

If the user selects the Playback Settings option by pressing the "2" key, he or she will see a submenu that allows adjustment of audio playback settings, such as volume and speed and whether audio associated with recognized words and/or audio recorded without associated recognized words is to be played.

FIG. 90 starts with options selected by the "3", "4", "5", "6" and "7" keys under the audio menu described above, which is displayed in response to selection of the Audio Menu option 8938 in FIG. 89.

If the user presses the "3" key, a recognized audio options dialog box 9000 will be displayed that, as is described by numerals 9002 through 9014, gives the user the option to select to perform speech recognition on any audio contained in the current selection in the editor, to recognize all audio in the current document, to decide whether or not previously recognized audio is to be re-recognized, and to set parameters to determine the quality of, and time required by, such recognition. As indicated at line 9012 and 9014, this dialog box provides an estimate of the time required to recognize the current selection with the current quality settings and, if a task of recognizing a selection is currently underway, status on the current job. This dialog box allows the user to perform recognitions on relatively large amounts of audio as a background task or at times when a phone is not being used for other purposes, including times when it is plugged into an auxiliary power supply.

If the user selects the delete from selection option by pressing the "4" key in the audio menu, the user is provided with a submenu that allows him to select to delete certain information from the current selection. This includes allowing the user to select to delete all audio that is not associated with recognized words, to delete all audio that is selected with recognized words, to delete all audio, or to delete text from the desired selection. Deleting recognition audio from recognized text greatly reduces the memory associated with the storage of such text and is often a useful thing to do once the user has decided that he does not need the text-associated audio to help him her determine its intended meaning. Deleting text but not audio from a portion of media is often useful where the text has been produced by speech recognition from the audio but is sufficiently inaccurate to be of little use.

In the audio menu, the "5" key allows the users to select whether or not text that has associated recognition audio is marked, such as by underlining to allow the user to know if such text has playback that can be used to help understand it or, in some embodiments, will have an acoustic representation from which alternate recognition choices can be generated.

The "6" key allows the user to choose whether or not audio against which speech recognition has been performed is to be kept in recorded form in association with the resulting recognized text. In many embodiments, even if the recording of recognition audio is turned off, such audio will be kept for some number of the most recently recognized words so that it will be available for possible correction playback and re-utterance recognition.

As indicated by numeral 9030, in the audio menu, the "7" key selects a transcription mode dialog box. If this input is selected a transcription mode dialog box is displayed, that allows the user to select settings to be used in a transcription mode that is described below with regard to FIG. 96. This is a mode that is designed to make it easy for user to transcribe pre-recorded audio by speech recognition.

The "7" pointed to by the numeral 9032 can be selected directly from the Edit Options Menu, unlike the "7" described in the paragraph above, which is selected from the Audio Menu, which itself is a submenu of the Edit Options Menu. This difference is indicated by the different level of indentation of the two "7"s.

Pressing the "7" key pointed to by numeral 9032 selects the User Menu option. If this option is selected a User Menu is displayed which presents information and choices relating one or more users of the cellphone.

If the user presses the "8" key, function 9036 will be performed. It calls a search dialog box with the current selection, if any, as the default search string. As will be illustrated below, the speech recognition text editor can be used to enter a different search string, if so desired.

If the user double-clicks on the "8" key, this will be interpreted as a find again command, which will search again for the last search string for which a search was performed using the search dialog box.

If the user selects the "9" key in the edit options menu, a vocabulary menu is displayed that allows the user to determine which words are in the current vocabulary, to select between different vocabularies, and to add words to a given vocabulary.

If the user either single or double-presses the "0" button when in the edit options menu, an undo function will be performed, that in many cases will undo the last command. A double click of the "0" key accesses the undo function from within the edit options menu to provide similarity with the fact that a double-click on "0" accesses the undo function from the editor or the correction window.

In the edit options menu, the "#" key operates as a redo button.

FIGS. 91 and 92 illustrate the Word Type Menu 9100, which is accessed by pressing the "8" key in Editor Mode, as shown in FIG. 77.

If the user enters the Word Type Menu, function 9102 tests whether the current selection is a multi-word selection. If so, function 9104 prompts the user that word type filtering only works on single word selections and returns to the mode from which the Word Type Menu was called. If the current selection is a single word, function 9106 changes the active vocabulary while in the Word Type Menu to the names of commands available in that menu. Then function 9108 responds to a user selection of one of the phone keys.

If the user presses "1" in the Word Type Menu, function 9112 displays a Word-Ending sub-menu that allows a user to select a given word ending, which cause the currently selected word to be changed to a corresponding word having the selected given ending either added or removed. For example, if the user presses the "6" key when in this word ending sub-menu, if the current selection ends in "ly", the "ly" ending will be removed, and if it does not terminate with an "ly" ending, that ending will be added.

If the user presses "2" when in the Word Type Menu, function 9132 displays a prefix sub-menu that allows a user to select to change the currently selected word to a corresponding word having a selected prefix either added or removed.

If the user presses "3", function 9140 displays a Word Tense sub-menu that allows a user to select to change the currently selected word to a corresponding word having a selected tense.

If the user presses "4", function 9202 displays a Part-of-Speech sub-menu that allows a user to display a new choice list for the recognition of the select word in which all the choices are limited to the part-of-speech selected in that sub-menu. For example, if the system misrecognized "and" as "an", pressing 7 in this submenu would limit recognition of the current word to words that were conjunctions, and, thus, would virtually insure than "and" would be a displayed word choice.

If the user, when in the Word Type Menu of FIGS. 91 and 92, presses "5", function 9224 changes the currently selected word to possessive form if it is non-possessive, and to a non-possessive form if it is in possessive form.

If the user presses "6", function 92268 changes the currently selected word to plural form if it is singular, and to a singular form if it is plural.

If the user presses "7", function 9232 changes the form of a currently selected verb to plural form if it is singular, and to a singular form if it is plural.

If the user, in the Word Type Menu of FIGS. 91 and 92, presses "8", function 9236 changes the currently selected word to a spelled form if it is currently non-spelled, and to a non-spelled form if it is spelled. For example, this would change the word "period" to ".", the mark "," to "comma", and the word "three" to "3".

If the user presses "9", functions 9240 through 9246 are performed. If the currently selected word has only one homonym, functions 9240 and 9242 cause it to be replaced by that one homonym. If the currently selected word has multiple homonyms, functions 9244 and 9246 display a correction window that lists the current word as the first choice and its homonyms and alternate forms of the selected word, such as corresponding numerals or punctuation marks, as alternate choices. If the word has no homonyms, no change will be made.

In the Word Type Menu, and almost all other menus the key can be used to exit the menu and return to the mode from which the menu was called.

FIG. 93 describes the Entry Preference Menu 9300 which can be entered by pressing the "9" key in the Entry Mode Menu described above with regard to FIGS. 79 and 80.

In this menu, pressing the "1", "2", and "3" phone keys will cause a respective submenu to be displayed.

In the Entry Preference Menu pressing "1" causes the Dictation Defaults submenu to be displayed. This displays menu options that allow a user to set default attributes for normal dictation. These are the attributes that will be applied to dictation each time dictation mode is entered, until or unless the user first changes such attributes or changes the default values for such attributes. The attributes that can be set by this menu include whether the default dictation mode is continuous or discrete dictation; whether One-At-A-Time discrete dictation is performed, in which a correction window is displayed after the recognition of each word; and the recognition duration modes to be used as the current default for dictation.

Pressing "2" causes the Filter Defaults submenu to be displayed. This displays menu options that allow a user to set various settings to be used as defaults for the entering of filter strings in the correction window. These include whether the default filter entry dictation mode is continuous, discrete, discrete One-At-A-Time, letter name, ambiguous letter name, or KeyAlfpha dictation; and what recognition duration mode is to be used as the current default for dictation.

Pressing "3" causes the Reutterance Defaults submenu to be displayed. This displays menu options that allow a user to set various settings to be used as defaults for use in reutterance recognition. These include whether such recognition is continuous or discrete and the recognition duration mode to be used as the default for such recognition.

In the Entry Preference Menu the phone keys "4" through "8" are used to set the current recognition duration modes, as opposed to the default recognition duration modes described above with regard to the pressing of keys "1" through "3". Pressing "4" sets the current recognition duration mode to Press-Only; pressing "5" sets it to Press-&-Click-To-Utterance-End; pressing "6" to Press-Continuous,-Click-Discrete-To-Utterance-End mode, and "7" to Click-To-Timeout-mode. Pressing "8" displays a dialog box for setting the length of the timeout duration that is used in the Click-To-Timeout mode.

FIG. 94 illustrates the text-to-speech or "TTS" play rules. These are the rules that govern the operation of TTS generation of speech from text when TTS "on" operation has been selected through the text-to-speech options described above with regard to function 8912 or 8932 of FIG. 89.

If a TTS keys mode has been turned on by pressing the 1 key in the TTS Menu, as indicated by function 8909 of FIG. 89, function 9404 of FIG. 94 causes functions 9406 to 9414 to provide text-to-speech or recorded audio feedback on the identity and function of each key that is pressed, so as to enable a user to safely select phone keys without being able to see them, such as when driving a car. Preferably this mode is not limited to operation in the speech recognition editor but can also be used in any mode of the cellphone's operation.

When any phone key is pressed when TTS Keys mode is on, function 9408 tests to see if the same key has been pressed within a TTS KeyTime, which is a short period of time such as a quarter or a third of a second. For purposes of this test, the time is measured since the release of the last key press of the same key. If the same key has not been pressed within that short period of time, functions 9410 and 9412 cause a text-to-speech or, in some embodiments, a recorded utterance of the number of the key and its current command name. This audio feedback continues only as long as the user continues the press the key. If the key has a double-click command associated with it, it also will be said if the user continues to press the key long enough. If the test of function 9408 finds that the time since the release of the last key press of the same key is less than the TTS key time function 9414 the cellphone's software responds to the key press, including any double-clicks, the same as it would as if the TTS key mode were not on.

Thus it can be seen that the TTS keys mode allows the user to find a cellphone key by touch, to press it to hear if it is the desired key and, if so, to quickly press it again one or more times to achieve the key's desired function. Since the press of a key that is responded to by functions 9410 and 9412 does not cause any response other than the saying of the key's name and associated function, this mode allows the user to search for the desired key without causing any undesired consequences.

In some cellphone embodiments, the cellphone keys can be designed to sense when they are merely being touched separately from when they are being pushed. In such embodiments the TTS Keys mode could be used to provide audio feedback as to which key is being touched and its current function, similar to the feedback provided by function 9412 of FIG. 94. Such touch sensitivity can be provided, for example, by having the outer surface of the phone keys made of conductive material, and by having other portions of the phone separated from those keys generate a voltage that if conducted through a user's body to a key, can be detected by circuitry associated with the key. Such a system would provide an even faster way for a user to find a desired key by touch, since with it a user could receive feedback as to which keys he was touching merely by scanning a finger over the keypad in the vicinity of the desired key without having to first press a key to hear its name. It would also allow a user to rapidly scan for a desired command name by likewise scanning his fingers over successive keys until the desired command was found.

When TTS is on, if the system recognizes or otherwise receives a command input, functions 9416 and 9418 cause TTS or recorded audio playback to say the name of the recognized or otherwise received command. Preferably such audio confirmations of commands have a sound quality, such as a different tone of voice or different associated sound, that distinguishes the saying of command words from the saying of recognized text.

When TTS is on, when a text utterance is recognized, functions 9420 through 9424 detect the end of the utterance, and the completion of the utterance's recognition and then use TTS to say the words that have been recognized as the first choice for the utterance.

As indicated in functions 9426 through 9430, when TTS is on, it responds to the recognition of a an utterance corresponding to a string of characters, such as one entering a filter string, by waiting until the end of that utterance and then using TTS to say the letters recognized for it.

When in TTS, if the user moves the cursor to select a new word or character, functions 9432 to 9438 use TTS to say that newly selected word or character. If such a movement of a cursor to a new word or character position extends an already started selection, after the saying of the word or character corresponding to the new cursor position, functions 9436 and 9438 will say the word "selection" in a manner that indicates that it is not part of recognized text, and then proceed to say the words of the current selection. If the user moves the cursor so it becomes a non-selection cursor, such as is described above with regard to functions 7614 and 7615 of FIG. 76, functions 9440 and 9442 of FIG. 94 use TTS to say a message informing the user of the two words cursor is between.

When in TTS mode, if a new correction windows is displayed, functions 9444 and 9446 use TTS to say the first choice in the correction window, then spell the current filter string if any, indicating which parts of it are unambiguous and which parts of it are ambiguous, and then use TTS to say each candidate in the currently displayed portion of the choice list. For purposes of speed, it is best that differences in tone or sound be used to indicate which portions of the filter are absolute or ambiguous.

If the user scrolls an item in the correction window, functions 9448 and 9450 use TTS to say the currently highlighted choice and its selection number in response to each such scroll. If the user scrolls a page in a correction window, functions 9452 and 9454 use TTS to say that newly displayed choices as well, as indicating which of them is the currently highlighted choice.

When in TTS mode, if the user enters a menu, functions 9456 and 9458 use TTS or recorded audio to say the name of the current menu and all of the choices in the menu and their associated numbers, indicating the current selection position. Preferably this is done with audio cues that indicate to a user that the words being said are menu options.

If the user scrolls up or down an item in a menu, functions 9460 and 9462 use TTS or pre-recorded audio to say the highlighted choice and then, after a brief pause, any following selections on the currently displayed page of the menu.

FIG. 95 illustrates some aspects of the programming used in TTS generation.

If a word to be generated by text-to-speech is in the speech recognition programming's vocabulary of phonetically spelled words, function 9502 causes functions 9504 through 9512 to be performed. Function 9504 tests to see if the word has multiple phonetic spellings associated with different parts of speech, and if it has a current linguistic context indicating its current part of speech. If both these conditions are met, function 9506 uses the speech recognition programming's part-of-speech-indicating code to select the phonetic spelling for the word that is associated with the part of speech found most probable by that part-of-speech-indicating code as the phonetic spelling to be used in the TTS generation for the current word.

If, on the other hand, there is only one phonetic spelling associated with the word or there is no context sufficient to identify the most probable part of speech for the word, function 9510 selects the single phonetic spelling for the word or the word's most common phonetic spelling. Once a phonetic spelling has been selected for the word to be generated either by function 9506 or function 9510, function 9512 uses the phonetic spelling selected for the word as a phonetic spelling to be used in the TTS generation. If, as is indicated at 9514, the word to be generated by text-to-speech does not have a phonetic spelling, function 9514 and 9516 use pronunciation guessing software that is used by the speech recognizer to assign a phonetic spelling to names and newly entered words for the text-to-speech generation of the word.

FIG. 96 describes the operation of the transcription mode that can be selected by operation of the transcription mode dialog box that is activated by pressing the "7" key to select option 9030 under the Audio Menu submenu of the Edit Options Menu described above in association with FIG. 90.

This mode is used to make is easier for a user to transcribe a portion of pre-recorded audio by means of speech recognition.

When the transcription mode is entered, function 9602 normally changes navigation mode to an audio navigation mode that navigates forward or backward five seconds in an audio recording in response to Left and Right navigational key input and forward and backward one second in response to Up and Down navigational input. These are default values which can be changed in the transcription mode dialog box.

During transcription mode, if the user clicks, rather than presses, the "Play" key, which is the "6" key in the editor, functions 9606 through 9614 are performed. Functions 9607 and 9608 toggle play between on and off. Function 9610 causes functions 9612 to be performed if the toggle is turning play on. If so, if there has been no sound navigation since the last time sound was played, function 9614 starts playback a set period of the time before the last playback ended. This is done so that if the user is performing transcription, each successive playback will start slightly before the last one ended, enabling the user to recognize words that were only partially said in the prior playback and so that the user will better be able to interpret speech sounds as words by being able to perceive more of the preceding language context.

If the user presses, rather than clicks, the play key (i.e., if he presses it for more than a specified period of time), such as a third of the second, function 9616 causes functions 9618 through 9622 to be performed. These functions test to see if play is on, and if so they turn it off. They also turn on large vocabulary recognition during the press, in either continuous or discrete mode, according to present settings. They then insert the recognize text into the editor in the location in the audio being transcribed at which the last end of play took place. If the user double-clicks the play button, functions 9624 and 9626 prompt the user that audio recording is not available in transcription mode and that transcription mode can be turned off in the audio menu under the edit options menu.

It can be seen that transcription mode enables the user to alternate between playing a portion of previously recorded audio and then transcribing it by use of speech recognition by merely alternating between clicking and making sustained presses of the play key, which is the number "6" phone key. The user is free to use the other functionality of the editor to correct any mistakes that have been made in the recognition during the transcription process, and then merely return to it by again pressing the "6" key to play the next segment of audio to be transcribed. Of course, a user will often not desire to perform a literal transcription of the audio. For example, the user may play back a portion of a phone call and merely transcribe a summary of the more noteworthy portions.

FIG. 97 illustrates the operation of a dialogue box editing programming that uses many features of the editor mode described above to enable users to enter text and other information into a dialogue box displayed in the cellphone's screen.

When a dialogue box is first entered, function 9702 displays an editor window showing the first portion of the dialog box. FIG. 115 provides an illustration of such a dialog box. If the dialog box is too large to fit on one screen at one time., it will be displayed in a scrollable window, as is shown in FIG. 115. As indicated by function 9704, the dialog box responds to all inputs in the same way that the editor mode described above with regard to FIGS. 76 through 78 does, except as is indicated by the functions 9704 through 9726.

As indicated at 9707 and 9708, if the user supplies navigational input when in a dialog box, the cursor movement responds in a manner similar to that in which it would in the editor except that it can normally only move to a control into which the user can supply input. Thus, if the user moved left or right of the start or end of a dialog box control, the cursor would move left or right to the next dialog box control, moving up or down lines if necessary to find such a control. If the user moves up or down a line, the cursor would move to the nearest control in the nearest of the lines above or below the current cursor position. In order to enable the user to read extended portions of text in a dialog box that might not contain any controls, normally a cursor will not move more than a page even if there are no controls within that distance.

As indicated by functions 9700 and through 9716, if the cursor has been moved to a control with is a text field and the user provides any input of a type that would input text into the editor, function 9712 displays a separate editor window for the field, which displays the text currently in that field, if any. If the field has any vocabulary limitations associated with it, functions 9714 and 9716 limit the recognition in the editor to that vocabulary. For example, if the field were limited to state names, recognition in that field would be so limited. As long as this field-editing window is displayed, function 9718 will direct all editor commands to perform editing within it. The user can exit this field-editing window by selecting OK, which will cause the text currently in the window at that time to be entered into the corresponding field in the dialog box window.

If the cursor in the dialog box is moved to a control that is a choice list and the user selects a text input command, function 9722 displays a correction window showing the current value in the list box as the first choice and other options provided in the list box as other available choices shown in a scrollable choice list. In these scrollable choice lists, the options are not only accessible by selecting an associated number but also are available by speech recognition using a vocabulary substantially limited to those options.

If the cursor is in a control that is a check box or a radio button and the user selects any editor text input command, functions 9724 and 9726 change the state of the check box or radio button, by toggling whether the check box or radio button is selected.

FIG. 98 illustrates a help routine 9800, which is the cellphone embodiment analog of the help mode described above with regard to FIG. 19 in the PDA embodiments. When this help mode is called when the cellphone is in a given state or mode of operation, function 9802 displays a scrollable help menu for the state that includes a description of the state along with a selectable list of help options and of all of the state's commands.

Figures 99, 100:
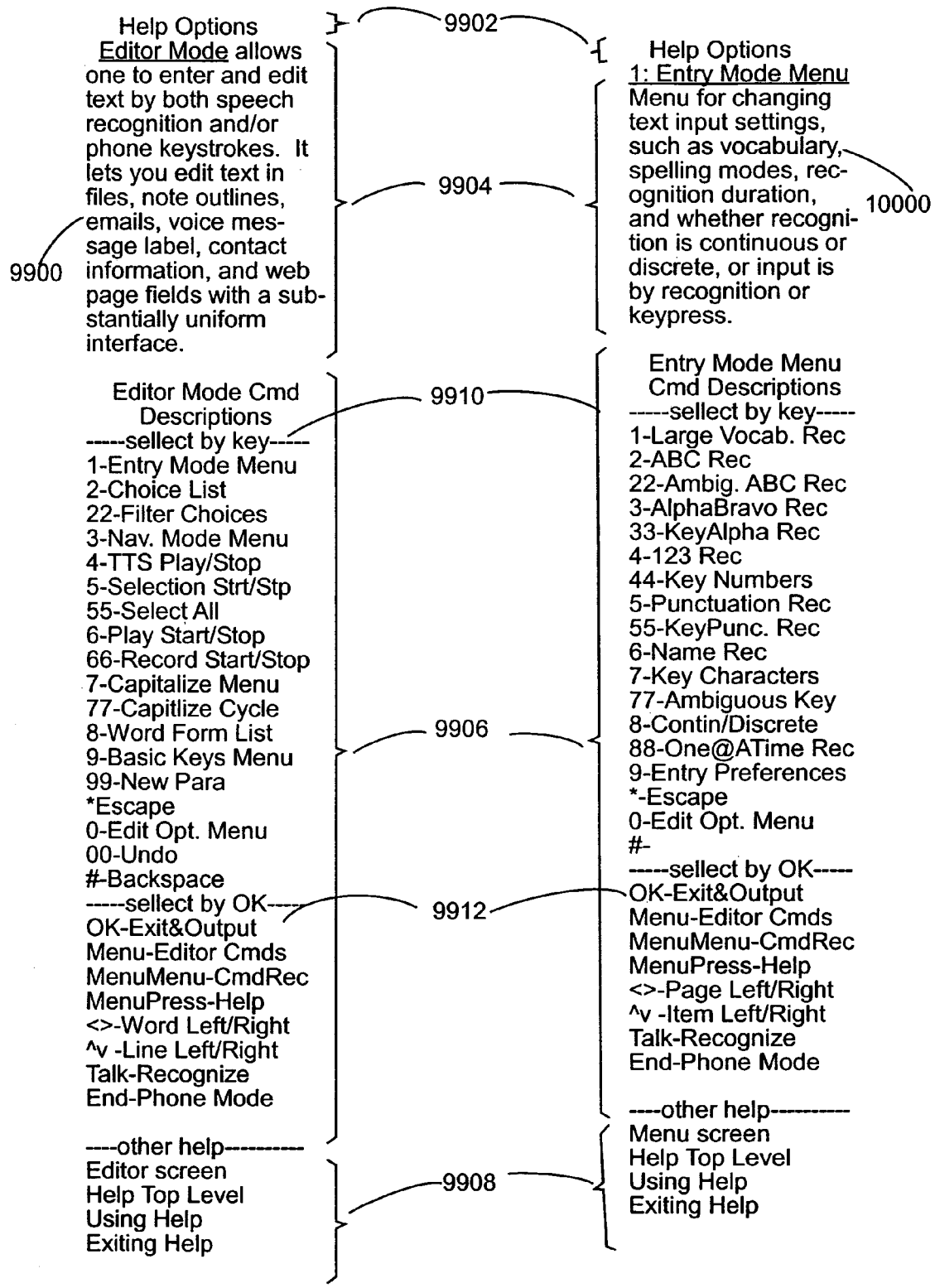
FIGS. 99 and 100 illustrate examples of help menus of the type that are displayed by the programming of FIG. 98.

FIG. 99 displays such a help menu for the editor mode described above with regard to FIGS. 67 and 76 through 78. FIG. 100 illustrates such a help menu for the entry mode menu described above with regard to FIG. 68 and FIGS. 79 and 80.

As his shown in FIGS. 99 and 100, each of these help menus includes a help options selection 9902, which can be selected by means of a scrollable highlight and operation of the help key. If selected, options will be provided that will allow the user to quickly jump to the various portions of the help menu as well as the other help related functions.

Each help menu also includes a brief statement, 9904, of the current command state the cellphone is in. Each help menu also includes a scrollable, selectable menu 9906 listing all the options accessible by phone key. It also includes a section 9908 which contains options that allow the user to access other help functions, including a description of how to use the help function and in some cases help about the function of different portions of the screen that is available in the current mode.

Figure 101:
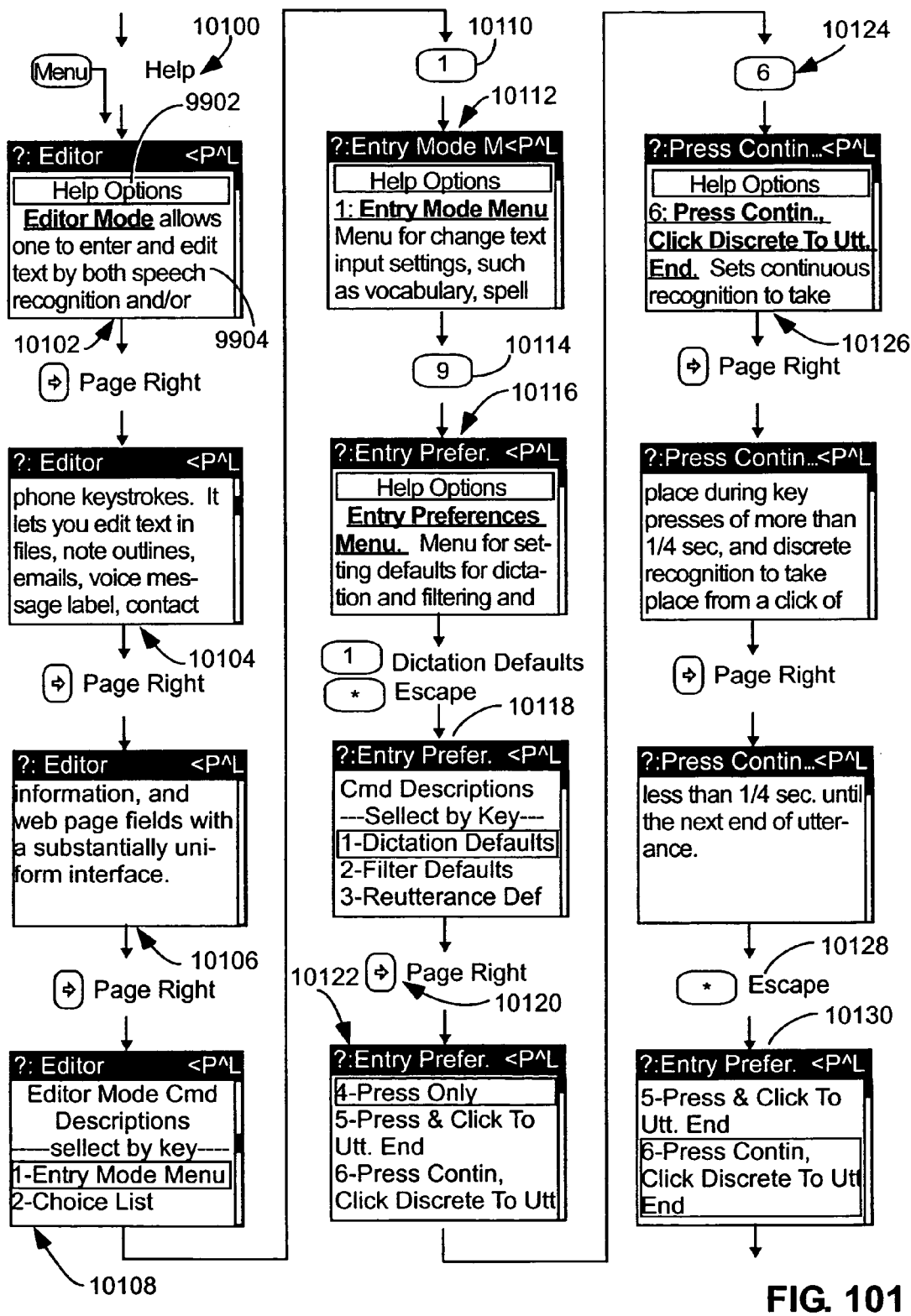
FIGS. 101 and 102 illustrate how a user can use the help programming of FIG. 98 to rapidly search for, and receive descriptions of, the functions associated with various portions of the cellphone's command structure.

As shown in FIG. 101, if the user in the editor mode makes a sustained press on the menu key as indicated at 10100 near the upper left-hand corner of that figure by the downward arrow that extends from the "Menu" key, the help mode will be entered for the editor mode, causing the cellphone to display the screen 10102. This displays the selectable help options, option 9902, and displays the beginning of the brief description of the operation of the other mode 9904 shown in FIG. 99.

In help mode the right navigation key of the cellphone functions as a Page Right button, since, in help mode, the navigational mode is a page/line navigational mode, as indicated by the characters "<µL" shown in screen 10102. If the user presses the Right Arrow in help mode the display will scroll down a page as indicated by screen 10104 of FIG. 101. If the user presses the Page Right key again, the screen will again scroll down a page, causing the screen to have the appearance shown at 10106. In this example, the user has been able to read the summary of the function of the editor mode 9904 shown in FIG. 99 with just two clicks of the Page Right key.

If the user clicks the Page Right key again causing the screen to scroll down a page, as shown in the screen shot 10108, the beginning of the command list associated with the editor mode can be seen. The user can use the navigational keys to scroll the entire length of the help menu, if so desired. In the example shown, when the user finds the key number associated with the entry mode menu, he presses that key as shown at 10110 to cause the help mode to display the help menu associated with the entry mode menu as shown at screen 10112.

It should be appreciated that whenever the user is in a help menu, he can immediately select the commands listed under the "select by key" line 9910 shown in FIG. 99 by pressing or double-clicking the number associated with each command. Thus, there is no need for a user to scroll down to the portion of the help menu in which commands are listed to press the key associated with a command in order to see its function. In fact, a user who thinks he understands the function associated with the key can merely make a sustained press of the menu key and then type the desired key to see a brief explanation of its function and a list of the commands, if any, that are available under it.

The commands listed under the "select by OK" line 9912 shown in FIGS. 99 and 100 have to be selected by scrolling the highlight to the command's line in the menu and then pressing the "OK" key or entering the OK command. This is because the commands listed below the line 9912 are associated with keys that are used in the operation of the help menu itself. This is similar to the commands listed in screen 7506 of the editor mode command list shown in FIG. 75, which are also only selectable by selection with the OK command in that command list.

In the example of FIG. 101, it is assumed that the user knows that the entry preference menu can be selected by pressing a "9" in the entry mode menu, and presses that key as soon as he enters help for the entry mode menu as indicated by 10114. This causes the help menu for the entry preference menu to be shown as illustrated at 10116.

In the example, the user presses the "1" key followed by the escape key. The "1" key briefly calls the help menu for the dictation defaults option and the escape key returns to the entry preference menu at the location and menu associated with the dictation defaults option, as shown by screen 10118.

Such a selection of a key option followed by an escape allows the user to rapidly navigate to a desired portion of the help menu's command list merely by pressing the number of the key in that portion of the command and list followed by an escape.

In the example, the user presses the Page Right key as shown at 10120 to scroll down a page in the command list as indicated by screen 10122. In the example, it is assumed the user selects the option associated with the "6" key, by pressing that key as indicated at 10124 to obtain a description of the Press-Continuous,-Click-Discrete-To-Utterance-End option. This causes a help menu for that option to be displayed as shown in screen 10126. In the example, the user scrolls down two more screens to read the brief description of the function of this option and then presses the escape key as shown at 10128 to return back to the help menu for the entry preference menu as shown at screen 10130.

Figure 102:
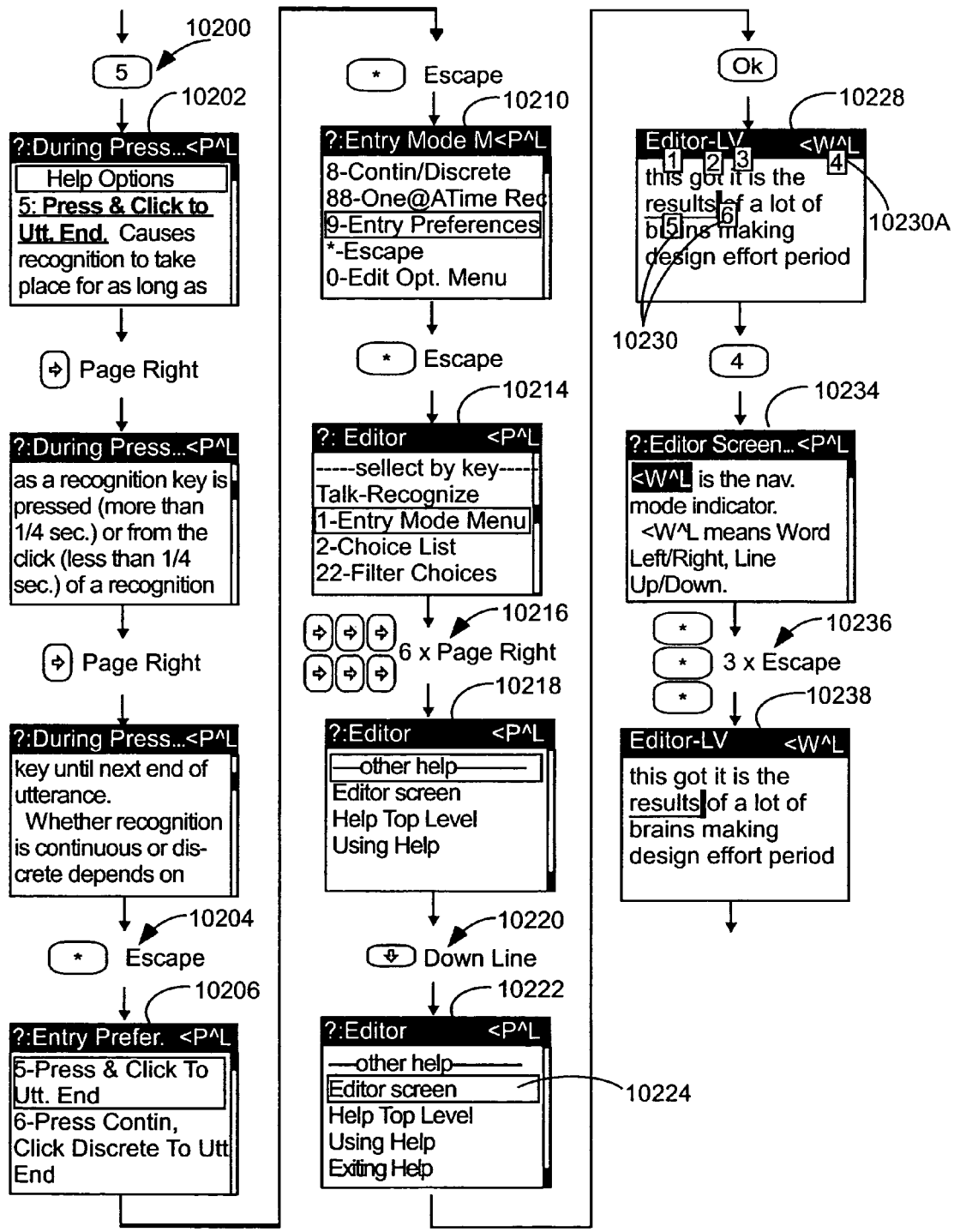

As shown in FIG. 102, in the example, when the user returns to help for the entry preference menu, he or she selects the "5" key as indicated by numeral 10200, which causes the help menu for the During-Press-and-Click-To-Utterance-End option, as shown at screen 10202. The user then scrolls down two more screens to read enough of the description of this mode to understand its function and then, as shown at 10204, presses the "*" key to escape back up to help for the entry preference menu as shown at screen 10206.

The user then presses escape again to return to the help menu from which the entry preference menu had been called, which is the help menu for the entry mode menu as shown at screen 10210. The user presses escape again to return to the help menu from which help for entry mode had been called, which is the help menu for the editor mode as shown in screen 10214.

In the example, it is assumed the user presses the Page Right key six times to scroll down to the bottom portion, 9908, shown in FIG. 99 of the help menu for the editor mode. If the user desires he can use a voice command to access options in this portion of the help menu more rapidly.

Once in the "other help" portion of the help menu, the user presses the down line button as shown at 10220 to move the selection highlight down to the editor screen option 10224 shown in the screen 10222. At this point, the user selects the OK button causing help for the editor screen itself to be displayed as is shown in screen 10228.

In the mode in which this screen is shown, phone key number indicators 10230 are used to label portions of the editor screen. If the user presses one of these associated phone numbers, a description of the corresponding portion of the screen will be displayed. In the example of FIG. 102, the user presses the "4" key, which causes an editor screen help screen 10234 to be displayed, which describes the function of the navigation mode indicator "<W" shown at the top of the editor screen help screen 10228.

In the example, the user presses the escape key three times as is shown to numeral 10236. The first of these escapes from the screen 10234 back to the screen 10228, giving the user the option to select explanations of other of the numbered portions of the screen being described. In the example, the user has no interest in making such other selections, and thus has followed the first press of the escape key with two other rapid presses, the first of which escapes back to the help menu for the editor mode and the second of which escapes back to the editor mode itself.

As can be seen in the FIGS. 101 and 102, the hierarchical operation of help menus enables the user to rapidly explore the command structure on the cellphone. This can be used either to search for a command that performs a desired function, or to merely learn the command structure in a linear order.

Figure 103:
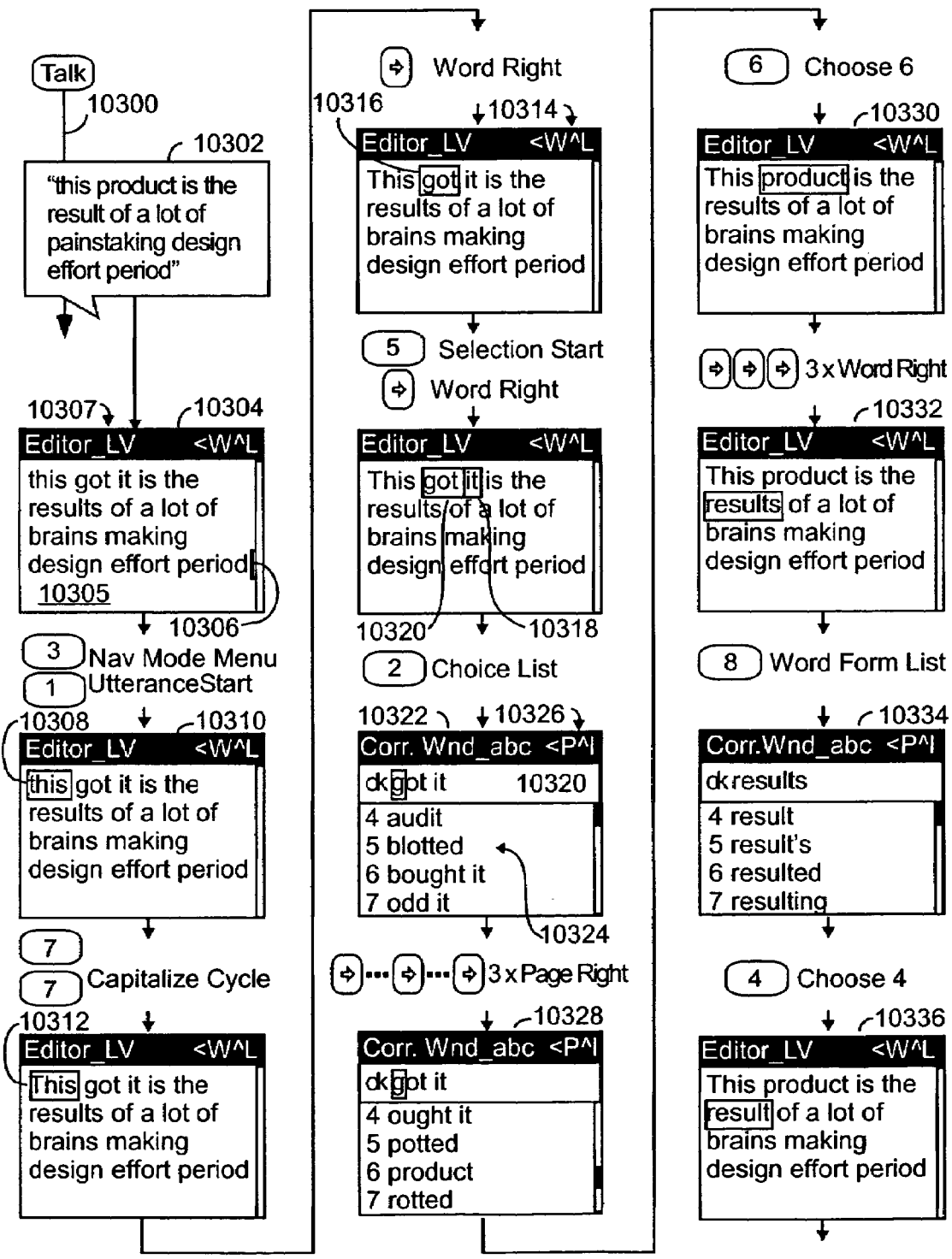
FIGS. 103 and 104 illustrate a sequence of interactions between a user and the cellphone's speech recognition editor's user interface in which the user enters and corrects text using continuous speech recognition.
Figure 104:
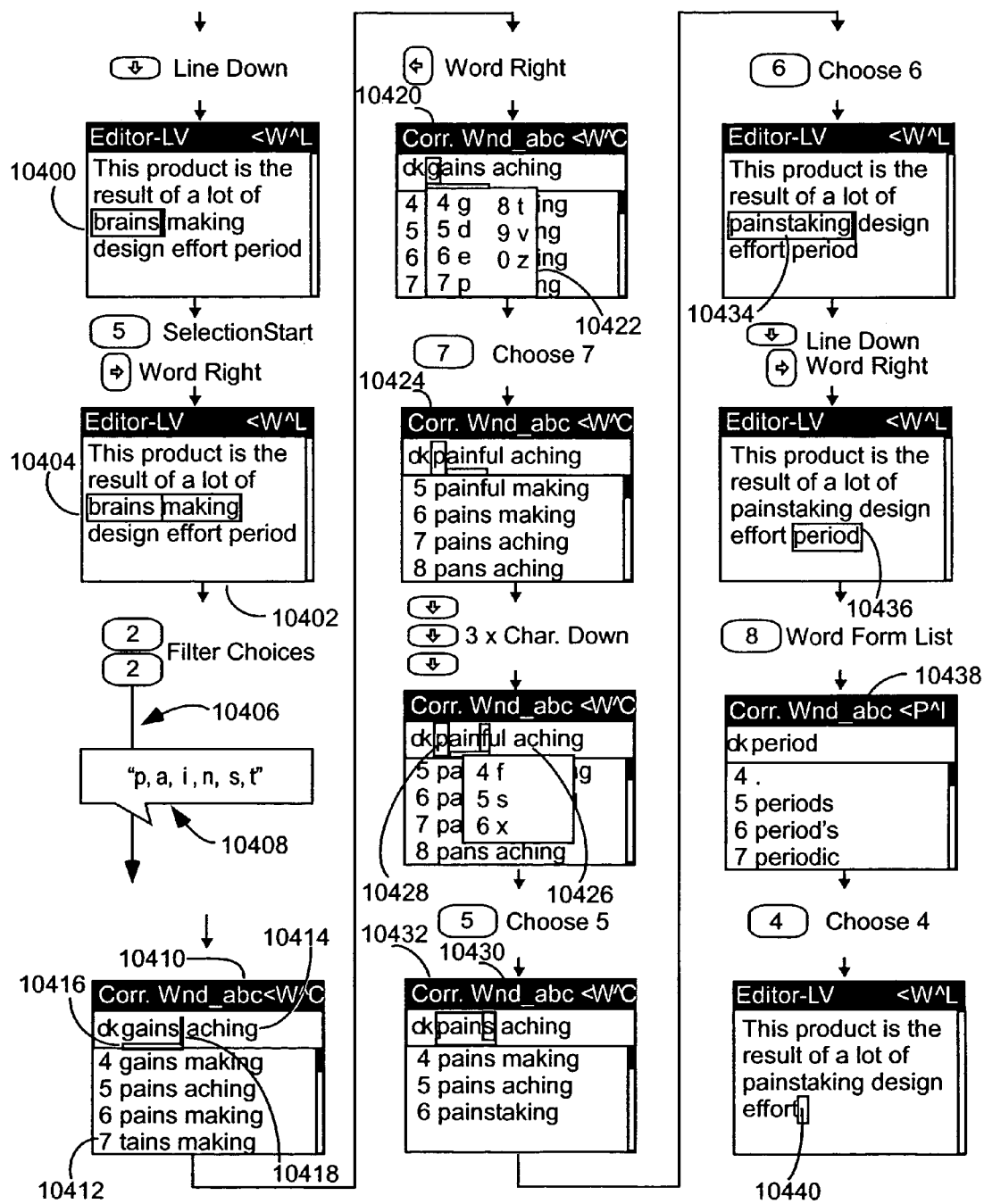

FIGS. 103 and 104 describe an example of a user continuously dictating some speech in the editor mode and then using the editor's interface to correct the resulting text output.

The sequence starts in FIG. 103 with the user making a sustained press of the talk button as indicated at 10300 during which he says the utterance 10302. This results in the recognition of this utterance, which in the example causes the text shown in screen 10304 to be displayed in the editor's text window 10305. The numeral 10306 points to the position of the cursor at the end of this recognized text. As indicated by the fact that the cursor does not highlight and words or characters, it is currently a non-selection cursor, and it is located at the end of the continuous dictation.

It is assumed that the system has been set to a mode that will cause the utterance to be recognized using continuous large vocabulary speech recognition. This is indicated by the characters "_LV" 10307 in the title bar of the editor window shown in screen 10304.

In the example, the user presses the "3" key to access the edit navigation menu illustrated in FIGS. 70 and 84 and then presses the "1" button to select the Utterance Start option shown in those figures. This makes the cursor correspond to the first word of the text recognized for the most recent utterance as indicated at 10308 in screen 10310. Next, the user double-clicks the "7" key to select the capitalized cycle function described in FIG. 77. This causes the selected word to be capitalized as shown at 10312.

Next, the user presses the Right button, which in the current word/line navigational mode, indicated by the navigational mode indicator 10314, functions as a Word Right button. This causes the cursor to move to the next word to the right, 10316. Next the user presses the "5" key to set the editor to an extended selection mode as described above with regard to functions 7728 through 7732 of FIG. 77. Then the user presses the word right again, which causes the cursor to move to the word 10318 and the extended selection 10320 to include the text "got it".

Next, the user presses the "2" key to select the choice list command of FIG. 77, which causes a correction window 10322 to be displayed with the selection 10320 as the first choice and with a first alphabetically ordered choice list shown, as displayed at 10324. In this choice list, each choice is shown with an associated phone key number that can be used to select it.

In the example, it is assumed that the desired choice is not shown in the first choice list, so the user presses the Right key three times to scroll down to the third screen of the second alphabetically ordered choice list, shown in screen 10328, in which the desired word "product" is located.

As indicated by function 7706 in FIG. 77, when the user enters the correction window by a single press of the choice list button, the correction window's navigation mode is set to the page/item navigational mode, as is indicated by the navigational mode indicator 10326 shown in screen 10332.

In the example, the user presses the "6" key to select the desired choice, which causes it to be inserted into the editor's text window at the location of the cursor selection, causing the editor text window to appear as shown at 10330.

Next, the user presses the Word Right key three times to place the cursor at the location shown in screen 10332. In this case, the recognized word is "results" and a desired word is the singular form of that word "result." For this reason, the user presses the word form list button, which causes a word form list correction window, 10334, to be displayed. In the example, this correction window has the desired alternate form as one of its displayed choices. The user selects the desired choice by pressing its associated phone key, causing the editor's text window to have the appearance shown at 10336.

As shown in FIG. 104, the user next presses the line down button to move the cursor down to the location 10400. The user then presses the "5" key to start an extended selection and presses the word key to move the cursor right one word, causing the current selection 10404 to be extended rightward by that one word.

Next, the user double-clicks the "2" key to select a filter choices option described above with regard to function 7712 through 7716, in FIG. 77. The second click of the "2" key is an extended click, as indicated by the down arrow 10406. During this extended press, the user continuously utters the letter string, "p, a, i, n, s, t," which are the initial letters of the desired word, "painstaking."

In the example, it is assumed that the correction window is in the continuous letter name recognition mode as indicated by the characters "abc" 10410 in the title bar of the correction window screen 10412.

In the example, the recognition of the utterance 10408 as filter input causes the correction window 10412 to show a set of choices that have been filtered against an ambiguous length filter corresponding to the recognition results from the recognition of that continuously spoken string of letter names. The correction window has a first choice, 10414, that starts with one of the character sequences associated with the ambiguous filter element. The portion of the first choice that corresponds to a sequence of characters associated with the ambiguous filter is indicated by the ambiguous filter indicator 10416. The filter cursor, 10418, is located after the end of this portion of the first choice.

At this point, the user presses the Word Right key which, due to the operation of functions 8124 and 8126 at FIG. 81, causes a filter cursor to be moved to and to select the first character, 10420, of the current word. Functions 8151 and 8162 of FIG. 81 cause a filtercharacterchoice window, 10422, to be displayed. Since the desired character is a "p," the user presses the "7" key to choose it, which causes that character to be made an unambiguous character of the filter string, and causes a new correction window, 10424, to be displayed as a result of that change in the filter.

Next, the user presses the character down button four times, which due to the operation of function 8150 in FIG. 81, causes the filter cursor's selection to be moved four characters to the right in the first choice, which in the example is the letter "f," 10426. Since this is a portion of the first choice that still corresponds to the ambiguous portion of the filter strength as indicated by the ambiguous filter marker 10428, the call to filtercharacterchoice in line 8152 of FIG. 81 will cause another character choice window to be displayed, as shown.

In the example, the desired character, the letter "s," is associated with the "5" phone key in the choice list, and the user presses that key to cause the correct character, 10430, to be inserted into the current filter string and it and all the characters before it to be unambiguously confirmed, as indicated by screen 10432.

At this time, the correct choice is shown associated with the phone key "6," and the user presses that phone key to cause the desired word to be inserted into the editor's text window as shown at 10434.

Next, in the example, the user presses the line down and Word Right keys to move the cursor selection down a line and to the right so as to select the text "period" shown at 10436.

The user then presses the "8," or word form list key, which causes a word form list shown in screen 10438 to be displayed. The desired output, a period mark, is associated with the "4" phone key. The user presses that key and causes the desired output to be inserted into the text of the editor window as shown at 10440.

Figure 105:
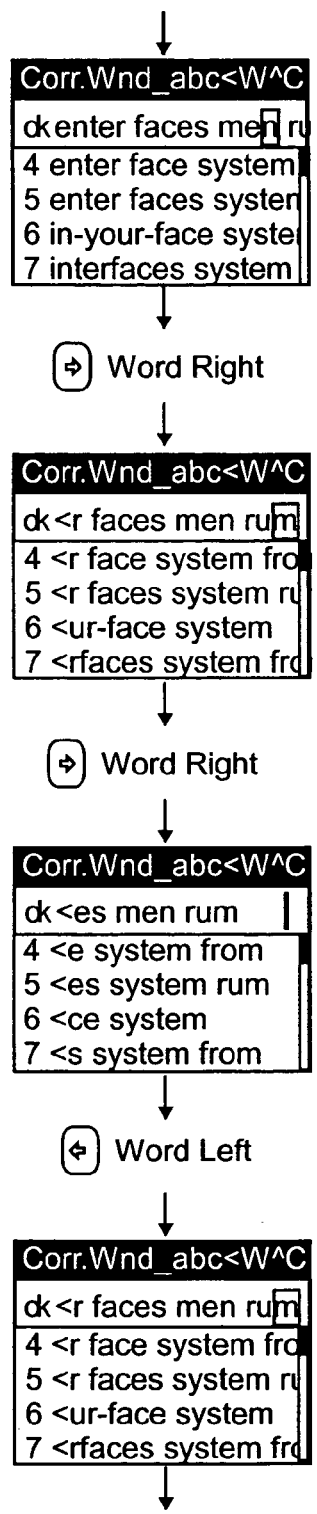
FIG. 105 illustrates how a user can scroll horizontally in a correction window displayed on the cellphone.

FIG. 105 illustrates how the user can use navigation keys to scroll a choice list horizontally right and left by operation of functions 8122 through 8135 described above with regard to FIG. 81. This includes scrolling right past the end of the current first choice word, so the user can read the endings of alternate choices that are longer than the first choice.

FIG. 106 illustrates how the KeyAlpha recognition mode can be used to enter alphabetic input into the editor's text window. Screen 10600 shows an editor text window in which the cursor 10602 is shown. In this example, the user presses the "1" key to open the entry mode menu described above with regard to FIGS. 68, 79 and 80, resulting in the screen 10604. Once in this mode, the user double-clicks the "3" key to select the Key Alpha recognition mode option described above with regard to function 7938 of FIG. 79. This causes the system to be set to the Key Alpha mode described above with regard to FIG. 86, and the editor window to display the prompt 10606 shown in FIG. 106.

In the example, the user makes an extended press of the "2" key as indicated by the extended downward arrow 10608, which causes a prompt window, 10610 to display the ICA (International Communication Alphabet) words associated with each of the letters on the "2" key that has been pressed. In response, the user makes the utterance "Charley," 10612. This causes the corresponding letter "c" to be entered into the text window at the former position of the cursor and causes the text window to have the appearance shown in screen 10614.

In the example, it is next assumed that the user presses the talk key while continuously uttering two ICA words, "alpha" and "bravo" as indicated at 10616. This causes the letters "a" and "b" associated with these two ICA words to be entered into the text window at the cursor as indicated by screen 10618. Next in the example, the user presses the 8 key, is prompted to say one of the three ICA words associated with that key, and utters the word "uniform" to cause the letter "u" to be inserted into the editor's text window as shown at 10620.

FIG. 107 provides an illustration of the same KeyAlpha recognition mode being used to enter alphabetic filtering input. It shows that the KeyAlpha mode can be entered when in the correction window by pressing the "1" key followed by a double-click on the "3" key in the same way it can be from the text editor, as shown in FIG. 106.

Figure 108:
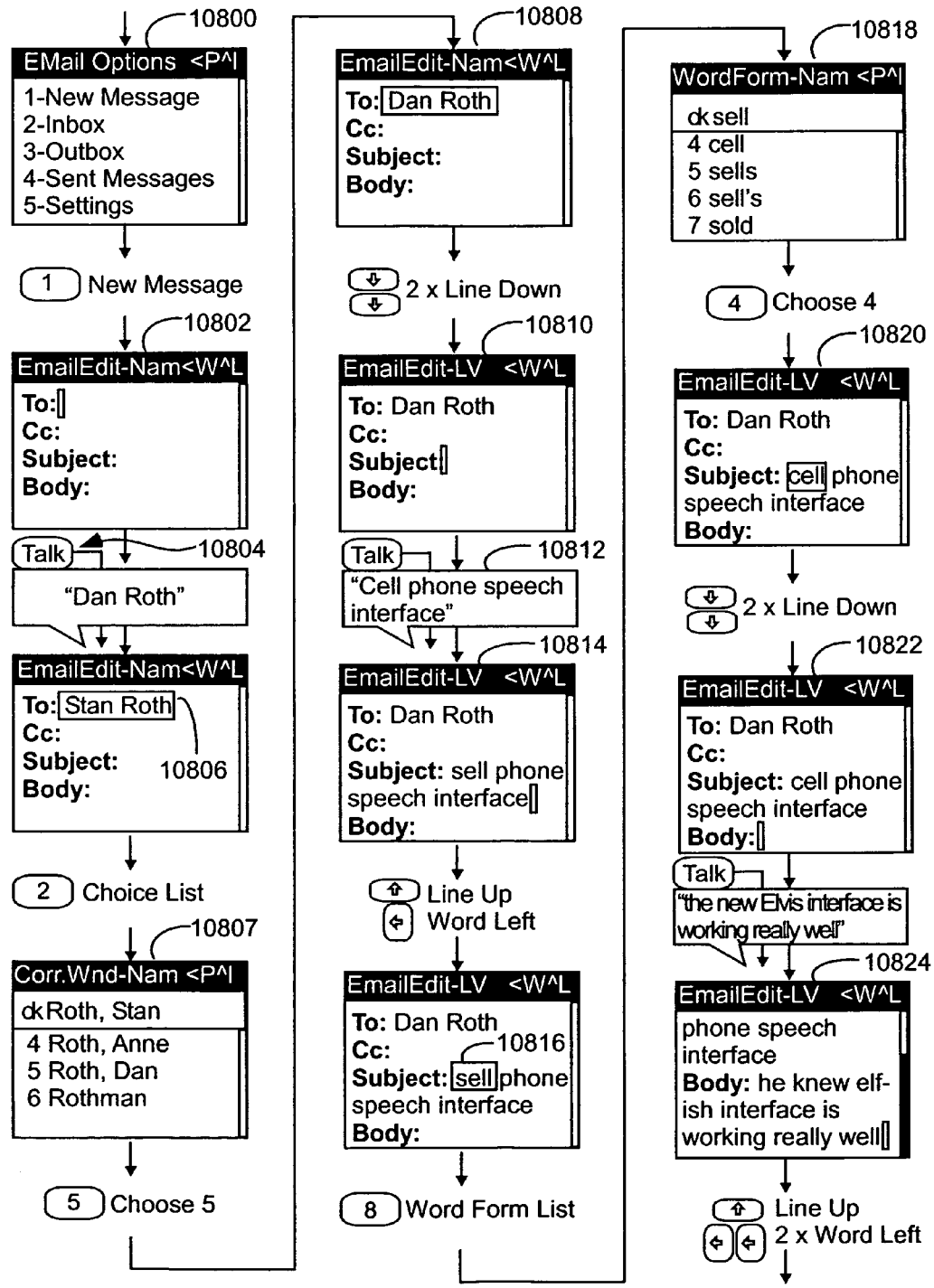
FIGS. 108 and 109 illustrate how the cellphone's speech recognition editor allows the user to address and enter and edit text in an e-mail message that can be sent by the cellphone's wireless communication capabilities.
Figures 109, 110:
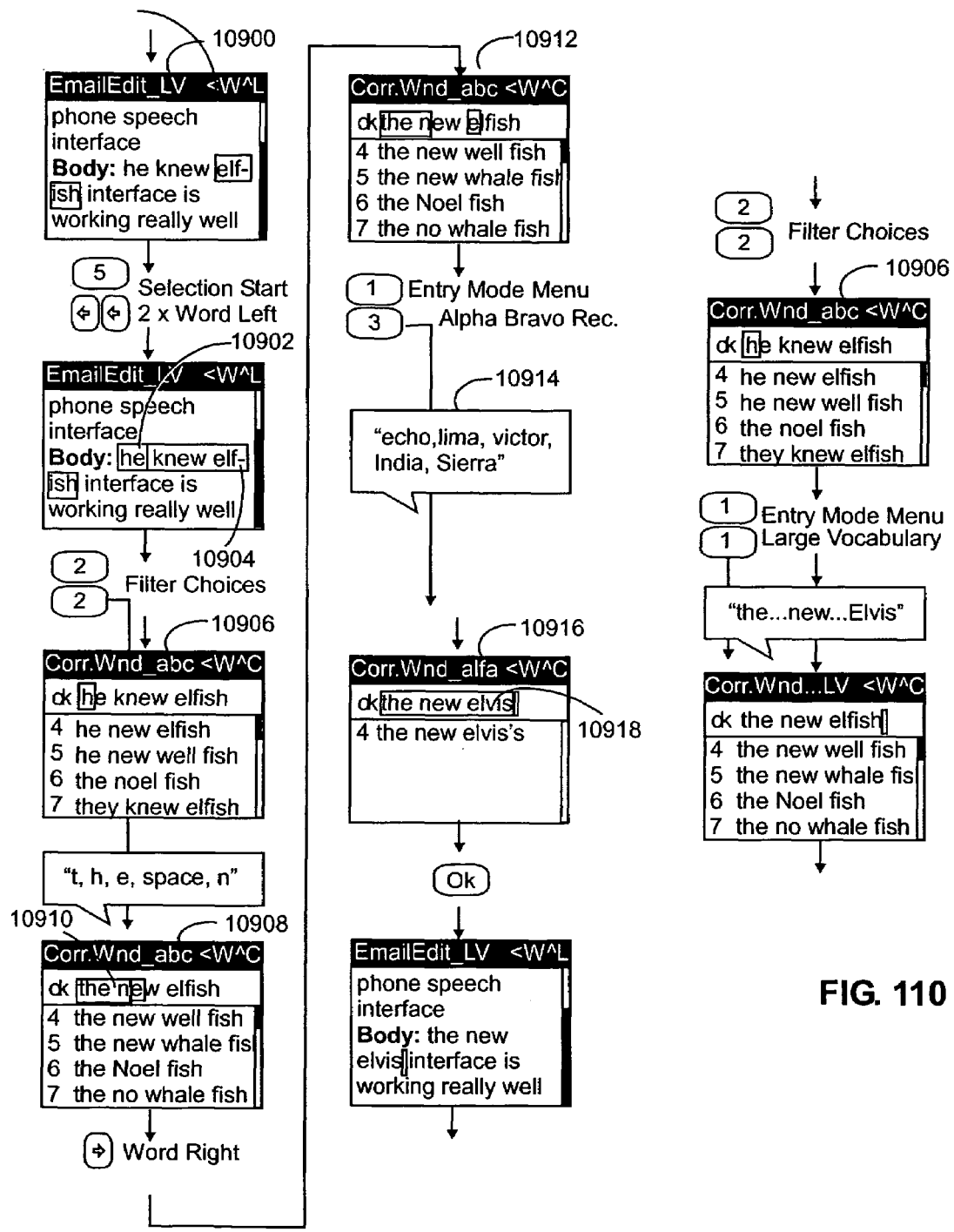
FIG. 110 illustrates how the cellphone's speech recognition can combine scores from the discrete recognition of one or more words with scores from a prior continuous recognition of those words to help produce the desired output.

FIGS. 108 and 109 show how a user can use the interface of the voice recognition text editor described above to address, enter, and correct text and e-mails in the cellphone embodiment.

In FIG. 108, screen 10800 shows the e-mail option screen which a user accesses if he selects the e-mail option by double-clicking on the "4" key when in the main menu, as indicated in FIG. 66.

In the example shown, it is assumed that the user wants to create a new e-mail message and thus selects the "1" option from the e-mail options menu. This causes a new e-mail message window, 10802, to be displayed with the cursor located at the first editable location in that window. This is the first character in the portion of the e-mail message associated with the addressee of the message. In the example, the user makes an extended press of the talk button and utters the name "Dan Roth" as indicated by the numeral 10804. The default vocabulary for recognition in a contact name field is the contact name vocabulary.

In the example, this causes the slightly incorrect name, "Stan Roth," to be inserted into the message's addressee line as a shown at 10806. The user responds by pressing the "2" key to select a choice list, shown in screen 10807, for the selection. In the example, the desired name is shown on the choice list and the user presses the "5" key to select it, causing the desired name to be inserted into the addressee line as shown at 10808.

Next, the user presses the down line button twice to move the cursor down to the start of the subject line, as a shown in screen 10810. The user then presses the talk button while saying the utterance "cellphone speech interface," 10812. In the example, this is slightly mis-recognized as "sell phone speech interface," and this text is inserted at the cursor location on the subject line to cause the e-mail edit window to have the appearance shown at 10814. In response, the user presses the line up button and the Word Left button to position the cursor selection at the position 10816. The user then presses the "8" key to cause a word form list correction window, 10818, to be displayed. In the example, the desired output is associated with the "4" key. The user selects that key and causes the desired output to be placed in the cursor's position as indicated in screen 10820.

Next, the user presses the line down button twice to place the cursor at the beginning of the body portion of the e-mail message as shown in screen 10822. Once this is done, the user presses the talk button while continuously saying the utterance "the new Elvis interface is working really well". This causes the somewhat mis-recognized string, "he knew elfish interface is working really well", to be inserted at the cursor position as indicated by screen 10824.

In response, the user presses the line up key once and the Word Left key twice to place the cursor in the position shown by screen 10900 of FIG. 199. The user then presses the "5" key to start an extended selection and presses the Word Left key twice to place the cursor at the position 10902 and to cause the selection to be extended as is shown by 10904. At this point, the user double-clicks on the "2" key to enter the correction window, 10906, for the current selection and, during a continuation of the second press of that double click, continuously says the characters "t, h, e, space, n". This causes a new correction window, 10908, to be displayed with unambiguous filter 10910 corresponding to be continuously entered letter name character sequence, since it is assumed in this example that unambiguous continuous letter name recognition has previously been selected as the current filter entry mode.

Next, the user presses the Word Right key, which moves the filter cursor to the first character of the next word to the right, as indicated by screen 10912. The user then presses the "1" key to enter the entry mode menu and presses the "3" key to select to select the AlphaBravo, or ICA word, input vocabulary. During the continuation of the press of the "3" key, the user says the continuous utterance 10914, i.e., "echo, lima, victor, india, sierra". This is recognized correctly as the sequence "elvis," which is inserted, starting with the prior filter cursor position, into the first choice window of the correction window, 10916. In the example shown, it is assumed that AlphaBravo recognition is treated as unambiguous because of its reliability, causing the entered characters and all the characters before it in the first choice window to be treated as unambiguously confirmed, as is indicated by the unambiguous filter string indication 10918 shown in screen 10916.

In the example, the user presses the "OK" key to select the current first choice because it is the desired output.

FIG. 110 illustrates how re-utterance can be used to help obtain the desired recognition output. It starts with the correction window in the same state as indicated by screen 10906 in FIG. 109. But in the example of FIG. 110, the user responds to the screen by pressing the "1" key twice, once to enter the entry menu mode, and a second time to select a large vocabulary recognition.

As indicated by function 7908 through 7914 in FIG. 79, if large vocabulary recognition is selected in the entry mode menu when a correction window is displayed, the system interprets this as an indication that the user wants to perform a re-utterance, that is, to add a new utterance for the desired output into the utterance list for use in helping to select the desired output.

In the example, the user continues the second press of the "1" key while using discrete speech to say the three words "the," "new," "Elvis" corresponding to the desired output. In the example of FIG. 110, it is assumed the additional acoustic information provided by this new utterance list entry causes the system to correctly recognize the first two of the three words. It does so by performing a re-utterance recognition that uses a combination of acoustic scores from matches against both the original and the new utterance list entries that correspond to the selection for which the correction window is being displayed. In the example it is assumed that the third of the three words is not in the current vocabulary, which will require the user to spell that third word with filtering input, such as was done by the utterance 10914 in FIG. 109.

Figure 111:
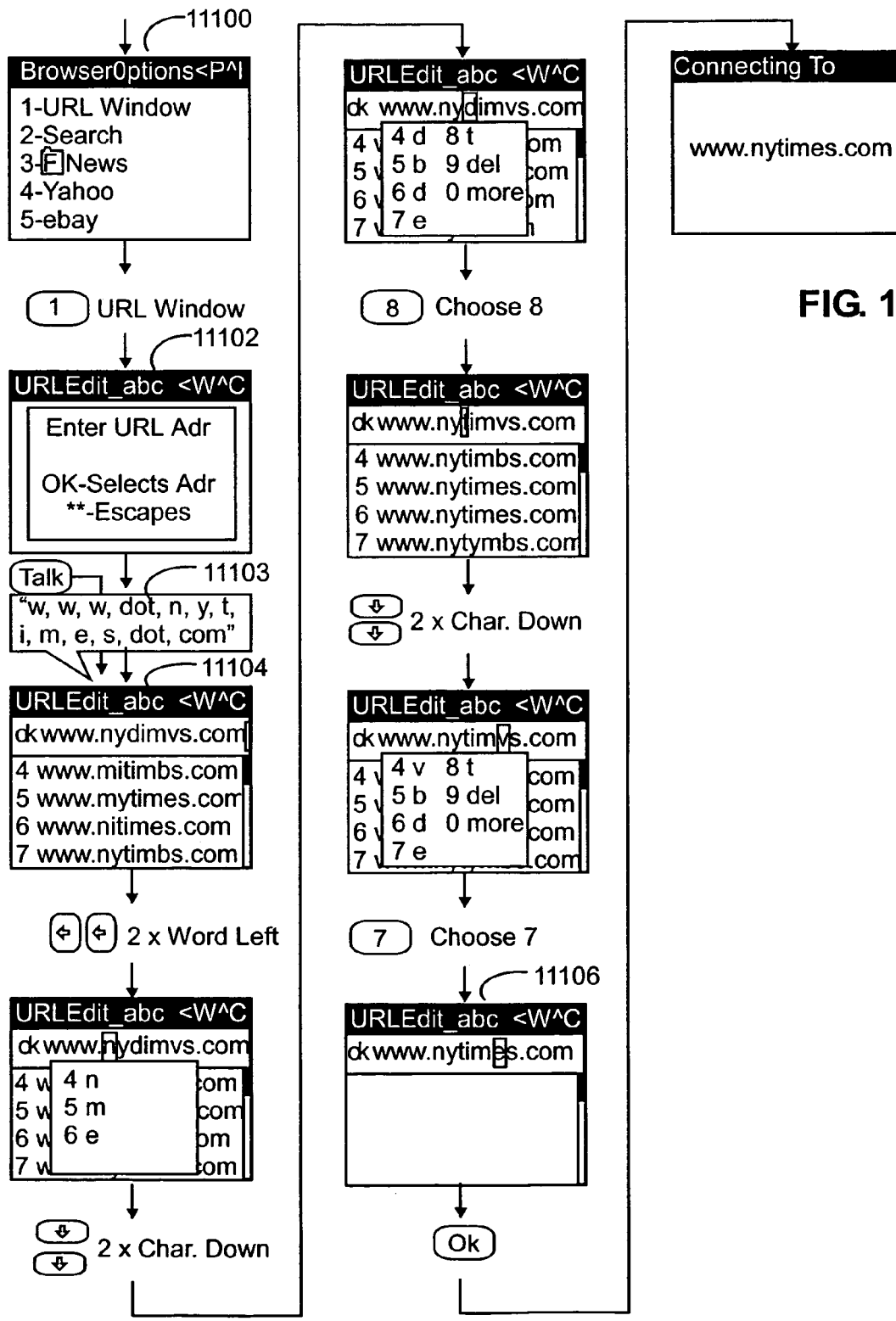
FIG. 111 illustrates how the cellphone speech recognition software can be used to enter a URL for the purposes of accessing a World Wide Web site using the wireless communication capabilities of the cellphone.

FIG. 111 illustrates how the editor's functionality can be used to enter a URL text string for purposes of accessing a desired web page on a Web browser that is part of the cellphone's software.

The browser option screen, 11100, shows the screen that is displayed if the user selects the Web browser option associated with the "7" key in the main menu, shown in FIG. 66. In the example, it is assumed that the user desires to enter the URL of a desired web site and selects the URL window option associated with the "1" key by pressing that key. This causes the screen 11102 to display a brief prompt instructing the user. The user responds by using continuous letter-name spelling to spell the name of a desired web site during a continuous press of the "Talk" button.

In the embodiment shown, the URL editor is always in correction mode so that the recognition of the utterance, 11103, causes a correction window, 11104, to be displayed. The user then uses filter string editing techniques of the type described above to correct the originally mis-recognized URL to the desired spelling as indicated at screen 11106, at which time he selects the first choice, causing the system to access the desired web site.

Figure 112:
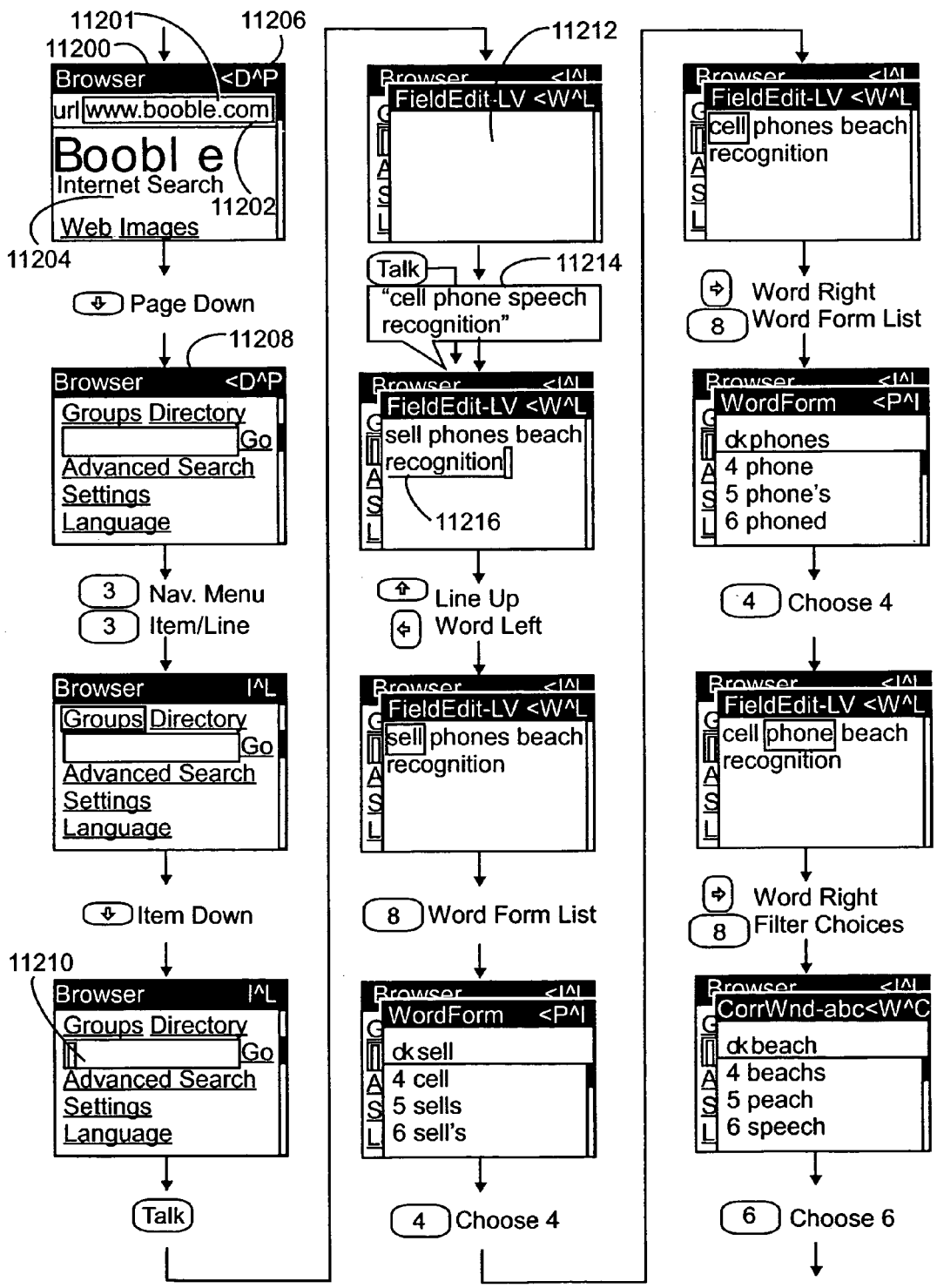
FIGS. 112 and 113 illustrate how elements of the cellphone's speech recognition user interface can be used to navigate World Wide Web pages and to select items and enter and edit text in the fields of such web pages.
Figures 113, 114:
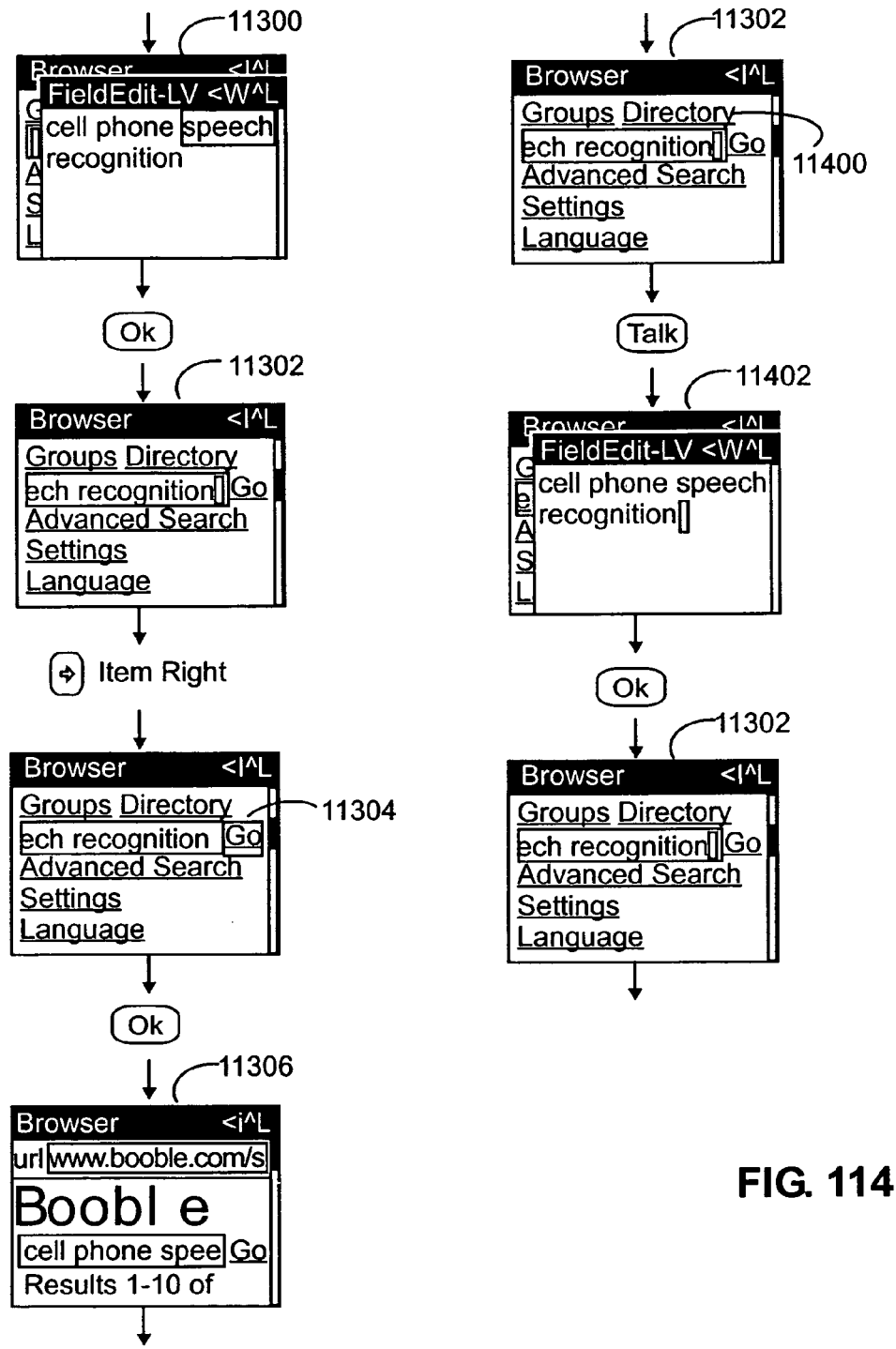
FIG. 114 illustrates how elements of the cellphone speech recognition user interface can be used to enable a user to more easily read text strings too large to be seen at one time in a text field displayed on the cellphone screens, such as a text fields of a web page or dialogue box.

FIGS. 112 through 114 illustrate how the editor interface can be used to navigate, and enter text into the fields of, Web pages.

Screen 11200 illustrates the appearance of the cellphone's Web browser when it first accesses a new web site. A URL field, 11201, is shown before the top of the web page, 11204, to help the user identify the current web page. This position can be scrolled back to at any time if the user wants to see the URL of the currently displayed web page. When web pages are first entered, they are in a document/page navigational mode in which moving the Left and Right key will act like the Page Back and Page Forward controls on most Web browsers. In this case, the word "document" is substituted for "page" because the word "page" is used in other navigational modes to refer to a screen full of media on the cellphone display. If the user presses the up or down keys, the web page's display will be scrolled by a full display page (or screen).

In the example of FIG. 112, the user presses the Page Down screen, which scrolls down one screen in the display of the current web page, causing a new screen, 11208, to be shown. The user then selects the "3" key followed by the "3" key again, which selects the Navigation Menu and the Item/Line mode which is a web page's equivalents of the Word/Line mode associated with the 3 key in the editor's Navigation menu. In this Navigation mode, if the user presses the Left or Right navigational keys, the cursor will move to the next selectable object within the web page to the left or right on the current line, or, if there is not any such item on the current line, to the next such item going to the left and upward or going to the right and downward in the web page, respectively.

In the example, this navigation mode is used to place the cursor in the text field, 11210, shown in FIG. 112. The user then presses a text input key, such as the "Talk" key, which causes a field editor window, 11212, to be displayed. The user then says the utterance 11214 during the press of the Talk key, which causes the text recognized for that utterance to be inserted into the field editor window as indicated at 11216. The user then continues to use correction techniques of the types described above until the field edit window has the desired text, as indicated in screen 11300 of FIG. 113. The user then presses the OK button to cause the text in the field edit window to be inserted into the field of the web page for which the field edit window had been evoked, as indicated at 11302.

In the example, it is assumed that the current web page is a search engine and that the text which has just been entered is a search string. The user follows the entry of this text by pressing the Item Right button to place the cursor on a "go" button, 11304, to the right of the field into which text had just been entered. The user then presses the OK button to cause the search engine to make the desired search, which results in a new browser screen 11306 showing a search results web page.

FIG. 114 illustrates that the field editor window can enable a user to easily read text contained within a web page's or a dialog box's text field that is larger than the space allocated for the text field on the web page or dialog box. Thus, a user can navigate the cursor to a text field, such as the text field 11400 previously shown in the screen 11302 of FIG. 113, press a text input button and cause a field edit window to be displayed that provides room for a substantial amount of field text to be displayed and easily read at one time. When the user is finished reading the text, he can merely click the OK or escape key to return to the screen in which the field was previously shown.

FIG. 115 shows how the editor interface can be used to edit text in a dialog box, in this example, the Find Dialog Box evoked by the "Find" option, 9034 in the Edits Option Menu shown in FIG. 90. In the example of FIG. 115, the user presses the "0" key to enter the edit options menu and then the "8" key to select the find option. This results in the find dialog box, 11500, being displayed, with the cursor located at the first editable object in the dialog box, which in this case is the "Find" text field. In response, the user speaks the utterance 11502 while the Talk key is pressed.

In the example, this "Find" string is correctly recognized and inserted in the dialog box as indicated at 11504. The user responds by pressing the OK key, which causes the find function to search for the search string in the current document, which in the example is the notes document. When it finds the first occurrence of the string, it provides a notes editor window with that occurrence selected, as is shown in screen 11506.

In the example, the text string searched for has been used as a label for recorded audio represented by audio graphics 11508 shown in FIG. 115. In the screen 11506 the audio graphics represent one second of sound for each pixel width, and approximately 60 pixel widths fit on a full line of the sound segment 11508, allowing approximately one minute of sound to be represented on each line. The audio graphics present, in effect, a bar chart representing the amplitude of sound during each second of the recorded speech. This provides useful information in that it enables the user to see periods of silence. The Audio Navigation menu 8940 described above with regard to FIG. 89 provides one method of determining the resolution at which such audio graphics are displayed on a given system.

FIG. 116 illustrates how the cellphone embodiment shown allows a special form of correction window to be used as a list box when editing a dialog box of the type described above with regard to FIG. 115.

The example of FIG. 116 starts from the find dialog box being in the state shown at screen 11504 in FIG. 115. From this state, the user presses the down line key twice to place the cursor in the "In:" list box, which defines in which portions of the cellphone's data the search conducted in response to the find dialog box is to take place. When the user presses the "Talk" button with the cursor in this window, a list box correction window, 11612, is displayed that shows the current selection in the list box as the current first choice and provides a scrollable list of the other list box choices, with each such other choice being shown with associated phone key number. The user could scroll through this list and choose the desired choice by phone key number or by using a highlighted selection. In the example, the user continues the press of the talk key and says the desired list box value with the utterance, 11614. In list box correction windows, the active vocabulary is substantially limited to list values. With such a limited vocabulary correct recognition is fairly likely, as is indicated in the example where the desired list value is the first choice. The user responds by pressing the OK key, which causes the desired list value to be placed in the list box of the dialog box as is indicated, 11618.

Figure 117:
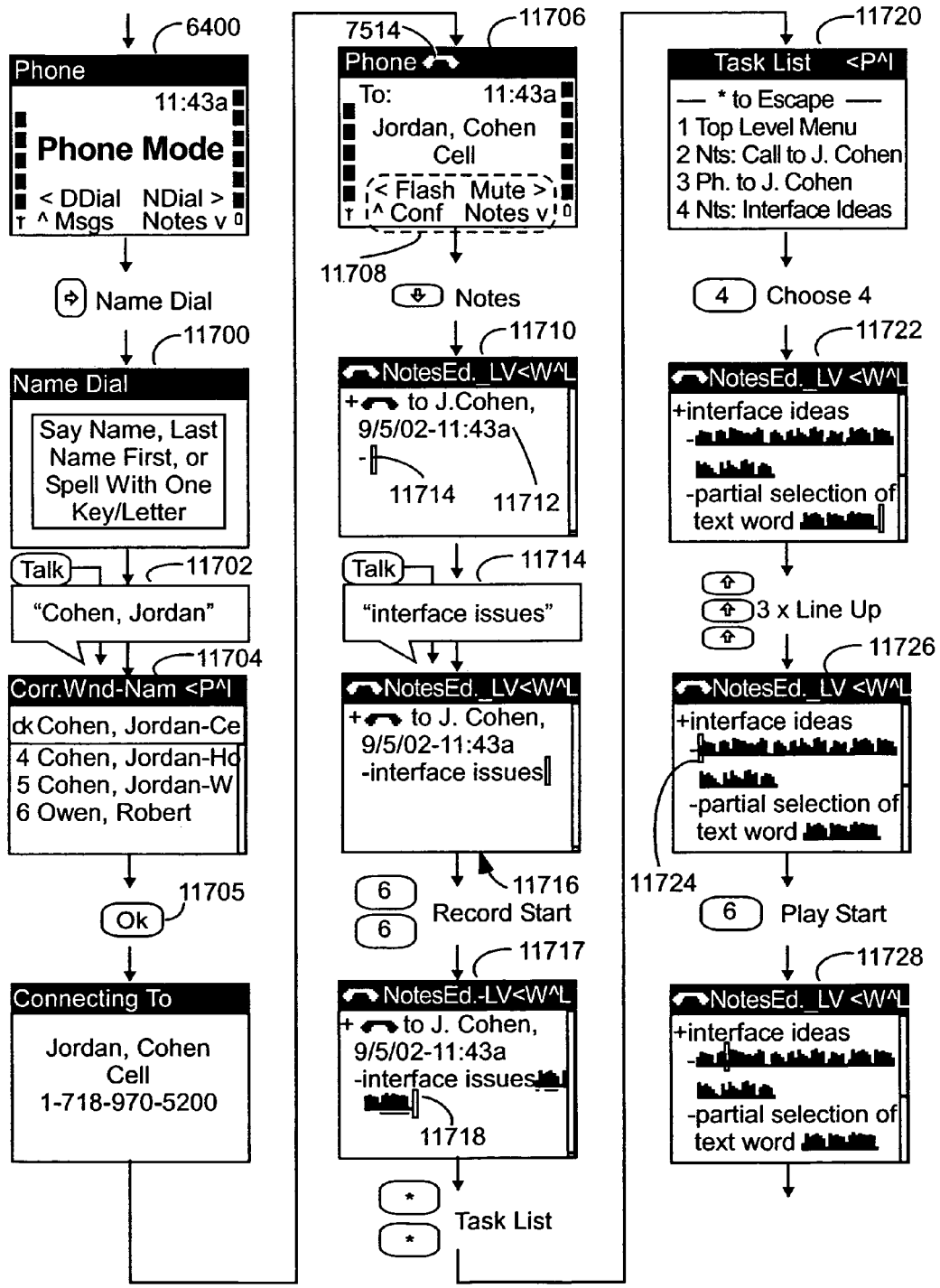
FIG. 117 illustrates how speech recognition can be used to dial people by name, and how the audio playback and recording capabilities of the cellphone can be used during such a cellphone call.

FIG. 117 illustrates a series of interactions between a user and the cellphone interface, which display some of the functions the interface allows the user to perform when making phone calls.

The screen 6400 in FIG. 117 is the same top-level phone mode screen described above with regard to FIG. 64. If, when it is displayed, the user selects the Right navigation button, which is mapped to be name dial command, the system will enter the name dial mode, the basic functions of which are illustrated in the pseudocode of FIG. 129. As can be seen from that figure, this mode allows a user to select names from a contact list by speaking or spelling them, and if there is a mis-recognition, to correct it by alphabetic filtering and/or by selecting choices from a potentially scrollable choice list in a correction window that is similar to those described above.

When the cellphone enters the name dial mode, an initial prompt screen, 11700, is shown as indicated in FIG. 117. In the example, the user utters a name, 11702, during the pressing of the talk key. In name dial, such utterances are recognized with the vocabulary automatically substantially limited to the name vocabulary. The resulting recognition causes a correction window, 11704, to be displayed. In the example, the first choice is correct, so the user selects the "OK" key, causing the phone to initiate a call to the phone number associated with the named party in the user's contact list.

When the phone call is connected, a screen, 11706, is displayed having the same ongoing call indicator, 7514, described above with regard to FIG. 75. At the bottom of the screen, as indicated by the numeral 11708, an indication is given of the functions associated with each of the navigation keys during the ongoing call. In the example, the user selects the down button, which is associated with the Notes Outline option 6616 described above with regard to FIG. 66. In response, an editor window, 11710, is displayed for the Notes outline with an automatically created heading item, 11712, being created in the Notes outline for the current call, labeling the party to whom it is made and its start and ultimately its end time. A cursor, 11714, is then placed at a new item indented under the calls heading.

In the example, the user says a continuous utterance, 11714, during the pressing of the talk button. This causes recognized text corresponding to that utterance to be inserted into the notes outline at the cursor as indicated in screen 11716. Then the user double-clicks the "6" key to start recording, which causes an audiographic representation of the sound to be placed in the editor window at the current location of the cursor. As indicated at 11718, audio from portions of the phone call in which the cellphone operator is speaking is underlined in the audiographics to make it easier for the user to keep track of who's been talking how long in the call and, if desired, to be able to better search for portions of the recorded audio in which one or the other of the phone call's two parties was speaking.

In the example of FIG. 117, the user next double-clicks on the star key to select the task list. This shows a screen, 11720, that lists the currently opened tasks, on the cellphone. In the example, the user selects the task associated with the "4" key, which is another notes editor window displaying a different location in the notes outline. In response, the phone keys display shows a screen, 11722, of that portion of the notes outlined.

In the example, the user presses the up key three times to move the cursor to location 11724 and then presses the "6" key to start playing the sound associated with the audio graphics representation at the cursor, as indicated by the motion between the cursors of screens 11726 and 11728.

Unless the Play-Only-To-Me option, 7513, shown above with regard to FIG. 75, is on, the playback of the audio in screen 11728 will be played to both sides of the current phone call, enabling the user of the cellphone to share audio recording with the other party during the cellphone call.

FIG. 118 illustrates that when an edit window is recording audio, such as is shown in screen 11717 near the bottom middle of FIG. 117, the user can turn on speech recognition during the recording of all or a portion of such audio to cause the audio recorded during that portion to also have speech recognition performed upon it. In the example shown during the recording shown in screen 11717, the user presses the talk button and speaks the utterance 11800. This causes the text associated with that utterance, 11802, to be inserted in the editor window, 11806. Audio recorded after the duration of the recognition is recorded merely with audio graphics. Normally the user would make an effort to speak clearly during an utterance, such as the utterance 11800, which is to be recognized, and then would feel free to talk more casually during portions of conversation or dictation that are being recorded only with audio. Normally audio is recorded in association with speech recognition so that the user could later go back, listened to and correct any dictation that might have been incorrectly recognized during a recording.

FIG. 119 illustrates how the system enables the user to select a portion of audio, such as the portion 11900 shown in that figure by a combination of the extended selection key and play or navigation keys, and then to select the recognized audio dialog box discussed above with regard to functions 9000 through 9014 of FIG. 90 to have the selected text recognized as indicated in screen 11902. In the example of FIG. 119, the user has previously selected the Show-Recognized-Audio option, 9026, shown in FIG. 90, which causes the recognized text, 11902, to be underlined, indicating that it has a playable audio associated with it. In FIG. 119 the screen 11902 is shown having an exaggerated height that is roughly equal the height of six actual screens, for the purpose of showing all the text that is associated with a relatively short selected segment 1190 of audio.

Figure 120:
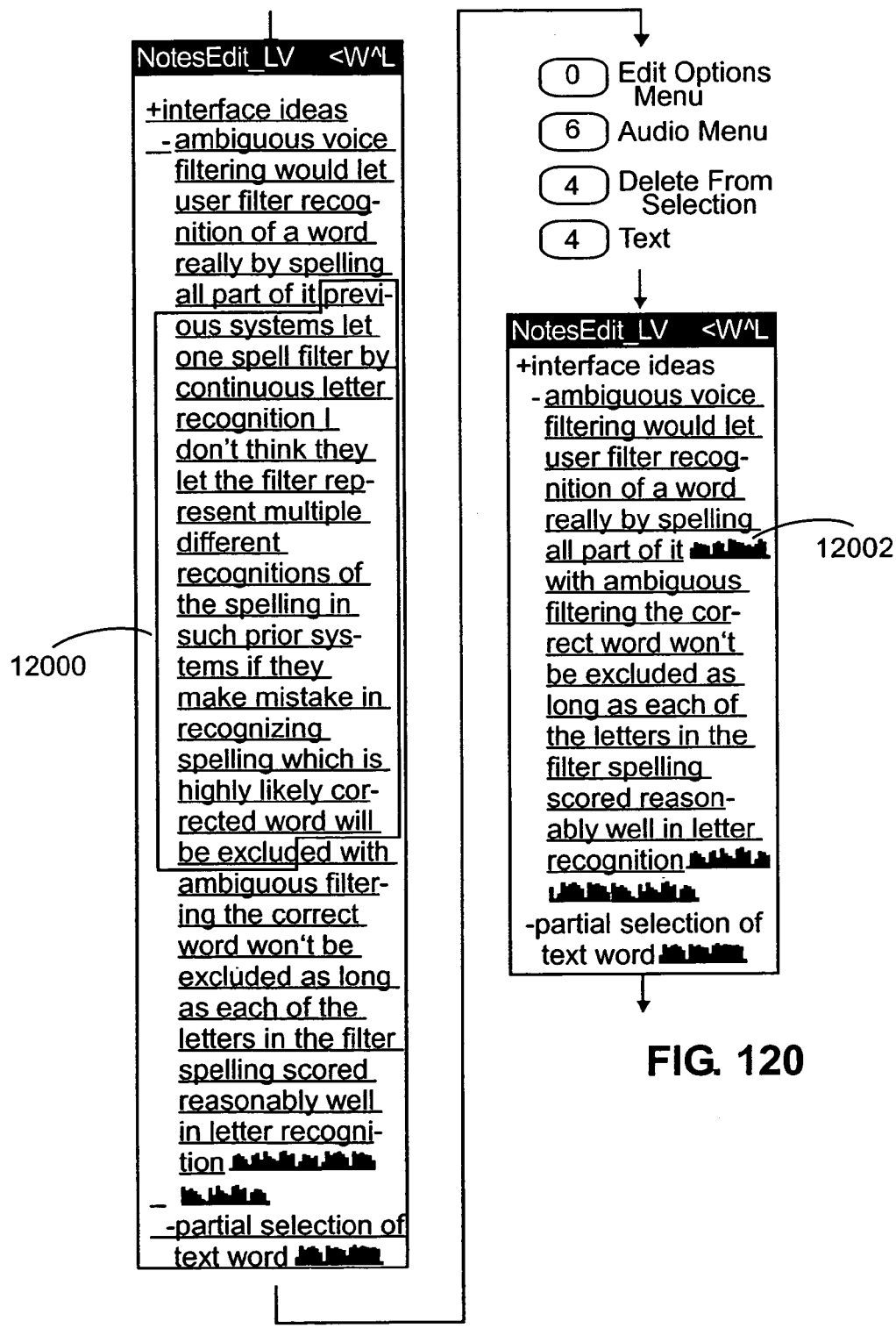
FIG. 120 illustrates how the cellphone enables a user to strip text recognized for a given segment of sound from the audio recording of that sound.

FIG. 120 illustrates how a user can select a portion, 12000, of recognized text that has associated recorded audio, and then select to have that text stripped from its associated recognized audio by selecting the option 9024, shown in FIG. 90, in a submenu under the edit options menu. This leaves just the audio, 12002, and its corresponding audio graphic representation, remaining in the portion of media where the recognized text previously stood.

Figure 121:
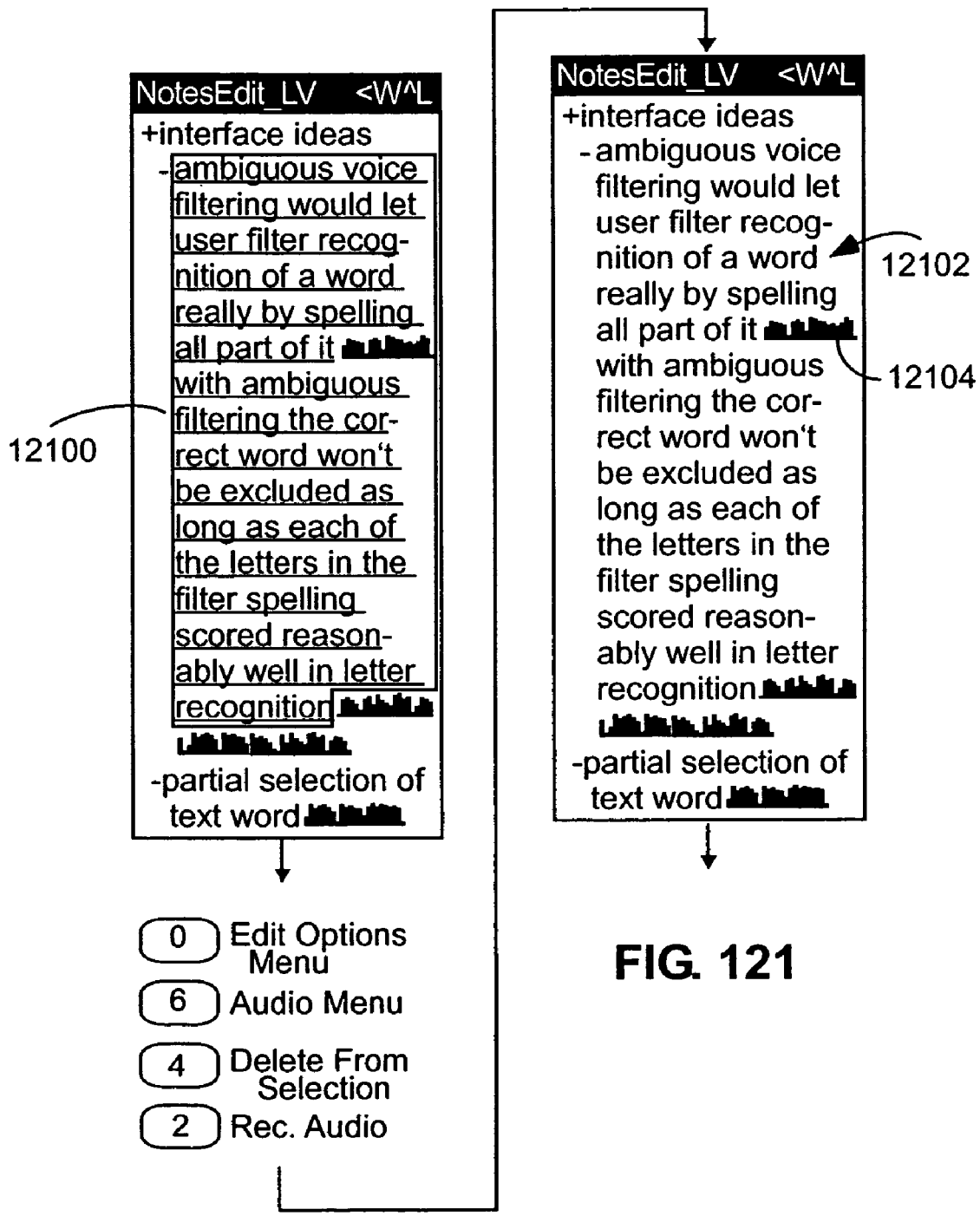
FIG. 121 illustrates how the cellphone enables the user to either turn on or off an indication of which portions of a selected segment of text have associated audio recording.

FIG. 121 illustrates how the function 9020, of FIG. 90, from under the audio menu of the edit options menu allows the user to strip the recognition audio that has been associated with a portion, 12100, of recognized text from that text as indicated at 12102 in FIG. 121. Note that the audio 12104, which has no recognized text associated with it, is not deleted, since such audio is not considered recognition audio.

FIGS. 122 through 125 illustrate operation of the digit dial mode described in the pseudocode of FIG. 130. If the user selects the digit dial mode, such as by pressing the "2" phone key when in the main menu, associated with function 6552 of FIG. 65 or by selecting the Left navigational button when the system is in the top-level phone mode shown in screen 6400 and FIG. 64, the system will enter the digital dial mode shown in FIG. 130 and will display a prompt screen, 12202, which prompts the user to say a phone number. When the user says an utterance of a phone number, as indicated at 12204, that utterance will be recognized. If the system is quite confident that the recognition of the phone number is correct, it will automatically dial the recognized phone number as indicated at 12206. If the system is not that confident of the phone number's recognition, it will display a correction window, 12208. If the correction window has the desired number as the first choice as is indicated in screen 12210, the user can merely select it by pressing the OK key, which causes the system to dial the number as indicated at 12212. If the correct choice is on the first choice list as is indicated in screen 12214, the user can merely press the phone key number associated with that choice to cause the system to dial the number, as is indicated at 12216.

Figure 123:
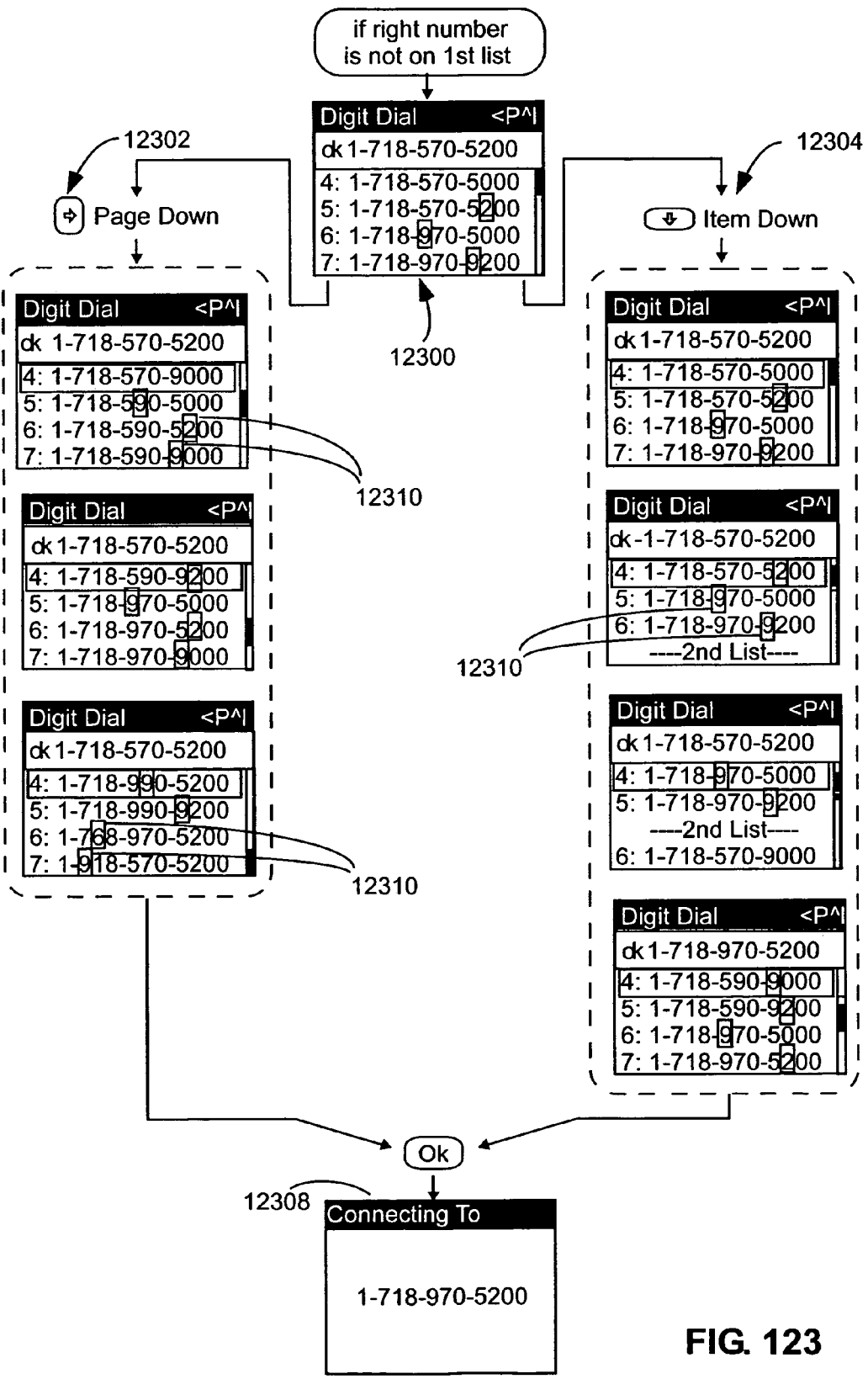

If the correct number is neither the first choice nor in the first choice list as indicated in the screen 12300, shown at the top of FIG. 123, the user can check to see if the desired number is on one of the screens of the second choice list by either repeatedly pressing the page down key as indicated by the number 12302, or repeatedly pressing the item down key as is indicated at 12304. Pushing the "Page Down" button moves a screen at a time through the second choice list. Pushing "Item Down" moves the highlighted item down one item at a time. If by scrolling through the choice list in either of these methods the user sees the desired number, the user can select it either by pressing its associated phone key or by moving the choice highlight to it and then pressing the OK key. This will cause the system to dial the number as indicated at screen 12308.

It should be appreciated that because the phone numbers in the choice list are numerically ordered, the user is able to find the desired number rapidly by scrolling through the list. In the embodiment shown in these figures, digit change indicators, 12310, are provided to indicate the digit column of the most significant digit by which any choice differs from the choice ahead of it on the list. This makes it easier for the eye to scan for the desired phone number.

FIG. 124 illustrates how the use of the Filter Nav option, described above with regard to functions 8248 and 8240 of the Correction Window functions shown in FIG. 82 in digit dial mode allows the user to navigate to digit positions in the first choice by use of the navigation keys and correct any error that exists within it. In FIG. 124, this is shown being done by speaking the desired number, but some embodiments the user is also allowed a filter option that can correct the desired number by navigating to digits in a number that need to be corrected and pressing the appropriately numbered phone keys.

As illustrated in FIG. 125, the user is also able to edit a misperceived phone number by inserting a missing digit as well as by replacing a mis-recognized one. The user can switch from a selection cursor that will cause an uttered number to replace the number highlighted by the cursor to an insertion cursor which is located between digits by pressing a "Character Up" key immediately followed by pressing a "Character Down" key as indicated by numeral 12502, or vice versa, by pressing a "Character Down" key immediately after pressing a "Character Up" key.

FIG. 129 illustrates one possible embodiment of the Name Dial routine 12900. This function can be selected from the top level phone screen 6400 shown at the start of FIG. 117 by pressing the Right button. It allows selection of a phone number by recognition of an associated name in the cellphone's contact information, in a manner similar to that in which an email address is selected by saying an associated name, as is shown in the screens 10800 through 10808 of FIG. 108.

As shown in FIG. 129, function 12904 of the Name Dial routine prompts the user to say or spell a name from the contact list. This is illustrated at screen 11700 in FIG. 117. This prompt remains displayed until it is removed either by the detection of an utterance in name recognition mode or of alphabetic input in filter mode, or by the user exiting the name dial function, such as by pressing the "escape" key, "*" (which, for purposes of simplification, is not shown in FIG. 129).

Function 12904 also clears the filter string, since at the time of the recognition of the expected name utterance no filter input will have been received, and sets the name dial routine to name recognition mode, which will cause the next utterance to be responded to by functions 12908 through 12916.

After function 12904 is performed a loop 12906 iterates over the remaining functions of FIG. 129. This loop is repeated until either a name is selected for dialing or the name dial function is exited.

If during this loop, before any step has been taken to remove the name dial routine from the name recognition mode, an utterance is detected, function 12908 causes functions 12909 through 12916 to be performed.

Function 12909 removes the prompt of function 12904. Function 12910 calls the getChoices routine of FIG. 23 with the utterance and the current filter string which is empty at this time. GetChoices will perform recognition on the utterance with a vocabulary substantially limited to names from system's contact list.

Function 12912 sets the navigation in the name dial mode to the Page/Item navigation mode and sets the name dial function to the choice mode, which favors the recognition of commands for selecting choices from the choice list.

In a manner similar to that described above with regard to the displayChoiceList routine of FIG. 22, function 12914 creates a first alphabetically ordered choice list that fits on one screen and a second alphabetically ordered choice list of more poorly scoring words from the recognition results created by the call to getChoices. The second list can be multiple screens in length.

Function 12916 then displays the best choice plus the first ordered choice list with the current filter cursor on the first letter of the first choice.

If the recognition of functions 12908 through 12916 is triggered by an unintended utterance, the user can, often by merely pressing "*>", escape from the name dial choice list window and then re-enter the name dial function, if desired.

Once in the loop 12906, if the user selects Filter Mode by double-pressing the "2" key, function 12917 sets the navigation mode to the Word/Char mode and enters the Filter Mode In this mode recognition of utterances and key presses related to filtering are favored.

After the user has switched to filter mode, he or she can enter alphabetic filtering input, such as by uttering a letter-name or by either ambiguous or unambiguous phone key presses, depending on current settings. If the user enters such alphabetic filtering input while in filter mode, function 12918 causes functions 12919 through 12930 to be performed.

Function 12919 removes the prompt of function 12904. Function 12920 calls the filterEdit routine of FIG. 28 with filtering input, and the current first choice, filter string, and filter cursor. Then function 12922 calls get-Choices with the filter string produced by the call to filterEdit to create a set of best scoring names based on the current filter string and recognition against the prior utterance of the desired name, if any.

Functions 12926 and 12928 show that if there is no prior name utterance, an alphabetically ordered choice list of contact names which have initial letters corresponding to the current filter string will be created. (Actually these choices will be generated by the call to getChoices in function 12922, which, as is shown in FIG. 23 includes functions 2338 and 2340 that can create choices from a filter string even when there is no utterance.)

Function 12930 displays a list of choices from the call to getChoices, with the highest scoring word in the list as the best, or first, choice and with the filter cursor before the first letter of the first choice that does not correspond to the filter string.

In some embodiments an indication will be made to the user that the phone keys cannot be used to choose any displayed choices other than the first choice when name dial is in the filter mode, during which time such keys are used for entering filtering characters. This can be done, for example by removing the phone key numbers from next to the non-best choices or, if one has a display capable of it, by graying all the choices other than the first choice.

Once a choice list is displayed, function 12932 allows functions 12934 through 12960 of the loop 12906 to be performed.

If, during the display of a choice list, the user selects a displayed choice candidate, function 12934 causes function 12936 to dial the phone number associated with the chosen name.

If the desired name is the current first choice, this can be done by pressing the "OK" key, as shown at 11705 in FIG. 117, in either the filter or choice mode. Choice mode provides more options for selecting choices. It favors recognition of choice-related commands. In choice mode, if the desired name is a displayed alternate choice, it can be selected by pressing the phone key having the number next to that choice. The Page/Item navigation mode used in choice mode, allows a user to scroll the highlighted choice in the choice list from the first choice to another choice and then either press "OK" to select the current highlighted choice or press a phone key associated with a desired choice.

If the user selects the Choice Mode by single pressing the "2" key, function, 12938 sets the navigation mode to the Page/Item mode and enters the Choice Mode.

During the Page/Item navigation mode of the Choice Mode, function 12940 causes functions 12942 through 12948 to control a response to the pressing of a navigational button.

In the Page/Item mode if the user selects Page Left or Right by pressing the Left or Right navigation button, functions 12942 and 12944 respond by scrolling the choice lists by a page up or down, respectively, moving the selection highlight by one page.

If, on the other hand, the user selects Item Up or Down by pressing the Up or Down button when in Page/Item navigation mode, functions 12946 and 12948 scroll the highlighted choice up or down, respectively, by one choice, scrolling the screen if necessary to display the new highlighted choice.

During the Word/Char navigation mode of the Filter Mode, function 12950 causes functions 12952 through 12960 to control the response to a navigational button.

If a user selects Word Left or Right while in Word/Char mode, functions 12952 and 12954 move the current character selection to the first or last character, respectively, of the previous or next word (such as first, middle, or last name) in the displayed best choice.

On the other hand if the user selects Character Up or Down when in such a mode, functions 12956 through 12960 move the filter cursor left or right by one character, respectively, provided the move would not place the filter cursor before or after the start or end of the best choice.

As shown in FIG. 129, the Name Dial routine allows a user to not only dial calls to a person listed in the cellphone's contact information by saying their name, but it also allows the user to aid such a recognition process by quickly scanning through one or more alphabetically ordered choice lists to look for a desired name listed as an alternate choice when the correct choice is not listed first. It also allows a user to limit recognition candidates to those that match a user specified filter string.

In some embodiments, all or a subset of the correction window options specified in FIGS. 81 through 83 could be made available in the Name Dial routine.

FIG. 130 illustrates a Digit Dial routine 13000, aspects of which have been described above with regard to FIGS. 122 through 125.

Figure 122:
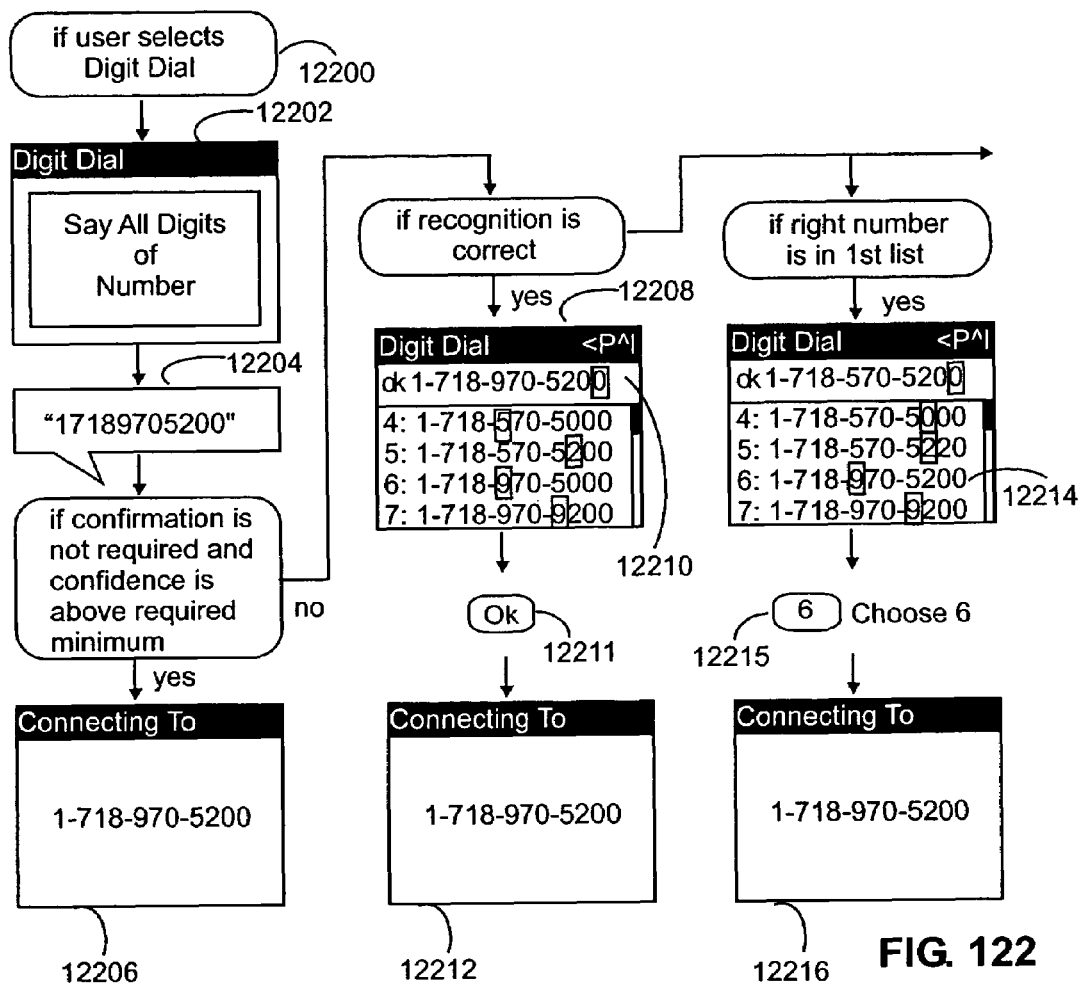

Function 13002 of this routine prompts a user to say the digits of a phone number that is to be dialed, as shown in screen 12202 of FIG. 122. Once such an utterance is received, such as the utterance 12204 shown in FIG. 122, function 13004 of FIG. 130 performs continuous digit recognition on it. A call to a routine like getChoices routine of FIG. 23 can be used to perform this recognition and generate a list of best scoring number strings.

If the cellphone is in a mode in which confirmation is not required before the dialing of a phone number selected by voice recognition, and if the confidence in the first choice recognized number string is above a required level, functions 13006 and 13008 will dial the recognized number, as is indicated at screen 12206 of FIG. 122. This causes the cellphone to commence a phone call and exit the routine of FIG. 130. In some embodiment the user can be enabled to decide whether the cell phone is to be in a mode in which the voice recognition of all phone numbers requires confirmation, no matter what the recognition confidence, by use of options located under the Main Options Menu referred to briefly at 6648 at the end of FIG. 68.

If best choice has a score above a required minimum level sufficient to indicate the recognition has a chance of proving useful, function 13010 causes functions 13012 through 13016 to generate a correction window. Although not shown, it is preferred that if this minimum score is not met the program flow will return to step 13002, which prompts the user to re-say the phone number.

If the minimum recognition score is met, function 13012 sets the navigation mode to Page/Item. Function 13014 creates a set of choice lists from the recognition results produced by function 13006 in a manner similar to that described above with regard to the displayChoiceList routine of FIG. 22. This includes generating a first numerically ordered choice list, which will fit on one screen, and a second numerically ordered choice list, which can be multiple screens in length. Then function 13016 displays best choice plus the first ordered choice list with current selection being set to the last digit in best choice. This results in the screen having the appearance shown at 12210 in FIG. 122.

Once this Digit Dial choice list is displayed, a loop 13018 is performed. Which repeatedly responds to user inputs, as indicated by the functions 13020 through 13070, until a phone number is selected and dialed or the user otherwise exits the Digit Dial routine.

If, when in the loop 13018, a user selects a displayed choice candidate, functions 13020 and 13022 will dial the selected number and then exit the Digit Dial routine. Such a selection can be made by pressing the "OK" key to select the first choice, as indicated at 12211 in FIG. 122, or by pressing a number key associated with a currently displayed choice, as is indicated at 12215 in FIG. 122.

If, when in this loop, the user selects Filter Mode by double pressing the "2" key, function 13024 sets the navigation mode to Word/Char Mode and enters Filter Mode.

If, on the other hand, the user selects choice mode by single pressing the "2" key, function 13026 sets the navigation mode to Page/Item and enters Choice Mode.

If, when in the Page/Item navigational mode of the Choice Mode, the user enters Page Left or Right, functions 13030 and 13032 will scroll the choice list by a page up or down, respectively, moving the highlight by one page, as is indicated on the left hand side of FIG. 123. This will allow the user to quickly scan all the choices in the two numerically ordered lists generated by either function 13014 or 130 13068.

If instead, when in this mode, the user selects Item Up or Down, functions 13034 and 13036 scroll the highlighted choice up or down, respectively, by one choice, scrolling the screen if necessary to display the highlighted choice. This choice-at-a-time navigation is indicated on the right hand side of FIG. 123. If either method of navigation places the desired number on the screen, the user can then select it by either pressing the "OK" key (if the highlight is on it) or by pressing an associated choice number key, as described above with regard to functions 13020 and 13022.

If, when in the Word/Char navigation mode of the Filter Mode, the user selects Word Left or Right, functions 13040 and 13042 move the current character selection to the first or last digit, respectively of displayed best choice.

If instead, when in this mode the user selects Character Up or Down, functions 13046 through 13052 will be performed. Function 13046 tests to see if either (a) the last input was a Character Up or Down command of different direction or (b) the move would put character selection before or after end of the current best choice. If either of these conditions is met, function 13048 changes the current character selection to an insertion cursor immediately before or after, respectively, the prior character selection. If neither of the conditions of function 13046 is met, functions 13050 and 13052 move the current character selection left or right by one digit.

If the user inputs one or more digits, function 13054 causes functions 13056 through 13070 to be performed.

If the current character selection is one or more digits, functions 13056 and 13058 replace the selected digit or digits with the one or more digits that have just been input by the user.

If, on the other hand, the current character selection is an insertion cursor of the type created by the operation of functions 13046 and 13048, then functions 13060 and 13062 will insert the one or more newly entered digits at the cursor position.

Once the new digits have been inserted into the best choice, function 13066 filters the phone number choices, using all digits from the start of the first choice up to and including the rightmost newly inserted digit as the filter string. Such filtering can be performed in a manner similar to that described above with regard to FIGS. 23 and 26.

Once such recognition has been performed functions 13068 and 13070 create a set of choice lists and display them in a manner similar to that described above with regard to function s13014 and 13016.

Thus, it can be seen that the Digit Dial routine of FIG. 130 allows a user to dial calls to a phone number by saying that number's digits. It also allows the user to aid such a recognition process by quickly scanning through one or more numerically ordered choice lists to look for a desired phone number as an alternate choice when the correct choice is not listed first. It also allows a user to limit phone number candidates to those that match a user specified numerical filter string.

In some embodiments, many of the correction window options specified in FIGS. 81 through 83 could be made available in the Digit Dial routine.

The invention described above has many aspects that can be used for the entering and correcting of speech recognition as well as other forms of recognition on many different types of computing platforms, including all those shown in FIGS. 3 through 8. A lot of the features of the invention described with regard to FIG. 94 can be used in situations where a user desires to enter and/or edit text without having to pay close visual attention to those tasks. For example, this could allow a user to listen to e-mail and dictate responses while walking in a Park, without the need to look closely at his cellphone or other dictation device. One particular environment in which such audio feedback is useful for speech recognition and other control functions, such as phone dialing and phone control, is in an automotive arena, such as is illustrated in FIG. 126.

Figure 126:
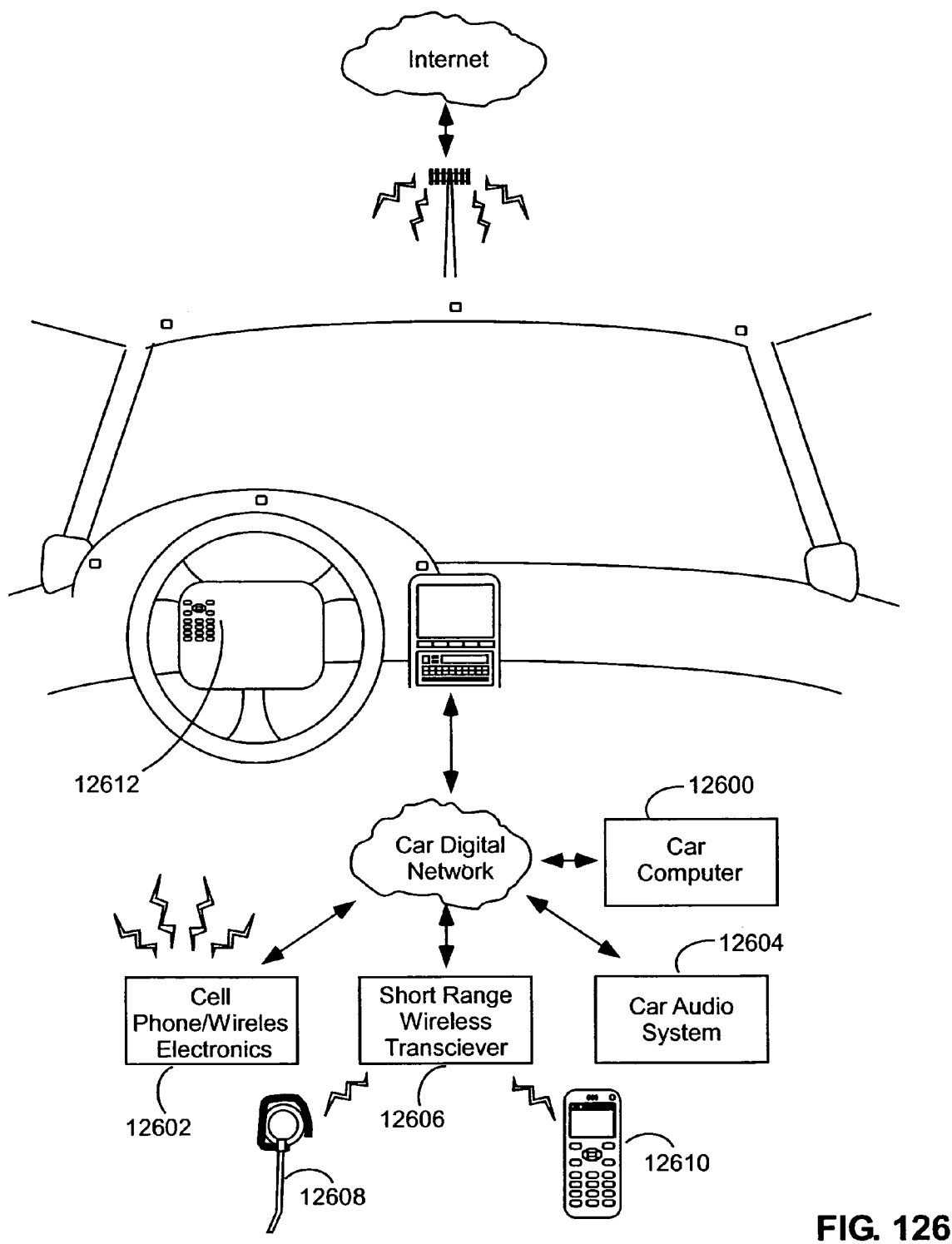
FIG. 126 illustrates how many aspects of the cellphone embodiment shown in FIG. 59 through 125 can be used in an automotive environment, including the TTS and duration logic aspects of the cellphone embodiment.

In the embodiment by shown in FIG. 126, the car has a computer, 12600, which is connected to a cellular wireless communication system, 12602, and to the car's audio system 12604. In many embodiments, the car's electronic system will have a short range wireless transceiver such as a Blue Tooth or other short range transceiver, 12606. These can be used to communicate to a wireless headphone, 2608, or the user's cellphone, 12610, so that the user can have the advantage of accessing information stored on his normal cellphone while using his car.

Preferably, the cellphone/wireless transceiver, 12602, can be used not only to send and receive cellphone calls but also to send and receive e-mail, digital files, such as text files that can be listened to and edited with the functionality described above, and audio Web pages.

The input device for controlling many of the functions described above with regard to the shown cellphone embodiment can be accessed by a phone keypad, 12612, which is preferably located in a position such as on the steering wheel of the automobile, which will enable a user to access its keys without unduly distracting him from the driving function. In fact, with a keypad having a location similar to that shown in FIG. 126, a user can have the forefingers of one hand around the rim of the steering wheel while selecting keypad buttons with the thumb of the same hand. In such an embodiment, preferably the system would have the TTS keys function described above with regard to 9404 through 9414 of FIG. 94 to enable the user to determine which key he is pressing and the function of that key without having to look at the keypad. In other embodiments, the touch sensitive keypad, discussed above with regard to FIG. 94, that responds to a mere touching of its phone keys with such information could also be provided that would be even easier and more rapid to use.

Figure 127:
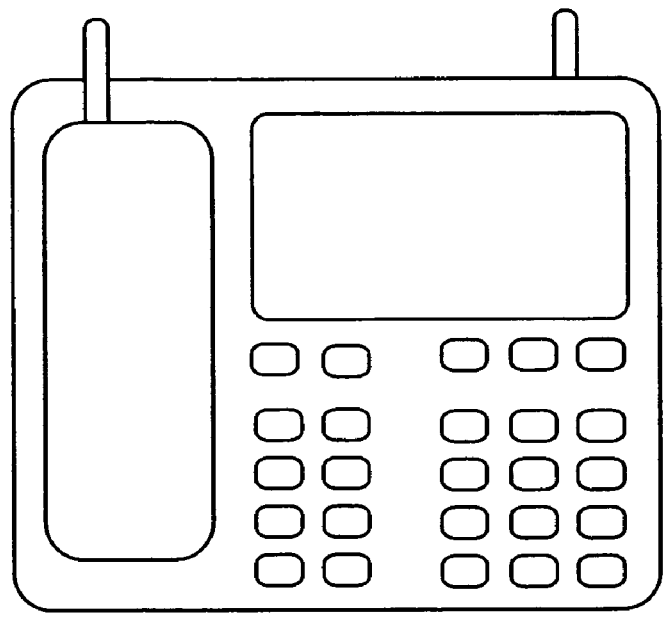
FIGS. 127 and 128 illustrate that most of the aspects of the cellphone embodiment shown in FIG. 59 through 125 can be used either on cordless phones or landline phones.
Figure 128:
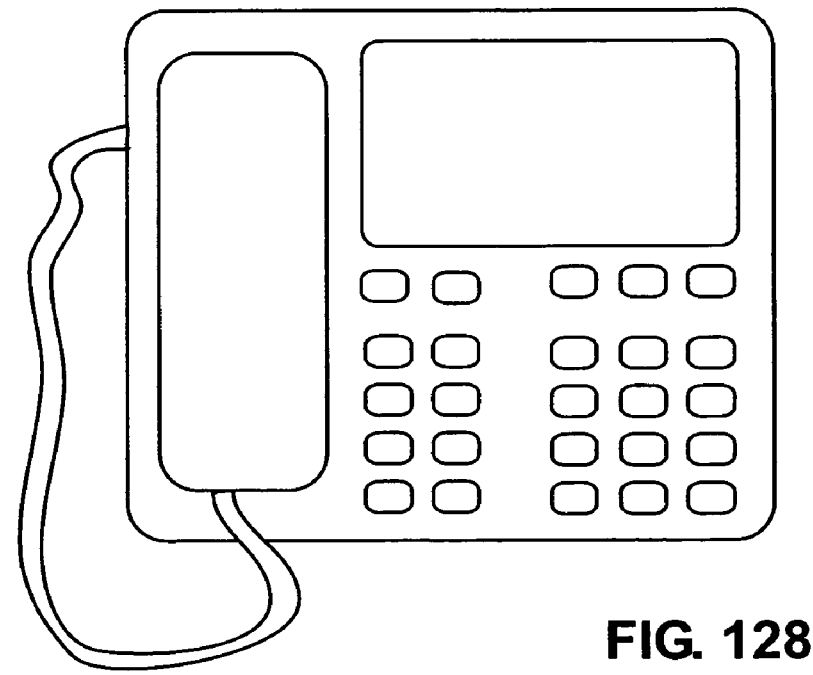

FIGS. 127 and 128 illustrate that most of the capabilities described above with regard to the cellphone embodiment can be used on other types of phones, such as on the cordless phone shown in FIG. 127 or on the landline found indicated at FIG. 128.

It should be understood that the foregoing description and drawings are given merely to explain and illustrate, and that the invention is not limited thereto except insofar as the interpretation of the appended claims are so limited. Those skilled in the art who have the disclosure before them will be able to make modifications and variations therein without departing from the scope of the invention.

The invention of the present application, as broadly claimed, is not limited to use with any one type of operating system, computer hardware, or computer network and, thus, other embodiments of the invention could use differing software and hardware systems.

Furthermore, it should be understood that the program functions described in the claims below, like virtually all program functions, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact functions and/or sequence of functions described in the figures. This is particularly true since the pseudo-code described in the text above has been highly simplified to let it more efficiently communicate that which one skilled in the art needs to know to implement the invention without burdening him or her with unnecessary details. In the interest of such simplification, the structure of the pseudo-code described above often differs significantly from the structure of the actual code that a skilled programmer would use when implementing the invention. Furthermore, many of the programmed behaviors that are shown being performed in software in the specification could be performed in hardware in other embodiments.

In the many embodiment of the invention discussed above, various aspects of the invention are shown occurring together which could occur separately in other embodiments of those aspects of the invention.

It should be appreciated that the present invention extends to methods, apparatus systems, and programming recorded in machine-readable form, for all the features and aspects of the invention which have been described in this application is filed including its specification, its drawings, and its original claims.

What we claim is:

1. A computerized method of performing word recognition comprising:

receiving a word input signal containing non-textual user input representing a sequence of one or more words;

performing word recognition upon the input signal to produce a choice list of best scoring recognition candidates, each comprised of a sequence of one or more words, found by the recognizer to have the best probability of corresponding to the input signal;

producing a visual display representing a choice list of the best scoring recognition candidates, with the candidates being ordered in said choice list according to a character ordering of the sequence of characters corresponding to the one or more words associated with each candidate in the list;

providing a user interface which enables a user to select one of the character-ordered recognition candidates from the choice list; and responding to user selection of one of the recognition candidates from the choice list by treating the selected candidate as the one or more words that correspond to the word input signal;

wherein:

the word recognition selects a single best scoring recognition candidate; and the single best scoring candidate is placed in a position in said user-perceivable output that is independent of where the character sequence corresponding to the one or more words associated with the single best scoring candidate would, according to said character ordering, fall in the character-ordered list;

said choice list includes more recognition candidates than fit on the display at one time;

the choice list is scrollable, so that a user can select to scroll the list relative to the display, so as to see more recognition candidates on the list than fit on the display at one time;

said user interface includes one button that allows a user to select to scroll the visual display of the choice list up by multiple recognition candidates and one button that allows a user to select to scroll the visual display of the choice list down by multiple recognition candidates; and said user interface responds to a user selection of one of said two buttons by moving the display up or down, respectively, relative choice list by multiple recognition candidates, when there are multiple such candidates by which to move the display, independently of the current location of the display relative to said list.

2. A method as in claim 1 wherein:
the word input signal is a representation of an utterance of a spoken word; and
the word recognition is speech recognition.

3. A method as in claim 1 wherein:
the character-ordered list is an alphabetically ordered list; and
the display of an individual recognition candidates in the list includes a sequence of one or more alphabetically spelled words.

4. A method as in claim 3 further including:
providing a user interface that allows the user to select a filtering sequence of one or more letter-indications after said display of the character-ordered list of best scoring recognition candidates; and
responding to the selection of said filtering sequence by generating and showing on said display a new alphabetized choice list of recognition candidates, which new choice list is limited to candidates whose sequence of one or more characters start with said filtering sequence; and
providing a user interface that enables a user to select one of the alphabetized recognition candidates from the new choice list;
responding to a user selection of one of the recognition candidates in the new choice list by treating the selected candidate as the one or more words that correspond to the word input signal.

5. A method as in claim 4 wherein said responding to the selection of said filtering sequence by generating and showing a new alphabetized choice list includes:
detecting whether or not the number of recognition candidates is below a desired number; and
when a detection is made that the number of recognition candidates is below the desired number, selecting from a vocabulary list one or more additional candidates that start with the filtering sequence for inclusion in said new alphabetized choice list.

6. A method as in claim 1 wherein:
the input signal represents the speaking of one or more names from contact information;
said word recognition is speech recognition; and
the choice list represents a plurality of best scoring names from the contact information, ordered alphabetically.

7. A computerized method of performing word recognition comprising:
receiving a word input signal containing non-textual user input representing a sequence of one or more words;
performing word recognition upon the input signal to produce a choice list of best scoring recognition candidates, each comprised of a sequence of one or more words, found by the recognizer to have the best probability of corresponding to the input signal;
producing a visual display representing a choice list of the best scoring recognition candidates, with the candidates being ordered in said choice list according to a character ordering of the sequence of characters corresponding to the one or more words associated with each candidate in the list;
providing a user interface which enables a user to select one of the character-ordered recognition candidates from the choice list; and
responding to user selection of one of the recognition candidates from the choice list by treating the selected candidate as the one or more words that correspond to the word input signal;
wherein:
said choice list includes more recognition candidates than fit on the display at one time;
the choice list is scrollable, so that a user can select to scroll the list relative to the display, so as to see more recognition candidates on the list than fit on the display at one time;
the character-ordered list is an alphabetically ordered list; and
the display of an individual recognition candidates in the list includes a sequence of one or more alphabetically spelled words;
said choice list has two separately alphabetically ordered sub-lists;
the first sub-list includes a alphabetically ordered plurality of the highest scoring choice candidates, which fit on the display at one time; and
the second sub-list includes an alphabetically ordered plurality of less well scoring choice candidates which would not all fit on the display at the same time as the first sub-list.

8. A method as in claim 7 wherein the second sub-list has more candidates than fit on the display at one time.

9. A method as in claim 8 wherein:
said user interface includes one button that allows a user to select to scroll the visual display of the combined choice list formed by the sequential combination of the first and second sub-lists up by multiple recognition candidates and one button that allows a user to select to scroll the visual display of the combined choice list down by multiple recognition candidates; and
said user interface responds to a user selection of one of said two buttons by moving the display up or down, respectively, relative to the combined choice list by multiple recognition candidates, when there are multiple such candidates by which to move the display, independently of the current location of the display relative to said list.

10. A method as in claim 7 wherein:
the word recognition selects a single best scoring recognition candidate; and
the single best scoring candidate is placed in a position in said user-perceivable output that is independent of where the character sequence corresponding to the one or more words associated with the single best scoring candidate would, according to said character ordering, fall in the character-ordered list.

11. A method as in claim 7 wherein:
said user interface allows the user to select a filtering sequence of one or more letter-indications after said display of the character-ordered list of best scoring recognition candidates;
the user interface that allows the use to select a sequence of one or more letter-indications allows a user to select a desired number of characters from the start of a string of alphabetic characters contained within a selected one of the recognition candidates displayed in a selected one of said first and second sublists; and
said user interface response to such a selection by using the selected one or more characters as all or part of said sequence of one or more letter-indications; and
said method further includes:
responding to the selection of said filtering sequence by generating and showing on said display a new alphabetized choice list of recognition candidates, which new choice list is limited to candidates whose sequence of one or more characters start with said filtering sequence;

causing said user interface to enable a user to select one of the alphabetized recognition candidates from the new choice list; and responding to a user selection of one of the recognition candidates in the new choice list by treating the selected candidate as the one or more words that correspond to the word input signal.

12. A method as in claim 7 wherein:

said user interface allows the user to select a filtering sequence of one or more letter-indications after said display of the character-ordered list of best scoring recognition candidates;

providing a user interface that allows the user to indicate the selection of a location on a displayed alphabetized choice list between two successively listed candidates in a selected one of said first and second sub-lists or between a first or last listed candidate in a selected one of said first and second sub lists and the beginning or end, respectively, of the selected sublist; and responding to such a selection by redisplaying a new alphabetized choice list limited to recognition candidates having spellings between the two candidates or between the candidates and the beginning or end of the alphabet, respectively;

said method further includes:

responding to the selection of said filtering sequence by generating and showing on said display a new alphabetized choice list of recognition candidates, which new choice list is limited to candidates whose sequence of one or more characters start with said filtering sequence;

causing said user interface to enable a user to select one of the alphabetized recognition candidates from the new choice list; and responding to a user selection of one of the recognition candidates in the new choice list by treating the selected candidate as the one or more words that correspond to the word input signal.

13. A computerized method of performing word recognition comprising:

receiving a word input signal containing non-textual user input representing a sequence of one or more words;

performing word recognition upon the input signal to produce a choice list of best scoring recognition candidates, each comprised of a sequence of one or more words, found by the recognizer to have the best probability of corresponding to the input signal;

producing a visual display representing a choice list of the best scoring recognition candidates, with the candidates being ordered in said choice list according to a character ordering of the sequence of characters corresponding to the one or more words associated with each candidate in the list;

providing a user interface which enables a user to select one of the character-ordered recognition candidates from the choice list; and responding to user selection of one of the recognition candidates from the choice list by treating the selected candidate as the one or more words that correspond to the word input signal;

wherein:

the character-ordered list is an alphabetically ordered list; and the display of an individual recognition candidates in the list includes a sequence of one or more alphabetically spelled words;

said user interface allows the user to select a filtering sequence of one or more letter-indications after said display of the character-ordered list of best scoring recognition candidates;

the user interface that allows the user to input said letter indications allows the user to enter such inputs by pressing one or more keys of a telephone keypad, with the pressing of a given telephone pad key indicating that a corresponding letter in the sequence of one or more characters associated with a desired recognition candidate is one of a set of multiple letters associated with the given key; and the new alphabetically ordered candidate list is limited to candidates that start with an initial sequence of letters corresponding to the sequence of letter-indicating inputs, in which each letter of a listed candidate that corresponds to a letter-indicating input entered by pressing a given telephone pad key is one of the set of letters associated with said given key;

said method further includes:

responding to the selection of said filtering sequence by generating and showing on said display a new alphabetized choice list of recognition candidates, which new choice list is limited to candidates whose sequence of one or more characters start with said filtering sequence;

causing said user interface to enable a user to select one of the alphabetized recognition candidates from the new choice list; and responding to a user selection of one of the recognition candidates in the new choice list by treating the selected candidate as the one or more words that correspond to the word input signal.

14. A computerized method of performing word recognition comprising:

receiving a word input signal containing non-textual user input representing a sequence of one or more words;

performing word recognition upon the input signal to produce a choice list of best scoring recognition candidates, each comprised of a sequence of one or more words, found by the recognizer to have the best probability of corresponding to the input signal;

producing a visual display representing a choice list of the best scoring recognition candidates, with the candidates being ordered in said choice list according to a character ordering of the sequence of characters corresponding to the one or more words associated with each candidate in the list;

providing a user interface which enables a user to select one of the character-ordered recognition candidates from the choice list; and responding to user selection of one of the recognition candidates from the choice list by treating the selected candidate as the one or more words that correspond to the word input signal;

wherein:

the character-ordered list is an alphabetically ordered list; and the display of an individual recognition candidates in the list includes a sequence of one or more alphabetically spelled words;

said user interface allows the user to select a filtering sequence of one or more letter-indications after said display of the character-ordered list of best scoring recognition candidates;

the user interface that allows the use to select a sequence of one or more letter-indications allows a user to select a desired number of characters from the start of a string of alphabetic characters contained within a selected one of the recognition candidates displayed in the choice list; and said user interface response to such a selection by using the selected one or more characters as all or part of said sequence of one or more letter-indications; and said method further includes:

responding to the selection of said filtering sequence by generating and showing on said display a new alphabetized choice list of recognition candidates, which new choice list is limited to candidates whose sequence of one or more characters start with said filtering sequence;

causing said user interface to enable a user to select one of the alphabetized recognition candidates from the new choice list; and responding to a user selection of one of the recognition candidates in the new choice list by treating the selected candidate as the one or more words that correspond to the word input signal.

15. A method as in claim 14 wherein:

said user interface includes one button that allows a user to select to scroll the visual display of the choice list up by multiple recognition candidates and one button that allows a user to select to scroll the visual display of the choice list down by multiple recognition candidates; and said user interface responds to a user selection of one of said two buttons by moving the display up or down, respectively, relative choice list by multiple recognition candidates, when there are multiple such candidates by which to move the display, independently of the current location of the display relative to said list.

16. A method as in claim 14 wherein the user interface includes a pointing device and allows the use to select a sequence of one or more letter-indications by dragging the pointing device over a desired number of characters from the start of a string of alphabetic characters contained within a selected one of the recognition candidates displayed in the choice list.

17. A computerized method of performing word recognition comprising:

receiving a word input signal containing non-textual user input representing a sequence of one or more words;

performing word recognition upon the input signal to produce a choice list of best scoring recognition candidates, each comprised of a sequence of one or more words, found by the recognizer to have the best probability of corresponding to the input signal;

producing a visual display representing a choice list of the best scoring recognition candidates, with the candidates being ordered in said choice list according to a character ordering of the sequence of characters corresponding to the one or more words associated with each candidate in the list;

providing a user interface which enables a user to select one of the character-ordered recognition candidates from the choice list; and responding to user selection of one of the recognition candidates from the choice list by treating the selected candidate as the one or more words that correspond to the word input signal;

wherein:

the character-ordered list is an alphabetically ordered list; and the display of an individual recognition candidates in the list includes a sequence of one or more alphabetically spelled words;

said user interface allows the user to select a filtering sequence of one or more letter-indications after said display of the character-ordered list of best scoring recognition candidates;

providing a user interface that allows the user to indicate the selection of a location on a displayed alphabetized choice list between two successively listed candidates or between a first or last listed candidate and the beginning or end, respectively, of the list; and responding to such a selection by redisplaying a new alphabetized choice list limited to recognition candidates having spellings between the two candidates or between the candidates and the beginning or end of the alphabet, respectively;

said method further includes:

responding to the selection of said filtering sequence by generating and showing on said display a new alphabetized choice list of recognition candidates, which new choice list is limited to candidates whose sequence of one or more characters start with said filtering sequence;

causing said user interface to enable a user to select one of the alphabetized recognition candidates from the new choice list; and responding to a user selection of one of the recognition candidates in the new choice list by treating the selected candidate as the one or more words that correspond to the word input signal.

18. A computerized method of performing word recognition comprising:

receiving a word input signal containing non-textual user input representing a sequence of one or more words;

performing word recognition upon the input signal to produce a choice list of best scoring recognition candidates, each comprised of a sequence of one or more words, found by the recognizer to have the best probability of corresponding to the input signal;

producing a visual display representing a choice list of the best scoring recognition candidates, with the candidates being ordered in said choice list according to a character ordering of the sequence of characters corresponding to the one or more words associated with each candidate in the list;

providing a user interface which enables a user to select one of the character-ordered recognition candidates from the choice list; and responding to user selection of one of the recognition candidates from the choice list by treating the selected candidate as the one or more words that correspond to the word input signal;

wherein:

the input signal represents the speaking of one or more word for a number that can be represented by a sequence of one or more digits;

said word recognition is speech recognition;

the choice list display each recognition candidate as a sequence of one or more digits; and the character ordering of the choice list orders recognition candidates based on a numerical ordering of their digit sequences.

19. A method as in claim 18 wherein:
said input signal represents the speaking of a phone number; and
said responding to a user selection of a recognition candidate causes the phone number displayed for the selected recognition candidate to be automatically dialed.

20. A computerized method of performing word recognition comprising:
receiving a word input signal containing non-textual user input representing a sequence of one or more words;
performing word recognition upon the input signal to produce a choice list of best scoring recognition candidates, each comprised or a sequence of one or more words, found by the recognizer to have the best probability of corresponding to the input signal;
producing a visual display representing a choice list of the best scoring recognition candidates, with the candidates being ordered in said choice list according to a character ordering of the sequence of characters corresponding to the one or more words associated with each candidate in the list;
providing a user interface which enables a user to select one of the character-ordered recognition candidates from the choice list; and
responding to user selection of one of the recognition candidates from the choice list by treating the selected candidate as the one or more words that correspond to the word input signal;
wherein:
the word recognition selects a single best scoring recognition candidate; and
the single best scoring candidate is placed in a position in said user-perceivable output that is independent of where the character sequence corresponding to the one or more words associated with the single best scoring candidate would, according to said character ordering, fall in the character-ordered list;
said choice list includes more recognition candidates than fit on the display at one time;
the choice list is scrollable, so that a user can select to scroll the list relative to the display, so as to see more recognition candidates on the list than fit on the display at one time;
said user interface includes one button that allows a user to select to scroll the visual display of the choice list up by multiple recognition candidates and one button that allows a user to select to scroll the visual display of the choice list down by multiple recognition candidates;
said user interface responds to a user selection of one of said two buttons by moving the display up or down, respectively, relative choice list by multiple recognition candidates, when there are multiple such candidates by which to move the display, independently of the current location of the display relative to said list;
the method is performed on a cell phone; and
the display is the display of a cell phone; and
the user interface that allows the user to select to scroll by multiple recognition candidate includes as set of four navigation buttons on said cell phone, including an up, a down, a left, and a right button; and
said two buttons that, respectively, allows the use to scroll up and down by multiple recognition candidates are either the up and down buttons, or the left and right buttons of said set of navigation buttons; and
the other two buttons of said set of navigation buttons are used, respectively, for moving selection in said choice list up and down by one candidate.

21. A method as in claim 20 wherein:
the showing of the choice list on the cell display includes displaying a different number in association with each recognition candidate in the portion of the choice list shown on the display at one time;
providing a user interface which enables a user to select one of the recognition candidates from the choice list by pressing a numbered phone key on said cell phone corresponding to a desired recognition candidate; and
responding to a user selection of one of the recognition candidates from the choice list by treating the selected candidate as the one or more words and/or numbers that correspond to the word input signal.

22. A computerized method of performing word recognition comprising:
receiving a word input signal containing non-textual user input representing a sequence of one or more words;
performing word recognition upon the input signal to produce a choice list of best scoring recognition candidates, each comprised of a sequence of one or more words and/or numbers, found by the recognizer to have a relatively high probability of corresponding to the input signal;
showing the choice list in a user scrollable display, with the choice list having more recognition candidates than fit on the display at one time so that only a sub-portion of the choice list is displayed at one time;
displaying a different symbol in association with each recognition candidate in the portion of the choice list shown on the display at one time, with the same symbol being associated with different recognition candidates shown on the display at different times as a result of the scrolling a given choice list;
responding to user input selecting to scroll the choice list up or down by moving the choice list relative to the display up or down, respectively, so as to change the portion of the choice list shown on the display;
providing a user interface which enables a user to select one of the recognition candidates from the choice list by pressing a button associated with the symbol corresponding to a desired recognition candidate; and
responding to the pressing of a button associated with a symbol corresponding to a given recognition candidate by treating the given candidate as the one or more words and/or numbers that correspond to the word input signal
wherein:
said user input selecting to scroll the choice list up or down includes one button that allows a user to select to scroll the visual display of the choice list up by multiple recognition candidates and one button that allows a user to select to scroll the visual display of the choice list down by multiple recognition candidates; and
said user interface responds to a user selection of one of said two buttons by moving the display up or down, respectively, relative choice list by multiple recognition candidates, when there are multiple such candidates by which to move the display, independently of the current location of the display relative to said list.

23. A method as in claim 22 wherein the word input signal is a representation of the speaking of one or more words and the word recognition is speech recognition.

24. A method as in claim 22 wherein:
the method is performed on a cell phone; and
the display is the display of a cell phone.

25. A method as in claim 24 wherein the symbols associated with displayed recognition candidates are numbers and the buttons associated with symbols are numbered phone keys.

26. A method as in claim 22 wherein:
each recognition candidate has associated with it a character string; and
recognition candidates in the scrollable choice list are ordered by the character ordering in which their respective character strings occur.

27. A method as in claim 22 wherein the recognition candidates in the scrollable choice list are ordered by their recognition score against the word signal.

28. A method as in claim 22 further including responding to user input selecting to scroll the choice list right or left by moving the choice list relative to the display right or left, respectively, so as to change the portion of individual choices in the choice list that are shown on the display.

29. A computerized method of performing word recognition comprising:
receiving a word input signal containing non-textual user input representing a sequence of one or more words;
performing word recognition upon the input signal to produce a choice list of best scoring recognition candidates, each comprised of a sequence of one or more words and/or numbers, found by the recognizer to have a relatively high probability of corresponding to the input signal;
showing the choice list in a user scrollable display, with the choice list having more recognition candidates than fit on the display at one time so that only a sub-portion of the choice list is displayed at one time;
displaying a different symbol in association with each recognition candidate in the portion of the choice list shown on the display at one time, with the same symbol being associated with different recognition candidates shown on the display at different times as a result of the scrolling a given choice list;
responding to user input selecting to scroll the choice list up or down by moving the choice list relative to the display up or down, respectively, so as to change the portion of the choice list shown on the display;
providing a user interface which enables a user to select one of the recognition candidates from the choice list by pressing a button associated with the symbol corresponding to a desired recognition candidate; and
responding to the pressing of a button associated with a symbol corresponding to a given recognition candidate by treating the given candidate as the one or more words and/or numbers that correspond to the word input signal
wherein:
said user input selecting to scroll the choice list up or down includes one button that allows a user to select to scroll the visual display of the choice list up by multiple recognition candidates and one button that allows a user to select to scroll the visual display of the choice list down by multiple recognition candidates; and
said user interface responds to a user selection of one of said two buttons by moving the display up or down, respectively, relative choice list by multiple recognition candidates, when there are multiple such candidates by which to move the display, independently of the current location of the display relative to said list;
further including responding to user input selecting to scroll the choice list right or left by moving the choice list relative to the display right or left, respectively, so as to change the portion of individual choices in the choice list that are shown on the display; and
wherein said responding to user input to scroll the choice list right or left includes responding to such an input by horizontally scrolling the display of individual recognition choices by a greater horizontal distance than the display of said symbol associated with each such recognition choice, so said associated symbols remain in the display when they wouldn't if they were scrolled by the same horizontal distance as the choices.

30. A computerized method of performing word recognition comprising:
receiving a word input signal containing non-textual user input representing a sequence of one or more words;
receiving a sequence of one or more filter input signal, each containing non-textual user input representing a sequence of one or more characters;
responding to the one or more filter input signals by producing a filter, representing one or more possible character sequences, each having one or more characters, found to have the best probability of corresponding to the filter input signal;
performing word recognition upon said word input signal, to generating a list of best scoring word recognition candidates, each of which is selected to start with a one of the one or more character sequences represented by the filter;
producing user-perceivable output representing:
said list of best scoring word recognition candidates; and
an indication of the character sequence represented by said filter that corresponds to the initial characters of one of the listed best scoring recognition candidates;
providing a user interface that enables a user to select one of the word recognition candidates from said list and/or to select a filter character from said indication of a character sequence represented by the filter;
responding to selection of one of the word recognition candidates from the choice list by treating the selected candidate as the one or more words that correspond to the word input signal;
responding to selection of a filter character by providing a user perceivable output of a choice list of other characters selected as having the best probability of corresponding to the selected character's position in the filter;
enabling a user to choose one of the characters in the character choice list;
responding to a choice of a character in the character choice list by:
limiting the one or more possible character sequences represented by the filter to ones having the chosen character in the selected filter character's position; and
repeated said generation of a user-perceivable list of word recognition candidates using the filter as limited by the chosen character.

31. A method as in claim 30 wherein the limiting of the one or more possible character sequences represented by the filter includes limiting such character sequences to ones having the characters, if any, that occur before the selected character in said user-perceivable indication of the character sequence represented by said filter.

32. A method as in claim 30 wherein:

said filter represents only one given character sequence;

said generation of a list of recognition candidates limits the listed word recognition candidates to only those starting with said one given character sequence; and the user-perceivable indication of the character sequence represented by the filter indicates the characters of said one given character sequence.

33. A method as in claim 30 wherein:

said filter represents a plurality of character sequences;

said generation of a list of word recognition candidates limits the listed word recognition candidates to those starting with one of said plurality of character sequences; and the user-perceivable indication of the character sequence represented by the filter indicates the characters of one of said plurality of character sequences.

34. A method as in claim 30 wherein:

the filter input signals correspond to a sequence of one or more phone key presses, where each of a plurality of said phone keys has a set of two or more letters associated with it; and the responding to the one or more filter input signals produces a filter representing a plurality sequences of characters, where each such sequence has a character position associated with each such key press, and where in different one of said character sequences the character position associated with a given key press has a different one of the set of letters associated with the given key press's phone key.

35. A method as in claim 30 wherein:

the filter input signals correspond to a sequence of one or more utterances each of a sequence of one or more letter indications; and the responding to the filter input signals includes performing speech recognition upon the sequence of one or more utterances to produce a filter representing one or more sequences of characters corresponding to the characters recognized from said utterances.

36. A computerized method of performing word recognition comprising:

receiving a word input signal containing non-textual user input representing a sequence of one or more words;

performing word recognition upon the input signal to produce a choice list of best scoring recognition candidates, each comprised of a sequence of one or more words, found by the recognizer to have the best probability of corresponding to the input signal;

showing the choice list in a user scrollable display;

responding to user input selecting to scroll the choice list right or left by moving the choice list relative to the display right or left, respectively, so as to change the portion of individual choices in the choice list that are shown on the display displaying a different symbol in association with each recognition candidate in the portion of the choice list shown on the display at one time, with the same symbol being associated with different recognition candidates shown on the display at different times as a result of the scrolling a given choice list;

providing a user interface which enables a user to select one of the recognition candidates from the choice list by pressing a button associated with the symbol corresponding to a desired recognition candidate; and responding to the pressing of a button associated with a symbol corresponding to a given recognition candidate by treating the given candidate as the one or more words and/or numbers that correspond to the word input signal;

wherein said responding to user input to scroll the choice list right or left includes responding to such an input by horizontally scrolling the display of individual recognition choices by a greater horizontal distance than the display of said symbol associated with each such recognition choice, so said associated symbols remain in the display when they wouldn't if they were scrolled by the same horizontal distance as the choices.

37. A method as in claim 36 wherein said method is practiced on a cell phone and the user input selecting to scroll horizontally is the pressing of a button or key on the cell phone.

38. A method as in claim 36 wherein:

the choice list has more recognition candidates than fit on the display at one time so only a sub-portion of the recognition candidates are displayed at one time;

the method further includes responding to user input selecting to scroll the choice list up or down by moving the choice list relative to the display up or down, respectively, so as to change the sub-set of recognition candidates shown on the display.

\* \* \* \* \*